US012798798B2

(12) United States Patent
Doulton et al.

(10) Patent No.: US 12,798,798 B2
(45) Date of Patent: Nov. 17, 2026

(54) SOLAR POWERED PLANE

(71) Applicant: Solaris Suborbital Inc., San Francisco, CA (US)

(72) Inventors: Daniel Michael Doulton, San Francisco, CA (US); Andrew Charles Elson, Fowey (GB); Jawad Al Attari, San Francisco, CA (US)

(73) Assignee: Solaris Suborbital Inc., San Francisco, CA (US)

( * ) Notice: Subject to any disclaimer, the term of this patent is extended or adjusted under 35 U.S.C. 154(b) by 0 days.

(21) Appl. No.: 19/442,372

(22) Filed: Jan. 7, 2026

(65) Prior Publication Data

US 2026/0131912 A1 May 14, 2026

Related U.S. Application Data

(63) Continuation-in-part of application No. PCT/US2026/010228, filed on Jan. 6, 2026, and a
(Continued)

(51) Int. Cl.

| | |
|---|---|
| ***B64U 10/50*** | (2023.01) |
| ***B64C 1/34*** | (2006.01) |
| ***B64C 3/26*** | (2006.01) |
| ***B64C 17/02*** | (2006.01) |
| ***B64C 31/02*** | (2006.01) |

(Continued)

(52) U.S. Cl.

CPC ................ *B64U 10/50* (2023.01); *B64C 1/34* (2013.01); *B64C 3/26* (2013.01); *B64C 17/02* (2013.01); *B64C 39/04* (2013.01); *B64D 17/38* (2013.01); *B64D 17/383* (2013.01); *B64D 45/04* (2013.01); *B64U 10/25* (2023.01); *B64U 20/65* (2023.01);
(Continued)

(58) Field of Classification Search

CPC ......... B64C 31/02; B64C 39/04; B64C 39/08; B64U 50/31
See application file for complete search history.

(56) References Cited

U.S. PATENT DOCUMENTS

| | | |
|---|---|---|
| 1,348,983 A | 8/1920 | Covino |
| 3,016,535 A | 1/1962 | Hewitt, Jr. |

(Continued)

FOREIGN PATENT DOCUMENTS

| | | |
|---|---|---|
| CN | 105460201 A | 4/2016 |
| EP | 4362081 A1 | 5/2024 |

(Continued)

OTHER PUBLICATIONS

International Search Report and Written Opinion dated Jul. 15, 2025 issued by the US Patent Office as International Searching Authority in connection with related International Application No. PCT/US2024/037028 (19 pages).

*Primary Examiner* — Nicholas McFall
(74) *Attorney, Agent, or Firm* — Neo IP

(57) ABSTRACT

A solar powered plane, such as a plane configured to operate in the stratosphere, that includes a descent control system arranged such that, in the event of loss of control or airframe failure or flight termination, a transferred energy to an impacted object and/or a kinetic energy imparted on impact by any item of the plane that reaches the ground is reduced to less than a predetermined energy or a regulatory or legal safety threshold.

20 Claims, 48 Drawing Sheets

Related U.S. Application Data continuation-in-part of application No. 19/338,555, filed on Sep. 24, 2025, which is a continuation of application No. 18/766,055, filed on Jul. 8, 2024, now Pat. No. 12,428,173.

(60) Provisional application No. 63/525,279, filed on Jul. 6, 2023.

(51) Int. Cl.

| | |
|---|---|
| ***B64C 39/04*** | (2006.01) |
| ***B64D 17/38*** | (2006.01) |
| ***B64D 45/04*** | (2006.01) |
| ***B64U 10/25*** | (2023.01) |
| ***B64U 20/65*** | (2023.01) |
| ***B64U 50/31*** | (2023.01) |
| *B64C 25/52* | (2006.01) |
| *B64U 101/30* | (2023.01) |

(52) U.S. Cl.
CPC .............. *B64U 50/31* (2023.01); *B64C 25/52* (2013.01); *B64C 31/02* (2013.01); *B64U 2101/30* (2023.01)

(56) References Cited

U.S. PATENT DOCUMENTS

| | | | | |
|---|---|---|---|---|
| 6,581,873 | B2 | 6/2003 | McDermott | |
| 7,789,339 | B2 | 9/2010 | Sommer | |
| 7,922,115 | B2 | 4/2011 | Colgren et al. | |
| 8,146,855 | B2 | 4/2012 | Ismailov | |
| 8,256,715 | B2 | 9/2012 | Ballard et al. | |
| 8,322,650 | B2 | 12/2012 | Kelleher | |
| 9,169,014 | B2 | 10/2015 | Elson et al. | |
| 9,957,037 | B2 | 5/2018 | Cornew et al. | |
| 10,214,295 | B2 | 2/2019 | Pan et al. | |
| 10,308,346 | B2 | 6/2019 | Parks et al. | |
| 10,836,480 | B2 | 11/2020 | Heinen et al. | |
| 11,296,540 | B2 | 4/2022 | Kirleis et al. | |
| 11,312,492 | B1 | 4/2022 | von Flotow et al. | |
| 11,414,191 | B2 | 8/2022 | Gibboney et al. | |
| 11,427,311 | B1 | 8/2022 | Ensslin | |
| 11,968,802 | B2 | 4/2024 | Amos et al. | |
| 12,091,149 | B2 | 9/2024 | Abbott | |
| 2004/0211862 | A1 | 10/2004 | Elam | |
| 2015/0336661 | A1 | 11/2015 | McCollough et al. | |
| 2018/0346095 | A1* | 12/2018 | Elson ........................ | B64C 3/26 |
| 2018/0354603 | A1 | 12/2018 | Elson | |
| 2020/0108909 | A1 | 4/2020 | Elson et al. | |
| 2020/0130810 | A1* | 4/2020 | Elson ..................... | B64U 50/31 |
| 2020/0148327 | A1 | 5/2020 | Elson et al. | |
| 2020/0274203 | A1 | 8/2020 | Kirleis et al. | |
| 2021/0309353 | A1 | 10/2021 | Gil | |
| 2022/0212788 | A1 | 7/2022 | Fen | |
| 2022/0411047 | A1 | 12/2022 | Mihai | |
| 2023/0091659 | A1* | 3/2023 | Kendall ................. | B64U 50/31<br>701/11 |
| 2023/0145112 | A1* | 5/2023 | Bishop ..................... | B64D 1/08<br>244/13 |
| 2024/0068756 | A1 | 2/2024 | Al Omari | |
| 2024/0125431 | A1 | 4/2024 | Lu et al. | |
| 2025/0011013 | A1 | 1/2025 | Elson et al. | |

FOREIGN PATENT DOCUMENTS

| | | |
|---|---|---|
| JP | 202015396 | 1/2020 |
| WO | 2017207968 A1 | 12/2017 |

* cited by examiner

DETAIL D

DETAIL E

DETAIL F

61

SECTION A-A
SCALE 1 : 2

FIG. 13C
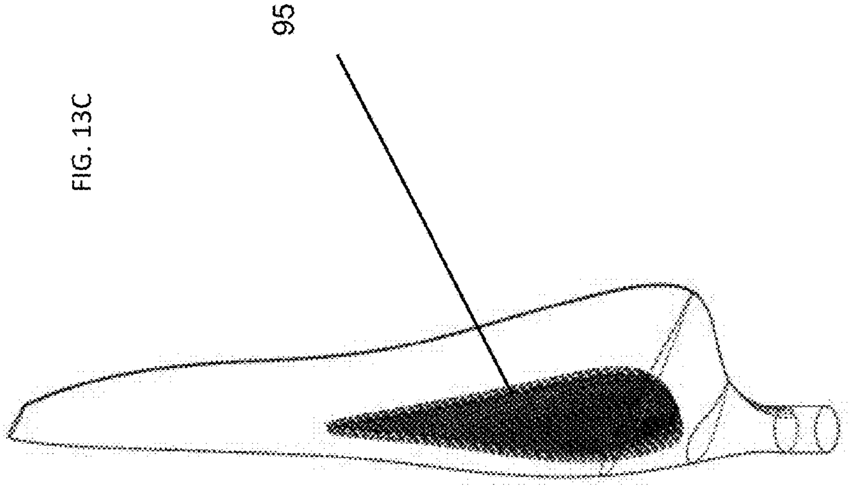
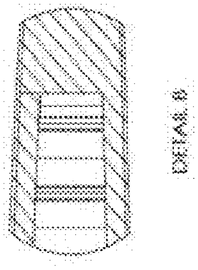
FIG. 13D
FIG. 13A
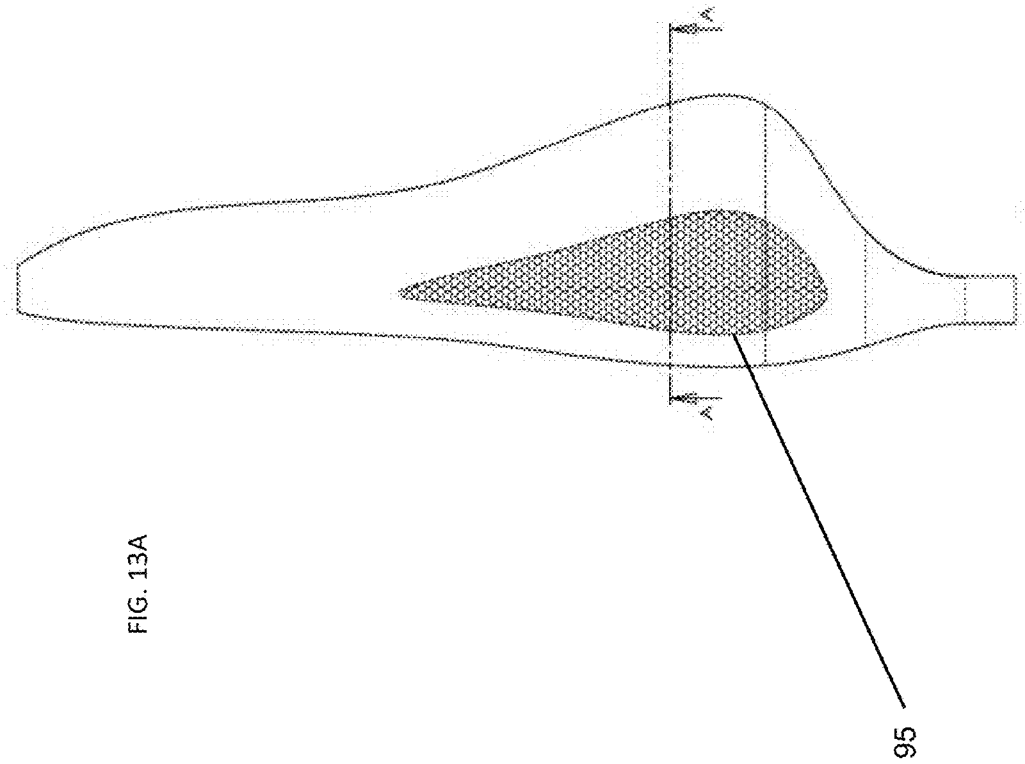
FIG. 13B

| | Mass of Airframe (kg) | Wingspan (m) | Downward speed (m/s) | Target mass* (kg) |
|---|---|---|---|---|
| (a) | 127.5 | 34 | 3.0 | 80 |
| (b) | 127.5 | 34 | 3.0 | 5 |
| (c) | 87.5 | 28 | 2.6 | 80 |
| (d) | 87.5 | 28 | 2.6 | 5 |

FIG. 29

| | $M_{airframe}$ (kg) | $M_{target}$ (kg) | Speed (m/s) | Position* | $KE_{initial}$ (J) | $KE_{airframe}$ (J) | $KE_{target}$ (J) |
|---|---|---|---|---|---|---|---|
| (a) | 127.5 | 80.0 | 3.0 | 0 | 573.8 | 216.6 | 135.9 |
| | 127.5 | 80.0 | 3.0 | 1 | 573.8 | 442.0 | 29.2 |
| (b) | 127.5 | 5.0 | 3.0 | 0 | 573.8 | 531.3 | 20.8 |
| | 127.5 | 5.0 | 3.0 | 1 | 573.8 | 537.5 | 16.8 |
| (c) | 87.5 | 80.0 | 2.6 | 0 | 295.8 | 80.7 | 73.8 |
| | 87.5 | 80.0 | 2.6 | 1 | 295.8 | 225.2 | 12.5 |
| (d) | 87.5 | 5.0 | 2.6 | 0 | 295.8 | 264.6 | 15.1 |
| | 87.5 | 5.0 | 2.6 | 1 | 295.8 | 270.8 | 11.2 |

FIG. 30

SOLAR POWERED PLANE

CROSS REFERENCES TO RELATED APPLICATIONS

This application is related to and claims priority from the following patents and patent applications. application is a continuation-in-part of U.S. patent application Ser. No. 19/338,555, filed Sep. 24, 2025, which is a continuation of U.S. patent application Ser. No. 18/766,055, filed Jul. 8, 2024, which claims priority to and the benefit of U.S. Application No. 63/525,279, filed Jul. 6, 2023. This application is a continuation-in-part of and claims priority to and the benefit of PCT Application No. PCT/US26/10228 filed Jan. 6, 2026. This application claims priority to and the benefit of UK patent applications GB2500150.4, filed Jan. 7, 2025, GB2515465.9, filed Sep. 17, 2025, and GB2516714.9 filed Oct. 7, 2025. Each of the above-referenced applications are incorporated herein by reference in its entirety.

BACKGROUND OF THE INVENTION

1. Field of the Invention

The present invention relates to a solar powered UAV, and more specifically to solar-powered stratospheric gliders including sensors for scanning a surface below and sacrificial landing systems to allow for reusability.

2. Description of the Prior Art

It is generally known in the prior art to provide a solar powered UAV.

Prior art patent documents include the following:

U.S. Pat. No. 10,214,295 for High-efficiency, lightweight solar sheets by inventor Pan et al., filed May 8, 2017 and issued Feb. 26, 2019, is directed to a high efficiency, lightweight solar sheet. Some embodiments include a solar sheet configured for installation on a surface of a UAV or on a surface of a component of a UAV. The solar sheet includes a plurality of solar cells and a polymer layer to which the plurality of solar cells are attached. Some embodiments include a kit for supplying solar power in a battery-powered or fuel cell powered unmanned aerial vehicle (UAV) by incorporating flexible solar cells into a component of a UAV, affixing flexible solar cells to a surface of a UAV, or affixing flexible solar cells to a surface of a component of a UAV. The kit also includes a power conditioning system configured to operate the solar cells within a desired power range and configured to provide power having a voltage compatible with an electrical system of the UAV.

U.S. Pat. No. 9,957,037 for High altitude aircraft with integrated solar cells, and associated systems and methods by inventor Cornew et al., filed Jun. 20, 2014 and issued May 1, 2018, is directed to a method of making a solar cell assembly includes placing backsides of multiple solar cells in contact with a substrate. The solar cells are electrically connected to each other. Heat and pressure are applied to the solar cells and the substrate to simultaneously impress the solar cells into the substrate and bond the solar cells to the substrate.

U.S. Pat. No. 8,322,650 for Aircraft by inventor Kelleher et al., filed Jul. 30, 2010 and issued Dec. 4, 2012, is directed to an aircraft, particularly a solar powered, high altitude, long endurance, unmanned aerial vehicle, is equipped with a combination of canted down, raked back wing tips and trailing "tip tails" carried on booms from the tip regions of the mainplane. Each tip tail is positioned to be subject to the upwash field of the respective wing tip vortex, at least in the cruise condition of the aircraft. The wing tip form can achieve a reduction in induced drag and help to relieve wing root bending moment while the tip tails can act through their connections to the mainplane to provide torsional relief to the latter, particularly under lower incidence/higher speed conditions. In the higher incidence/lower speed cruise condition, however, the presence of the tip tails in the upwash fields of the wing tip vortices means that they can generate lift with a component in the forward direction of flight and hence contribute to the thrust requirements of the aircraft.

U.S. Pat. No. 9,169,014 for Unmanned aerial vehicle and method of launching by inventor Elson et al., filed Aug. 8, 2012 and issued Oct. 27, 2015, is directed to A method of launching a powered unmanned aerial vehicle at an altitude of at least 13,000 m, the method comprising lifting the vehicle by attachment to a lighter-than-air carrier from a substantially ground-level location to an elevated altitude, causing the vehicle to detach from the carrier while the velocity of the vehicle relative to the carrier is substantially zero, the vehicle thereafter decreasing in altitude as it accelerates to a velocity where it is capable of preventing any further descent and can begin independent sustained flight.

U.S. Pat. No. 7,789,339 for Modular articulated-wing aircraft by inventor Sommer, filed Jun. 27, 2006 and issued Sep. 7, 2010, is directed to systems and/or methods for forming a multiple-articulated flying system (skybase) having a high aspect ratio wing platform, operable to loiter over an area of interest at a high altitude are provided. In certain exemplary embodiments, autonomous modular flyers join together in a wingtip-to-wingtip manner. Such modular flyers may derive their power from insolation. The autonomous flyers may include sensors which operate individually, or collectively after a skybase is formed. The skybase preferably may be aggregated, disaggregated, and/or re-aggregated as called for by the prevailing conditions. Thus, it may be possible to provide a "forever-on-station" aircraft.

US Patent Publication No. 2022/0411047 for Aerial vehicles with transitioning landing gear and related methods by inventor Mihai, filed May 19, 2022 and published Dec. 29, 2022, is directed to aerial vehicles that may be selectively transitioned between a fixed wing flight configuration and a vertical takeoff and landing (VTOL) configuration. In the fixed wing flight configuration, a forward propeller may rotate in a first forward plane, whereas in the VTOL configuration, the forward propeller may be tilted to rotate in a second forward plane. A forward landing arm may extend downward in the VTOL configuration and be configured to be tilted to a stowed position when the aerial vehicle is in the fixed wing flight configuration. The forward landing arm may be coupled to the forward propeller such that tilting of the forward propeller causes corresponding tilting of the forward landing arm. In some examples, a plurality of such landing arms and propellers are tilted during transitioning of the aerial vehicle, such as one or more forward propellers and landing arms and/or one or more aft propellers and landing arms.

U.S. Pat. No. 10,836,480 for Flight vehicle by inventor Heinen et al., filed Oct. 26, 2017 and issued Nov. 17, 2020, is directed to Method and apparatus for a flight vehicle including a wing having a high aspect ratio and first and second rotors having a high aspect ratio, with a ratio of the rotor diameter to wing length ratio is equal to or greater than about 0.25. In embodiments, the flight vehicle can include a first and second motor, each less than about one thousand HP, to drive a respective rotor and a second motor. The flight vehicle can include a cruise mode and a VTOL mode.

U.S. Pat. No. 7,922,115 for Modular unmanned air-vehicle by inventor Colgren et al., filed Apr. 23, 2007 and issued Apr. 12, 2011, is directed to an unmanned air vehicle designed for reconnaissance, surveillance, data acquisition, and general research. The air vehicle is a monoplane that consists of several pieces that can easily be assembled using a minimal amount of tools. The air vehicle consists of a forward and aft fuselage section, two identical horizontal stabilizers, and four identical wing sections. The aircraft can fly with all four wing sections, or with just two wing sections (the short wing configuration). Each of the four wing sections of the air vehicle can be interchanged with any of the other wing sections for the purpose of minimizing assembly time and spare parts.

U.S. Pat. No. 8,146,855 for Unmanned air vehicle by inventor Ismailov, filed Sep. 3, 2008 and issued Apr. 3, 2012, discloses an unmanned air vehicle for military, land security and the like operations including a fuselage provided with foldable wings having leading edge flaps and trailing edge ailerons which are operable during ascent from launch to control the flight pattern with the wings folded, the wings being deployed into an open unfolded position when appropriate. The vehicle is contained within a pod from which it is launched and a landing deck is provided to decelerate and arrest the vehicle upon its return to land.

US Patent Publication No. 2021/0309353 for Modular unmanned aerial vehicle system for adaptable parcel delivery by inventor Gil, filed Mar. 30, 2021 and published Oct. 7, 2021, discloses a modular unmanned aerial vehicle (UAV) system comprising a body module, a rotor module, and a wing module. The body module includes a flight controller and a power distribution device. The body module is releasably attachable to the rotor module or the wing module, and the body module is releasably attachable to the rotor module. The rotor module includes one or more motors and electronic speed controllers (ESCs), while the wing module includes a wing having a flap, elevator, aileron, or rudder. Various UAV configurations can be formed from the body module, the rotor module, and the wing module. Each configuration includes different advantages for flight time, distance, battery life, and payload capacity. A UAV can be configured to a particular configuration to optimize parcel delivery.

US Patent Publication No. 2023/0145112 for Aircraft by inventors Bishop et al., filed Mar. 29, 2021 and published May 11, 2023, discloses an aircraft comprising: a fuselage; and a payload module coupled to the fuselage, the payload module comprising one or more data storage devices. The payload module is configured to be decoupled from the fuselage during flight upon receipt of a de-coupling input.

U.S. Pat. No. 11,414,191 for Remotely controlled modular VTOL aircraft and reconfigurable system using same by inventors Gibboney et al., filed Jul. 27, 2019 and issued Aug. 16, 2022, discloses a manned/unmanned aerial vehicle adapted for vertical takeoff and landing using the same set of engines for takeoff and landing as well as for forward flight. An aerial vehicle which is adapted to takeoff with the wings in a vertical as opposed to horizontal flight attitude which takes off in this vertical attitude and then transitions to a horizontal flight path. A tailless airplane which uses a control system that takes inputs for a traditional tailed airplane and translates those inputs to provide control utilizing non-traditional control methods.

U.S. Pat. No. 11,312,492 for Rotorcraft-assisted systems and methods for launching and retrieving a fixed-wing aircraft into and from free flight by inventors von Flotow et al., filed Oct. 4, 2018 and issued Apr. 26, 2022, discloses various systems and methods configured to: launch a fixed-wing aircraft from a moving object into free, wing-borne flight using a multicopter; retrieve the multicopter after fixed-wing aircraft launch using a retrieval winch; retrieve the fixed-wing aircraft from free, wing-borne flight back onto the moving object using the multicopter; and retrieve the multicopter after fixed-wing aircraft retrieval using the retrieval winch.

US Patent Publication No. 2020/0108909 for Aircraft longitudinal stability by inventors Elson et al., filed Jun. 20, 2018 and published Apr. 9, 2020, discloses an aircraft having at least one main wing and at least one boom fuselage. The main wing has an aerofoil section having a leading edge, a trailing edge, a chord length extending between the leading edge and the trailing edge, a centre of lift, a flexural centre and a centre of mass. The centre of lift, the flexural centre and the centre of mass are located all within a region at most 4% of the chord length.

US Patent Publication No. 2020/0130810 for Aerial vehicle tether by inventor Elson, filed Jun. 20, 2018 and published Apr. 30, 2020, discloses an aerial vehicle having a wing and a fuselage. A tether is anchored at opposing ends of the wing and/or the fuselage. The tether is arranged to prevent one or more parts of the aerial vehicle from separating from the remainder of the aerial vehicle in the event of structural failure of the aerial vehicle.

WIPO Patent Publication No. WO2017207968 for Battery arrangement by inventors Elson et al., filed May 25, 2017 and published Dec. 7, 2017, discloses a battery arrangement and a method of operating a battery arrangement for a solar powered aerial vehicle. The battery arrangement has a plurality of batteries arranged in a plurality of groups, the groups including a first battery group, a second battery group and a third battery group. Each battery group includes one or more batteries, and the method has the following steps: discharging the first battery group via an electrical heating device, the first battery group being at an operative temperature range, the operative temperature range being at or above zero degrees Celsius; warming the second battery group from a non-operative temperature range, the non-operative temperature range being below zero degrees Celsius, to the operative temperature range using heat energy from the electrical heating device. Whilst the first battery group is being discharged and the second battery group is being warmed, the third battery group remains at the non-operative temperature range.

US Patent Publication No. 2020/0148327 for Method of forming a hollow spar for an aerial vehicle by inventors Elson et al., filed Jun. 20, 2018 and published May 14, 2020, discloses a method of forming a hollow spar for an aerofoil includes forming a sandwich structure having a first structural layer, a second structural layer and a cellular core layer located in between the first structural layer and the second structural layer. At least part of the sandwich structure is removed at intervals corresponding to one or more corner locations, and the sandwich structure is folded at the one or more corner locations to define a hollow space and form the spar. A chordwise extending rib section for an aerofoil has a substantially planar web with a chordwise length; and a reinforcement strip attached to an edge of the web over substantially the majority of the chordwise length.

US Patent Publication No. 2018/0354603 for Aircraft wing structure by inventor Elson, filed Sep. 19, 2016 and published Dec. 13, 2018, discloses an aircraft having a wing providing the main lifting surface for the aircraft. The wing has a structure supporting an aerodynamic surface, and the wing has a weight, the wing structure being unable to support its own weight when the aircraft is stationary and under a load of 1 g so as to cause structural failure of the wing.

US Patent Publication No. 2018/0346095 for Foam aerofoil by inventor Elson, filed Sep. 19, 2016 and published Dec. 6, 2018, discloses an aerofoil having at least one space frame and at least one pre-stressed cover supported by the space frame. The space frame has one or more structural members, the structural members including a structural foam material; and the pre-stressed cover forms at least a part of an external aerodynamic surface of the aerofoil.

US Patent Publication No. 2024/0125431 for a Device for Providing Liquid Helium Forced Flow Cooling Fluid by inventor Lu et al., filed Mar. 29, 2023, published Apr. 18, 2024, discloses a device for providing a liquid helium forced flow cooling fluid is provided, including a liquid helium vessel system for heat load, a liquid helium vessel system for circulation pump, a liquid helium vessel system for subcooled helium, and a cold box. The liquid helium vessel system for heat load absorbs the heat load of a cryogenic user; the liquid helium vessel system for circulation pump absorbs the heat load of a circulation pump; the liquid helium vessel system for subcooled helium absorbs the heat load of subcooled helium; the device process pipelines and the cold box achieve a pre-cooling process of a cryogenic user, a pre-cooling and liquid storage process of liquid helium vessels, and a pre-cooling and starting-up process of rotating machines, and provide the liquid helium forced flow cooling fluid to accomplish the operations of a cryogenic user. The device for providing a liquid helium forced flow cooling fluid of the present disclosure can effectively reduce the heat load of the liquid helium forced flow cooling device by optimizing the liquid helium forced flow cooling loops and managing the cryogenic heat loads base on the energy level gradient, thereby reducing the investment size and operating cost of a helium cryogenic system.

U.S. Pat. No. 11,968,802 for a Heat sink, heat sink arrangement and module for liquid immersion cooling by inventor Amos et al., filed Mar. 16, 2023, issued Apr. 23, 2024, discloses a heat sink and heat sink arrangements are provided for an electronic device immersed in a liquid coolant. A heat sink may comprise: a base for mounting on top of a heat-transmitting surface of the electronic device and transferring heat from the heat-transmitting surface; and a retaining wall extending from the base and defining a volume. A heat sink may have a wall arrangement to define a volume, in which the electronic device is mounted. A heat sink may be for an electronic device to be mounted on a surface in a container, in an orientation that is substantially perpendicular to a floor of the container. Heat is transferred from the electronic device to liquid coolant held in the heat sink volume. A cooling module comprising a heat sink is also provided. A nozzle arrangement may direct liquid coolant to a base of the heat sink.

US Patent Publication No. 2024/0068756 for a Heat sink with opposed elements providing temperature gradient by inventor Omari, filed Aug. 8, 2022, published Feb. 29, 2024, discloses a heat sink with opposed elements providing a temperature gradient has first and second thermally conductive elements disposed diametrically opposite each other on opposite sides of a chamber filled with a thermally conductive phase change material (PCM). The first and second thermally conductive elements ascend vertically from a thermoconductive base of the PCM chamber, which is adapted for mounting on the case of a heat source, such as an electronic component that generates heat or has heat applied thereto from its surroundings during operation. The first thermally conductive element is maintained hotter than the second thermally conductive element to provide a temperature gradient across the PCM chamber. The PCM melts as heat is absorbed. Convection currents are induced in the melting PCM that enhance heat absorption from the heat source while maintaining the heat sink at a relatively low temperature by dissipation of heat through the second thermally conductive element.

European Patent No. 4,362,081 for a Heat sink and electronic device by inventors Lin et al., Filed Sep. 8, 2023, published May 1, 2024, discloses a heat sink (3) and an electronic device (1) are provided. The electronic device (1) includes a circuit board (2) having a heat source (21), and a heat sink (3) contacting the heat source (21) to dissipate the heat. The heat sink (3) includes a heat dissipating plate (31) having an inlet region (IR), an outlet region (OR) and a vaporization region (VR) therebetween, and a cover plate (32). The vaporization region (VR) is disposed corresponding to the heat source (21). The cover plate (32) covers on the heat dissipating plate (31), and a channel (C) with an inlet (C1) and an outlet (C2) is formed between the cover plate (32) and the heat dissipating plate (31). A cooling liquid flowing into the channel (C) from the inlet (C1) is vaporized to a gas in the vaporization region (VR), and then dissipates outside the channel (C) through the outlet (C2).

SUMMARY OF THE INVENTION

The present invention relates to solar-powered stratospheric gliders including sensors for scanning a surface below and sacrificial landing systems to allow for reusability It is an object of this invention to provide a glider system powered by solar cells for scanning a surface below for various purposes, including agricultural monitoring, defense, fire detection, weather alerts, and/or other purposes.

In one embodiment, the present invention is directed to a glider including a sacrificial landing system as described herein.

In another embodiment, the present invention is directed to a modular glider system as described herein.

In yet another embodiment, the present invention is directed to a solar-powered stratospheric glider as described herein.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 13A illustrates a plan view of a propeller blade with an internal honeycomb core according to one embodiment of the present invention.

FIG. 13B illustrates a cross-sectional view of a propeller blade with an internal honeycomb core according to one embodiment of the present invention.

FIG. 13C illustrates a plan view of a propeller blade with an internal honeycomb core according to one embodiment of the present invention.

FIG. 13D illustrates a cross-sectional view of a propeller blade with an internal honeycomb core according to one embodiment of the present invention.

FIG. according to one embodiment of the present invention. 26C illustrates a side view of the AGP, carrying a plane

FIG. 29 illustrates a table illustrating the representative values used for impact modelling according to one embodiment of the present invention.

FIG. 30 illustrates a table summarizing the results for impact modelling according to one embodiment of the present invention.

DETAILED DESCRIPTION

Figure 1A:
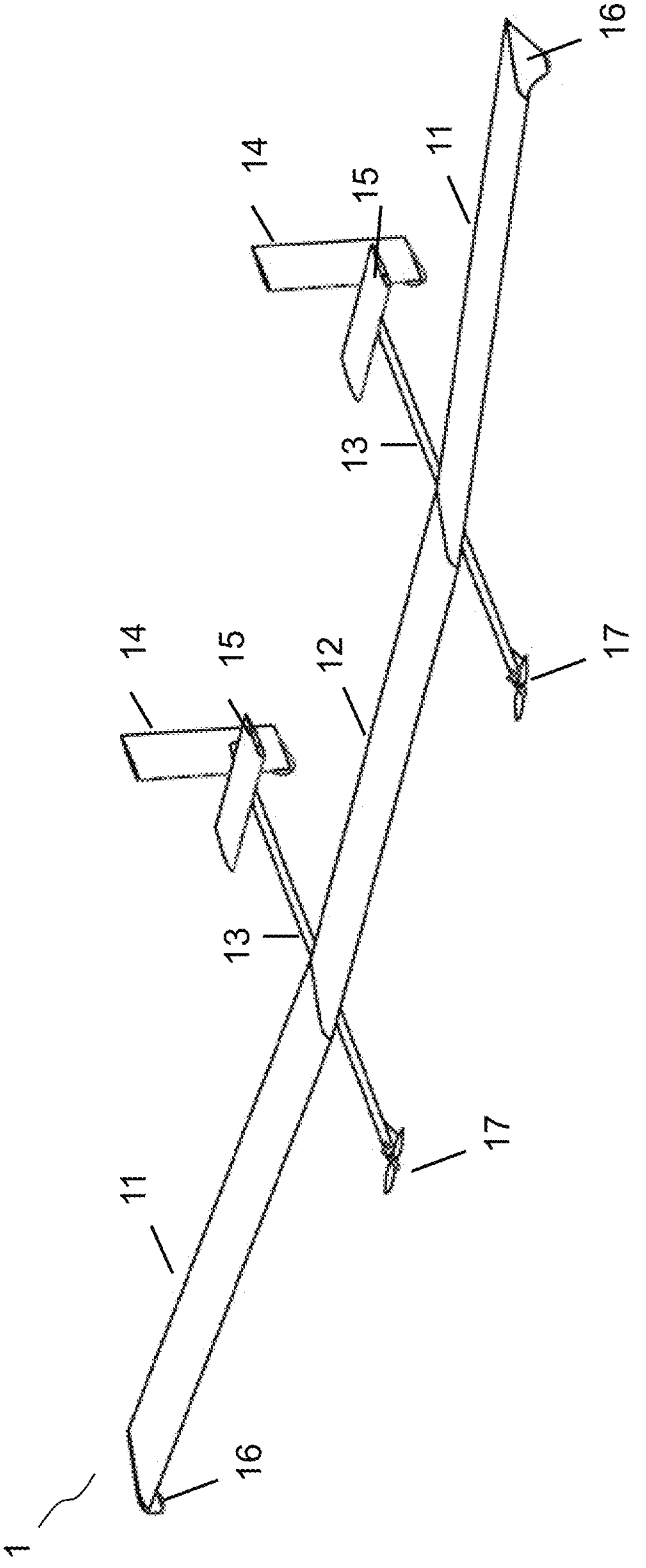
FIG. 1A illustrates a perspective view of the Solaris plane according to one embodiment of the present invention.

The present invention is generally directed to a solar powered UAV. The Solaris plane addresses technical challenges associated with, for example, manufacturing complexity, manufacturing cost, servicing complexity, repair complexity, re-usability, payload layout configurability, airframe rigidity and the flight stability essential for high precision data-gathering, which can arise in the design and operation of stratospheric solar powered planes.

In one aspect, the invention provides a solar powered plane, such as a plane configured to operate in the stratosphere, that includes a descent control system arranged such that, in the event of loss of control or airframe failure or flight termination, a transferred energy to an impacted object and/or a kinetic energy imparted on impact by any item of the plane that reaches the ground is reduced to less than a predetermined energy or a regulatory or legal safety threshold.

As used herein, "kinetic energy imparted on impact" refers to energy transferred from an item of the aircraft to an impacted object during an impact event, taking into account energy dissipation due to aerodynamic drag, structural deformation, modular separation, flexible structural response, vibration and damping behavior, and other energy dissipating mechanisms.

In some embodiments, structural sections of the aircraft are interconnected by one or more tethers arranged to maintain attachment of the sections during descent and to inhibit uncontrolled separation in the event of structural failure. A braking system, which may include a parachute, aerodynamic brake, deployable surface, drag-inducing structure, or other decelerating device, may be configured to deploy automatically or manually to reduce descent speed such that the kinetic energy transferred upon impact remains below a regulatory threshold. In further embodiments, high-mass components such as batteries or payloads may be separated from supporting structures and suspended on individual tethers during descent to ensure that no single component exceeds an impact energy limit. Modular airframe architecture, flexible wing structures, and vibration dissipation characteristics may inherently reduce initial impact energy and further assist in compliance with predetermined energy thresholds.

In a second aspect, the invention provides wing-integrated electrical architectures that simplify manufacturing and servicing while enabling rapid reconfiguration of payload and subsystem arrangements. In one embodiment, the aircraft includes a wiring loom that runs along a surface of a wing spar. The wiring loom may be located on a forward-facing, rearward-facing, internal, or external surface of the spar, and may be attached using lightweight attachment mechanisms. This accessible routing simplifies installation, replacement, and maintenance of wiring and enhances payload configurability.

In another aspect, the invention provides a solar powered plane comprising a wing having a leading-edge D-section formed of a removable modular component positioned forward of a wing spar. The D-section defines an internal volume for one or more payloads and may be substituted for D-sections having different forward profiles to support mission-specific configurations. As used herein, 'D-section' refers broadly to a removable leading-edge module positioned forward of a wing spar and is not limited to any particular cross-sectional shape. In some embodiments, the D-section is sized and shaped to house sensors, communications devices or other payloads positioned adjacent to or forward of the spar and may include apertures or external forms to accommodate such payloads. In further embodiments, the D-section is manufactured from lightweight or cuttable materials to permit rapid fabrication or modification using processes such as hot-wire cutting from CAD templates, CNC machining, molding or additive manufacturing.

Additional independent features may be implemented separately or in combination. These include communication subsystems enabling peer-to-peer mesh networking among aircraft; structural configurations such as ribs formed from compressed foam struts or wings of substantially constant chord; and gas-filled enclosures arranged to provide thermal buffering or lightweight internal volume.

Although described in connection with solar-powered stratospheric aircraft, the invention is not limited to such platforms. The features described herein may be employed in aircraft using other propulsion systems and operating at various altitudes.

Designing a stratospheric solar powered plane presents multiple challenges: the plane has to be light and yet rigid enough to survive the ascent and descent from stratospheric altitudes. It has to be light and yet able to lift a significant payload. It has to be light and yet be equipped with sufficient batteries and PV cells to enable it to stay in the air for many days, weeks or even months. It should ideally be low cost, straightforward to manufacture and service, be re-usable, have a configurable payload layout, and have the flight stability essential for high precision data-gathering.

Stratospheric solar powered planes include the NASA Pathfinder (1993), Pathfinder Plus (1998), NASA Centurion/Helios (1999), Airbus Zephyr (2005 to date), Titan Aerospace Solara (2012-2017), Korea Aerospace Research Institute EAV (2010-2015), Astigan A3 (2014-2021), and Facebook Aquila (2016-2018). Some implementations can involve manufacturing, or servicing steps that increases turnaround time.

Reference may be made to WO 2018/234798, WO 2018/234799, WO 2014/013268, U.S. Pat. No. 9,169,014, WO 2017/207968, WO 2018/237797, WO 2018/234797, WO 2017/051159, WO 2017/051160, the contents of which are incorporated herein by reference in their entirety.

In one embodiment, the present invention includes a glider configured for operation in the stratosphere, including: multiple wings; at least one fuselage; a photovoltaic power source; at least one battery positioned inside one of the multiple wings; and at least one payload item positioned inside one of the multiple wings or within the at least one fuselage; wherein the at least one battery is positioned behind one or more removable parts or covers that define a curved, frontal part of a leading edge of a wing surface and wherein the one or more removable parts or covers form a continuous surface with adjacent parts of the leading edge of the wing surface.

In one embodiment, the glider further comprises a descent control system arranged such that, in the event of loss of control or airframe failure or flight termination, transferred energy to an impacted object and/or kinetic energy imparted on impact by any item of the glider that reaches the ground is reduced to less than a predetermined energy or a regulatory or legal safety threshold.

In one embodiment, the descent control system is configured to reduce a transferred energy to an impacted object by controlling descent speed, impact attitude and likely first-contact location along a span of the glider, mass distribution and modular separation, and/or structural compliance and damping.

In one embodiment, the predetermined energy or the regulatory or legal safety threshold corresponds to an impact energy of less than approximately 175 Joules, and/or a transferred energy to a person of less than 80 Joules.

In one embodiment, the glider further includes one or more tethers interconnecting sections of the glider including the multiple wings, the at least one fuselage, the at least one payload item, and/or the at least one battery, wherein the one or more tethers are arranged to keep the sections of the glider attached together in an event of loss of control or an airframe failure or flight termination.

In one embodiment, the glider further includes a braking system to reduce descent speed including at least one parachute, a deployable wing surface, a drag panel, an airbag, a deployable aerodynamic foil, and/or other deployable drag-inducing structure connected to one or more tether and/or the at least one battery.

In one embodiment, deployment of the braking system is triggered by an onboard sensor, a remote command, detection of a specific event such as loss of control, airframe failure, and/or flight termination, wherein the braking system is configured to reduce descent speed to less than 3 m/s at ground impact.

In one embodiment, the glider further includes a release system, wherein the deployment of the braking system automatically triggers the release system which is configured to separate high-mass items including the at least one battery or the at least one payload from their supporting structures and suspends them on individual tethers, wherein the release system comprises a release pin or another mechanical release coupled to the braking system and/or the one or more tether.

In one embodiment, the one or more removable parts or covers is made of foam.

In one embodiment, the foam provides thermal protection for the at least one battery positioned behind the one or more removable parts or covers.

In another embodiment, the present invention includes a glider includes: an airframe comprising multiple wing sections, wherein the multiple wing sections include at least one removable component defining a leading edge of the multiple wing sections; a plurality of power storage devices positioned distributed across the multiple wing sections to optimize weight distribution and energy storage capacity; and an optical power receiver configured to receive an optical beam transmitted through air from a ground station or node glider and to convert the received optical beam into electrical power; wherein the plurality of power storage devices are positioned behind the at least one removable component defining the leading edge of the multiple wing sections.

In one embodiment, the glider further includes an electrical interface configured to supply the electrical power to a propulsion system, avionics system, communications system, a payload, and/or the plurality of power storage devices.

In one embodiment, the glider is further configured to exchange data with the ground station or the node glider via the optical power receiver utilizing a separate point-to-point communications link that is independent of the optical beam and/or by modulation of the optical beam to carry a data signal.

In one embodiment, the glider further includes at least one communication device configured to communicate directly with other aircraft, a satellite, and/or the node glider to form a peer-to-peer mesh network, and a routing subsystem configured to dynamically select between free-space optical, radiofrequency (RF), and/or satellite links.

In one embodiment, the optical power receiver comprises one or more photovoltaic receiver materials and/or stacks selected for a wavelength of the optical beam.

In another embodiment, the present invention includes a solar powered glider, including: an airframe comprising multiple wing sections, wherein the multiple wing sections include at least one removable component defining a leading edge of the multiple wing sections; at least one photovoltaic power source; at least one power storage device positioned within at least one of the multiple wing sections; and at least one payload item positioned within one or more of the multiple wing sections or within at least one fuselage; wherein the at least one payload item comprises at least one communication module configured to receive and/or transmit signals; and wherein the at least one power storage device and/or the at least one payload item is positioned behind the at least one removable component defining the leading edge of the multiple wing sections.

In one embodiment, the solar powered glider further includes the solar powered glider is further configured to exchange data with a ground station, a node glider, and/or at least one satellite via the at least one communication module.

In one embodiment, the at least one communication module includes an automatic dependent surveillance-broadcast (ADS-B) receiver, a data relay subsystem comprising satellite communication (SATCOM), a radiofrequency (RF) line-of-sight data link, and/or laser-based communication link.

In one embodiment, the solar powered glider further includes one or more tethers interconnecting sections of the glider including the multiple wing sections, the at least one payload item, and/or the at least one power storage device, wherein the one or more tethers are arranged to keep the sections of the glider attached together in an event of loss of control or an airframe failure or flight termination.

In one embodiment, the solar powered glider further includes the at least one removable component includes a foam layer.

Index

1 plane
11 wing section
12 central section
13 fuselage
14 vertical stabilizer
15 horizontal stabilizer
16 winglet
17 propeller blade
21 universal joint system
22 bracket
23 curved mounting surface
24 circular aperture
25 vertical structural section
26 fuselage/boom
27 fabric loop/tape
28 torniquet pin
29 cylindrical boss/stub
31 fuselage
32 carbon fiber outer surface of fuselage
33 carbon fiber inner surface of fuselage
34 structural foam core of fuselage
51 vertical stabilizer skid
52 winglet skid
53 fuselage skid
61 wing leading edge section to cover a payload compartment
62 wing leading edge section not covering a payload compartment
63 foam and/or carbon fiber strut
64 L-shape bracket
65 battery pack (or other non-airframe payload item)
66 payload/battery compartment
71 battery pack
72 wing rib
73 mechanical adjustment or frame
74 lock collar
81 wiring loom
91 high-density foam core
92 low-density foam core
93 light weight honeycomb
94 additional reinforcement
95 light weight honeycomb foam core
110 solar cells
121 vertical tailplane (during flight)
122 vertical tailplane (during landing)
123 hinge point
131 small control surface (e.g. trim ailerons or controls)
132 descent control system
133 braking system
141 top chord
142 bottom chord
143 diagonal foam struts
150 heat shrinkable border
151 non-heat shrinkable film
191 ground handling vehicle (AGP)
192 fuselage holders
193 support arms
194 wheels
195 lateral spar
196 chassis
200 data ingestion stage
201 receive live data stage
202 processing stage
203 delivery stage
204 decisioning stage
205 APIs
206 field operatives
207 update mission parameter and processing priority update stage

208 signal processing module
209 specialist data processing module
210 machine learning module
211 input updated mission parameters and processing priorities
212 update prediction models
800 computer system
810 network
812 communication antenna
820 computing device
830 computing device
840 computing device
850 server
851 processing unit
852 operating system
860 processor
862 memory
864 random access memory (RAM)
866 read-only memory (ROM)
868 bus
870 database
872 operating system
874 memory
876 programmes
890 storage media
892 operating system
896 communication media
898 input/output controller
899 other devices
900 instructions In one embodiment, the Solaris plane is a twin fuselage or twin boom, solar powered plane optimised for long duration stratospheric flights; it is equipped with electric motors powering propellers optimised for stratospheric operation; the Solaris plane can also glide for extended distances. The electric motors are powered by a combination of power from PV solar cells (e.g. on the upper surface of its wings) and batteries; these batteries are also charged by the PV cells during daylight. The Solaris plane comes in three primary variants: one with an 8 m wingspan, one with a 28 m wingspan and one with a 38 m wingspan; more generally, Solaris planes have a wingspan of 25-40 m. All are dual fuselage, dual propeller designs, with a payload that can be in the central wing section connecting the two fuselages or booms, distributed across the main wings or located in the fuselages; this flexibility enables a broad range of different payloads to be carried, in various configurations optimised for the task required to be performed and the flight mission constraints.

Note that for the 32 m-34 m variant, the payload capacity of approximately 12 Kg marries well to a wide payload inventory of COTS (commercial off-the-shelf) instruments/sensors/cameras and CubeSat payload dimensions; the wingspan is not so large as to require a heavy airframe, with all the negative consequences that entails, yet not so small that the payload is insufficient for commercially viable payloads. As payloads (including batteries) become increasingly smaller and lighter yet more capable, smaller Solaris planes become viable for the same or better payload functionality. Because of the inherent flexibility of the airframe design, and the ease with which different sizes of Solaris plane can be designed and constructed, Solaris planes can be readily optimised for future payloads. Solaris planes with a 32 m-34 m wingspan can be thought of as occupying today's sweet-spot across various parameters, given the constraints of today's material performance (e.g. airframe strength to weight ratio, battery power to weight ratio, PV output etc) and today's payload size and weight. As material performance improves, the 28 m variant may prove to be at the sweet-spot. Equally, much larger payloads may be needed in the future, in which case larger variants may be needed.

In one embodiment, the variants implement a plurality of features. These features are classified into the following 6 general categories:

Key Feature Group A. Design of the plane
Key Feature Group B. Photo Voltaics
Key Feature Group C. Imaging systems
Key Feature Group D. Connectivity
Key Feature Group E. Launch and recovery
Key Feature Group F. Use cases
Key Feature Group G. Additional features These general categories are sub categorized as follows:

Key Feature Group A: Design of the plane
- A.1 Modular construction
- A.2 Carbon fiber fuselage
- A.3 Downward winglet that acts as landing skid
- A.4 Removable wing leading edge, covering a payload compartment
- A.5 Batteries and payload positioned in the wings
- A.6 Battery re-positioning for optimal balancing
- A.7 Accessible wiring loom running along wing spar
- A.8 Over-sized foam core used in the carbon fiber propeller blade
- A.9 Carbon fiber propeller blade with inhomogeneous internal structural foam core
- A.10 Triangular cross-section fuselage
- A.11 Hinged tail with landing skid
- A.12 Propeller blades align with the wing direction prior to landing
- A.13 Very fine flight control surfaces
- A.14 Wing ribs
- A.15 Gas-filled bag heat sink
- A.16 Combining heat shrinkable and non-heat shrinkable films
- A.17 Creating the wing skin Key Feature Group B: PVs
- B.1 Flexible PV film wing surface
- B.2 Flexible PV film with lacquer coating Key Feature Group C: Imaging systems
- C.1 Metallised carbon fiber lens
- C.2 Phased array antenna or sensor coated directly onto a wing skin
- C.3 Parallel processing of wing mounted imaging sensors Key Feature Group D: Connectivity
- D.1 Ground station connectivity
- D.2 Data payloads are sent plane-to-plane Key Feature Group E: Launch and recovery
- E.1 Plane with detachable propulsion pod
- E.2 Tail-first vertical lift and then nose-down release
- E.3 Plane lands on an autonomous vehicle
- E.4 Assisted take-off from an autonomous vehicle
- E.5 Ground handling vehicle can move in any direction Key Feature Group F: Use cases
- F.1 Improved training of AI based models
- F.2 Improved inference for AI based models
- F.3 Combining multiple sensors or imaging subsystems
- F.4 Dark vessel monitoring
- F.5 Ship Anchor Dragging Detection
- F.6 Spy balloon capture
- F.7 Non-GPS location system
- F.8 Weather/Wind data capture process
- F.9 Urban Eyes
- F.10 Parking F.11 Traffic/movements
F.12 Buildings
F.13 Insurers, Finance, Service providers
F.14 Plane includes sensors for geophysical surveys
F.15 Characterizing 3D spaces
F.16 Synthetic radar return pulse generation
F.17 Below horizon aircraft monitoring
F.18 Imaging system for cloud penetration
F.19 Cloud characteristic monitoring Key Feature Group G: Additional features
G.1 Reducing kinetic energy risk to meet a safety threshold
G.2 Constant chord wings
G.3 Rectangular or trapezoidal cross-section wing spars
G.4 Solar cells flush to the wing skin
G.5 Latitude extension
G.6 Wireless power transfer (Microwave/RF and optical) and combined communications for sustained stratospheric operations
G.7 Peer-to-peer FSO (laser com) or RF communications mesh
G.8 Configurable D-section In one embodiment, any of the key features and/or sub-categories can be combined with any one or more other key features and/or sub-categories; any of the optional features for a key features can be combined with any one or more other key features or with any one or more other optional features.

Key Features

Feature Group A: Design of the Plane

A.1 Modular Construction

HAPS, solar gliders, and other high altitude solar powered platforms are capable of flight missions lasting from several days to several months duration before they need to land to have their battery packs replaced, as well as to have a general service to keep all of their systems operating reliably. It is beneficial to minimise the time taken for a service so that the platform can be returned to revenue generating operations as quickly and efficiently as possible. In some aircraft architectures, repairing damaged, worn or tired sections of the plane can require substantial time and effort.

In one embodiment, the Solaris plane is constructed from a plurality of modular sections e.g. central, inboard, outboard, wing-tip sections and winglets, fuselages, booms, vertical stabilizers and tail planes, any of which can be swapped out and replaced during servicing. This “swap-ability” enables rapid replacement of damaged, worn or tired sections, thus reducing service turnaround time. The swap-ability also allows sections of differing wing areas, fuselage/booms of different lengths, diameters (or widths) or different payload fitments to be incorporated, thus changing the flight characteristics between mission to suit different applications. For example, fitting wing sections with larger areas would increase the overall lift, permitting heavier payloads to be carried. Conversely reducing the wing area would increase the manoeuvrability of the plane, permitting tighter turn radii for more complete data capture when flying sensors with narrow swath widths. Lengthening the fuselages/booms would change the mass distribution to offset the mass of a forward mounted payload. Altering the length of the fuselage booms may also be used change the mass distribution to match the mounting mass and location of a payload—e.g. a forward mounted payload could be compensated for with a longer fuselage boom. The length of the fuselage section, wing sections or tail-boom sections are configured to be varied to provide different configurations using modular sections.

In one embodiment, for example and not limitation, the plane is made up of a plurality wing sections fitted to one or more central sections (also acting as a lifting surface). All of these sections are modular and replaceable; for example, a short wing section (e.g. 1 m in length—i.e. in the direction of wingtip to wingtip and not the chord dimension) and sitting in-between a pair of booms or fuselages, could be used for a small payload whereas a 2 m long central section could be used for a larger or heavier payload. The left side wing (for the ‘28 m’ variant) is made up of two modular sections; likewise for the right-side wing. A simple and light weight universal joint system is used to connect these modular, structural sections together. Modularity can also be used to design into the airframe specific failure points, minimizing the time to turn around by swapping out modular parts.

Referring now to the drawings in general, the illustrations are for the purpose of describing one or more preferred embodiments of the invention and are not intended to limit the invention thereto.

FIG. 1A shows the Solaris plane 1, comprising two wing sections 11, and a central section 12. In one embodiment, the central section is positioned between two fuselages 13. Winglets 16 are provided at the tip of each wing sections. The winglets are downward facing, and act as landing skids in order to protect from ground damage when landing. A vertical stabilizer 14 and a horizontal stabilizer 15 are located at the end of each fuselage. A propeller blade 17 is also located at the front of each fuselage.

Each section is modular and is operable to be attached to or detached from the rest of the plane. Hence any section that is damaged is operable to be easily replaced. Sections are operable to be substituted to tailor the plane’s performance depending on an intended mission. For example, wing sections may be designed with different spans or taper ratios or materials.

Figure 1B:
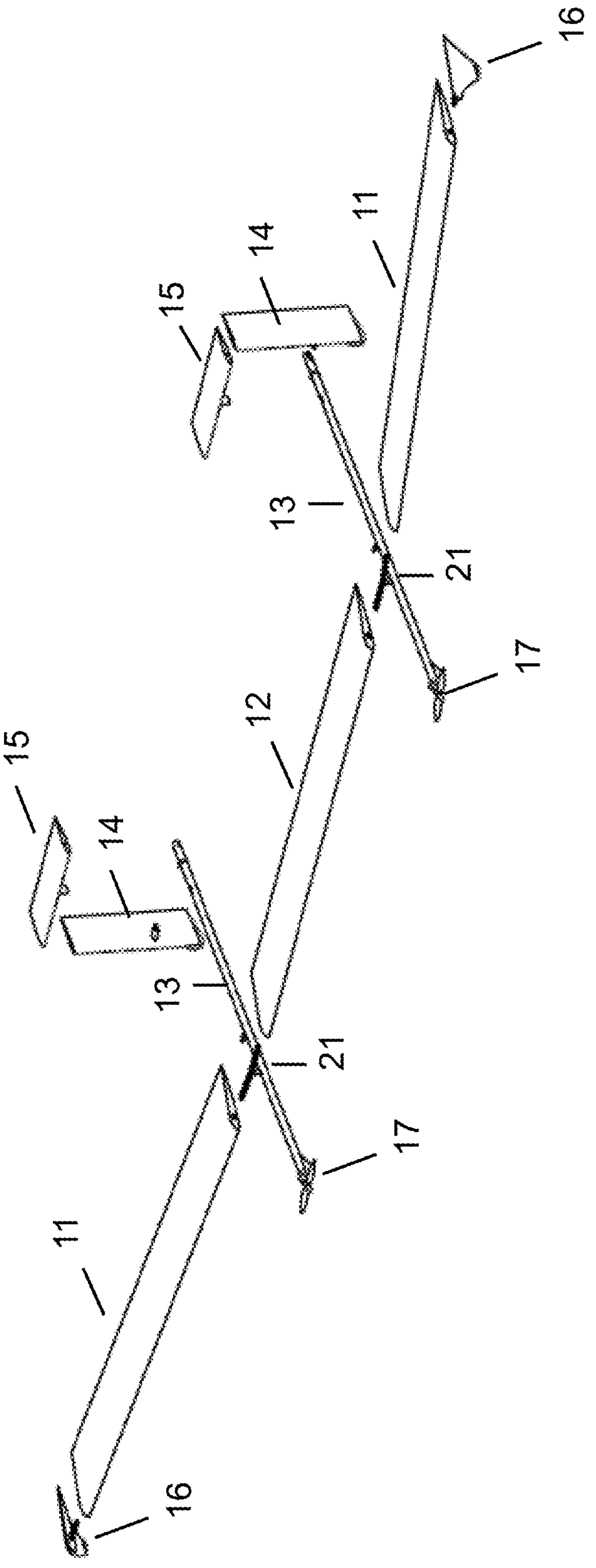
FIG. 1B illustrates an exploded view of the Solaris plane according to one embodiment of the present invention.

FIG. 1B shows an exploded view of the Solaris plane showing the separate detachable sections: each wing section 11 can be attached and detached from a fuselage 13. In one embodiment, the central section 12 can be attached and detached from each fuselage 13. Each winglet 16 can be attached and detached from a wing section 11. Each vertical stabilizer 14 can be attached and detached from the fuselage 13. Each horizontal stabilizer 15 can be attached and detached from a fuselage 13. A simple and light weight universal joint system 21 is used to connect the different sections together. The joint system is also easily replaceable and includes one or more of the following: tongue and groove; mortise and tenon; half-lap; biscuit; pocket; dovetail; rabbet; spigot; sliding tube, or any other mechanical, magnetic, compressive, adhesive or interlocking joint configured to permit detachable connection of structural sections.

One type of joint system is used to attach two main structural sections together, as shown in FIGS. 2A-M: a lightweight but rigid bracket 22 is fixed to one section 25 (e.g. a post used for the vertical stabilizer) and that is shaped to receive and locate against a second section 26 (e.g. the long cylindrical section that forms a fuselage); the second section 26 is located against the bracket 22 and a loop of strong tape or fabric 27 is used to attach the second section 26 to the bracket 22. This approach is low cost, does not require a high skill level and enables sections to be rapidly attached to each other when preparing a plane for flight and also rapidly detached from one another after flight.

Figure 2B:
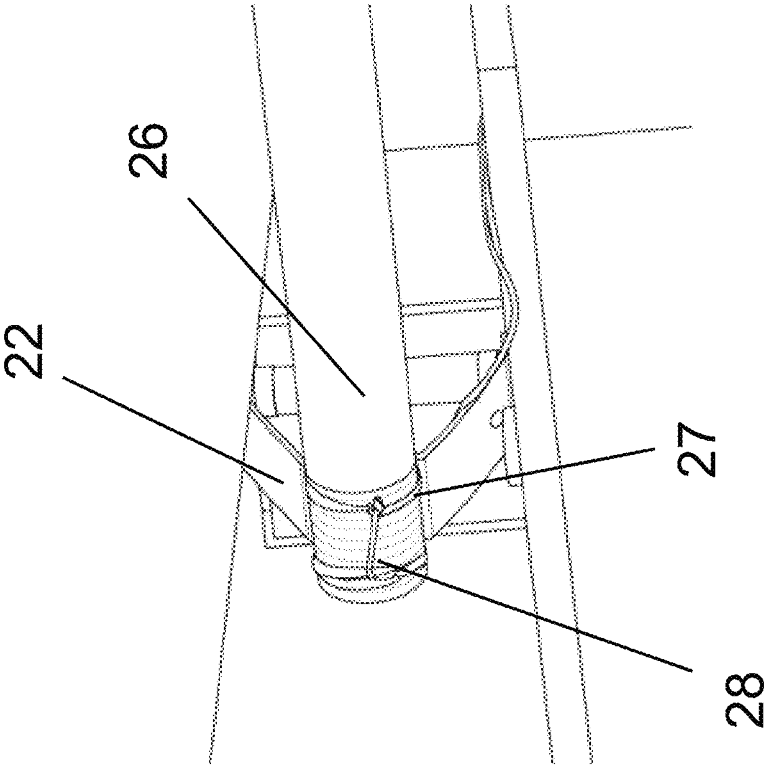
FIG. 2B illustrates how structural sections can be joined together according to one embodiment of the present invention.
Figure 2A:
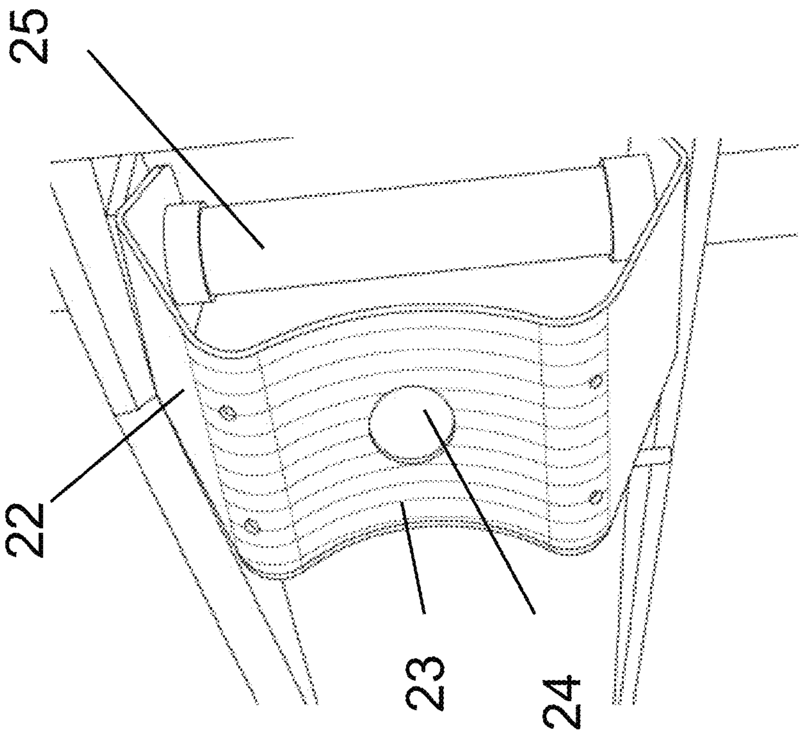
FIG. 2A illustrates how structural sections can be joined together according to one embodiment of the present invention.

In FIG. 2A, the bracket 22 is shown: it is rigidly attached to structural section 25: section 25 is the rigid cylindrical section that supports the vertical stabilizer 14. Bracket 22 includes a curved face 23, shaped to receive the second section 26, which is the rigid fuselage cylindrical section that forms the boom or fuselage. FIG. 2B shows the second section 26 securely attached to the bracket 22, and hence the first section 25 using a loop of fabric 27, which is tightened using a tourniquet pin 28.

Figure 2C:
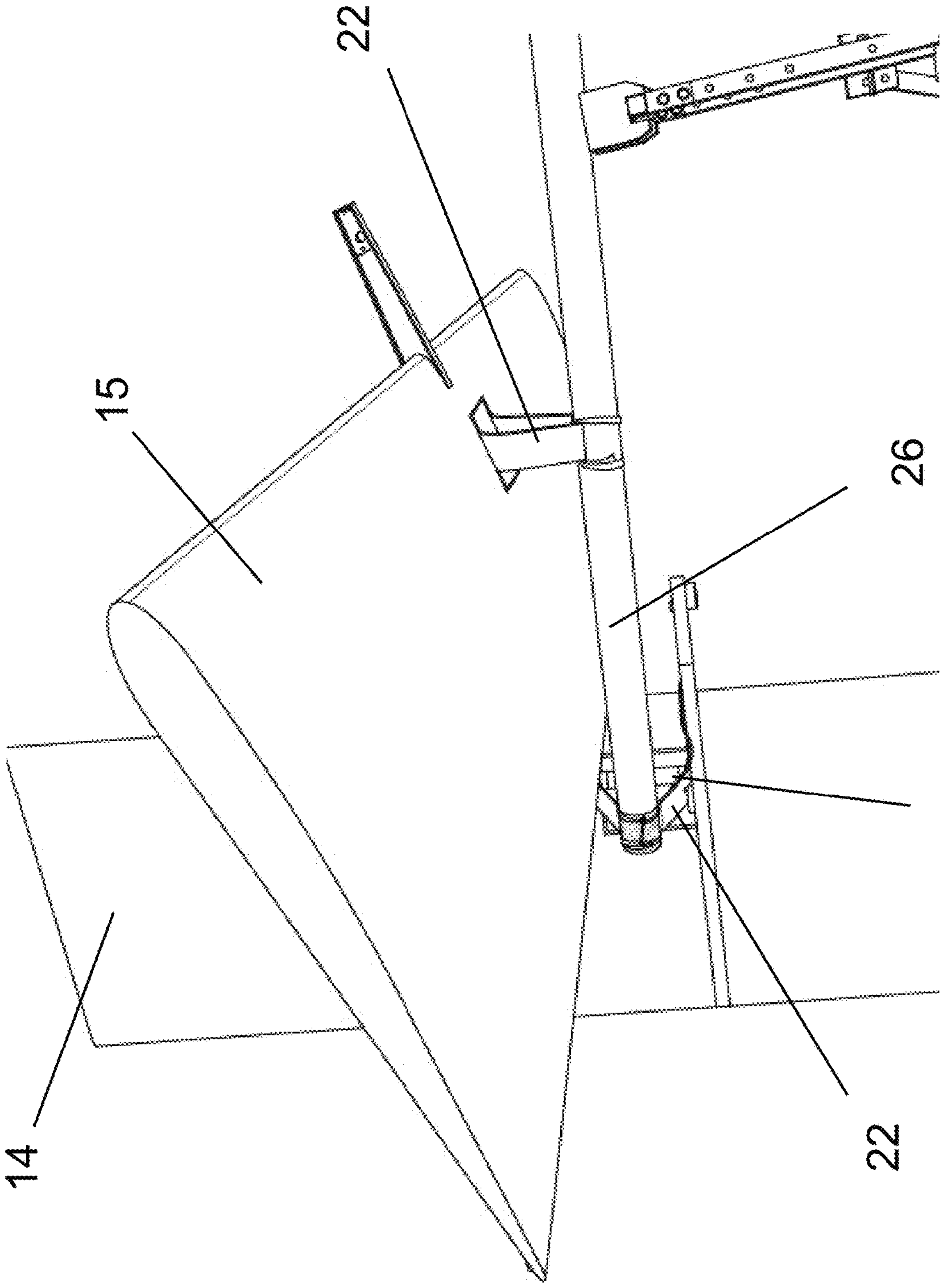
FIG. 2C illustrates how structural sections can be joined together according to one embodiment of the present invention.

FIG. 2C shows the vertical stabilizer 14 attached to vertical structural section 25; the bracket 22 is secured to longitudinal, fuselage 26. A similar bracket 22 is used to attach longitudinal, fuselage 26 to a structural section passing through horizontal stabilizer 15.

Figure 2E:
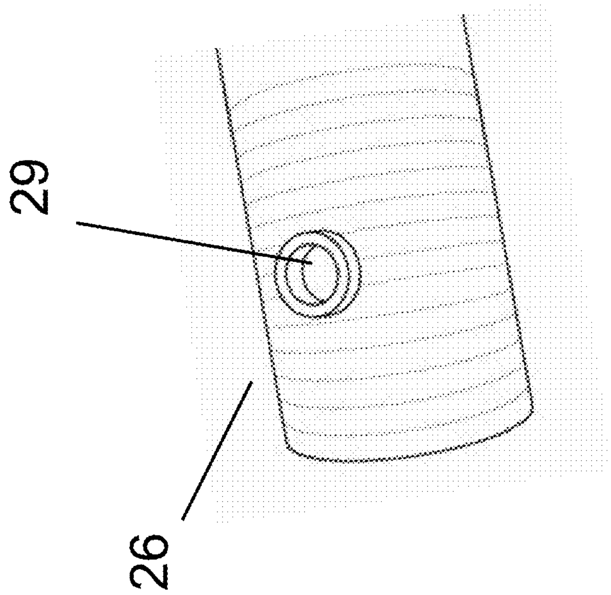
FIG. 2E illustrates how structural sections can be joined together according to one embodiment of the present invention.
Figure 2F:
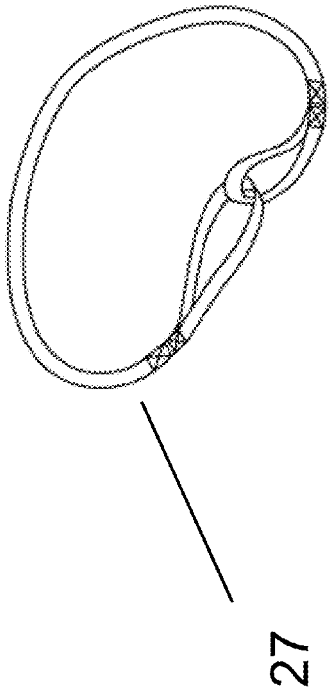
FIG. 2F illustrates how structural sections can be joined together according to one embodiment of the present invention.
Figure 2D:
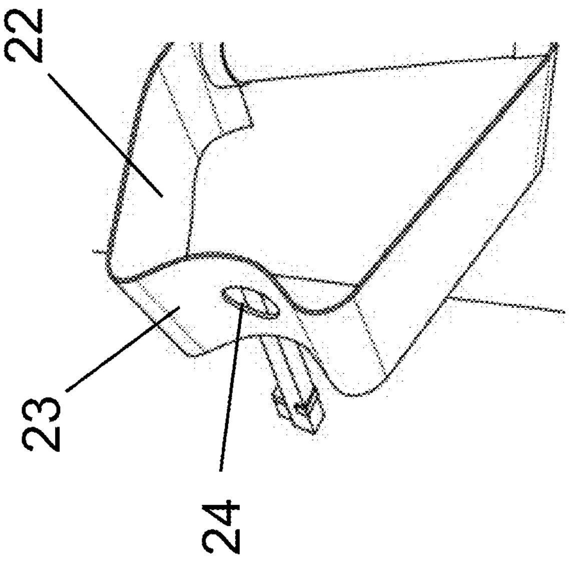
FIG. 2D illustrates how structural sections can be joined together according to one embodiment of the present invention.

FIGS. 2D-2F show the build sequence for attaching structural sections using the bracket 22. FIG. 2D shows the bracket 22, with circular aperture 24 in the curved mounting surface 23. Fuselage or boom 26, shown in FIG. 2E, includes a cylindrical boss or stub 29 that locates into circular aperture 24 when the spar 26 is correctly located against the mounting surface 23 of the bracket 22. FIG. 2F shows the tape or fabric loop 27.

Figure 2H:
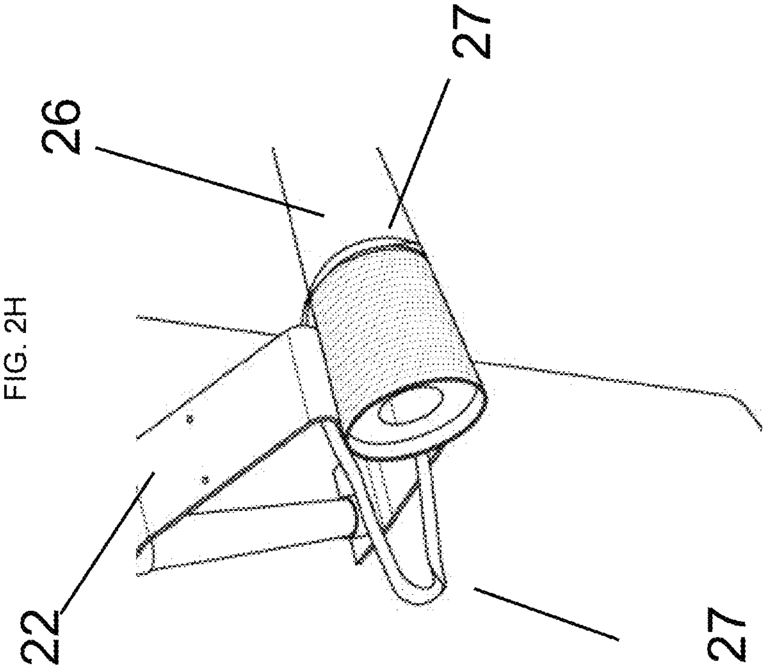
FIG. 2H illustrates how structural sections can be joined together according to one embodiment of the present invention.
Figure 2G:
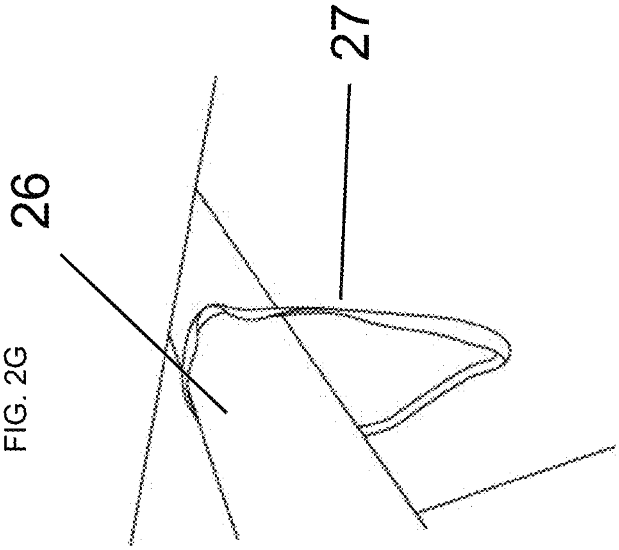
FIG. 2G illustrates how structural sections can be joined together according to one embodiment of the present invention.
Figure 2I:
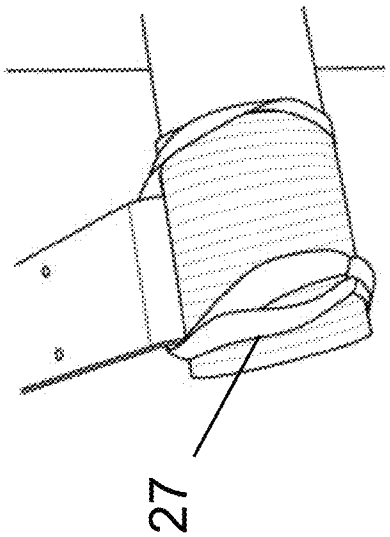
FIG. 2I illustrates how structural sections can be joined together according to one embodiment of the present invention.

FIG. 2G shows the loop 27 in position on the fuselage or boom 26. FIG. 2H shows how the loop is passed through the bracket 22 once the fuselage 26 has been located against the bracket 22. FIG. 2I shows the tape loosely wrapped around the fuselage 26, with a loop section of the tape easily accessible.

Figure 2J:
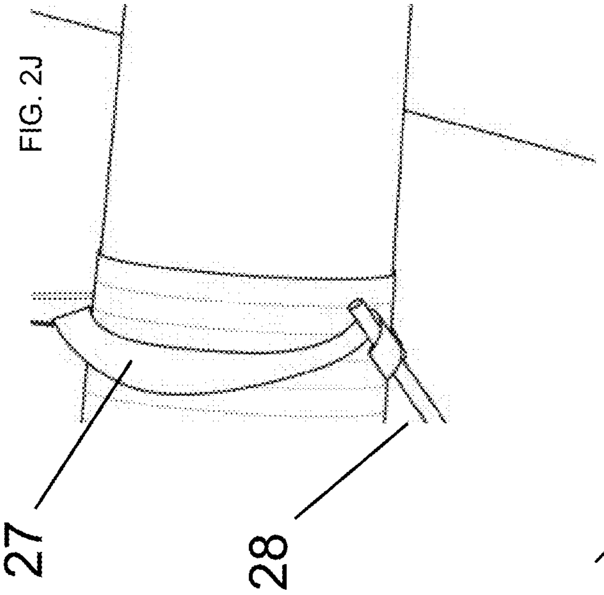
FIG. 2J illustrates how structural sections can be joined together according to one embodiment of the present invention.
Figure 2K:
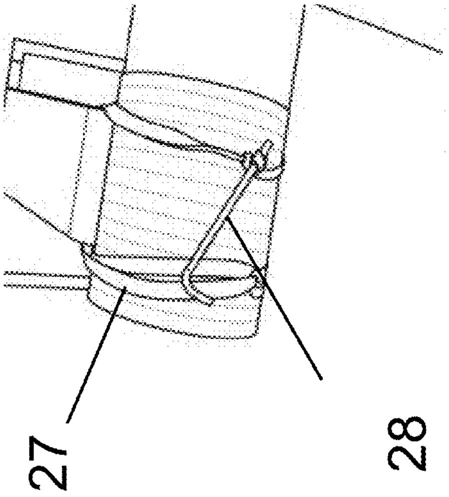
FIG. 2K illustrates how structural sections can be joined together according to one embodiment of the present invention.
Figure 2L:
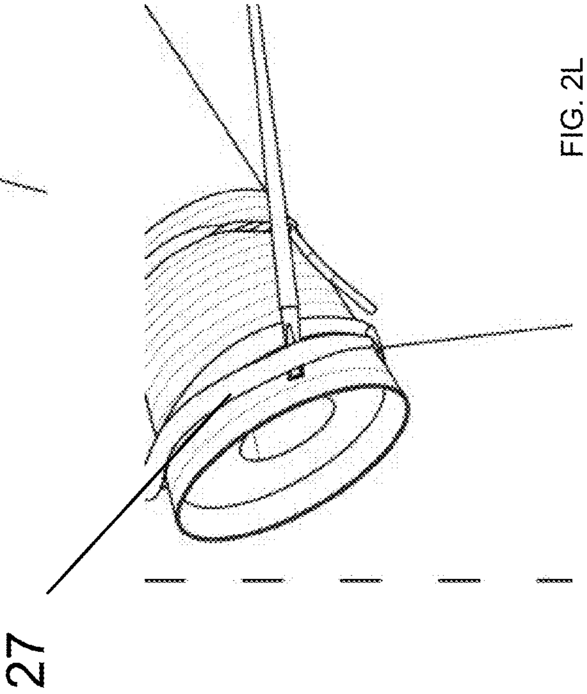
FIG. 2L illustrates how structural sections can be joined together according to one embodiment of the present invention.
Figure 2M:
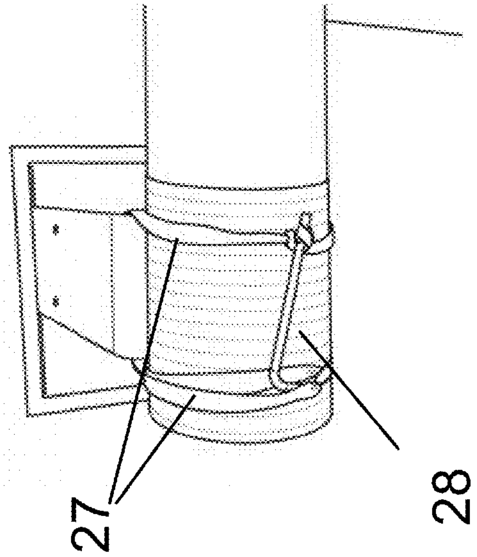
FIG. 2M illustrates how structural sections can be joined together according to one embodiment of the present invention.

Next, as shown in FIG. 2J, a tourniquet pin 28 is inserted behind the tape 27 at the tape end that does not include the loop. The pin 28 is twisted to tighten the tape 27, securely drawing in the fuselage 26 against the bracket 22. In FIG. 2L, the loop in the tape 27 is teased open with a screwdriver and then, as a final stage, shown in FIG. 2M, one end of the pin 28 is inserted into the loop in tape 27 to prevent the pin from unwinding. Overall, this is a very low cost, low-skill, lightweight and robust way of attaching different parts of the plane together; the loop can be readily loosened and unwound if the parts need to be separated (e.g. to replace a damaged vertical or horizontal stabilizer). Whilst we have shown this being used to attach the fuselage 26 to the vertical stabilizer 14 and also to the horizontal stabilizer 15, the same bracket-based system can be used wherever sections need to be securely and rapidly attached or quickly removed after landing.

All elements in the airframe, including all of the modular elements, can be connected with one or more tethers, such that if there is a failure of the airframe, all of the elements will stay together; the entire airframe, made up of disconnected parts attached by these tethers, can be designed to descend like a sycamore leaf, with a reduced decent rate, keeping the parts together and reducing the danger of heavy items (e.g. batteries, payload) detaching and risking serious damage on the ground. Kinetic energy risk is hence reduced because the Solaris airframe is configured to a) distribute its mass across the widest section of the wings to minimize there being any single heavy section at risk (such as in single fuselage designs in which all of the payload and batteries are in the fuselage) and b) stay together if the airframe fails, to provide as much air braking as possible on descent. Combined, they reduce the kinetic energy risk of all parts of the platform.

In one embodiment, his is generalized as a solar powered plane, such as a plane configured to operate in the stratosphere, that includes at least one or more structural sections, each configured to be attachable, detachable and replaceable during normal servicing or operations. Optional features are operable to include any one or more of the following:

a replaceable structural section is a central wing section positioned between two fuselages.

a replaceable structural section is an inboard wing section.

a replaceable structural section is an outboard wing section.

a replaceable structural section is a wing-leading edge section.

a replaceable structural section is a wing-tip section.

a replaceable structural section is a winglet section.

a replaceable structural section is a fuselage section.

a replaceable structural section is a boom section.

a replaceable structural section is a vertical stabilizer section.

a replaceable structural section is a tail plane section.

a replaceable structural section is a landing skid.

a replaceable structural section is a wing section, and different interchangeable wing sections have different surface areas.

a replaceable structural section is a fuselage or boom, and different interchangeable fuselages or booms have different lengths (dimension in the direction of the long axis of the fuselage or boom).

different fuselages or booms have different widths (dimension in the direction perpendicular to the long axis of the fuselage or boom).

one or more sections are chosen to meet the specific payload requirements for a mission.

one or more sections are chosen to meet the specific endurance requirements for a mission.

one or more sections are chosen to meet the specific application or mission type, such as weather monitoring, earth observation and earth imaging, border security, maritime patrols, anti-piracy operations, disaster response and agricultural observation.

a wing section with a larger surface area is chosen where more lift is required.

a larger central wing section is used for a heavier payload, compared with the central section used for a lighter payload.

a wing section with a smaller surface area is chosen where more manoeuvrability, e.g. a tight turning radii, is required.

a longer fuselage boom is chosen where a payload is more forward mounted.

a replaceable structural section is attached to another section or part of the plane using a mechanical joint.

a replaceable structural section is attached to another section or part of the plane using a quick release mechanical joint.

the mechanical joint is one or more of the following: tongue and groove; mortise and tenon; half-lap; biscuit; pocket; dovetail; rabbet; spigot; sliding tube.

joins between replaceable structural sections are designed as failure points.

multiple replaceable structural sections are secured together using a lightweight, rigid bracket that is fixed to one structural section and that is shaped to receive and locate against a second structural section; and where the second structural section is located against the bracket and a loop of strong tape or fabric securely attaches the second section to the bracket.

- multiple replaceable structural sections are secured together using a tether so that they do not separate in the event of an airframe failure.
- the plane is a dual fuselage plane with an approximately 25-40 m wingspan.

A 'structural' section is any section that is designed to withstand forces or loads.

A.2 Carbon Fiber Fuselage

The concept of long duration, solar powered, high-altitude flight in the stratosphere relies on the aircraft being of exceedingly low mass. Apart from the batteries, one of the heaviest items is the airframe and a significant portion of this is the fuselage, which runs perpendicular to the wing spar(s). Making this fuselage as light as possible, whilst maintaining sufficient levels of both torsional and longitudinal stiffness, is key to producing a successful plane.

In some embodiments, one or more primary structural members of the aircraft (for example a fuselage tube and/or tail boom, and optionally a wing spar or spar caps) are formed as a layered composite structure comprising an inner composite layer and an outer composite layer with a light-weight core material between the layers. By way of example, the inner and outer layers may comprise carbon fiber composite, and the core may comprise a foam or other low-density structural core. In another embodiment, the same construction approach is applied across multiple air-frame elements to simplify manufacture. In another embodiment, the same layered composite construction is used for one or more wing spars and/or tail booms.

In the Solaris plane, the fuselage may be formed as a tube (e.g. a cylinder with a circular or elliptical cross section); the tube has carbon fiber inner and outer surfaces, between which is a structural foam core (e.g. a polymethacrylimide (PMI) based structural foam such as Rohacell™). This construction is stronger and lighter than a solid carbon fiber tube or a carbon fiber tube with a square cross section. In other embodiments, the fuselage may also have polygonal, faceted, trapezoidal, triangular, or customer aerodynamic cross sections.

Different regions of the fuselage can have different mechanical properties, optimised for the specific forces or possible failure modes at that region. As an example, a denser structural foam core could be used locally in areas where additional strength is needed and/or extra carbon fiber can be incorporated locally. Similarly, intentionally designed-in weak points may be created by using a less dense core, or by varying the carbon fiber layering. Such a fuselage can also have non-uniform properties specifically to suit the flight characteristics of the particular aircraft and its function.

Figure 3A:
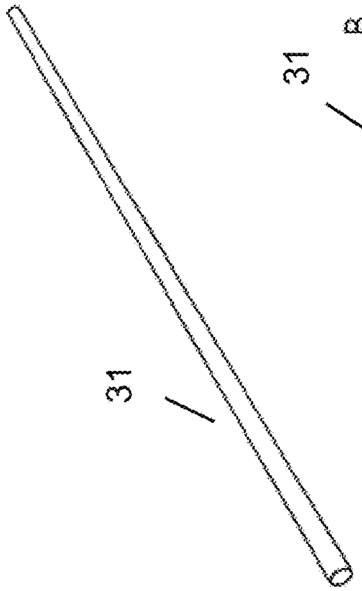
FIG. 3A illustrates a fuselage according to one embodiment of the present invention.
Figure 3B:
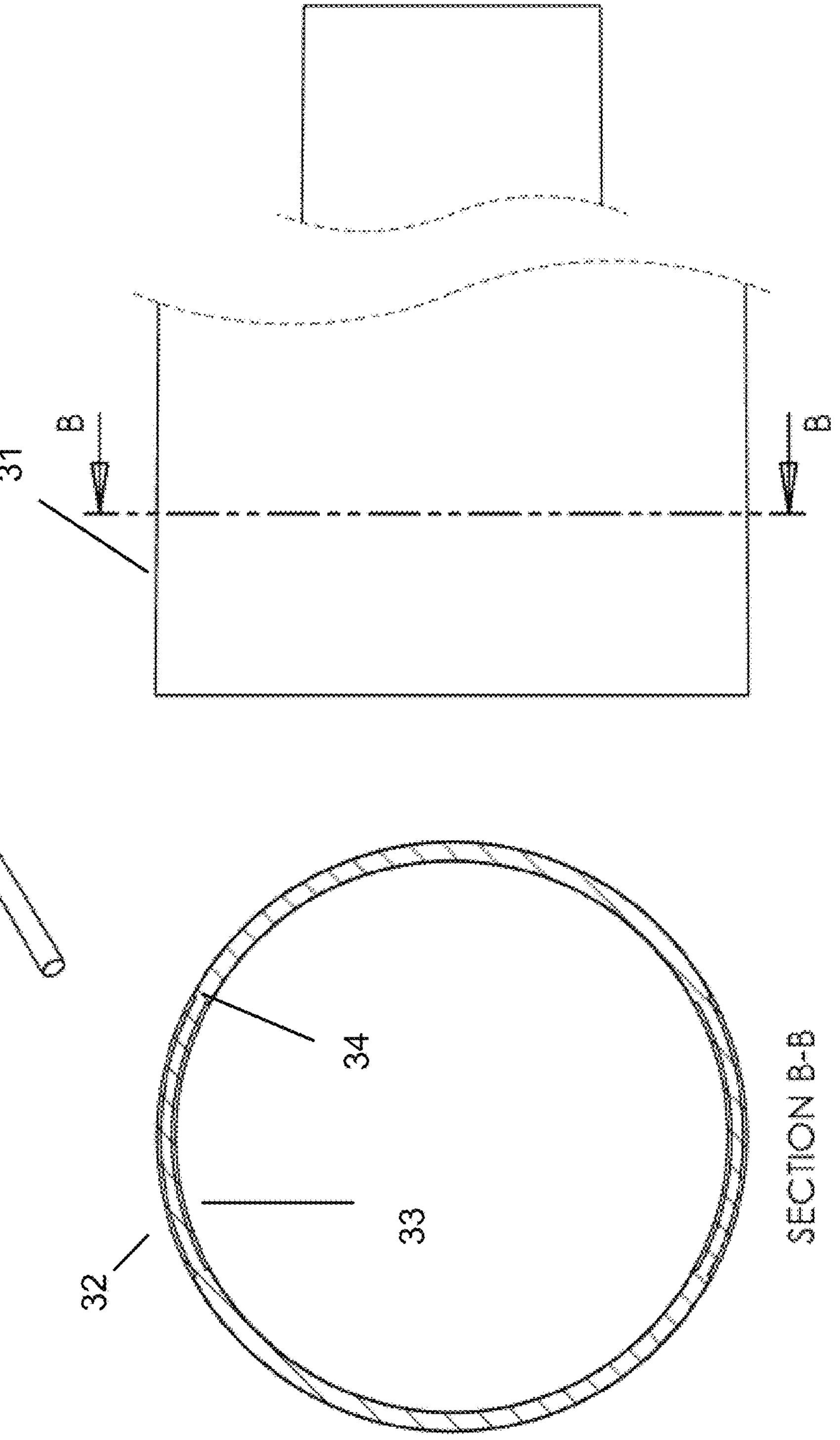
FIG. 3B illustrates a fuselage cross-sectional view according to one embodiment of the present invention.

FIG. 3A shows a perspective view of the fuselage 31 formed as a tube. A cross-section view of the fuselage at FIG. 3B shows the carbon fiber inner 33 and outer 32 surfaces, between which is a structural foam core 34. This is operable to be generalized to as a solar powered plane, such as a plane configured to operate in the stratosphere, that includes a light-weight structural section, formed as a tube with a circular or elliptical cross section, with carbon fiber inner and outer surfaces, between which is a structural foam core.

Optional features are operable to include include any one or more of the following:

- the structural section is a fuselage.
- the structural section is a wing spar.
- different regions of the tube have different cross-sectional geometries to create different properties.
- the structural foam core is a polymethacrylimide (PMI) based structural foam.
- the structural foam core is a polyurethane based structural foam.
- the structural foam core is a XPS or EPS based structural foam.
- different regions of the structural section have different mechanical properties, optimised for the specific forces or possible failure modes at that region.
- where additional strength is needed then a denser foam core and/or extra carbon fiber is used locally.
- intentionally designed-in weak points are created by using a less dense core, and/or by varying the carbon fiber layering.
- a wiring loom runs along the outside of the structural section.
- the plane is a dual fuselage plane with an approximately 25-40 m wingspan.

A.3 Downward Winglet that Acts as Landing Skid

In one embodiment, in order to keep the mass of the Solaris plane as light as possible, landing gear or wheels is omitted to reduce weight, as the aircraft does not require conventional landing gear for the majority of its mission duration, which would be flown for many days but are only needed to work for a few minutes on landing.

The Solaris plane instead uses an ultra-light weight solution to minimise damage on landing. In the Solaris plane, winglets or any other downward protruding structural feature are provided to optimise the aerodynamic properties of the aircraft and in one variant are downward facing as this permits them to also act as landing skids, protecting the underside of the wings from ground damage when landing. The winglet base and other contact points can include a sacrificial material (e.g. light XPS foam) that contacts the ground but can easily be replaced during servicing.

Figure 4A:
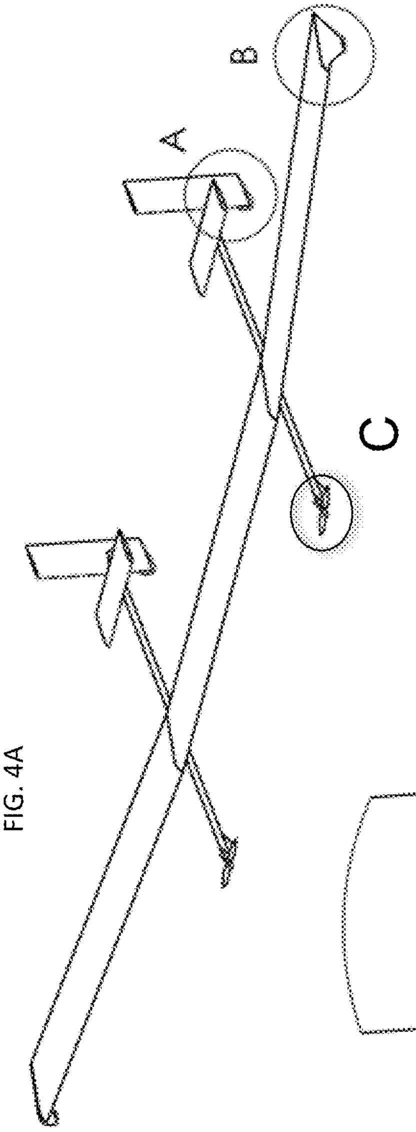
FIG. 4A illustrates a perspective view of the Solaris plane, indicating a detail at the base of the vertical stabilizer, the base of the downward facing winglets and the base of the fuselage behind the propeller according to one embodiment of the present invention.
Figure 4C:
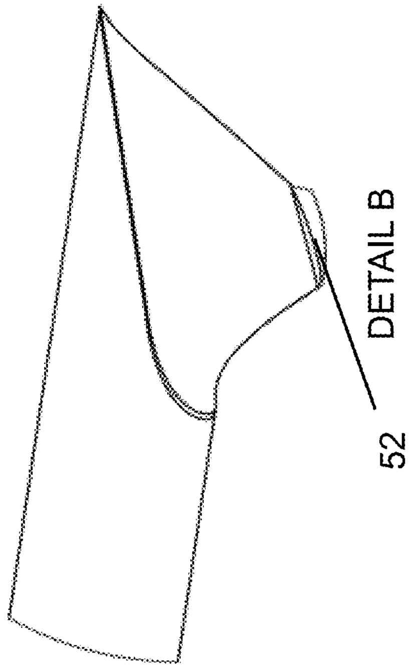
FIG. 4C illustrates a perspective view of the detail at the base of the downward facing winglets according to one embodiment of the present invention.
Figure 4B:
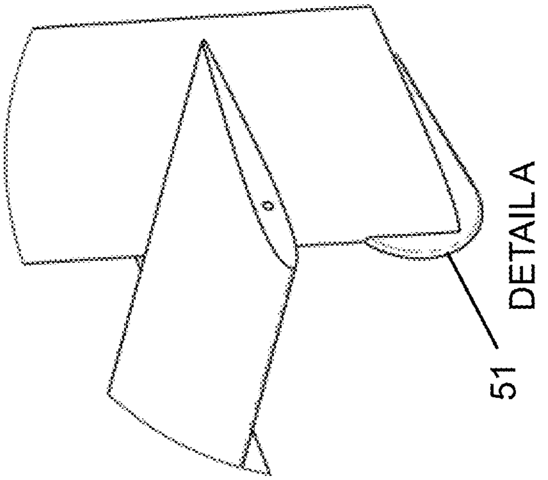
FIG. 4B illustrates a perspective view of the detail at the base of the vertical stabilizer according to one embodiment of the present invention.

FIG. 4A is a perspective view of the Solaris plane, indicating a detail or feature (A) at the base of a vertical stabilizer, another detail or feature (B) at the base of the downward facing winglets and a third feature (C) on the underside of the fuselages, behind the propellers. FIG. 4B is a perspective view of the detail (A) at the base of the vertical stabilizer. FIG. 4C is a perspective view of the detail (B) at the base of the downward facing winglets.

Figure 5A:
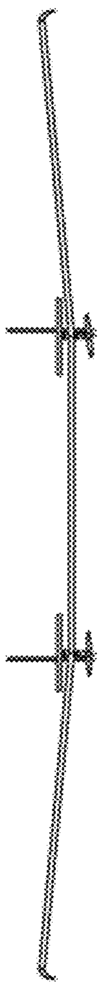
FIG. 5A illustrates a frontal view of the Solaris plane according to one embodiment of the present invention.
Figure 5B:
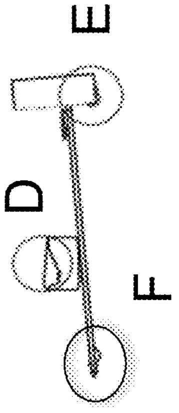
FIG. 5B illustrates a side view of the Solaris plane indicating a detail at the base of the vertical stabilizer, the base of the downward facing winglets and the base of the fuselage behind the propeller according to one embodiment of the present invention.
Figure 5C:
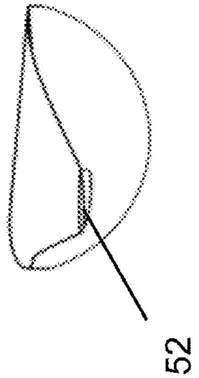
FIG. 5C illustrates a side view of the detail at the base of the downward facing winglets according to one embodiment of the present invention.
Figure 5D:
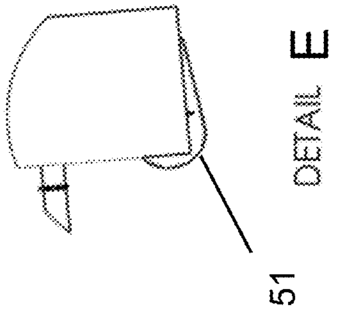
FIG. 5D illustrates a side view of the detail at the base of the vertical stabilizer according to one embodiment of the present invention.
Figure 5E:
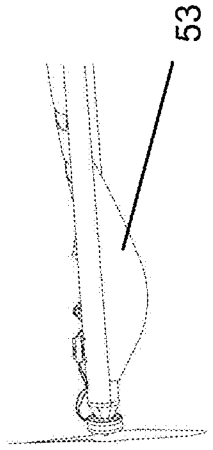
FIG. 5E illustrates a side view of the propeller blade and front skid according to one embodiment of the present invention.

FIG. 5A is a frontal view of the Solaris plane; FIG. 5B is a side view of the Solaris plane indicating a detail (E) at the base of the vertical stabilizer, a detail (D) of the base of the downward facing winglets and a detail (F) on the underside of the fuselages, behind the propellers. FIG. 5C is a side view of the detail (D) at the base of the downward facing winglets. FIG. 5D shows a side view of the detail (E) at the base of the vertical stabilizer. FIG. 5E shows a side view of the detail (F) at the propeller end of the fuselage.

The base of each vertical stabilizer includes a skid 51 made of a sacrificial material. The base of each winglet also includes a skid 52 made of a sacrificial material. The base of the fuselage behind the propeller includes a replaceable landing skid 53, made of sacrificial material, which protects the fuselage, motor and propeller (when turned to the horizontal) from damage when landing. The dimensions of the skids may be dependent on the size of the plane. This is operable to be generalized as a solar powered plane, such as a plane configured to operate in the stratosphere, that includes downward facing structures, such as downward facing winglets and/or downward facing vertical stabilizer and/or a downward facing fuselage section, that are also configured to act as landing skids.

Optional features are operable to includes any one or more of the following:

- the downward facing winglets are configured to protect the underside of the wings from ground damage when landing.
- the downward facing vertical stabilizer is configured to protect the underside of the fuselage or the rear horizontal stabilizers from ground damage when landing.
- the downward facing fuselage section is configured to protect a propeller and/or the front of the fuselage from ground damage when landing.
- the base or body of each landing skid includes a sacrificial material that contacts the ground.
- the sacrificial material is a light XPS foam.
- the sacrificial material is an EPS based foam.
- the sacrificial material is a polymethacrylimide (PMI) based foam.
- the sacrificial material is a polyurethane based foam.
- the sacrificial material is configured to be replaceable during servicing.
- the plane is a dual fuselage plane with an approximately 25-40 m wingspan.

A.4 Removable Wing Leading Edge Covering Payload Compartment

The Solaris plane includes a wing leading edge that runs along the entirety of each wing of the aircraft. The wing leading edge 61 is made up of multiple, removable modular sections as shown in FIGS. 6A-6E; these sections are detachable from and attachable to the wing using a simple mechanical joint, such as a tongue and groove joint. A payload compartment sits behind each removable, modular section, e.g. for a battery or other payload. The removable, modular sections may be made of foam.

A removable leading-edge section as described herein may form an embodiment of the 'D-section' or modular payload housing described in section G.8 'Configurable D-section'. In certain embodiments, the modular sections include removable modules configured to be replaced for servicing or mission specific configuration.

Figure 6A:
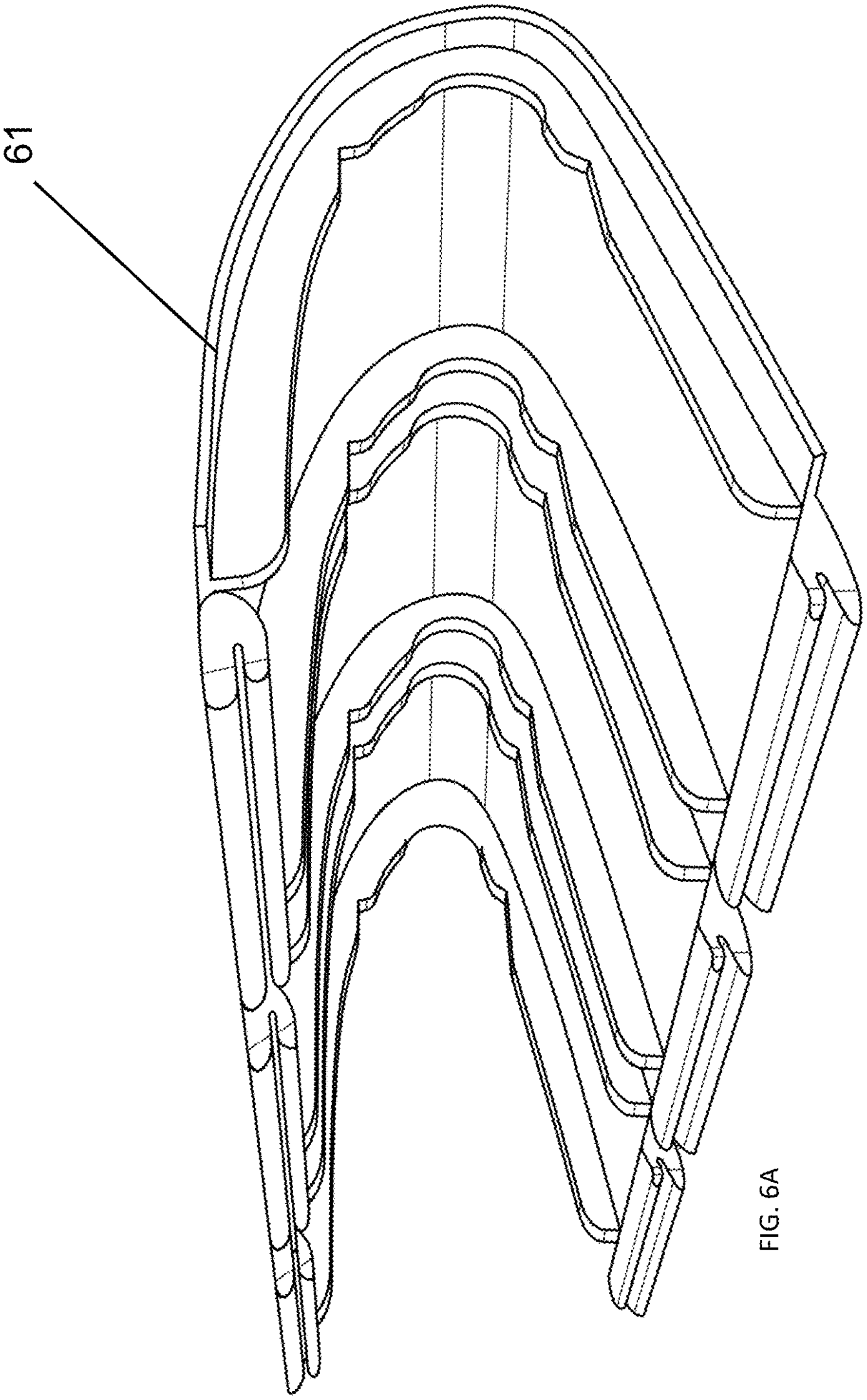
FIG. 6A illustrates a wing leading edge section configured to snap onto the wing to cover a payload or battery compartment according to one embodiment of the present invention.
Figure 6B:
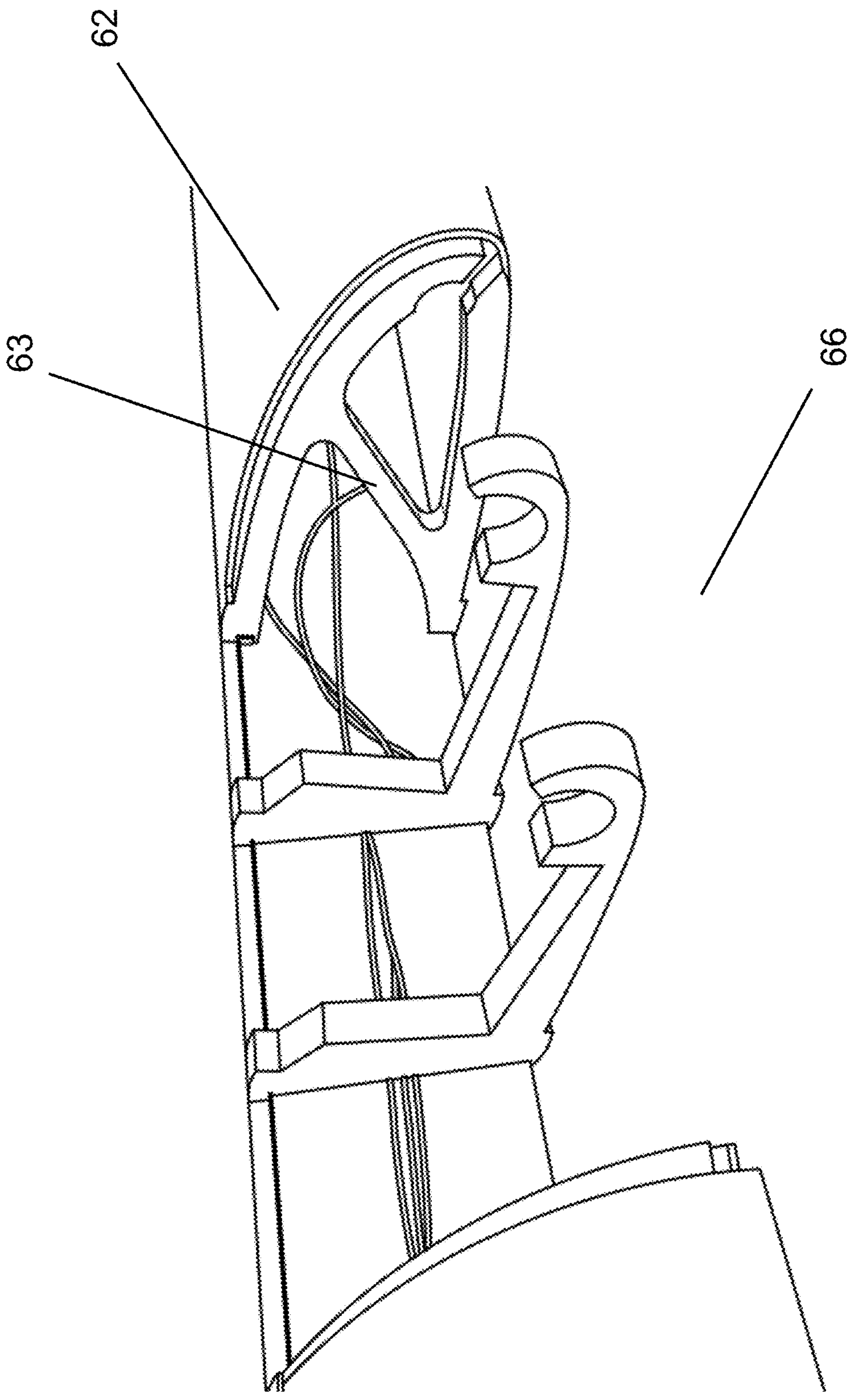
FIG. 6B illustrates a wing leading edge section that does not encase a non-airframe component next to an uncovered payload or battery compartment according to one embodiment of the present invention.
Figure 6C:
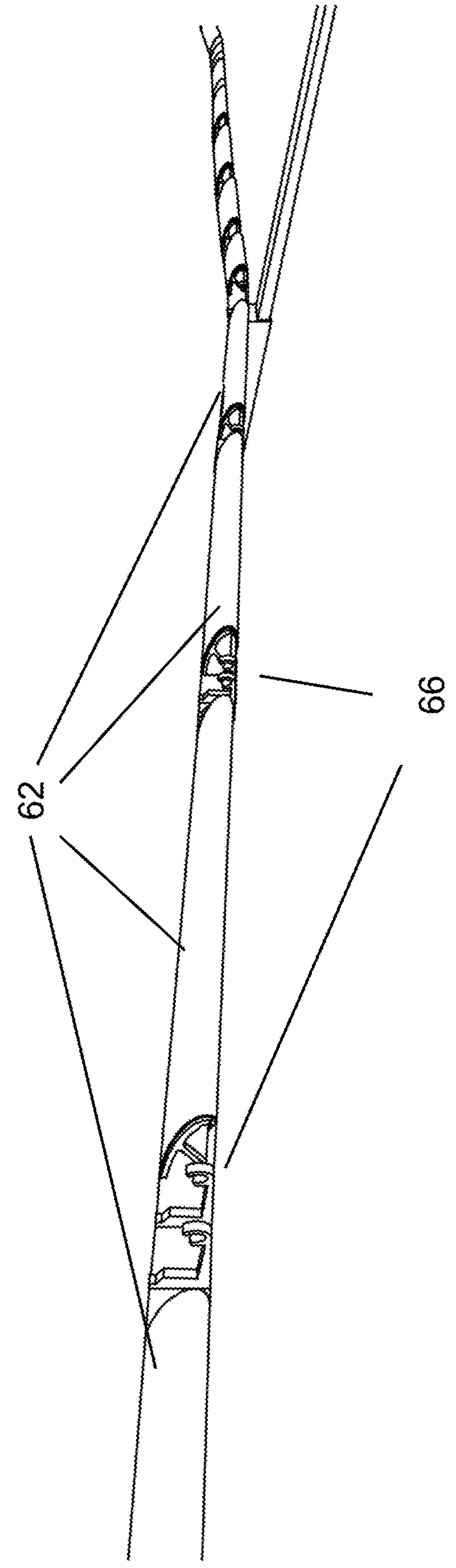
FIG. 6C illustrates a perspective view of a wing section that has leading edge sections detached and showing a series of payload or battery compartments according to one embodiment of the present invention.

FIG. 6A shows a section of a foam wing leading edge section used to cover a payload or battery compartment in the wing, or otherwise encase a non-airframe component 61. The cross-section of all foam wing leading edge sections 61 is rounded and asymmetric, allowing a greater curvature on the top surface of the leading edge. FIG. 6B shows a section 62 of a foam wing leading edge that does not encase a non-airframe component. Section 62 includes a diagonal strut 63 that may be made of foam and/or carbon fibre. The adjacent battery or payload compartment 66 is shown exposed. FIG. 6C shows a wing 11 of the plane with modular foam wing leading edge sections removed, showing the battery or payload compartment 66 where the battery, payload or other non-airframe components are housed 61, allowing these non-airframe components to be exposed for rapid removal, replacement or service. Sections of foam wing leading edge that do not encase a non-airframe component 62 remain attached in this service scenario. In one embodiment, each wing leading edge section is operable to be made of one or more pieces of accurately cut foam; foam is used due to its low density and suitably high compressive strength. This foam also offers thermal insulation for any non-airframe components (e.g. payload, batteries) encased within the leading edge.

The key advantage to using rapidly detachable wing leading edge sections is that each detachable section can cover a payload or battery compartment, as shown in FIG. 6A; during pre-flight preparation, access to a compartment is simply a matter of quickly removing the related wing leading edge section; as will be explained below, these are not screwed or permanently bonded into position, but instead are clipped into position and then secured by low-cost, high adhesive tape. After the payload or battery is installed into the compartment, the wing leading edge section is clipped back on and secured. This gives a very fast, low cost, and simple payload/battery install and de-install process, as well as very fast, low cost, and simple way to upgrade payloads/batteries to the latest or most appropriate designs. Each wing may have between one and ten (or more) such compartments, each covered by a wing leading edge section.

Where there are modular sections of the wing leading edge that do not encase non-airframe components like a payload or battery 62, the foam leading edge includes a diagonal foam or carbon fiber strut 63 for increased stiffness, as shown in FIG. 6B The modular sections that do contain non-airframe components like a battery or payload cannot have this diagonal strut as the non-airframe component occupies this space.

The modular design for the leading edge is beneficial as it enables quick replacements/swaps of not only non-airframe components encased in the leading edge, but also changes to the wiring exposed on the wing spar, behind the leading edge, as well as replacing the modular section of the leading edge itself. FIG. 6C shows a wing 11 in pre-flight preparation, with the wing leading edge sections that normally cover the batteries or other payloads removed, revealing the battery/payload compartments 66 that run along the leading edge of the wing.

Although the examples in the figures depict rounded profiles, the removable leading-edge modules are operable to have alternative profiles such as curved, bulged, tapered or recessed shapes depending on mission requirements. Further features are also provided in section G.8 or air intakes/exits, cooling ducts.

This is operable to be generalized as a solar powered plane, such as a plane configured to operate in the stratosphere, wherein the leading edge of the wings comprises one or more removably attachable, modular, leading edge components.

Optional feature are operable to include one or more of the following:

- When attached to the aircraft, the attachable and detachable leading edge components also acts to enclose to non-airframe components, such as payload or battery components.
- one or more of the attachable and detachable leading edge components cover or encase a battery compartment.
- one or more of the attachable and detachable leading edge components cover or encase a payload compartment.
- one or more of the attachable and detachable leading edge components is attached to the aircraft through a mechanical joint, such as a tongue and groove joint.
- one or more of the attachable and detachable leading edge components is made of foam.
- one or more of the attachable and detachable leading edge components is made of a single, integral piece of shaped foam.

one or more of the attachable and detachable leading edge components offers thermal insulation for encased non-airframe components.

one or more of the leading edge components comprise one or more parts.

one or more of the leading edge components is made of a foam, such as XPS or EPS.

one or more of the leading edge components is made from, at least in part, a translucent material where a payload in the compartment covered by that translucent component is an optical imaging system.

one or more of the leading edge components is made from, at least in part, an electromagnetically transparent material, where a payload in the compartment covered by that electromagnetically transparent component is a radar system.

one or more of the leading edge components contains a strut, such as a carbon fiber strut, the cross-sectional shape of one or more of the leading edge components is asymmetric.

the cross-sectional shape of one or more of the leading edge components rounded.

A.5 Batteries and Payload Positioned in the Wings

In one embodiment, the batteries may be placed in one or more compartments 66 in the wings, as opposed to the fuselage (for example in the central wing 12 and/or the, main wings 11. The main wings may include dihedral, anhedral, or neutral configuration. By placing the heavy batteries in the main wings, we also reduce or dampen fluctuations that can stress the wing spar. By distributing mass of these non-airframe items across the main wings, as opposed to placing that mass in the fuselage, we also reduce the loading on the joints between the main wings and the fuselage. In certain configuration, a slight dihedral angle to the main wings can be used to optimise this loading. The battery modules are operable to themselves be removable or replaceable during servicing, and may be mounted within the wing, fuselage, or modular sections located forward of the spar.

The principle of placing items into the (e.g. dihedral) main wings applies not just to batteries, but other non-airframe items too, such as payload sensors, avionics, communications equipment; for many of these items, there are functional advantages to being positioned in the dihedral wings: for example, stereoscopic imaging sensors benefit from being placed towards the wingtips. The non-airframe items can be positioned in or against a holder or attachment system that is itself fixed to the airframe (e.g. the wing ribs or wingspar—(see A.4 above) and that enables the non-airframe item to be rapidly attached to and removed from the airframe. One implementation of this attachment system is an L-shape bracket, shown in FIGS. 6D and 6E.

Figure 6D:
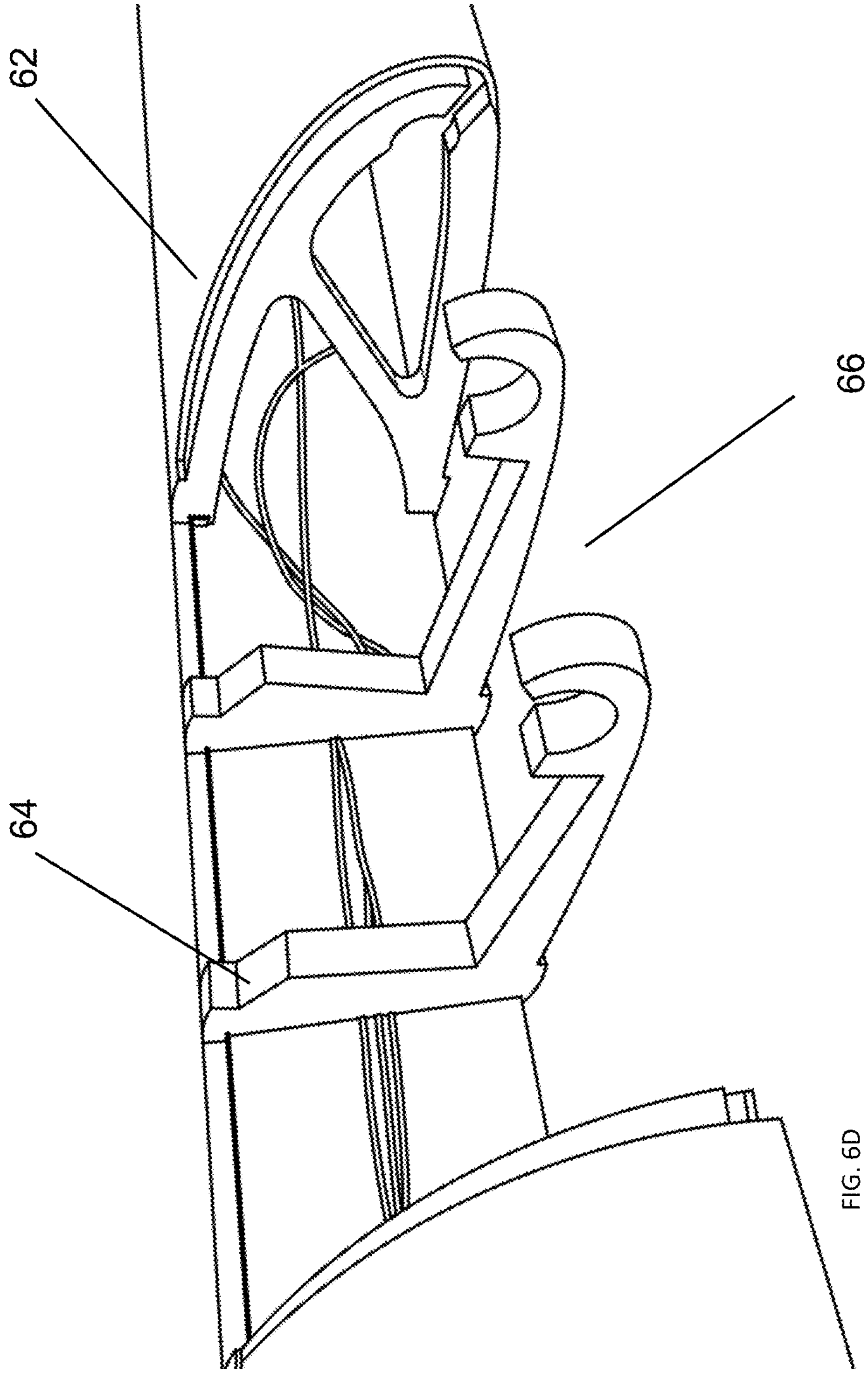
FIG. 6D illustrates an L-shape bracket within the payload or battery compartments to be covered by a wing leading edge section according to one embodiment of the present invention.
Figure 6E:
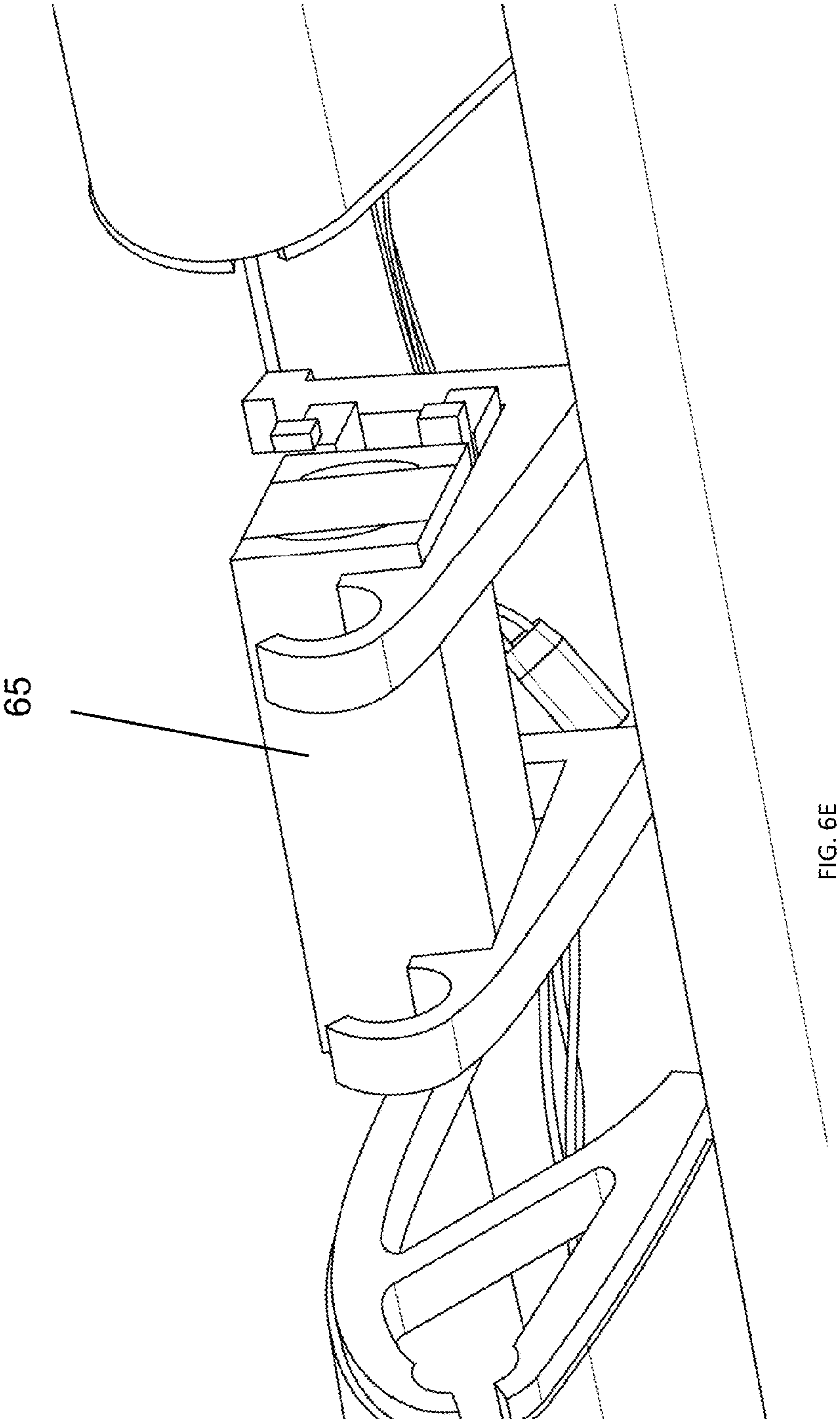
FIG. 6E illustrates a battery back fixed in an L-shape bracket within the payload or battery compart according to one embodiment of the present invention.

FIG. 6D shows the compartment 66 left exposed by the removal of a modular foam wing leading edge section. The compartment 66 includes an L-shape bracket 64 onto which a battery or other non-airframe component can be mounted. FIG. 6E also shows the compartment 66 exposed by the removal of a modular foam wing leading edge section, with the compartment filled by an L-shape bracket with a battery 65 mounted to it.

In one embodiment, this L-shape bracket 64 enables a flat surface for the battery 65 or other non-airframe payload to rest securely on the bracket 64 while encased by the foam leading edge. The L-shape bracket 64 itself attaches to the wing spar through two independent connections. Firstly, the L-shape bracket 64 uses a mechanical joint (such as a tongue and groove joint) to attach to the wing spar. Secondly, the bracket is attached to the forward-facing (fore) face of the main spar through a hook and fastener method such as Velcro®, where hooks are attached to one surface through adhesion and the fasteners attached to the other. There can be multiple pads of hooks adhesively attached the wing spar; rapid lateral positional adjustment of the L-shape brackets is possible by attaching the brackets to different pads. Also, different designs of L-shaped bracket, configured to securely hold different payload shapes, can readily be used. The L-shaped brackets can themselves include the same type of hook/fastener pads to enable payloads such as batteries, avionics, thermal regulation system and also cable fasteners, all including reciprocal hook/fastener pads, to attach to the L-shaped brackets or directly to the wing spar using a very lightweight and low cost system. This approach gives the ability to adjust the positions of the avionics, batteries, other payloads, cables, and thermal regulation systems fore/aft and laterally very easily, to alter the load balance across the airframe so that it is more optimal. A technician with a set of bathroom scales can make quick manual adjustments to battery trays, payload positioning, cabling etc, to 'tune' each glider correctly. Millimetric changes are possible without expensive tools, skills or redesigns.

In one embodiment, this is operable to be generalized as a solar powered plane, such as a plane configured to operate in the stratosphere, and that include at least one user-movable item that is configured to be positioned pre-flight against a support surface, in which the user-movable item includes at least one hook/fastener pad or strip and the support surface includes at least one reciprocal hook/fastener pad or strip.

Optional features are operable to include one or more of the following:

the user-movable item is operable to be positioned against the support surface to give a desired mass distribution.

the user-movable item is a bracket and the support surface is a structural element in the plane, such as a wing spar.

the user movable item is a battery.

the user movable item is an avionics system.

the user movable item is a thermal regulation system.

the user movable item is a cable fastener.

the user movable item is a cable.

the support surface is a structural element in the plane, such as a wing spar.

the support surface is a bracket or other type of support.

the fore/aft position of the usable item is adjustable against the support surface.

the lateral position of the usable item is adjustable against the support surface.

the plane is a dual fuselage plane with an approximately 25-40 m wingspan.

These battery packs or other non-airframe payloads can be positioned, as noted above, in a foam covered leading edge of the wing; the foam covering is removably attachable from the wing spar, wing ribs, or both through a mechanical joint such as a tongue and groove as noted earlier, exposing the batteries, payload, avionics etc and enabling quick replacement/swaps. The foam covering also provides some thermal protection (e.g. from extremes of external temperature) and hence enhanced regulation for the items positioned in the wings.

In one embodiment, this is operable to be generalized as a solar powered plane, such as a plane configured to operate in the stratosphere, and that includes one or more non-airframe items each positioned inside a compartment in the wings.

Optional features are operable to include any one or more of the following:

- each compartment is in the leading edge of the wing.
- each compartment is covered by a removable leading edge module.
- each compartment is covered by a removably attachable, modular, leading edge components made substantially of foam.
- the non-airframe item is a holder or attachment system configured to releasably secure the non-airframe item in position.
- the holder or attachment system is an L-shape bracket.
- the holder or attachment system remains in position through a mechanical joint.
- the holder or attachment system remains in position through a hook and fastener system.
- the holder or attachment system is a screw-less removably attachable system.
- the holder or attachment system provides a surface onto which a non-airframe item can be placed or fixed to.
- the non-airframe item is a battery.
- the non-airframe item is a sensor.
- the non-airframe item is an antenna.
- the non-airframe item is an avionics system.
- the non-airframe item is a communications system.
- the non-airframe item is located in a leading edge of the wing.
- the non-airframe item is located behind a removable part in a leading edge of the wing, and the non-airframe item can be inserted, removed and its position adjusted once the removable part has been removed.
- the removable part includes a foam layer.
- the plane is a twin fuselage plane and includes one or more non-airframe items positioned in a central wing joining the two fuselages.
- the plane is a dual fuselage plane with an approximately 25-40 m wingspan.

A.6 Battery Re-Positioning for Optimal Balancing

Conventional aircraft undergo mass distribution changes as they burn their liquid fuel during flight. This is compensated by control surface inputs, however these increase the drag and reduce the flight efficiency. A solar powered plane maintains constant mass distribution throughout its flight since no liquid fuel is burnt, and so compensatory control surface inputs are not required, provided the mass distribution is correct at take-off. This feature is a way of achieving optimal mass distribution prior to flight.

In one embodiment, in the Solaris plane, the rechargeable Li-ion batteries are one of the heaviest items in the aircraft and are distributed along the length (i.e. perpendicular to the long axis of the plane) of the wing (e.g. the central wing 12, and also the main, dihedral wings 11, generally in the forward part of the wing; the Solaris plane includes an easy way to mechanically adjust their fore/aft location (e.g. manual millimetric adjustments of position) to give optimal balancing of the aircraft for different payloads. Battery packs are mounted on a lightweight frame and their position on the frame can be manually altered when the frame is being prepared for flight. Lateral adjustments port/starboard may also be provided to balance the total loading when taking into account other equipment that may not be symmetrically loaded (sensors, avionics, transponders, etc . . . ) and to improve the overall flight stability which improves the quality of data capture. Vertical adjustments of the battery pack are also possible; any adjustment type (fore/aft; lateral; vertical) can be done independently of any other adjustment type.

Figure 7A:
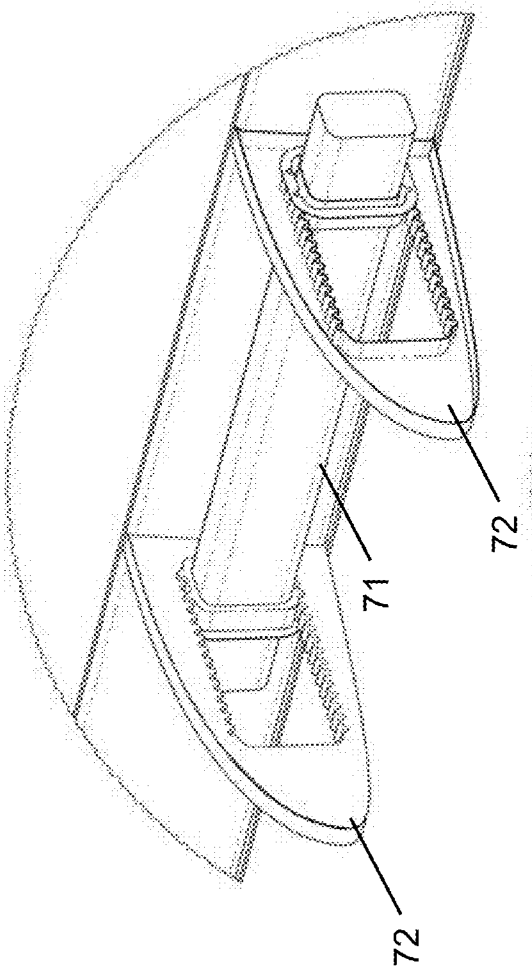
FIG. 7A illustrates a battery pack positioned along the length of a wing in one position according to one embodiment of the present invention.
Figure 7B:
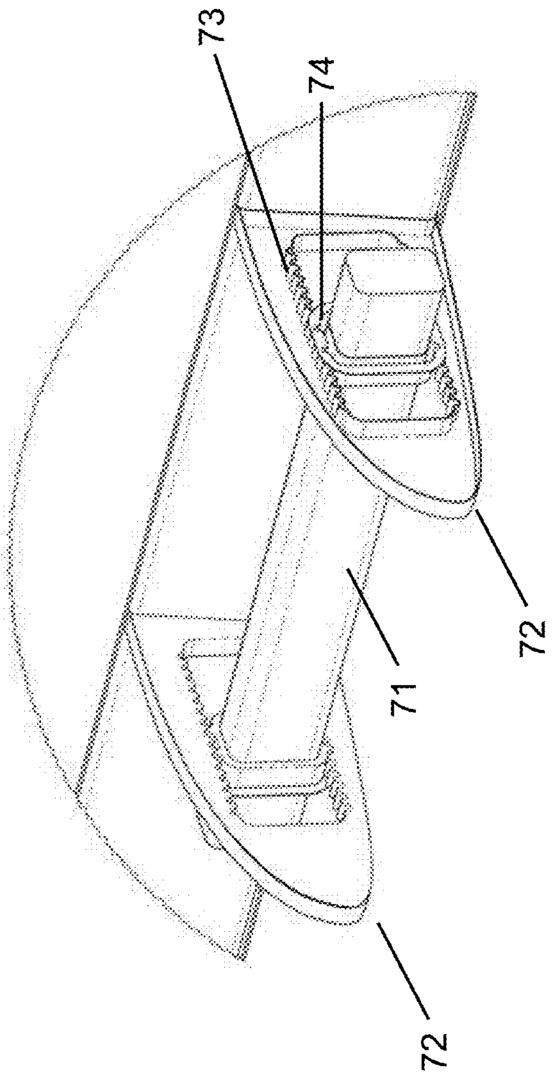
FIG. 7B illustrates the battery pack at a different position according to one embodiment of the present invention.

FIG. 7A shows a battery pack 71 positioned along the length of wing 11 or 12 in a fully aft position across two adjacent wing ribs 72. The batteries may be rechargeable li-ion batteries and may generally be positioned in the forward part of the wing. The battery pack engages with mechanical adjustments 73 in adjacent wing ribs 72 that enables fore and aft adjustments of the battery pack. Each of these ribs 72 includes a frame 73 that enables multiple different positions that the battery pack can be positioned on or against. The battery pack 71 is inserted through one or more lock collars 74. The lock collar 74 engages with teeth or features located in the frame 73 in a wing rib 72. Whilst Li-ion rechargeable batteries are normally used, other high power-to-weight technologies (e.g. solid-state) may also be used.

In one embodiment, each wing is operable to include multiple battery packs 71, each housed in a foam covered leading edge of the wing; the foam covering is detachable from the wing ribs, exposing the batteries and enabling quick battery replacement/swaps. The foam covering also provides some thermal protection (e.g. from extremes of external temperature) and hence enhanced regulation for the batteries.

In one embodiment, this is operable to be generalized as a solar powered plane, such as a plane configured to operate in the stratosphere, and that includes batteries or one or more battery packs that are configured to be positioned pre-flight in a battery position adjustment system to give an optimal mass distribution to offset or compensate for the mass and position of different payloads.

Optional features are operable to include any one or more of the following:

- the battery position adjustment system is positioned in a wing.
- the battery position adjustment system is positioned in a central wing positioned between twin fuselages.
- the battery position adjustment system is positioned in a dihedral main wing.
- the battery position adjustment system enables fore and aft adjustments.
- the battery position adjustment system enables port/starboard lateral adjustments.
- the battery position adjustment system enables vertical adjustments of the battery pack.
- any adjustment type (fore/aft; lateral; vertical) can be done independently of any other adjustment type.
- the battery position adjustment system is attached to or forms part of a wing rib.
- the battery position adjustment system includes a frame with multiple different positions that the batteries or one or more battery packs can be positioned on or against.
- the battery position adjustment system includes a locking collar configured to lock the battery at a desired position relative to a wing rib.
- the battery position adjustment system is located in a leading edge of the wing.
- the battery position adjustment system is located behind a removable part in a leading edge of the wing, and the battery or battery pack can be inserted, removed and its position adjusted once the removable part has been removed.

the removable part includes a foam layer.

the plane is a dual fuselage plane with an approximately 25-40 m wingspan.

A.7 Accessible Wiring Loom Running Along a Wing Spar

In one embodiment, In the Solaris plane, there may be a wiring loom that run along the forward-facing (fore) surface of each wing spar, proximal to the leading edge. This approach allows enables quick replacements/swaps of electrical components such as the payload in the compartments described in Section A.4 above and also payloads positioned inside the wing sections, e.g. between the wing ribs described in Section A.14 below (e.g. flat phased array antennas, solar panels etc.) or that form part of the wing skin (e.g. flat phased array antennas, solar panels etc). In a traditional solar powered plane, you could expect the wiring to run in inaccessible areas, inhibiting the ability to make quick adjustments. Furthermore, the wiring runs in close proximity to the payloads that it services, ensuring the aircraft does not carry additional wiring weight. The wiring loom is attached to the surface of the wing spar using tape or some other low-cost, light weight attachment system. This approach enables rapid and low-cost upgrading of all the wiring (or simply replacing faulty wiring/looms) by a technician in the field, without redefining the airframe or other components.

Figures 8A, 8B:
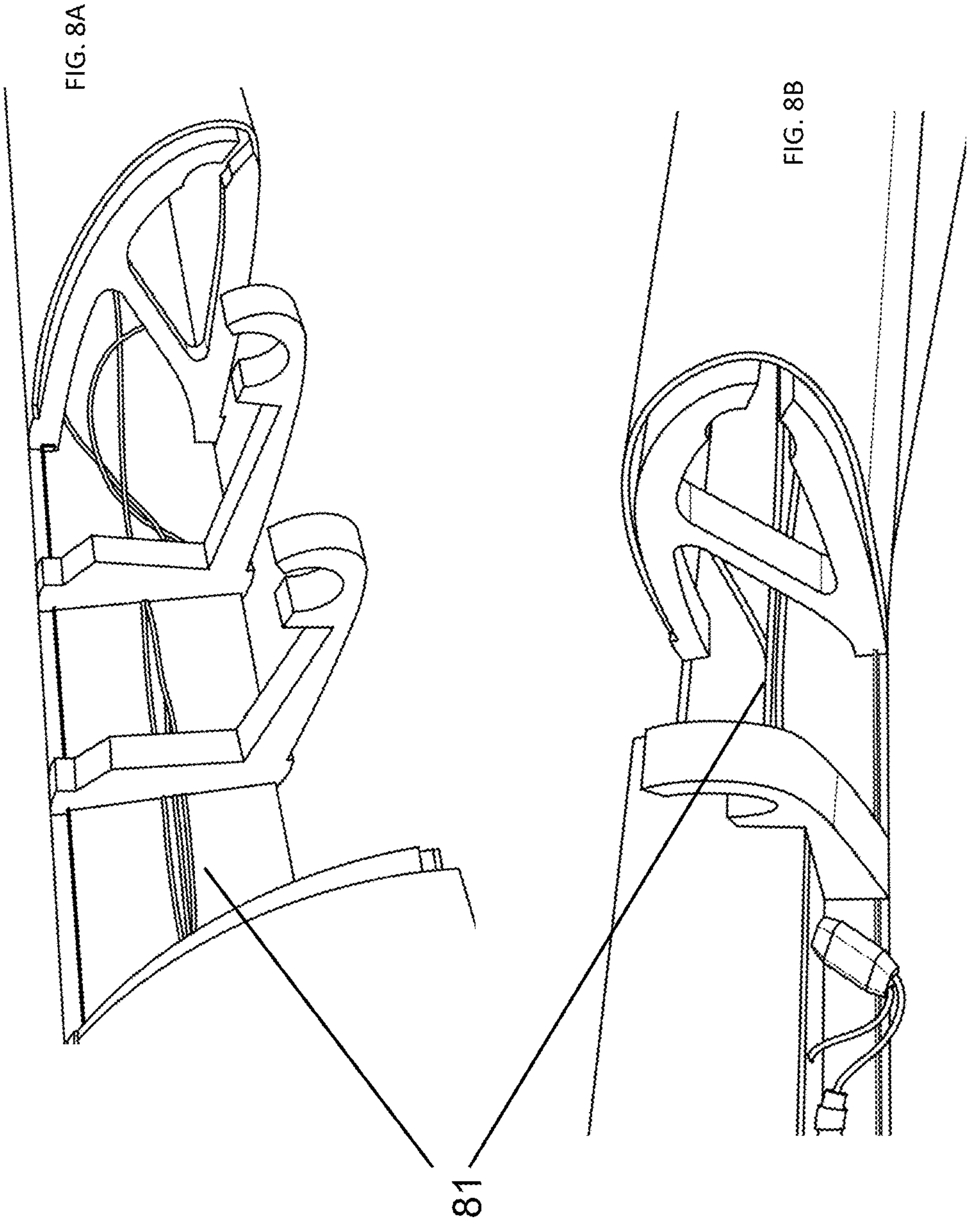
FIG. 8A illustrates the wiring loom passing along the forward-facing edge of the wing spar, behind a wing leading edge section according to one embodiment of the present invention.
FIG. 8B illustrates the wiring loom passing behind a battery pack, mounted to an L-shape bracket according to one embodiment of the present invention.

The wiring loom is shown in FIGS. 8A and 8B. In FIG. 8A, the wiring loom 81 passes along the forward-facing surface of a wing spar, behind a wing leading edge section. In FIG. 8B the wiring loom 81 can be seen to pass behind a battery pack that has been mounted in an L-shape bracket. The wiring loom can interact with the battery pack close to the forward-facing surface of a wing spar.

In further embodiments, wiring looms may interconnect wing-mounted non airframe items, such as battery modules with electronics located in the fuselage or in removable D-section modules, and may be routed along spars, ribs, conduits, cutouts, channels, or other integrated structural features. Multiple looms may be provided, including looms dedicated to power, data, communication links, or control signals, and these may be serviceable independently.

In some embodiments, the wiring loom is positioned entirely forward of the main wing spar, forming a fore spar electrical region that becomes fully accessible whenever a removable leading-edge section or D-section module is detached. This fore spar positioning enables plug and play electrical interfacing with removable D-section modules, allowing each module to be mechanically attached and electrically connected in a single operation. The D-section may include mission-specific payloads, sensors, batteries, thermal-management devices or communication systems, all of which can be serviced or exchanged without disturbing internal wing structures.

The wiring loom may include a series of distributed electrical connectors, one located in each bay between adjacent wing ribs or between a rib and a spar, thereby enabling payloads, sensor modules or batteries to be coupled or decoupled directly through the leading edge opening without accessing internal cavities of the wing. As used herein, the term 'leading edge opening' refers to the access opening that is exposed when a removable leading edge or D-section module is detached from the wing, thereby providing direct access to the fore spar region, wiring looms and/or connectors housed behind the leading edge In an alternative embodiment, the control signal wiring is routed in front of the spar, whereas the power distribution wiring may be located inside the spar. This separation improves electromagnetic compatibility, reduces crosstalk and simplifies the wiring architecture.

In a further embodiment, the spar includes an internal conductive or semi-conductive shielding layer ("intershield") that forms part of a protected internal power distribution bus. High current wiring may be routed inside the spar, shielded by the intershield, while low current control wiring remains forward of the spar in the accessible fore-spar region.

In a further embodiment, the wing spar is manufactured with pre-formed apertures, channels or removable breakout windows aligned with each bay, allowing wiring to exit the interior of the spar and interface with devices housed in the D-section or other leading edge locations. These apertures may include reinforced edges to maintain spar structural integrity. This arrangement enables a hybrid wiring architecture in which power wiring is routed internally within the spar while control wiring is routed externally along the fore-spar region.

A plug and play electrical interface may be positioned directly behind the leading edge, such that installation of a removable D-section automatically aligns and engages both electrical power connectors and control signal connectors.

This plug and play architecture enable rapid mission reconfiguration, allowing D-section modules or other leading-edge payloads to be swapped or upgraded without rewiring the aircraft.

In some embodiments, control signal wiring may also include payload data communication wiring. For example, the control signal wiring may provide a data communications link between a payload interface and an onboard communications terminal for external data transmission. As another example, the control signal wiring may also include a packet-based data interface, optionally an Ethernet interface, for coupling a payload to at least one onboard subsystem.

In one embodiment, this is operable to be generalized as a solar powered plane, such as a plane configured to operate in the stratosphere, and that includes a wiring loom that runs along a surface of a wing spar.

Hybrid Routing of Power and Control Wiring

A solar powered plane, such as a plane configured to operate in the stratosphere, and that includes a wiring architecture in which control and/or data communication wiring is routed externally of a wing spar and power distribution wiring is routed within the wing spar.

Plug-and-Play Leading-Edge Electrical Interface

A solar powered plane, such as a plane configured to operate in the stratosphere, the plane comprising a removable module, wherein removal of the removable module exposes one or more connectors arranged to permit plug and play connection of a payload.

Wing Spar with Distributed Apertures

A solar powered plane, such as a plane configured to operate in the stratosphere, and that includes a wing spar having a plurality of apertures, cutouts or channels located in respective bays between adjacent wing ribs, the apertures, cutouts or channels being configured to allow wiring to exit an interior of the wing spar to interface with payloads and/or electrical loads positioned in the wing.

Optional features are operable to include one or more of the following:

- the wiring loom runs along the forward-facing (fore) surface of the wing spar, proximal to the leading edge.
- the wiring loom runs along an internal surface of the wing spar.
- the wiring loom runs along the rearward-facing (aft) surface of the wing spar.
- the wiring loom runs along any external surface of the wing spar.
- the wiring loom is attached to the surface on the wing spar through tape.
- the wiring loom is configured to enable a non-airframe item such as a battery or other payload that is positioned in front of the wing spar to be connected to and disconnected from the wiring loom.
- the wiring architecture supports both aircraft control signalling and/or payload data communications.
- the control and/or data communications wiring includes a packet-based data interface, optionally an Ethernet interface, for coupling a payload to an onboard subsystem and/or to a communications terminal for external data transmission.
- the wing spar includes an internal shielding layer configured to protect the power-distribution wiring
- the control and/or data communication wiring is accessible upon removal of a leading-edge component.
- wiring loom is configured to provide electrical connectivity to payloads housed in removable leading-edge modules and to payloads located between adjacent wing ribs.
- the payload is housed at least partially inside the removable module.
- the payload is electrically coupled to a connector upon attachment of the removable module.
- the removable module comprises or forms part of a leading edge of the wing.
- the removable module defines an internal volume for receiving a payload
- the removable module is configured to be exchanged with another removable module having a different external contour or payload.
- the removable module is formed from a lightweight cuttable material.
- the removable module is attachable and detachable without modification of a spar or rib of the wing.
- the removable module forms, together with the wing, a smooth aerodynamic profile when installed.

A.8 Over-Sized Foam Core Used in the Carbon Fiber Propeller Blade

For a solar powered HAPS propeller, efficiency is important. Assuming a good design, both the accuracy of the propeller shape and its high quality surface finish are key. To achieve a reliable and repeatable process, the propeller blade(s) in the Solaris plane are manufactured as follows: The propeller blade is made using a thermally controllable compression moulding press into which bespoke, highly polished top and bottom cavity moulds of the propeller are fitted to the heated platens of the press. The pre-cut, pre-impregnated layup of carbon fiber sheets for one side skin of the blade is laid into the lower half of the mould followed by a pre-machined over-sized foam core; this core has a surface that is approximately 0.5 mm higher than it would normally be in a conventional process. Since the carbon fiber sheets are typically no more than 0.2 mm in thickness and the total thickness of the blade is typically no more than 10 mm, this additional volume of the foam core is significant.

The over-sized core is then covered with the second carbon fiber outside skin. The press is closed, crushing the outer surface of the over-sized foam core and squeezing out any bubbles or wrinkles in the carbon skins. The platens are heated to the appropriate process temperature until the pre-impregnated carbon fiber sheets have cured. The pre-finished item is then released from the mould for final finishing. Because any bubbles and wrinkles are squeezed out since the entire surface of the blade is compressed by approximately 0.5 mm, the quality of the blade surface is very high: a much smoother, high quality finish than would be the case if an over-sized foam core was not used.

In alternative embodiments, propeller blades may incorporate hybrid cores, honeycomb structures, polymer cores, metallic inserts, or combinations thereof.

The principles described for oversized foam inserts may also be applied to removable D-section modules where internal reinforcement or local stiffening is required.

In one embodiment, this is operable to be generalized as a carbon fiber structure for a system, the structure made using a vacuum/compression moulding process, with carbon fiber pre-impregnated sheets formed in a mould around an over-sized structural foam core.

Optional features are operable to include any one or more of the following:

- the over-sized structural foam core is sized so that one or more surfaces of the core are compressed down by at least 0.2 mm during the moulding process.
- the over-sized structural foam core is sized so that one or more surfaces of the core are compressed down by approximately 0.5 mm during the moulding process.
- the over-sized structural foam core is sized and shaped so that, when a press is closed over the carbon fiber pre-impregnated sheets, then at least some of the surface of over-sized structural foam core is crushed or compressed, squeezing out some or all bubbles or wrinkles in the carbon fiber pre-impregnated sheets.
- carbon fiber pre-impregnated sheets for one outside side skin of the structure are laid into a lower half of a mould, followed by a pre-machined over-sized foam core, which is then covered with the second carbon fiber outside skin and the press is then closed to compress two halves of the mould together.
- the system is any device over which smooth air or fluid flow is desirable.
- the system is solar powered plane, such as a plane configured to operate in the stratosphere.
- the structure is a propeller blade.
- the structure is a strut or spar.
- the plane is a dual fuselage plane with an approximately 25-40 m wingspan.

A.9 Carbon Fiber Propeller Blade with Inhomogeneous Internal Structural Foam Core The concept of long duration solar powered high altitude flight in the stratosphere relies on the plane being of exceedingly low mass. In order to keep the mass as low as possible the propulsion system and the propellers need to operate outside of their optimised efficiency envelope, particularly in the lower stratosphere.

In one embodiment, this feature A.9 maximises propeller structural performance with minimal mass increase. In the Solaris design, different regions of the propeller blade can have different types or structures of internal foam core with mechanical properties optimised for the specific forces/possible failure modes at that region. The variable properties in the core make it possible to reduce mass and/or to vary the stiffness or flex of the finished component.

As an example, a lightweight honeycomb core could be used to reduce mass in areas of the propeller blade where less strength is needed; we machine a pocket in the foam core and insert some lightweight honeycomb into that pocket. Conversely specific inserts (e.g. carbon fiber tubes, extra laminate or denser foam) can be locally incorporated where extra strength or rigidity is required; for example, near the root of the blade we need to transmit a lot of torque from out across the width of the blade so we could again make a pocket but insert into it extra carbon, or Kevlar fibres, or even pre-formed composite stiffeners before the blade has its skins attached.

Figure 9:
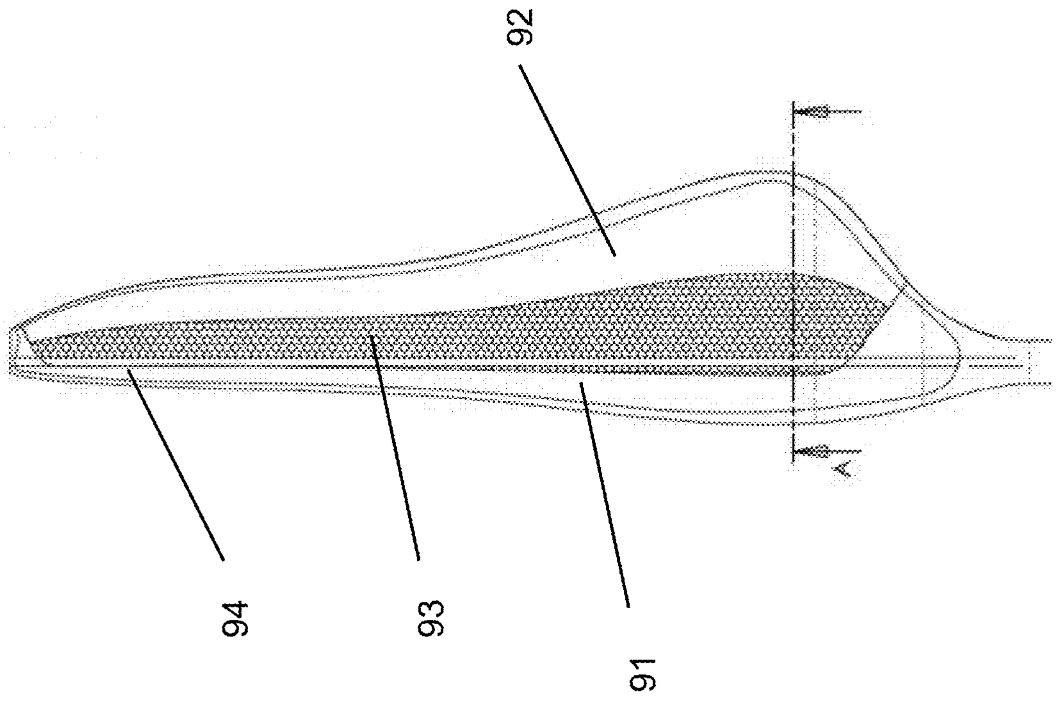
FIG. 9 illustrates a plan view of a propeller blade, showing an internal honeycomb core according to one embodiment of the present invention.
Figure 10:
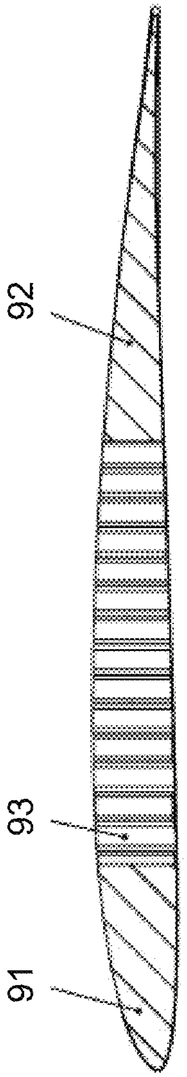
FIG. 10 illustrates a cross-sectional view through the propeller blade of FIG. 9 according to one embodiment of the present invention.
Figure 11:
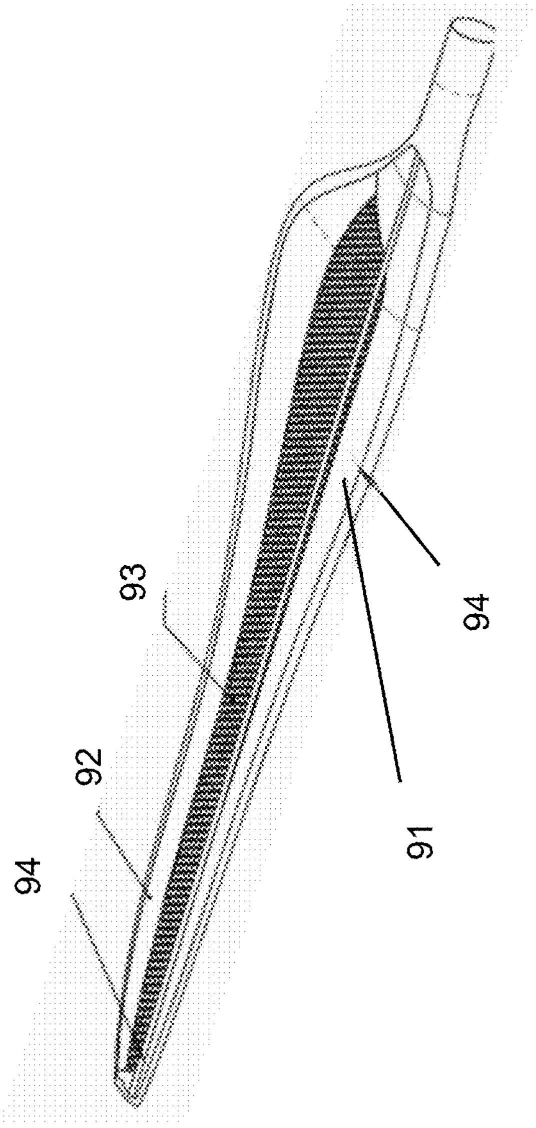
FIG. 11 illustrates a perspective view of the propeller blade of FIG. 9, showing the internal honeycomb core according to one embodiment of the present invention.

The propeller blades of the planes may be selected depending on several design parameters, such as weight, efficiency or operating conditions of the solar powered plane. Different types of propeller blades with different types or structures of internal foam core may be selected, as shown in FIGS. 9-11. Different regions of the blade may need more enhanced structural performance, such as strength and stiffness, while minimising weight. The internal foam core provides structural support and helps maintain the blade's shape in operation.

FIGS. 9-11 shows different views of a propeller blade with a honeycomb core. In FIG. 9 the leading edge that is subject to high aerodynamic loads and forces is made of a high-density foam core 91. The trailing edge is made of a low-density foam core 92. The internal section of the blade includes a pocket filled with light weight honeycomb 93. Further, the external contour of the blade may include additional reinforcement 94. FIG. 10 is a cross-sectional view through the blade along section A-A. FIG. 11 is a perspective view of the blade.

Figure 12B:
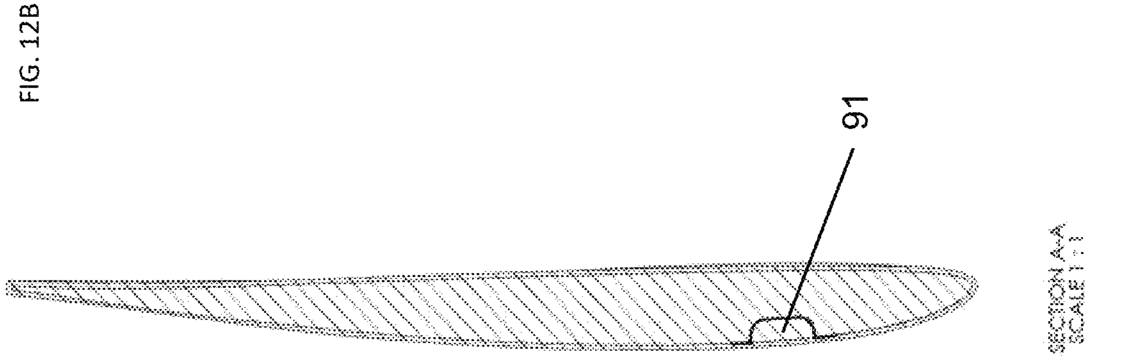
FIG. 12B illustrates a cross-sectional view of a propeller blade with an internal stiffener according to one embodiment of the present invention.
Figure 12A:
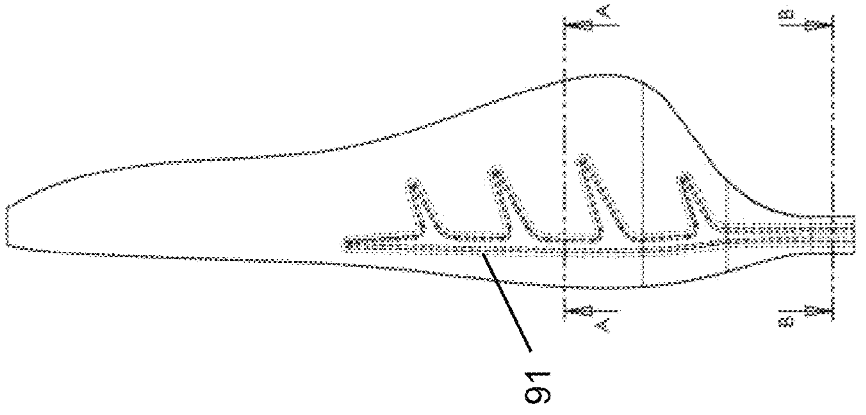
FIG. 12A illustrates a plan view of a propeller blade with an internal stiffener according to one embodiment of the present invention.

FIG. 12A show different views of another propeller blade with a different internal structure that includes one or more pockets 91 or cavities that are designed to fine tune the structural properties of the blade. Inserts made of materials such as carbon fiber tubes, extra laminate, or denser foam, are then embedded within the one or more pockets 91 to provide additional structural support and help distribute the load more effectively, especially in region experiencing higher stresses or where increase strength or rigidity is desired. The inserts combined with the foam core create a composite structure that is selected based on the desired performance characteristics of the propeller blade.

Figure 12C:
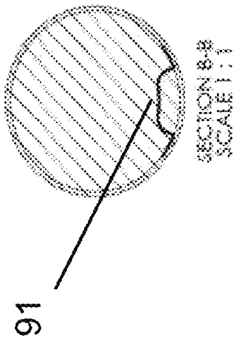
FIG. 12C illustrates a cross-sectional view of a propeller blade with an internal stiffener according to one embodiment of the present invention.

The root of the blade may include an insert 91 (as shown in a plan view in FIG. 12A), to provide extra stiffness, such as extra carbon, or synthetic fiber such as Kevlar fibre, or even pre-formed composite stiffeners. This is because the root of the blade needs to be robust to transfer a lot of torque effectively. FIG. 12B is a cross section along line A-A in FIG. 12A and FIG. 12C is a cross section along line B-B in FIG. 12A.

FIG. 13A shows the FIG. 12 blade in plan view, but showing the lightweight, low-density honeycomb foam core 95 that is also present. FIG. 13B is the blade in perspective view; FIG. 13C is a cross-section along A-A, showing the internal lightweight core and FIG. 13D is a close up view of region B indicated in FIG. 13B.

In one embodiment, this is operable to be generalized as a carbon fiber structure for a solar powered plane, such as a plane configured to operate in the stratosphere, in which the structure comprises an outer carbon fiber shell enclosing an internal structural foam core together with a second material with a different mechanical property to the internal structural foam core or the carbon fiber shell.

Optional features are operable to include any one or more of the following:

- the structure is a propeller blade.
- the structure is a strut or spar.
- the second material is optimised for specific forces.
- the second material is optimised for specific possible failure modes.
- the second material is also a foam core, but of different density to the internal structural foam core.
- the second material is a non-foam material.
- the second material is made of carbon fibre, synthetic fibre, composite, laminate, or a dense foam.
- the second material provides increased strength or rigidity to the structure.
- the second material extends form the root of a propeller blade into the body of the propeller blade.
- the internal structural foam core is a lightweight, honeycomb foam core used to reduce mass in areas of the structure where less strength is needed.
- the second material is an insert that is inserted into a void or space in the internal structural foam core, and the insert is configured to provide specific mechanical properties.
- the insert (e.g. carbon fiber tubes, extra laminate or denser foam) are locally incorporated where extra strength or rigidity is required.
- the plane is a dual fuselage plane with an approximately 25-40 m wingspan.

A.10 Triangular Cross-Section Fuselage

In one embodiment, solar powered unmanned HAPS, etc. with solar cells on the upper surfaces of the wing can suffer the effects of reduced angles of solar incidence when flying into the sun or at 90 degrees to the sun. In some embodiments, the Solaris plane may adopt a triangular fuselage; each fuselage is covered on the two upward facing surfaces in solar cells. This helps to mitigate some of these effects by adding extra solar cells at a different angle to those on the wing. So in the Solaris plane, the fuselage (or each fuselage in a twin or multi fuselage plane) has a triangular cross-section (e.g. equilateral or isosceles) with the apex at the top; it is made of carbon fiber struts covered in a stretched Mylar (or other plastic, e.g. polyester film) skin with integral PV cells on the two upward facing surfaces.

Figure 14A:
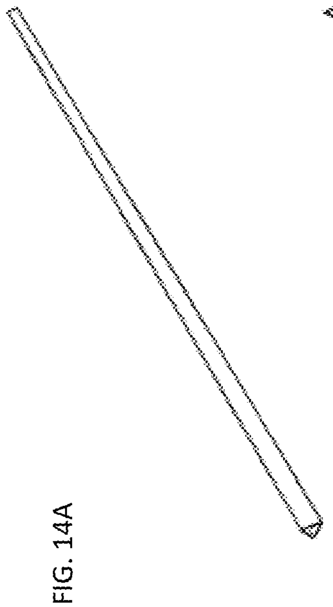
FIG. 14A illustrates a triangular fuselage formed with a triangular cross-section according to one embodiment of the present invention.
Figure 14B:
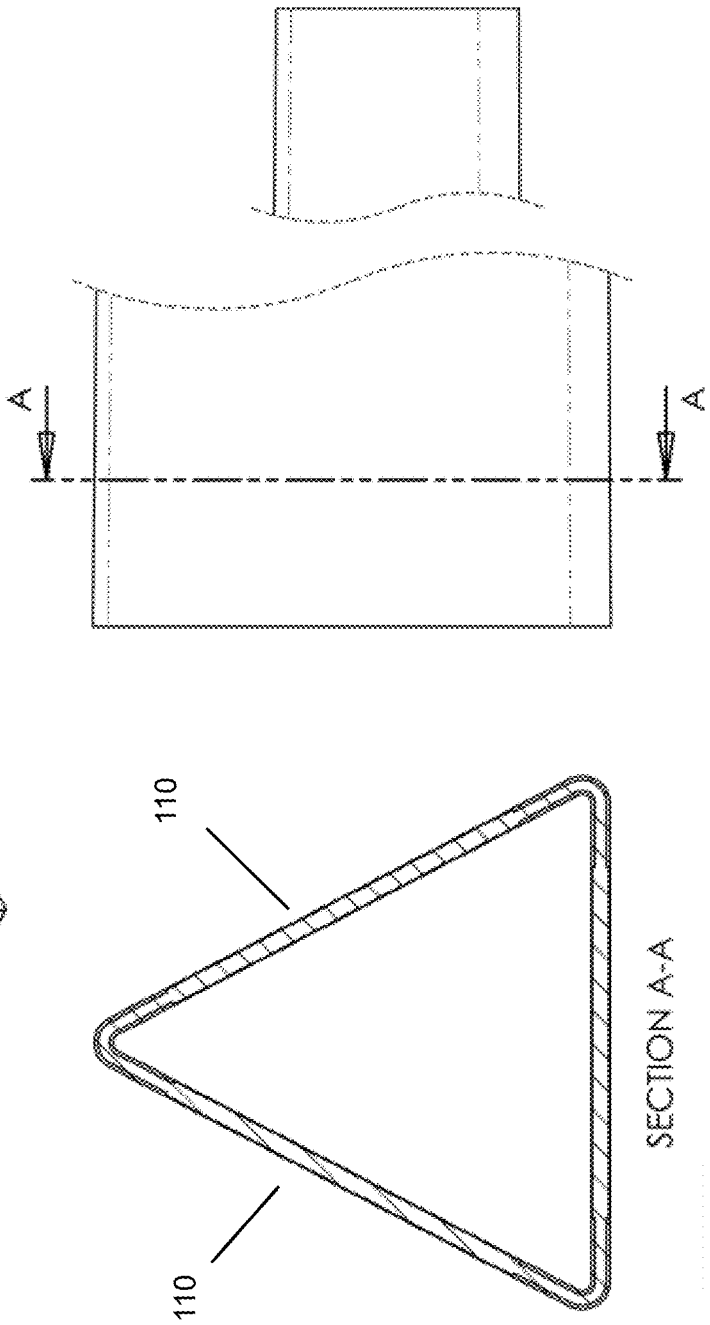
FIG. 14B illustrates different views of a triangular fuselage formed with a triangular cross-section according to one embodiment of the present invention.

FIG. 14A shows a perspective view of a triangular fuselage formed with a triangular cross-section, such as equilateral or isosceles, with its apex at the top. FIG. 14B shows a cross-section through this triangular fuselage. Solar cells 110 are included on, or form part of, each upward facing planar surface of the fuselage.

In one embodiment, this is operable to be generalized as a solar powered plane, such as a plane configured to operate in the stratosphere and including at least one fuselage with a substantially triangular cross-section with apex at the top, and in which an array of PV cells is formed on at least part of the two upward facing surfaces of the fuselage.

Optional features include any one or more of the following:

- the plane includes two fuselages, each formed with a triangular cross-section with its apex at the top, and an array of PV cells is formed on at least part of the two upward facing surfaces of each fuselage.

the surface of each fuselage comprises a stretched plastic, e.g. polyester, film skin with integral PV cells.
the fuselage is isosceles in cross-section.
the fuselage is equilateral in cross-section.
the plane includes further PV cells on the upper surface of one or more wing sections.
the plane is a dual fuselage plane with an approximately 25-40 m wingspan.

A.11 Hinged Tail with Landing Skid

In the Solaris plane, the fuselage or fuselages include a vertical tailplane (i.e. vertical stabilizer) that extends both above the fuselage, and also below the fuselage. The base of the vertical tailplane includes a sacrificial strike point and a landing skid (see Feature A.3 above). The vertical tailplane is hinged so that when the skid contacts the ground on landing, the top of the vertical tailplane pivots forwards around the hinge point, allowing the entire aircraft to belly flop onto the runway, whilst minimising damage to the aircraft on landing. This pivoting of the rearmost skid avoids high bending moments being generated in the fuselages/s. During flight, the vertical tailplane is prevented from hinging by means of either a frangible pin or lashing. The strike point & landing skid can, as noted above, include a lightweight sacrificial layer (e.g. XPS foam).

Figure 15A:
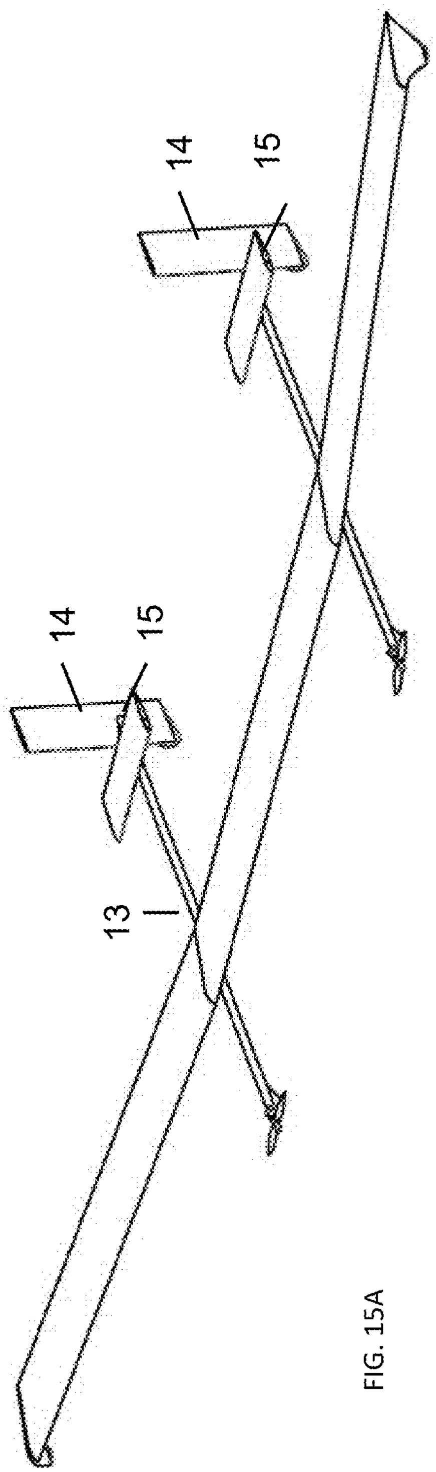
FIG. 15A illustrates the Solaris plane in operation during flight according to one embodiment of the present invention.
Figure 15B:
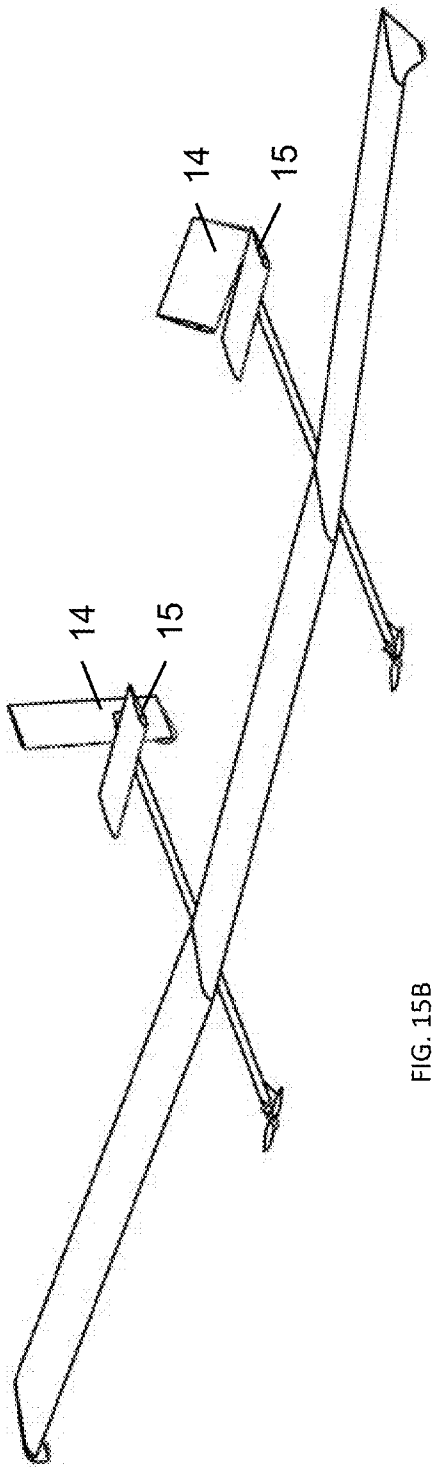
FIG. 15B illustrates the Solaris plane in operation when landing according to one embodiment of the present invention.

FIG. 15A is a perspective view of the Solaris plane in normal flight; the vertical tailplane 14 is upright. FIG. 15B is a perspective view of the Solaris plane during landing; the vertical tailplane 14 has been hinged forwards as the skid at the base of the tailplane has contacted the ground.

Figure 16A:
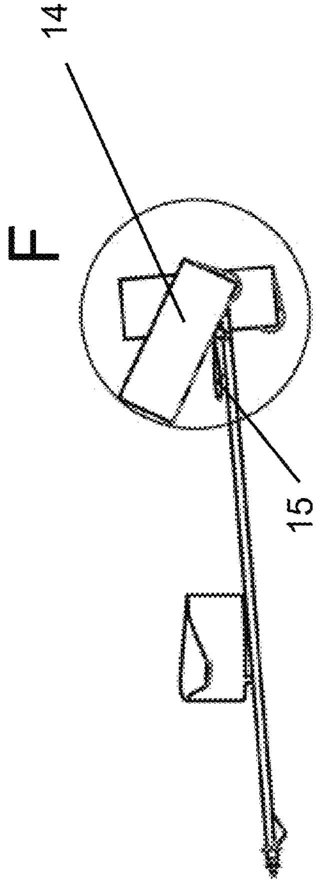
FIG. 16A illustrates a detailed side view of the vertical tailplane positioned during flight and when landing according to one embodiment of the present invention.

FIG. 16A shows a side view of the Solaris plane; the vertical tailplane in the expanded circular window is shown upright, the normal flight position, and also hinged forwards, which is the position it takes during landing. The base of the vertical tailplane 14 includes a sacrificial strike point and a landing skid and is hinged so that when the skid contacts the ground on landing, the top of the vertical tailplane pivots forwards around the hinge point, allowing the entire aircraft to belly flop onto the runway, whilst minimising damage to the aircraft on landing.

Figure 16B:
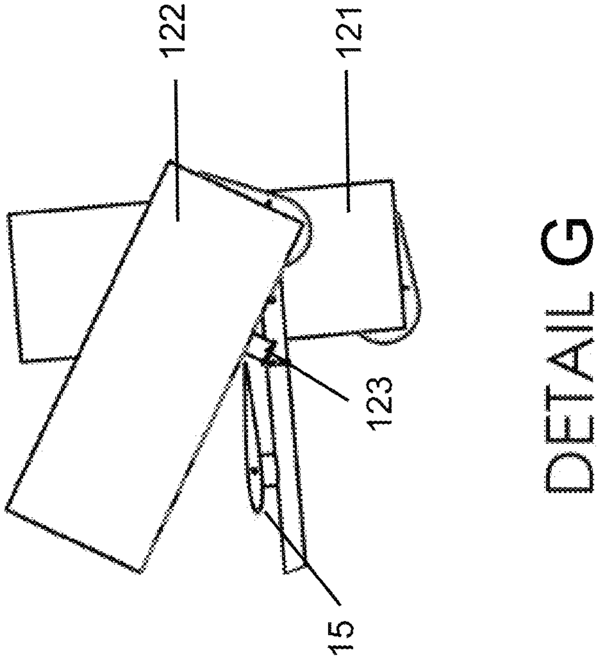
FIG. 16B illustrates a detailed side view of the vertical tailplane positioned during flight and when landing according to one embodiment of the present invention.

FIG. 16B shows a detail side view of the vertical tailplane 14 positioned during flight 121 and when landing 122. When landing the vertical tailplane pivots forward around the hinge point 123. This pivoting of the rearmost skid avoids high bending moments being generated in the fuselages/s.

In one embodiment, this is operable to be generalized as a solar powered plane, such as a plane configured to operate in the stratosphere and including a hinged vertical stabilizer that that pivots about a hinge, and where the stabilizer extends both above the fuselage and also below the fuselage, and the base of the vertical stabilizer includes a skid.

Optional features include any one or more of the following:
the hinged vertical stabilizer is configured such that when the skid contacts the ground on landing, the top of the vertical stabilizer pivots forwards around the hinge point, minimising damage to the aircraft on landing.
the skid includes a lightweight, replaceable sacrificial layer.
the vertical stabilizer is prevented from hinging during normal flight by means of either a frangible pin or lashing.
the plane includes downward facing winglets and these also act as landing skids.
the plane is a dual fuselage plane with an approximately 25-40 m wingspan.

A.12 Propeller Blades Align with the Wing Direction Prior to Landing

In one embodiment, in the Solaris plane, the plane glides in to land; none of the propeller blades are powered for a significant portion of the landing descent, and are instead automatically turned to be in-line with the wings, to minimise risks of being damaged on landing. The motor is fitted with a sensor that detects the position of the propeller. And the motor controller can step the motor rotation until the propeller is aligned and held horizontally (or with the wing direction, e.g. for a dihedral or anhedral wing). Alternatively, a sensor can determine when the propeller blades are in-line with the wings and to immediately short-circuit the motor to cause the blades to stop at the in-line position.

Turning the propellers to be in-line with the wings is especially useful when the plane is landing on a moving autonomous ground platform or AGP (see Feature E.3 below); it is critical to avoid the blades from colliding with the AGP. There may be a sensor in the plane and/or AGP to enable accurate relative positioning of the plane and AGP; data from this sensor can also be used to stop the propeller blades when they are in-line with the wings. For instance, the sensor can detect when the plane is say 2 m above the AGP, or within 5 seconds prior to landing on the AGP, and the sensor can then generate a signal that causes the propeller motors to immediately cease.

In one embodiment, this is operable to be generalized as a solar powered plane, such as a plane configured to operate in the stratosphere, in which the plane includes, or receives data from, a sensor configured to detect the approach of the plane to an autonomous ground platform (AGP) on which the plane is designed to land; and in which the sensor is further configured to generate a signal that is used to control the propeller blades to be in-line with the wings of the plane when the height of the plane above the AGP and/or its rate of descent to the AGP or the time to landing on the AGP meet defined criteria.

Optional features are operable to include any one or more of the following:
data from the sensor is used to enable accurate relative positioning of the plane and the AGP.
the sensor is in the plane, or the AGP, or is distributed between the plane and the AGP.
the blades are also automatically turned to be in-line with the wings prior to landing on the ground, the sensor is configured to detect the approach of the plane to the ground.
the motor or motors driving the or each blade are shorted to stop the propeller blades when they are be in-line with the wings.
each propeller motor is fitted with (i) a position sensor that detects the position of the propeller and (ii) a motor controller configured to rotate or step the motor rotation until the propeller is aligned substantially horizontally.
the plane is a dual fuselage plane with an approximately 25-40 m wingspan.

A.13 Very Fine Flight Control Surfaces

One of the big uses of HAPS is for data capture. In order to maximise the accuracy of this data capture, flight stability and fine flight control of the HAPS is essential. For flight at high altitudes where the air density is low, HAPS require large control surfaces which move relatively slowly. But to fine tune the flight stability, small very fast acting surfaces would be preferable; these could be on the tail which would in theory enhance their leverage by being further form the centre of lift, however extra mass on the tail is very disadvantageous on HAPS, not least as the control surfaces would require long wiring runs which add to the mass. If mounted on the tail they also lose some effect due to the natural damping caused by the flex of the fuselage/boom or booms.

In one embodiment, the Solaris plane uses small control surfaces (e.g. trim ailerons) that are located adjacent to, but behind (and optionally below), the main wing; this has several advantages, including keeping the extra mass of the surfaces as close to the fore-aft CofG (centre of gravity) as possible. Another advantage is that being located under the wing they produce secondary aerodynamic effects which enhance their functionality and reduce the amount that they need to move in order to maximise the flight control and stability of the HAPS.

In many embodiments, the main wings do not require conventional control surfaces, this simplifies the design, build and cost of fabrication; however removable leading edge modules may include adjustable apertures, shutters, or stabilising surfaces without departing from this principle. It also improves the aerodynamics for lift and stiffness of the airframe and enables load (batteries, payloads, avionics, communications payloads etc) to be spread widely across the wing section, (especially the central wing section in a twin fuselage plane like Solaris) improving airframe stiffness and flight stability, delivering a superior platform for data gathering.

The twin motor design enables differential power to be applied to each propeller motor, to cause a flat turn, i.e. one in which no bank or pitch is required, enabling a far superior platform for data gathering, communications links (e.g. optical); because it reduces the need for mechanical steering of sensor lenses, communications transmit/receive antenna/lensing, and enables controllable timing for precise flight patterns and/or formation flying for multi-instrument or very wide aperture data gathering. In a turn induced by applying differential power to the two motors, the small control surfaces may not be used at all, or used in a way that enables the flat turn to be achieved.

Figure 17:
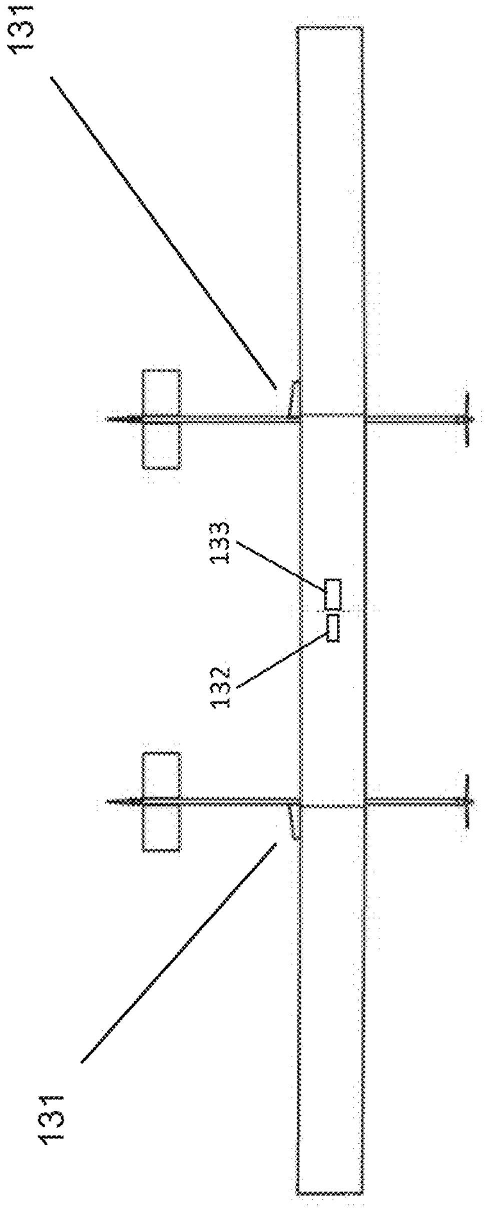
FIG. 17 illustrates a top-down view of the Solaris plane, showing small control surfaces (e according to one embodiment of the present invention. g. trim ailerons or controls) that are located behind the main wings according to one embodiment of the present invention.

FIG. 17 is a top-down view of the plane, showing the small control surface (e.g. trim ailerons or controls) 131 that are located behind the main wing.

Figure 18B:
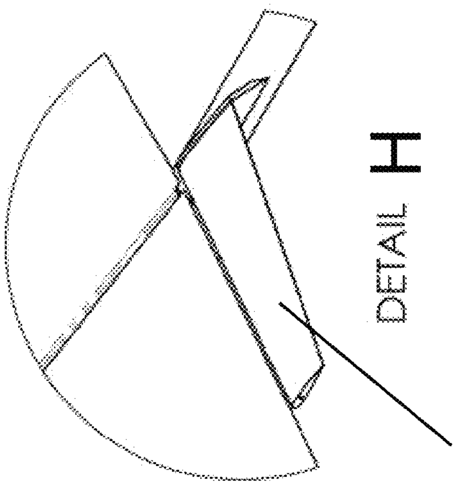
FIG. 18B illustrates a detailed view of the small control surfaces behind the main wings according to one embodiment of the present invention.
Figure 18A:
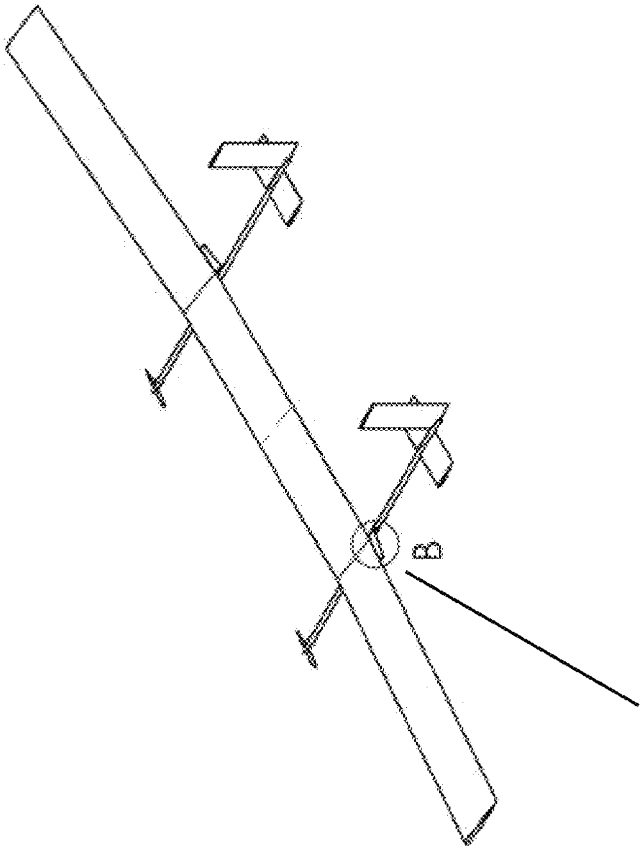
FIG. 18A illustrates a perspective view of the Solaris plane, showing the small control surfaces behind the main wings according to one embodiment of the present invention.

FIG. 18A is a perspective view of the plane, showing the trim ailerons or controls 131 that are located behind the main wing and FIG. 18B is a close up view of these trim ailerons or controls 131.

Figure 19:
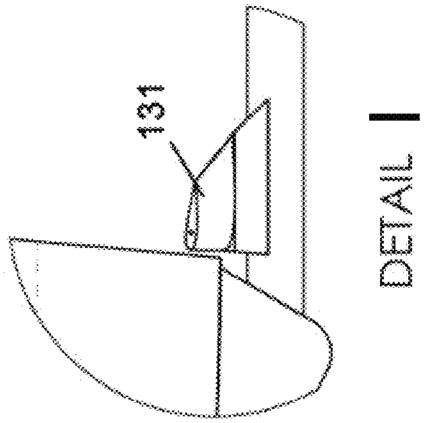
FIG. 19 illustrates a side view of the small control surfaces according to one embodiment of the present invention.

FIG. 19 is a side view of these trim ailerons or controls.

Control algorithms may also be adapted to account for different D-section shapes, profiles, or payload protrusions installed for a specific mission.

In one embodiment, this is operable to be generalized as a solar powered plane, such as a plane configured to operate in the stratosphere, including movable control surfaces extending from a fuselage of the plane and positioned adjacent to, but behind the main wings of the plane.

Optional features are operable to include any one or more of the following:

- movable control surfaces are positioned adjacent to, but behind and below, the main wings of the plane.
- the main wings include no moving parts or control surfaces.
- the plane is a twin fuselage plane and at least some of the plane's payload is distributed in some portions of the central wing between the two fuselages.
- at least some of the plane's payload is distributed in some portions of the main wings.
- the plane has twin fuselages, each with a motor driving a propeller, and is configured for differential power to be provided to each motor to enable a substantially flat turn to be achieved in conjunction with the control surfaces.
- the plane is a dual fuselage plane with an approximately 25-40 m wingspan.

A.14 Wing Ribs

Wing ribs provide the underlying support structure of the wings of the aircraft. They may attach to the wing spars and provide support for the wing skin of the aircraft. The wing skin ultimately provides the lift for the aircraft. The wing ribs are appropriately spaced at intervals along the wing spar such that they provide sufficient means for the transfer of the lift force from the wing skin to the remainder of the aircraft, while minimising their weight contribution.

Figure 20:
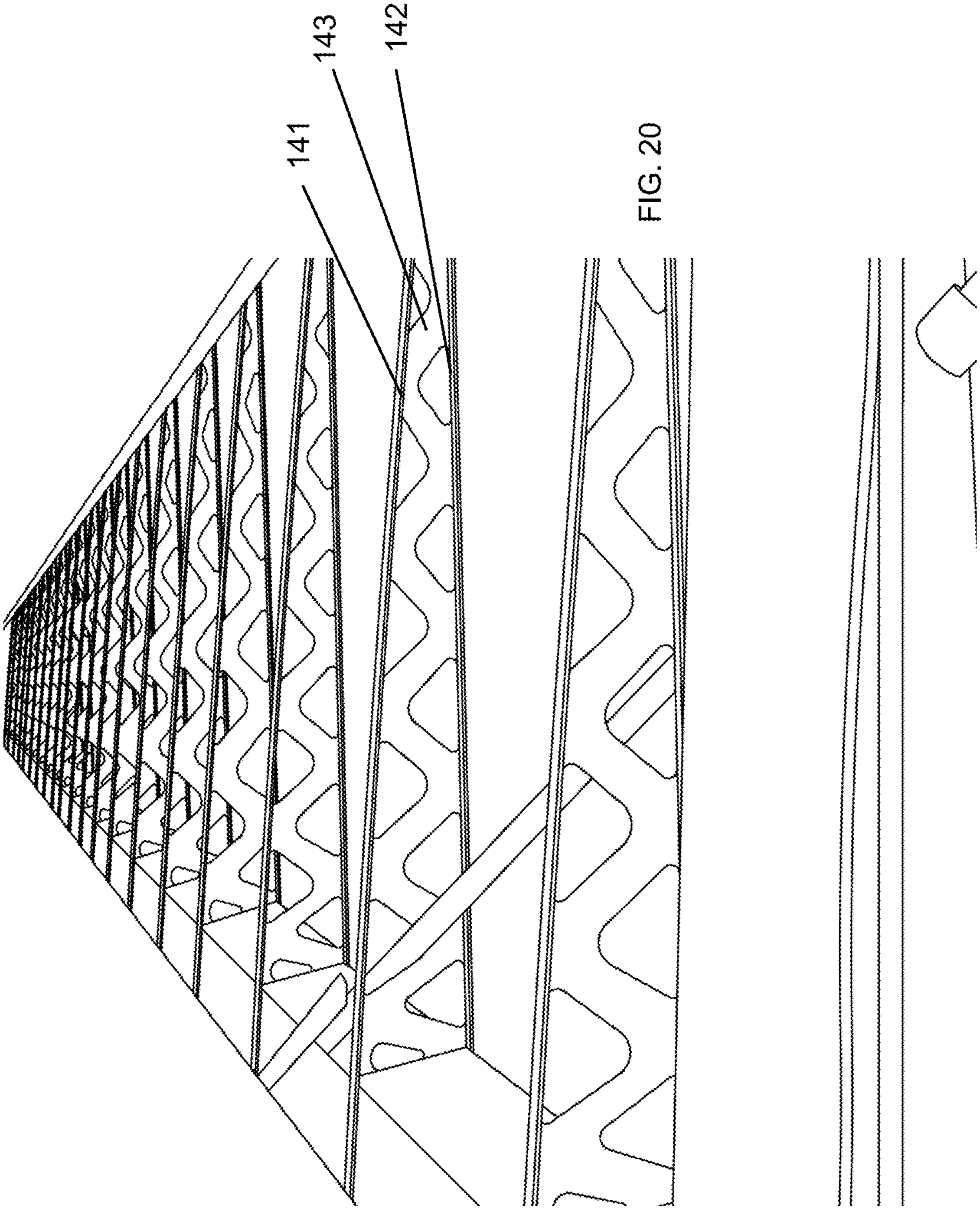
FIG. 20 illustrates a side view of a wing of the aircraft without a heat shrinkable film surface attached, showing the internal multiple wing ribs according to one embodiment of the present invention.

FIG. 20 shows wing ribs with top 141 and bottom 142 carbon fiber chords compressing diagonal foam struts 143.

In one embodiment, the top and bottom chords of the wing rib can be made from carbon fiber and are pretensioned to ensure they avoid compression. The diagonal struts attached to the top and bottom of the pre-tensioned carbon fiber chords hence experience compression forces. Given that the foam used in the wing ribs is strong in compression, it is a suitable choice for a low-density member in compression. By including diagonal foam struts in compression between a top and bottom chord, the wing rib resembles a truss.

The foam used for the wing ribs can be a polymethacrylimide (PMI) based or polyurethane based structural foam. This foam is 'unskinned'—normally a structural foam would be covered with a layer or skin of another material (e.g. carbon fibre) but the wing ribs remain unskinned. This saves weight, enables fast manufacture, and enables the ribs to flex more than they would if they had a rigid skin. It is possible to use unskinned foam as the loads are very light. Another benefit from using foam for ribs is that even if they are damaged, it is fast and easy to repair them in situ by say gluing a patch over a broken/damaged section to add strength.

In practice, depending on flight condition, and/or local structural response, the diagonal foam struts may experience not only compressive loads but also tensile and/or shear loads in at least some regions and at some times, in a manner analogous to bracing members in a conventional truss structure.

In one embodiment, this is operable to be generalized as a solar powered plane, such as a plane configured to operate in the stratosphere, including wing ribs made of compressed structural foam struts.

Optional features are operable to include any one or more of the following:

- the wing rib includes a top chord.
- the top chord of the wing rib is made of carbon fibre.
- the top chord of the wing rib is pretensioned.
- the wing rib includes a bottom chord.
- the bottom chord of the wing rib is made of carbon fibre.
- the bottom chord of the wing rib is pretensioned.
- the struts are diagonal struts that span between the top and bottom chords.

the diagonal struts are in compression.

each wing rib includes a single, integral piece of the structural foam, configured as a series of diagonal struts.

the diagonal struts are made of polymethacrylimide (PMI) based foam.

the diagonal struts are made of polyurethane based structural foam.

the diagonal struts are made of foam such as XPS or high-density EPS.

the diagonal struts are "unskinned", i.e. not covered with a layer or skin of another material such as carbon fibre.

the diagonal struts are made of foam such as XPS or high-density EPS and are repairable using patches applied to the struts.

the material the diagonal struts are made of has been selected for its compressive strength at low temperature.

the wing ribs are used to wrap a wing skin to the support structure of the wing.

A.15 Gas-Filled Bag Heat Sink

A lightweight thermal management device is provided in the form of a sealed, flexible bag filled with a thermally conductive gas, such as helium. This gas-filled bag acts as a passive heat sink, conducting heat away from the electronics housed within it. The lightweight construction makes it particularly suitable for aerospace applications, including an aircraft, high altitude aircraft, suborbital or space platform, or other mass constrained airframe. However, the thermal management system is also not limited to such platforms and may be applied to other systems requiring low-mass, passive heat dissipation.

Key features of this implementation are operable to include any one or more of the following:

The use of a thin, flexible polyester skin (e.g., 23-micron polyester) that encloses the thermally conductive helium gas, making the device significantly lighter than traditional metal heat sinks.

The ability of the device to function in high-altitude conditions by maintaining pressure around the electronics and preventing excessive depressurization.

The adaptability of the bag to various shapes and sizes, allowing it to be used in diverse applications, including inside the wings or fuselage of aircraft.

The prevention of condensation on sensitive electronics during descent through moist atmospheric conditions.

The helium gas is chosen for its superior thermal conductivity, which is approximately eight times higher than air, enabling efficient heat dissipation from electronic components enclosed in the bag.

Helium Gas Properties: Helium is highly effective at transferring heat away from the electronic components to the surface of the bag, which can have a much larger surface area compared to traditional heat sinks. This ensures efficient cooling while keeping the overall weight of the device low. The bag can be configured to fit various shapes and sizes, making it versatile for different applications.

Bag Construction: The bag is made of a 23-micron polyester film, which is durable enough to withstand the environmental stresses experienced in high-altitude flight. The bag can expand at lower pressures without bursting, allowing it to maintain its integrity even in the stratosphere. Furthermore, the material is transparent to radar signals, making the device suitable for use in electronic systems that utilize radar technology, such as Synthetic Aperture Radar (SAR).

Applications in High-Altitude Aircraft: The thermal management device is designed for use in solar-powered stratospheric aircraft. These aircraft often operate in extreme environmental conditions where temperature fluctuations and pressure changes are significant. The helium-filled bag not only dissipates heat from onboard electronics but also insulates them from depressurization and temperature extremes. Additionally, the bag prevents condensation from forming on the electronics during descent, protecting them from moisture-related damage.

Alternative Uses: The device can also act as a heat source. In high-altitude applications, batteries or other components that need to be kept warm can be positioned near the helium bag to absorb heat from the heat-generating electronics inside.

The Solaris plane may implement a helium-filled bag for use as a heat sink for heat-generating components, like batteries and other payloads. Instead of using heavy aluminum heat sinks, we put the heat-generating electronics in a sealed bag containing a gas of high thermal conductivity, such as helium. The bag can be made of a thin polyester material, such as 23-micron polyester; this makes the bag very lightweight and also low cost. The helium filled bag effectively provides the electronics inside the bag with a heat sink the size of the surface area of the bag, which can be of any size; the bag can be configured so that it inflates to fully or partially fill a specific space. Helium conducts heat 8× faster than air and is hence a very good conductor of heat away from the heat-generating electronics and to the large surface area of the bag. The helium-filled bag heat sink is thermally very effective (probably comparable to an aluminium heat sink) and ultra lightweight: a 55 g Helium sealed bag may well be as effective as a 1.4 Kg aluminium heat sink.

The helium-filled bag may be coated with a heat radiating material, such as a metallic coating that could better radiate heat away using mostly radiation, or with materials that convert that heat into a charge that can then be taken away to cool the bag.

If the helium bag is going to be taken to e.g. stratospheric altitude, it either needs to be constructed to withstand the pressure change from surface level to the appropriate altitude, plus a safety margin, or the volume of gas (helium) in the bag needs to be carefully controlled such that the bag is full but not over pressurized when at altitude, so that the bag does not burst. We prefer the latter approach since we can test different amounts of helium in 23-micron Polyester fabric bags in a low-pressure hypobaric chamber. The helium bag can also be used to protect sensitive electronics inside the bag from excessive depressurization at very high altitude.

Another of the benefits of using an inert/noble gas such as He inside the bag is that the gas also provides an electrically inert environment. One of the issues with high altitude flight (and space flight) is electrical arcing, and as the air density drops, it reduces the insulating capacity of air. Pulsed, high energy systems, such as radar or other antennas, pump high voltage, high power pulses and can be hard to deal with. Further, radiation and the accumulation of static across components of the aircraft are another source of arcing. So, bagging critical items that you want to prevent or protect from arcing in a bag filled with inert/noble gas is a very valuable thing in high-altitude and space systems. Further, a helium bag containing a heat generating device can act as a heat source and can be configured to transfer heat to components, such as the rechargeable batteries used in a solar powered stratospheric aircraft, that needs to be kept warm for optimum performance.

In one embodiment, a heat generating payload is included, such as a Synthetic Aperture Radar, carried by a solar powered stratospheric aircraft in this sort of helium filled bag with a 23-micron Polyester skin; the skin is sufficiently transparent to the radar waves, but robust enough to expand at stratospheric altitude without bursting. Because the bag material is highly flexible, it can be inflated with gas to fill any shape; the SAR or other payload could be fitted inside the wings of the aircraft; the bag can inflate to fill a large section of the void within a wing (or fuselage or other part of the aircraft).

Additional use: the bag can also be designed to ensure that when descending back to earth through moist air any condensation will occur on the outside of the bag as opposed to on the sensitive electronics or other contents within the bag. Hence, this provides added protection for the internal components, safeguarding them from moisture-related damage during atmospheric descent. As a result, the lifespan of the components inside the bag is extended and reliable performance during challenging environmental condition is ensured. This can be achieved through various features, such as, but not limited to material properties, structure of the bag, or thermal control. The bag does not have to be filled with a noble gas (or any gas for that matter), to prevent condensation on the sensitive electronics. The sensitive electronics will still be protected from condensation if the bag is filled with air or a vacuum. Whilst a primary use case is electronic component protection, the bag is also relevant to other science missions where chemistry/biology testing equipment is the payload; the testing equipment can be isolated and protected when placed inside the bag, acting as an environmental bag chamber.

We can generalise to the following key features with subsequent optional features:

A.15.1: Gas-Filled Heat Sink

A thermal management device comprising a sealed, flexible bag filled with a thermally conductive gas, such as helium, and configured to transfer heat from electronic components positioned within the bag and to radiate heat from the surface of the bag.

Optional features are operable to include any of the following:

- the thermally conductive gas conducts heat away from sensitive electronics.
- the sealed bag provides a large surface area for heat dissipation.
- the sealed bag also protects the electronics within the bag from rapid temperature fluctuations at high-altitude conditions.
- the bag is robust enough to expand at high-altitude conditions without bursting.
- the bag has a polyester skin, such as a 23-micron skin.
- the material of the bag is substantially transparent to a selected range of RF signals.
- the electronic components are a synthetic aperture radar and the material of the bag is substantially transparent to radar waves.
- the thermally conductive gas is infused with nanoparticles to enhance thermal conductivity.
- the thermally conductive gas is an inert/noble gas that provides an electrically inert environment.
- the thermally conductive inert/noble gas is helium.
- the bag includes thermal sensors to monitor the temperature of the helium gas and/or the skin of the bag.
- the sealed bag includes embedded sensors to adjust gas pressure in real-time, ensuring the bag remains intact during altitude changes.
- the bag includes a heat reflective coating to reflect external heat.
- the bag includes a heat radiating coating to enhance radiative cooling from the bag.
- the bag is configured to prevent internal condensation during atmospheric descent.
- the bag is designed such that moisture condenses on the bag's exterior.
- the gas-filled bag, without electronics components positioned within, weighs significantly less than an aluminium heat sink of equivalent heat dissipation capacity.

A.15.2: Gas-Filled Heat Sink for Excessive Pressure Reduction Protection

A thermal management device comprising a sealed, flexible bag filled with a thermally conductive gas, such as helium, and configured to protect electronic components positioned within the bag from excessive depressurization when at high altitudes.

Optional features are operable to include any one or more of the following:

- the sealed bag contains a thermally conductive gas and protects the electronics within the bag from pressure change.
- the thermally conductive gas maintains pressure around sensitive electronics within the bag.

A.15.3: Helium Bag Heat Source

A thermal management device comprising a sealed, flexible bag filled with a thermally conductive gas, such as helium, and configured to transfer heat from electronic components positioned within the bag and to transfer heat to components or devices, such as batteries, that are external to the bag. Optional features are operable to include the heat transfer protects the components or devices, such as batteries, that are external to the bag from rapid temperature fluctuations at high-altitude conditions.

A.15.4: Testing Helium Bags for High-Altitude Conditions

A method for testing the operation of a thermal management device comprising a sealed, flexible bag filled with a thermally conductive gas, such as helium, comprising the step of filling the bag with different amounts of the gas in the bag in a low-pressure testing chamber to test the resistance to bursting at high altitudes.

The method is operable to include one or more of the following steps:

- Filling the bag with a controlled volume of thermally conductive gas to ensure it is full but not over-pressurized at high-altitude conditions.
- Testing different amounts of thermally conductive gas in the bag using a low-pressure chamber to simulate high-altitude conditions.

A.15.5: Condensation Prevention Device

A condensation prevention device, comprising a sealed, flexible bag configured to allow condensation to accumulate on the outside of the bag, preventing condensation occurring on components inside of the bag, such as electronic components. An optional feature is operable to include a pressure relief valve to ensure the bag does not fail due to excess pressure.

A.15.6: Dry Inert Gas

While helium is often used, other gases may also be used where heat transfer is less critical. In such cases, a dry inert gas such as dry nitrogen can be introduced into the bag to provide the required internal pressure around the electronics at altitude. This allows the bag to maintain a stable pressure environment even at very high altitude, without requiring the bag to withstand the full sea-level to stratosphere pressure differential.

By controlling the amount of gas placed into the bag before ascent, the internal pressure at altitude can be set in advance. For example, if electronic components have a pressure ceiling limit of approximately 30,000 ft (around 300 millibar) but are to be used at 70,000 ft (around 50 millibar), the bag can be filled with the correct amount of gas such that, when the aircraft reaches 70,000 ft, the internal pressure in the bag remains at least 300 millibar. This approach can be applied with helium or with other gases, with dry nitrogen generally being a good choice for electronics.

In one embodiment, this is operable to be generalized as a thermal management device comprising a sealed, flexible bag filled with a gas and configured to dissipate heat from electronic components and/or to maintain a defined internal pressure around the components at altitude.

A solar powered plane, such as a plane configured to operate in the stratosphere, that includes a sealed, flexible bag filled with an inert gas, arranged to dissipate heat from electronic components and/or to maintain a defined internal pressure around the components at altitude.

Optional features are operable to include one or more of the following:

- the inert gas is dry nitrogen where pressure regulation is required without significant heat dissipation.
- the internal pressure of the bag at altitude is set by controlling the amount of gas filled before ascent.
- the bag expands at altitude without bursting.
- the bag protects electronics from excessive depressurisation.
- the bag provides a large surface area for heat dissipation.

A.15.7: Plug-and-Play Sensor Integration

The methods and systems described above enable a plug-and-play approach to sensor integration. By enclosing payloads or sensors such as synthetic aperture radar or other sensors in a sealed, gas-filled bag, the device can provide both thermal management and pressure protection without the need for complex cooling systems or recalibration.

Payloads or sensors can therefore be rapidly deployed or interchanged. Additionally, a bag with a specific payload may be removed and replaced with another bag with a different payload without having to modify the aircraft or thermal management system. Further, multiple sensors or payloads that are enclosed in a common bag may share a defined pressure or thermal environment.

In one embodiment, this is operable to be generalized as a thermal management device comprising a sealed, flexible bag filled with a gas and configured to transfer heat from electronic components positioned within the bag and to radiate heat from the surface of the bag.

Optional features are operable to include:

- The bag protects the electronic components positioned within the bag from rapid temperature fluctuations.
- the bag includes thermal sensors to monitor the temperature of the thermally conductive gas and/or of the bag.
- the bag includes a heat reflective coating to reflect external heat.

Gas

- the gas is a thermally conductive gas.
- the thermally conductive gas is helium.
- The gas is infused with nanoparticles to enhance thermal conductivity.
- the gas is an inert gas, such as dry nitrogen.
- the thermally conductive gas has a greater thermal conductivity than air.
- the thermally conductive gas is infused with nanoparticles.
- the gas-filled bag, without electronics components positioned within, weighs significantly less than an aluminium heat sink of equivalent heat dissipation capacity.

High Altitude

- the device is designed to protect sensitive electronic components within the bag from excessive depressurization at high altitudes.
- the bag is configured to withstand pressure changes from surface level to high-altitude.
- high-altitude includes stratospheric altitude.
- the bag is robust enough to expand at high-altitude conditions without bursting.
- the bag protects the electronic components positioned within the bag from pressure changes.
- the gas maintains the pressure around electronic components within the bag.
- the device is capable of automatic pressure adjustment to withstand pressure changes.
- the bag includes embedded sensors to monitor and adjust the pressure of the thermally conductive gas in real-time.

Heat Generating Payload

- the bag contains a heat-generating device.
- the bag contains synthetic aperture radar.

Helium Bag Heat Source

- the bag is configured to transfer heat from electronic components positioned within
- the bag to components or devices, such as batteries, that are external to the bag.

Polyester Skin

- the bag provides a large surface area for heat dissipation.
- the bag is a polyester skin fabric bag, such as a 23-micron polyester skin fabric bag.
- the bag includes embedded thermal sensors to monitor and adjust temperature of the thermally conductive gas in real-time.
- the bag is sufficiently transparent to radar signals.

the bag comprises heat-reflective coating.

the bag comprises multi-layer insulation to improve thermal management and pressure resistance of the device.

Dual-Use the gas is selected based on use, such that a thermally conductive gas is selected when heat transfer is required and an inert gas is selected when pressure regulation is required.

the gas provides both thermal conductivity and inertness, thereby simultaneously transferring heat and maintaining a defined internal pressure around the electronic components.

Plug and Play the bag is configured as a plug-and play module.

Aerospace Application

The device of any preceding claim in which it is located within an aircraft.

The aircraft may be a solar-powered high-altitude aircraft.

Method

A thermal management method, including the step of using a gas-filled bag heat sink to cool electronics within the bag in a solar-powered high-altitude aircraft.

A thermal management method, including the step of using a gas-filled bag heat sink to heat electronics outside of the bag in a solar-powered high-altitude aircraft.

A thermal management method, including the step of using a gas-filled bag to protect electronic components positioned within the bag from excessive depressurisation in a solar-powered high-altitude aircraft.

A thermal management method, including the step of using a gas-filled bag, with a synthetic aperture radar payload in the bag, in a solar-powered high-altitude aircraft.

A.16 Combining Heat Shrinkable and Non-Heat Shrinkable Films

Some types of plastic films like Mylar come in heat-shrinkable variants and these are conventionally used to form the wings and other surfaces of HAPS; the film is wrapped over the underlying support structures and heat is applied to shrink and tension the film. In one embodiment, in the Solaris plane, we use both heat-shrinkable and non-heat-shrinkable films so that we can integrate structures that cannot be shrunk into the skin of the plane: for example, we can form structures on non-heat-shrinkable films into sheets and we join the edges of these sheets to a heat-shrinkable plastic film border to form a panel; we can join adjacent panels together and these panels can form the skin of a wing or fuselage; the panels can be attached to the underlying structure. By heating these panels, we can secure the panels to the frame of the plane and also stretch and tension the entire surface formed by these panels. By 'heat-shrinkable' we mean a material that reduces in a linear dimension by at least 5% under heat.

Examples of the structures that are not heat-shrinkable are PV panels (see also B.1 Flexible PV (photo voltaic) film wing surface) and phased array antennas (see C.2 Phased array antenna or sensor coated directly onto a wing skin).

The surface of each fuselage is operable to comprise a stretched plastic, e.g. polyester, film skin with integral PV cells.

Figure 21:
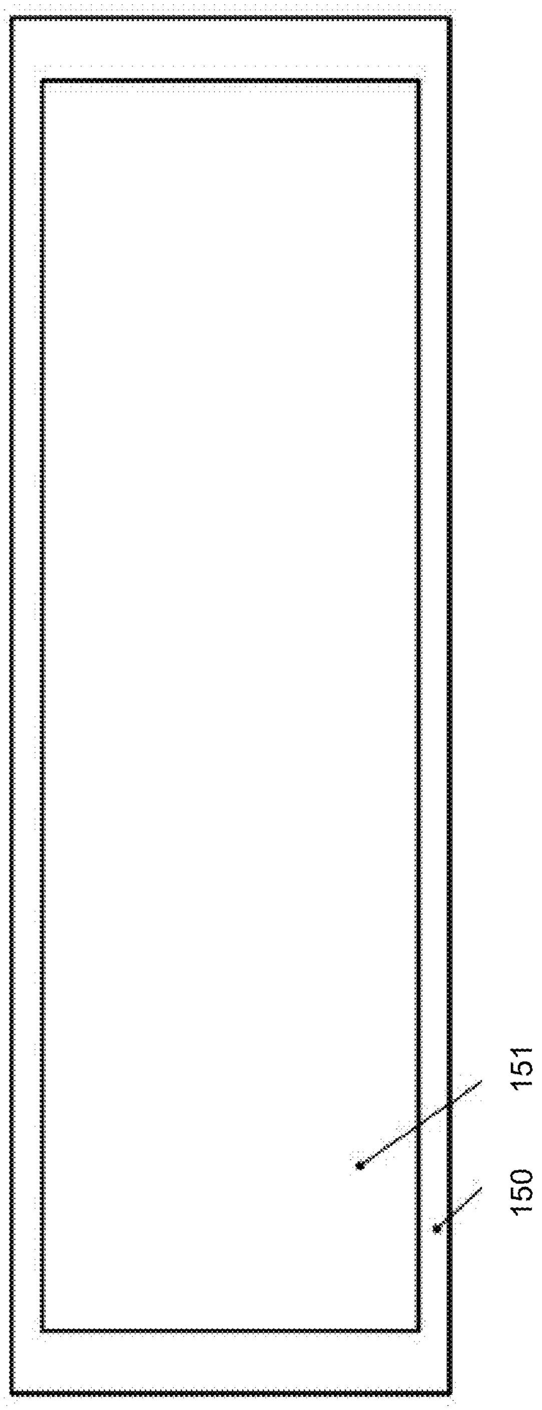
FIG. 21 illustrates a top view of the surface of the plane made up of a non-heat-shrinkable film substrate and a heat shrinkable border according to one embodiment of the present invention.

FIG. 21 shows a top view of a panel made up of a non-heat-shrinkable film substrate 151 and a heat shrinkable border 150. The non-shrinkable film substrate integrates with electronic items. The non-heat-shrinkable film 151 may include integrated electronic items, such as PV cells.

In one embodiment, this is operable to be generalized as a solar powered plane, such as a plane configured to operate in the stratosphere, the surface of the plane comprising panels that are each made up of a sheet that includes a non-heat-shrinkable film substrate and a heat shrinkable border to the sheet, and in which these panels are joined or attached together to form part of a surface of the plane that is tensioned or tightened by heating the heat shrinkable border.

Optional features are operable to include any one or more of the following:

the sheets include one or more PV films formed on a non-heat-shrinkable film substrate.

the sheets include one or more antennas, such as phased array antennas, formed on a non-heat-shrinkable film substrate.

the sheets include one or more mirrors.

the surface that is tensioned or tightened forms a part of the wing and/or fuselage surface of the plane.

the plane is a dual fuselage plane with an approximately 25-40 m wingspan.

A.17 Creating the Wing Skin

The wings are manufactured in sections up to 8 m in length and 2.5 m cord. We need to apply a thin plastic, e.g. polyester film, like Mylar film, to create the wing-skin; this skin is therefore a very large but only a few microns thick piece of film and is very difficult to handle and to apply evenly without wrinkles across the entire wing surface.

Once applied, we need to heat shrink the wing skin to a consistent tension. It is very hard to do this consistently. The solution is to build a light weight but relatively stiff frame that the skin can be unreeled onto; the frame has clips that allow the edges of the skin to be griped to the frame, and it is then easy to adjust the skin tension to remove all wrinkles, at which point the frame can be accurately positioned relative to a pre-glued wing structure before the skin is finally brought into contact and the adhesive bond is made wrinkle free. Consistent shrinking and tensioning is required. We accurately apply dots of (non-permanent) ink to the skin as it is unrolled from its reel on to the frame. We use real-time video images of the skin during the tensioning and shrinking process and by automatically comparing the distances between the dots we can ensure that the distances remains uniform.

In one embodiment, this is operable to be generalized as a method of creating a wing-skin for a solar powered plane, such as a plane configured to operate in the stratosphere, comprising the steps of:

(i) unreeling a heat shrinkable plastic film on to a frame;

(ii) securing the film to the frame;

(iii) applying heat to the plastic film to shrink it evenly;

(iv) positioning the frame over a pre-glued wing structure;

(v) bringing the plastic film into contact with the pre-glued wing structure.

Optional features are operable to include any one or more of the following:

- the heat shrinkable plastic film includes dots or other location markers at pre-defined positions.
- the heat shrinkable plastic film includes dots or other location markers at pre-defined positions and the method includes the step of monitoring the distances or positions of the markers during the heat shrinking process to ensure that shrinkage is uniform.
- step of monitoring the distances or positions of the markers during the heat shrinking process is doing using a computer vision system.
- the plane is a dual fuselage plane with an approximately 25-40 m wingspan.

Feature Group B: PVs

B.1 Flexible PV (Photo Voltaic) Film Wing Surface

In conventional stratospheric solar powered planes, the PVs are formed on a thin glass substrate and this substrate is then attached (e.g. glued) to the wing surface, which is made of a thin Mylar™ or other plastic film stretched over the spar and ribs of the wing.

In one embodiment, in the Solaris plane, PV cells that are formed, not on a glass substrate, but instead on a thin Mylar plastic substrate are used to reduce mass. This Mylar substrate is then also used as the actual wing skin, with the plastic substrate of multiple adjacent PV cell panels joined together to form a contiguous, stretched wing surface. The plastic substrate to these PV panels is not heat-shrinkable; at the edges of these panels, we use a heat-shrinkable plastic film and by heating this film we stretch and tension the entire wing surface (see Feature A.11 above).

In one embodiment, this is operable to be generalized as a solar powered plane, such as a plane configured to operate in the stratosphere, including PV cells that are manufactured on or integrated with a plastic film substrate and the plastic film substrate of multiple PV cells are joined together to form a part of the wing and/or fuselage surface.

Optional features are operable to include any one or more of the following:

- the joined plastic film substrates of the PV cells are formed into a stretched skin that forms at least part of the wing and/or fuselage surface.
- the plastic film substrates of the PV cells are non-heat-shrinkable.
- the plastic film substrates of the PV cells are attached at their edges to sections of a heat-shrinkable plastic film that are heated to form a tensioned surface.
- the plane is a dual fuselage plane with an approximately 25-40 m wingspan.

B.2 Flexible PV (Photo Voltaic) Film with Lacquer Coating

In the Solaris plane, the PV cells that are formed directly onto the Mylar plastic film are coated with a protective lacquer, e.g. the lacquer is applied over the untreated surface of the solar cells to protect the surface from moisture and corrosion. A proprietary thin film CIGS solar cells typically weighing less than 60 g/m$^2$ is used. Such cells are normally encapsulated within an EVA film or envelope to protect them from moisture and corrosion. This typically adds 500 to 800 g/m$^2$. In the Solaris plane, the cells are instead protected for high altitude flight operations with an application of a thin layer of lacquer. This typically weighs less than 30 g/m$^2$, significantly reducing the weight of the protected cells.

In one embodiment, this is operable to be generalized as a solar powered plane configured to operate in the stratosphere and including PV cells that are protected for high altitude flight operations with an application of a layer of lacquer.

Optional features are operable to include any one or more of the following:

- the PV cells are manufactured on or integrated with a plastic film substrate.
- the lacquer replaces an EVA film or envelope.
- the lacquer is applied to the PV cells using a sputter deposition process.
- the plane is a dual fuselage plane with an approximately 25-40 m wingspan.

Feature Group C: Imaging Systems

C.1 Metallised Carbon Fiber Lens

In one embodiment, in the Solaris plane, an imaging system can be deployed that does not use a conventional and heavy glass lens but instead a reflecting telescope-type design in which the parabolic primary mirror (and optionally any secondary mirror if used) is a carbon fiber parabolic surface that has been sputter coated with a metallic, light reflecting coating. At the prime focus there is a conventional digital camera CCD. The cylindrical side walls of the reflector are carbon fiber too.

This structure is much lighter (mass is approximately 50 g) and cheaper than a glass-based lens; it has very low thermal mass, so reaches thermal equilibrium quickly without thermal-related distortions. It provides extreme magnification (1 pixel=8 cm ground sample distance)—that is equivalent to the far heavier and more expensive glass lens system used in other conventional HAPS.

The focal length is optimised to image ground features when the plane is at 65,000-70,000 feet.

Figure 22:
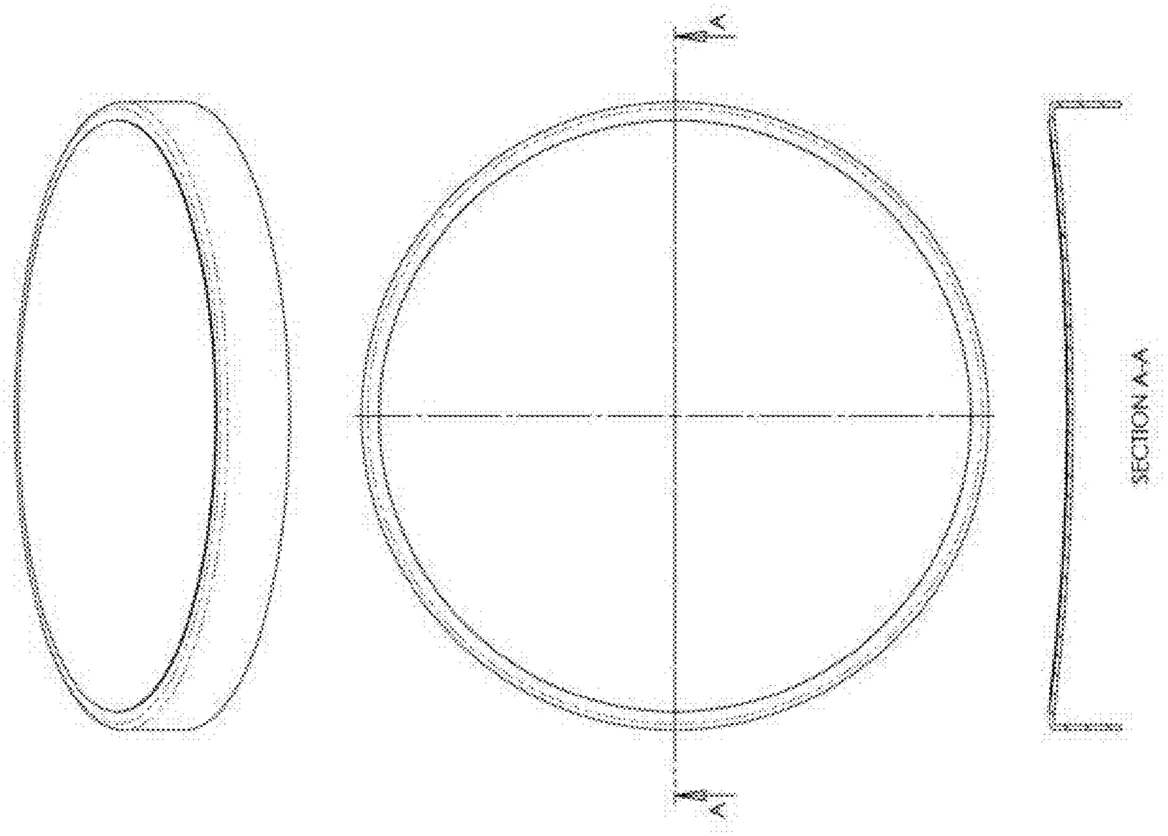
FIG. 22 illustrates an imaging system including a carbon fiber parabolic surface according to one embodiment of the present invention.
Figure 23:
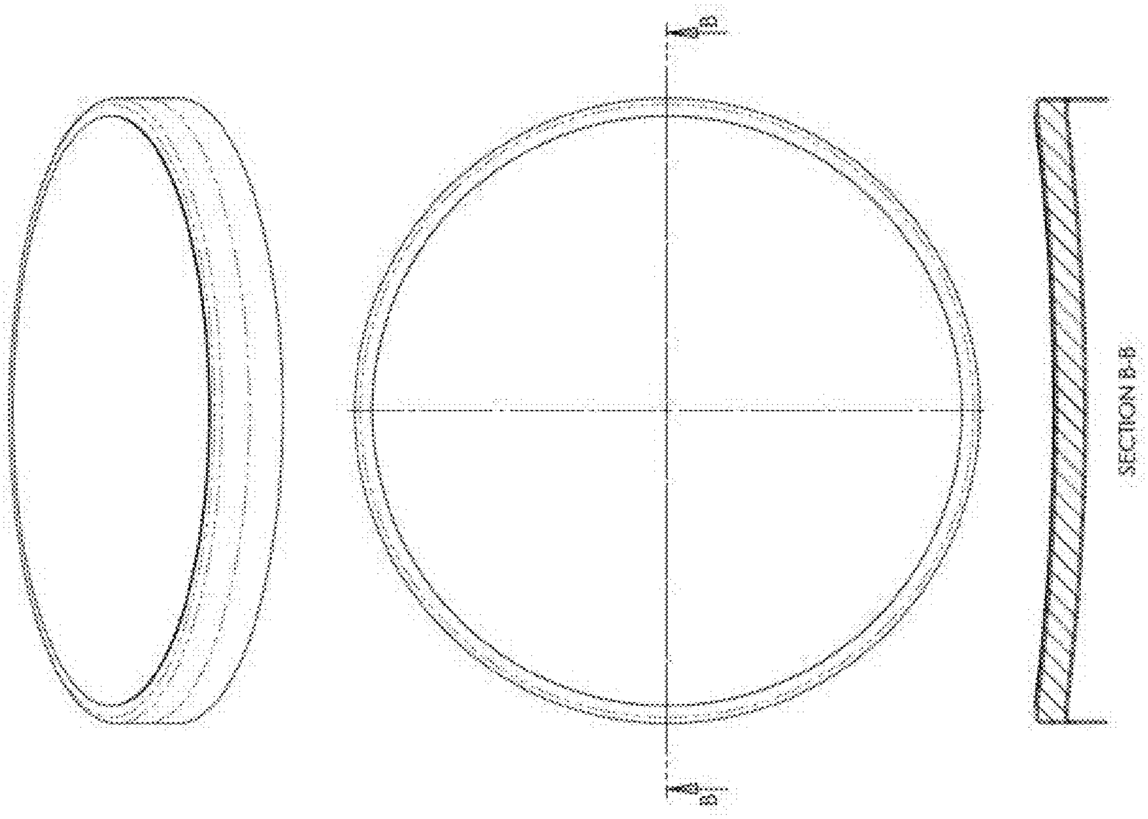
FIG. 23 illustrates another example of an imaging system including a carbon fiber parabolic surface according to one embodiment of the present invention.
Figure 24:
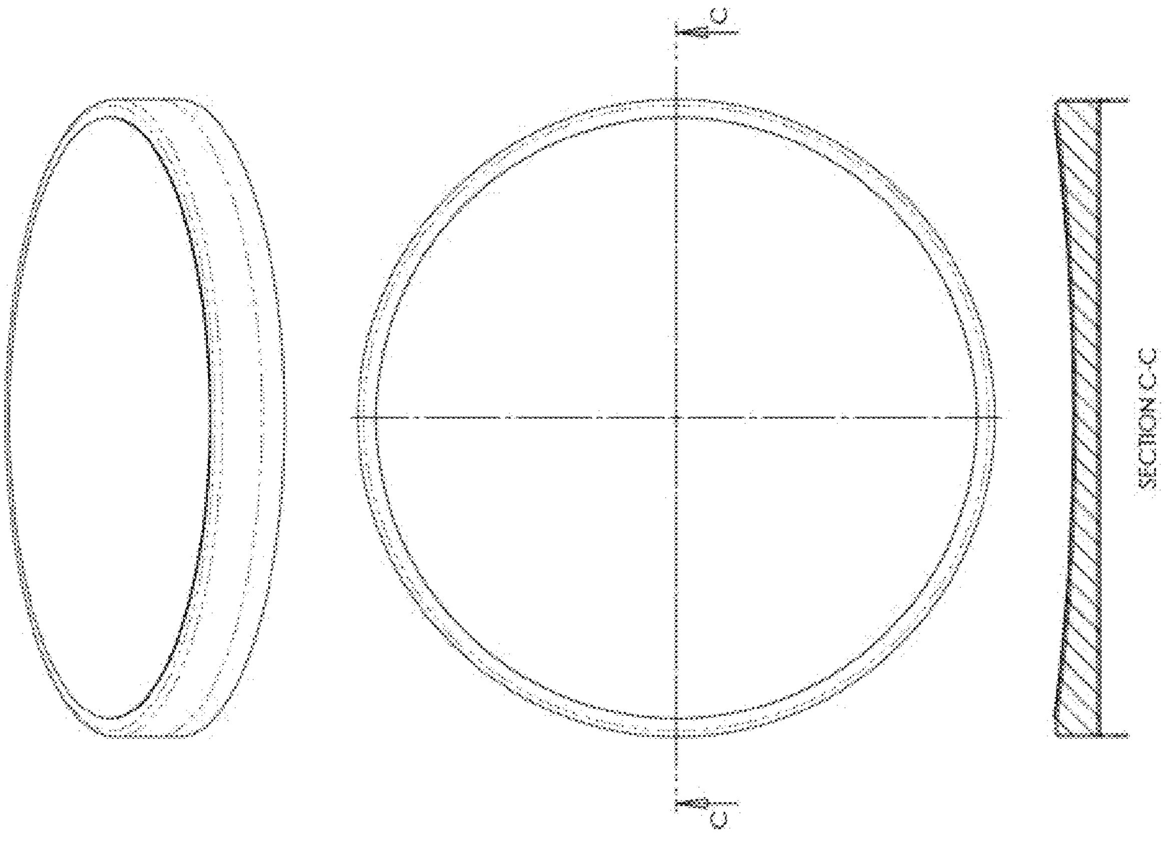
FIG. 24 illustrates another example of an imaging system including a carbon fiber parabolic surface according to one embodiment of the present invention.

FIGS. 22-24 show a different imaging system including a carbon fiber parabolic surface that has been sputter coated with a metallic, light reflecting coating. The cylindrical side walls are also made of carbon fibre. Different designs of parabolic surface are shown.

In one embodiment, this is operable to be generalized as a solar powered plane, such as a plane configured to operate in the stratosphere, and configured with an imaging system including a carbon fiber parabolic surface that has been sputter coated with a metallic, light reflecting coating.

Optional features are operable to include any one or more of the following:

- at the prime focus is a conventional digital camera CCD.
- the cylindrical side walls of the reflector are carbon fibre.
- the imaging system delivers approximately 1 pixel=8 cm ground sample distance.
- the focal length of the imaging system is optimised to image ground features when the plane is at stratospheric altitudes, such as 65,000-70,000 feet.
- the plane is a dual fuselage plane with an approximately 25-40 m wingspan.

C.2 Phased Array Antenna or Sensor Coated Directly onto a Wing Skin

In one embodiment, in the Solaris plane, a phased array antenna can be applied, e.g. by sputter coating, directly onto the Mylar or other polyester or lightweight, dimensionally stable film, e.g. on a lower wing section. This gives a very large antenna array area (e.g. 28 m or 38 m in length). Phased array antenna have many uses, including communications and synthetic aperture radar. A constellation of Solaris planes can fly together to create a synthetic aperture radar of even greater effective array size.

The phased array antenna can be linear (e.g. SAR), grid (configuration determines the beams, shapes and bandwidths) or conformal (e.g. over a curved wing section or tail section or underwing flat surface). Their spacing, configuration varies with frequency (½ lambda), application and beam-forming strategy. The phased array can be part of an active and/or passive antenna system.

It is not just phased array antennas that can be formed directly onto the stretched wing-skin: other types of sensors (potentially of different kinds), can also be formed on the wing surfaces, e.g. using a thin film technique. This is especially relevant for sensors that require large flat areas for interaction with the environment (chemistry, biology, physics) and electro-magnetic, nuclear or gravitational domains such as found in quantum sensing techniques. The sensors can be positioned on the lower wing surfaces for earth observation (e.g. earth surface and atmospheric analysis) and on the upper wing surfaces when looking away from the earth (e.g. stratospheric analysis, space observation, satellite observation, space debris re-entry observation).

In one embodiment, this is operable to be generalized as a solar powered plane configured to operate in the stratosphere, and including an antenna and/or sensor formed directly onto a stretched plastic, e.g. polyester, film substrate to form part of the surface of the plane.

Optional features are operable to include any one or more of the following:

- the stretched film forms the lower or upper surface of a wing section or wing skin.
- the antenna or sensor is formed directly onto the stretched film by a sputter deposition process.
- the antenna is a phased array antenna.
- the antenna is a phased array antenna configured for communications.
- the antenna is a phased array antenna configured for radar.
- the antenna is a phased array antenna that is linear or grid.
- the antenna is a phased array antenna that is conformal.
- the antenna is a passive antenna.
- the antenna is an active antenna.
- the sensor is positioned on the lower wing surfaces and is configured for earth and sub-stratosphere atmospheric observation.
- the sensor is positioned on the upper wing surfaces and is configured for space, or above-stratosphere atmospheric observation.
- adjacent film substrates of the antenna and/or sensor are joined together.
- the joined film substrates of the antenna and/or sensor are formed into part of a stretched skin that forms at least part of the wing and/or fuselage surface.
- the film substrates of the antennas and/or sensors are non-heat-shrinkable.
- the film substrates of the antennas and/or sensors are attached at their edge to sections of a heat-shrinkable film that is heated to form a tensioned surface.
- the plane is a dual fuselage plane with an approximately 25-40 m wingspan.

C.3 Parallel Processing of Wing Mounted Imaging Sensors

One of the key parameters for data collection from HAPS platforms is the swath width (i.e. the width of the broad strip that can be imaged by the platform in a single pass).

In one embodiment, the Solaris plane is configured to process images from multiple sensors mounted along the wings, and to process these images, automatically compensating for wing flex, into one seamless image (either optical image or data) that covers a far wider swath than is possible with a plane using just a single sensor. The processing can be done in parallel using a local GPU in the plane, or using ground-based computing resources, or a combination, where some computing resources in the plane are part of an edge computing architecture. The group of cameras/sensors could also be mounted centrally and angled relative to each other to capture a much larger swath width than is possible with a plane using just a single sensor, again with powerful GPU processing the image to remove the distortion caused by the relative angle of the cameras/sensors to each other and to compensate for wing flex.

In one embodiment, this is operable to be generalized as a solar powered plane, such as a plane configured to operate in the stratosphere, including multiple sensors configured to capture a swath width that is greater than the width that a single sensor could capture, and the plane includes a local processor, such as a GPU, configured to process at least some of the data from the multiple sensors into a single dataset covering the entire swath.

Optional features are operable to include any one or more of the following:

- at least some of the multiple sensors are mounted at different positions along a wing or wings.
- at least some of the multiple sensors are mounted in a fuselage.
- the plane is a twin fuselage place and at least some of the multiple sensors are mounted in each fuselage.
- at least some of the multiple sensors are oriented in different directions.
- one or more of the multiple sensors are mounted at different positions along the wings and the processor is configured to compensate for wing flex.
- one or more of the sensors are image sensors and the single dataset is an image covering the entire swath.
- local processor in the plane is part of an edge computing architecture.
- the plane is a dual fuselage plane with an approximately 25-40 m wingspan.

Imaging sensors, phased arrays, or optical collectors may alternatively be housed within or protruding from removable D-section modules, permitting forward facing or unobstructed fields of view.

Feature Group D: Connectivity

D.1 Ground Station Connectivity

Small mobile ground receiving stations (potentially suitcase sized) can be moved to (or near to) a region that the plane (or planes) are surveying/analysing and then plane/s can then fly a loitering path (e.g. a circle) around the ground receiving station/s and transmit their data payload. Using a line of sight optical link to the ground receiving station/s for very fast (up to 100 Gbps coherent multi-colour) and high security data transfer is possible: from 20 km the beam will be less than 1 m in diameter and it is not possible to intercept this beam undetected, which makes it especially relevant for quantum key distribution. It is also very efficient-optical transceivers are light, and power efficient. Data transmission could be done at night if in the daytime the plane/s are surveying/analysing in visible light. The mobile ground receiving stations can complement, supplement or replace the use of conventional fixed ground receiving stations.

Optical data links have demonstrated duplex communication with a speed of 10 Gbps from 20 km altitude to the ground; 100 Gbps is potentially possible over large distances both in space (inter-craft) and through the atmosphere (ground to space).

In one embodiment, the optical ground link described above shares terminal hardware and/or pointing and tracking functions with the optical link embodiments described in G.6 (including combined power and data embodiments).

In one embodiment, this is operable to be generalized as a method of providing data connectivity for a solar powered plane, such as a plane configured to operate in the stratosphere, including the step of moving a mobile ground station to a defined location, and configuring the plane to fly a path that enables the plane to transmit data back down to the mobile ground station.

Optional features are operable to include any one or more of the following:

- the path is optimised to increase the reliability and/or speed of the data transmission.
- the plane uses a line of sight optical link to the ground receiving station/s for very fast (up to 100 Gbps) and high security data transfer.
- the optical link uses coherent light.
- the optical link uses coherent, multi-colour light.
- the data is used for quantum key distribution.
- data transmission is done at night if in the daytime the plane is surveying/analysing in visible light.
- the mobile ground receiving stations can complement, supplement or replace the use of conventional fixed ground receiving stations.
- the plane is a dual fuselage plane with an approximately 25-40 m wingspan.

D.2 Data Payloads Are Sent Plane-to-Plane

Solaris planes can share their data payloads with one another (e.g. using a plane-to-plane optical link for security and efficiency), with the downlink to a ground receiving station then done by one of these planes. So there could be a constellation of Solaris planes over a large area, forming a mesh network, but perhaps not all can fly a path that enables them to transmit data reliably down to a ground receiving station; then, the planes share their data payloads from plane-to-plane; any plane able to transmit to ground (e.g. can fly a path that brings it into LoS—line of sight—with a ground receiving station) then does so, transmitting the data payloads sent to it from other planes. There could be multiple planes, each capable of independently sending data to ground, so there is redundancy. Solaris planes can also push data up to a satellite layer and from the satellite layer down to a ground station or ground-based receiver (and vice versa).

Solaris planes can operate as a repeater for satellite layers so they can reach devices on the ground. For example, for LTE, a Solaris system can be the 'last mile' (or, more literally, the last 10 to 30 miles) in connecting a standard mobile phone to a global satellite network where the relative proximity of the Solaris planes enables sufficient power and the LTE protocol to work with every mobile device. Solaris planes can be a relay to/from either non-terrestrial and/or terrestrial systems for any of the uses defined in this specification.

For IoT, Solaris planes can be the 'last-mile' repeater/transponder to cover the wide areas where IoT devices are located. Or in AIS (automatic identification system) or VDES (VHF Data Exchange System) where Solaris planes can be the repeater/transponder that extends the reach of the system across seas/oceans for continuous coverage, relaying each vessel's data via a Solaris plane-to plane mesh network of solar gliders to all other AIS/VDES vessels and back to ports, coast guards and other authorities, or relaying this up via satellite networks to span large areas.

The same can be applied to Solaris planes providing traffic, navigation, PNT (position, navigation and timing) and safety information services to manned and autonomous craft/vehicles by acting as the 'last mile' layer over wide areas. PNT services are potentially especially useful for autonomous vehicles, such as drones, farm equipment, remote sensing equipment, highway vehicles, ships).

In one embodiment, this is operable to be generalized as a method of providing data connectivity using a solar powered plane, such as a plane configured to operate in the stratosphere, including the step of configuring the plane to send data to, or receive data from, one or more different solar powered planes, and for one or more of those different planes to transmit data to, or receive data from, a ground station or other ground based system, or a satellite.

Optional features are operable to include any one or more of the following:

- a plane-to-plane free-space optical link is used.
- a group of planes is formed over a large area, where not all can fly a path that enables them to transmit data down to a ground receiving station and then, one or more planes in the group share their data payloads from plane-to-plane, with any plane able to transmit to ground then doing so, transmitting the data payloads sent to it from other planes.
- the method enables a mobile phone or an IoT device to connect to a satellite via the solar powered plane.
- the method enables a mobile phone or an IOT device to connect to the solar powered plane.
- the method enables a ship or other vessel to connect to a satellite via the solar powered plane to send AIS/VDES data.
- the method enables a ship or other vessel to connect to the solar powered plane to send AIS/VDES data.
- the method enables a ship or other vessel to connect to the solar powered plane to receive traffic, navigation and safety information data services.
- the method enables the solar powered planes to provide one or more of: traffic, navigation, PNT (position, navigation and timing) and safety information services to manned and autonomous craft/vehicles.
- the plane is a dual fuselage plane with an approximately 25-40 m wingspan.

In another embodiment, the aircraft may include a communication subsystem configured to dynamically select between multiple communication links, including free-space optical (FSO), radio-frequency (RF), and satellite links, using mission-dependent parameters or real-time optimisation models. The communication subsystem may form a self-organising mesh network with automatic rerouting, store-and-forward behaviour, or resilience-enhancing link selection.

Feature Group E: Launch and Recovery

E.1 Plane with Detachable Propulsion Pod

Using an aircraft's own power to climb from the ground to flight altitude is a massive drain on the plane's batteries and can result in the aircraft reaching altitude with depleted batteries, towards the end of the day when no solar power top-up is available. Another problem is that for long duration flight efficiency, the propeller design for a stratospheric plane is optimised for high altitude and so is not ideal for take-off or low altitude flying.

In one embodiment, in the Solaris system, we can have a separate, detachable pod containing fuel for an ICE engine or an electrical energy source, and a propulsion system, a motor and batteries, where the propulsion system includes at least one propeller optimised for take-off (in contrast to the propeller(s) on the plane, which are optimised for propulsion in the stratosphere). The pod is attached to the plane and is capable of taking the plane to at least mid-altitude (e.g. 30,000 feet) on auto-pilot; this is of tremendous value in preserving the battery power in the plane. The pod can be separated from the plane once at altitude and parachuted (or flown with a steerable parachute, parafoil, paraglider or its own wing) back to the launch area. The pod includes an internal battery which is fully charged at take-off, but the pod obtains electrical power for its motor (where an electrical motor is used) during the ascent from batteries in the plane or from the PV cells in the plane, thereby conversing its internal battery, which may be reserved for re-charging the aircraft batteries prior to detachment. The internal battery in the pod can be used to re-charge any batteries in the plane that fall below a threshold charge level. Once the plane is approaching the time that the pod will detach, the pod then starts to re-charge the plane's batteries so that the plane's batteries are fully charged by the time the pod detaches.

In one embodiment, this is operable to be generalized as a launch system for a solar powered plane configured to operate in the stratosphere, the launch system including a secondary device, comprising a propulsion system with a propeller optimised for take-off and not for stratospheric flight and a secondary battery, in which the secondary device is configured to be attached to the plane and to provide some or all take-off thrust for the plane, and the secondary device draws its power from one or more batteries in the plane and not its secondary battery, but is configured to re-charge one or more batteries in the plane from its secondary battery.

Optional features include any one or more of the following:

- the self-powered device provides some or all thrust for the plane to reach at least 15,000 feet.
- the self-powered device provides some or all thrust for the plane to reach at least 30,000 feet.
- the self-powered device is a fuel (e.g. aviation fuel) powered device.
- the self-powered device is a battery powered device.
- the system is configured to enable the plane to save battery power on take-off.
- the self-powered device is configured to be separated from the plane, for example once the plane has reached a set altitude and to return to land.
- the self-powered device includes a parachute, such as a steerable parachute/paraglider or wing to enable it to return and land, e.g. in the launch area.
- the self-powered device includes fuel and a propulsion system or a motor and batteries.
- the plane is a dual fuselage plane with an approximately 25-40 m wingspan.

E.2 Tail-First Vertical Lift and then Nose-Down Release

To deploy a HAPS from a ship or other relatively confined space, a near vertical launch is desirable. This can be reliably achieved by using this process: The Solaris plane is lifted by a balloon or cluster of balloons, tail first, with the fuselage or boom pointing approximately vertically downwards, and the nose facing the ground. At the launch height (e.g. at a stratospheric altitude of between 18,000 m to 30,000 m), the lift balloons are released, allowing the plane to dive downwards, approximately nose-first. The plane swiftly assumes approximately level flight. Small drogues or aerodynamic stabilizers may be used to control initial descent.

Where removable leading-edge D-section modules are installed on the aircraft, these modules may include attachment features or internal reinforcement suitable for the vertical suspension loads encountered during balloon-based launch.

The path that the plane follows once it is released from the lift balloons depends on the altitude at which it is released. For example, at sea level a 28 m wingspan Solaris plane can achieve level flight in a less than 10 m vertical drop.

By using a balloon lift system, the plane does not need to be designed to be strong and rigid enough to take-off and fly through potentially turbulent air imposing high dynamic wind loadings, before it reaches the calmer, lower density air in the stratosphere; this means that a lighter and simpler airframe can be used, making the Solaris plane both cheaper and more efficient. The plane's propeller blades do not need to be designed to power the plane through a ground level take-off, but can be optimised to work in the far thinner atmosphere of the stratosphere, leading to increased efficiency, greater payloads and extended mission duration. Mechanical gears used to alter the rotational speed of the propeller blades during ascent can be eliminated, saving weight.

On one embodiment, for example and not limitation, one 28 m wingspan variant of the Solaris plane may weigh between 30 Kg and 100 Kg (excluding payload), payloads may weigh between 15 Kg to 100 Kg; the chord length may be approximately 2.5 m; the upper wing surface area to weight ratio may be between 0.5 to 2.0 m2/kg, and preferably from 1.0 to 2.0 m2/kg. By way of further illustration, a balloon with 500 $m^3$ of helium is capable of lifting 50 kg at 26,000 m altitude; the weight savings described above contribute significantly to the practicability of launching a plane since the total plane and payload weight can be kept to under 200 Kg, requiring for example, four 500 $m^3$ balloons, which is commercially and practically feasible; climb rates of 1 to 10 m/s are possible. Other mass ranges, geometries, lifting arrangements, and climb profiles may be used depending on implementation constraints and mission requirements.

In one embodiment, this is operable to be generalized as a launch method for a solar powered plane configured to operate in the stratosphere, comprising the step of (a) raising the plane tail first and then (b) releasing the plane at launch altitude so that it initially flies down substantially nose-first, and then attains approximately level flight.

Optional features are operable to include any one or more of the following:

- the plane is raised tail first by one or more balloons, tail first, with the fuselage or boom pointing approximately vertically downwards, and the nose facing the ground.
- at the launch height, the balloons are released allowing the plane to dive downwards, substantially nose-first.
- the plane drops approximately vertically downwards initially, with its control surfaces set to attain level flight.
- the plane deploys small drogues to slow its initial descent.
- the plane is released when it has reached its target stratospheric altitude.

the plane is released before it has reached its target stratospheric altitude and then ascends under its own power.

the plane is a dual fuselage plane with an approximately 25-40 m wingspan.

E.3 Plane Lands on an Autonomous Vehicle

In the Solaris system, the plane can land on a ground handling vehicle we refer to as an Autonomous Ground Platform (AGP); the AGP moves along the runway at a velocity that matches the Solaris plane that is coming in to land. This effectively reduces the plane's ground-speed to zero, minimising impact damage, repairs and extending the useful lifetime of the plane, its payload and avionics. Either or both the plane and the AGP can be equipped with short range lidar units (or other kind of imaging unit) for tracking. Lidar units typically weigh less that 100 grams and can hence be mounted on the Solaris plane with minimal weight impact. The preferred variant is however for just the AGP to be equipped with short range lidar units (or other kind of imaging unit).

The landing process is as follows: the AGP is positioned on the runway near the runway threshold. The plane is given the location of the AGP as a waypoint. Once within range of the lidars, the AGP drives to match the velocity of the plane, positioning itself to match the plane's trajectory. The AGP or sensors on the plane instruct the plane to descend the last couple of metres onto the AGP. An alternative is for the AGP to simply detect the height, speed, position and trajectory (and their rates of change) of the plane and not send any instructions at all to the plane; the AGP can include a camera-based imaging unit that is designed to detect a plurality of markers on the plane, that enable the AGP to lock on to and match the speed, position and trajectory of the plane as it comes in to land safely on the AGP. In this variant, the plane has no need of a LIDAR system or the equipment needed to receive data from the AGP.

The plane can be positively attached to the AGP during landing, reducing the risk of damage to the plane. The attachment could use a mechanical latch that acts as a grabbing or holding system wherein once the mechanical attachment between the AGP and plane engages, the AGP and plane can be considered attached until actively detached once the landing sequence has completed. The landing sequence could include transportation of the plane from the runway to the hangar. Alternatively, a magnet or electromagnet fixed to the AGP could attract a ferromagnetic material fixed to the plane when the plane is within close proximity of the AGP. In this case, close proximity can be defined as the region in which the ferromagnetic material fixed to the plane would be attracted to the magnet or electromagnet fixed to the AGP. This region of close proximity is dictated by the strength of the magnetic or electromagnetic field. When an electromagnet is used, the strength of the electromagnetic field can be altered to change the region from which the plane is attracted to the AGP. Alternatively, a suction system can be used to positively attach the plane to the AGP during landing. The suction force between the plane and the AGP can be generated through creation of a vacuum or low-pressure zone between a surface fixed to the plane and a surface fixed to the AGP using a) flexible materials where they, under pressure caused by contact between the landing plane and the AGP, expel air from the interface creating the vacuum or low-pressure zone, or b) a mechanical pump fixed to the AGP that actively extracts air or fluid from an interface region, such as the surface of the underside of the wing skin.

Once the plane has landed on the AGP, the AGP can slow to a stop to allow a visual check by an operator and if necessary, repositioning of the plane on the AGP through a removably attachable system, before the AGP is commanded or driven by radio control to return to the hangar. The airfield and safe routes are pre-programed into the AGP to avoid it colliding with any airport furniture or structures.

This same platform may also be used for assisted take-off, wherein the plane is coupled to the AGP through a removably attachable system for transportation from the hangar to the runway.

In one embodiment, this is operable to be generalized as a method of landing a solar powered plane, such as a plane configured to operate in the stratosphere, on to an Autonomous Ground Platform (AGP); including the step of configuring the AGP to move along a runway at a velocity that matches the plane that is coming in to land, with either the plane and/or the AGP operating an imaging unit that enables, if in the plane, the plane to track the position and motion of the AGP and/or, if in the AGP, for the AGP to track the position and motion of the plane, to ensure that the plane lands safely on the AGP.

Optional features are operable to include any one or more of the following:

the imaging unit, if in the AGP, detects the height, velocity, and position (and/or their rates of change) of the plane.

the imaging unit, if in the plane, detects the height, velocity, and position (and/or their rates of change) of the AGP.

the imaging unit is an active imaging unit that actively illuminates the target plane.

the imaging unit is a LIDAR unit or other form of radar, such as SAR or InSAR.

the imaging unit is a passive imaging unit that observes the target plane.

the imaging unit is a camera in the AGP designed to detect markers on the plane.

the AGP adapts its position and movements to ensure a safe landing of the plane on the AGP, using the information from the imaging unit in the AGP and/or the plane.

the AGP or sensors on the plane instruct the plane to descend the last few metres onto the AGP.

the AGP is commanded or driven by radio control to return to the hangar.

the AGP is one of a number, or swarm of AGPs.

the AGP is one of a number, or swarm of AGPs, each co-operating together.

the airfield and safe routes are pre-programed into the AGP to avoid it colliding with any airport furniture or structures.

the AGP is also used to launch the plane.

the plane is removably attachable to the AGP.

the plane is removably attached to the AGP for transportation between the hangar and runway.

the plane is positively attached to the AGP during landing through a mechanical latch.

the plane is positively attached to the AGP during landing through a magnet or electromagnet.

the plane is positively attached to the AGP during landing through suction.

the plane is a dual fuselage plane with an approximately 25-40 m wingspan.

E.4 Assisted Take-Off from an Autonomous Vehicle

In the Solaris system, the plane can take off from a ground handling vehicle we refer to as an Autonomous Ground Platform (AGP); the AGP moves along the runway with the plane removably attached for assisted take-off. When the AGP and removably attached plane are travelling with a velocity that provides suitable lift for take-off of the plane, the plane is detached and allowed to take-off through lift generated by the wings. If the plane was not removably attached to the AGP, during acceleration along the runway, there is the risk that lift generated from the wings displaces the plane from the AGP before there is sufficient lift for flight causing the plane to crash into the runway.

The plane can be removably attached to the AGP through a variety of methods, provided that the method allows detachment when sufficient lift is generated.

In some embodiments, the plane is removably coupled to the AGP by an attachment system that generates a controllable force between the plane and the AGP, the force being selected from one or more attractive forces and/or repulsive forces. The attachment system may be configured to maintain the plane in a defined position relative to the AGP during acceleration and to release the plane when a release condition is satisfied. The release condition may comprise a measured lift force, a vehicle speed, a command signal, or a combination thereof.

One method is through use of a dog or peg. The purpose of the dog or peg is to ensure that the plane does not slide backwards on the AGP during acceleration. Simultaneously the elevators of the plane are held at a sufficient deflection to hold the plane to the AGP during acceleration. At the point of take-off, the deflection of the elevators is changed and the plane detaches from the AGP.

Another method is through use of a mechanical latch. The latch attaches the plane to the AGP when the plane is being transported between the hangar and the runway. During assisted take-off, when the wings of the plane have generated sufficient lift for the plane to take-off, the mechanical latch detaches the plane from the AGP. The trigger for this detachment may occur due to a) the plane providing a sufficient lift to force open the mechanical latch, b) the AGP reaching a velocity associated with a sufficient lift force, triggering the release of the mechanical latch, c) a remote-controlled manual release at the required speed.

Alternatively, magnetic couplers can attach the plane to the AGP. A magnet or electromagnet on the AGP can couple to a ferromagnetic material on either the plane itself, or a tether attached to the plane. At the point of take-off, the trigger for the detachment of the plane may occur due to a) the plane providing a sufficient lift to overcome the magnetic coupling, b) the AGP reaching a velocity associated with a sufficient lift force, triggering the demagnetisation of the electromagnet, in turn releasing the ferromagnetic material, c) a remote-controlled manual trigger of the demagnetisation of the electromagnet when at the required speed, in turn releasing the ferromagnetic material. In the implementation that the magnet or electromagnet on the AGP is magnetically coupled to a ferromagnetic material on a tether, the detachment of the ferromagnetic material and the electromagnet results in the release of the tether from the plane.

In further embodiments, the attachment system comprises an electrostatic coupling arrangement in which an electrostatic force is generated between the plane and the AGP to retain the plane during acceleration, and is reduced, neutralised, or reversed to permit release at take-off. Electrostatic coupling may be used alone or in combination with magnetic, mechanical, or pneumatic coupling mechanisms.

An alternative method for attachment could be through creating a suction force between the plane and AGP. At the point of take-off, the trigger for the detachment of the plane may occur due to a) the plane providing sufficient lift force to overcome the suction force, thereby detaching the plane and the AGP, b) the AGP reaching a velocity associated with a sufficient lift force, triggering a release of the suction force, c) a remote-controlled manual release of the suction force at the required speed. In instances b) and c), the release of the suction force could occur by any means of introducing air into the vacuum.

When the plane is sat on the AGP, it is angled such that the wings will generate lift sufficient for take-off at a velocity the AGP and attached plane can achieve on the runway. To maintain a controlled and repeatable release of the plane, the AGP may include guide rails or tracks along which the plane is guided during take-off.

The wind direction is considered in the determination of the direction of take-off. It is often beneficial to take-off and land into a headwind. Taking off and landing into a headwind allows a higher relative windspeed pas the aircraft which results in a reduced required ground speed to generate the necessary lift. The reduced ground speed allows for a shorter runway and allows for safter and more controlled deceleration during landing. Additionally, with a higher relative windspeed the aircraft responds more effectively to control inputs.

In some embodiments, the AGP is configured to control not only its forward velocity but also its direction of travel relative to the runway or ground surface, such that the AGP may move at a non-zero yaw angle relative to the runway direction. This allows the AGP to align its direction of motion with the instantaneous flight path or lift vector of the plane during assisted take-off and/or landing. In this manner, the AGP may "crab" relative to the runway to maintain alignment with the plane as wind direction and/or magnitude varies during take-off or landing.

In some embodiments, the AGP is configured to operate over a wide range of ground speeds during assisted take-off and/or landing, including speeds approaching zero relative to the ground when a sufficient headwind is present. In some landing scenarios, the AGP may be configured to decelerate to zero ground speed or to move in a reverse direction relative to the runway in order to align with and capture the plane during touchdown, for example in conditions of stronger-than-expected headwinds, gusts, or thermal activity.

Attachment mechanisms for assisted take-off may be positioned on the fuselage or reinforced wing regions, so that removable leading-edge D-section modules are not required to bear take-off loads.

In one embodiment, this is operable to be generalized as a method for assisted take-off of a solar powered plane, such as a plane configured to operate in the stratosphere, by means of an Autonomous Ground Platform (AGP); including the step of detaching the plane from the AGP at a point that the plane is generating sufficient lift for take-off.

Optional features include any one or more of the following:
- the wind direction is considered when determining the direction of take-off.
- the AGP includes an attachment system configured to attach the plane to the AGP
- the attachment system between the plane and the AGP is a dog or peg.

- the attachment system between the plane and AGP is a mechanical latch.
- the attachment system between the plane and AGP is a magnet or electromagnet.
- the attachment system between the plane and AGP is a suction force.
- the attachment system generates a controllable attractive force between the plane and the AGP.
- The attachment system generates a controllable electrostatic force.
- The attachment system comprises a mechanical, magnetic, electrostatic, and/or pneumatic coupling mechanism.
- the plane detaches from the AGP when the wings generate a lift force sufficient to overcome the attachment force.
- the plane detaches from the AGP when the AGP and plane are travelling at a velocity associated with a sufficient lift force.
- elevators of the plane are held at a sufficient deflection to hold the plane to the AGP during acceleration and at the point of take-off, the deflection of the elevators is changed and the plane detaches from the AGP.
- the plane detaches from the AGP by means of a remote-controlled manual trigger.
- the plane and AGP are travelling between 20 and 40 miles per hour at the point of detachment.
- the plane is attached to the AGP at an angle such that it promotes the generation of lift through the wings of the plane.
- the AGP may include guide rails or tracks along which the plane is guided during take-off.
- the AGP is configured to control at least one of its speed, direction of travel, and yaw orientation relative to the ground to maintain alignment with a flight path of the plane during assisted take-off and/or landing.
- the AGP is configured to adjust its direction of travel independently of a runway direction to align with a flight path of the plane.
- the AGP is configured to compensate for cross-wind conditions during assisted take-off and/or landing.
- the AGP is configured to operate at variable ground speeds including near-zero ground speed relative to the ground in headwind conditions.
- the AGP is configured to move in a reverse direction relative to the runway during landing to capture the plane under high wind conditions.
- the plane is a dual fuselage plane with an approximately 25-40 m wingspan.

E.5 Ground Handling Vehicle That Can Move in Any Direction

In one embodiment, in the Solaris system, the ground handling vehicle, which may be an AGP, as described above or may be manually controlled, is probably in excess of 20 m wide and when the plane is on it then the plane's wingspan becomes the effective width at perhaps 34 m, although in the front to back dimension its likely to be less than 3 m. More generally, the AGP is dimensioned to support a range of HAPS craft sizes, particularly the landing bed/cradle which can be adjusted or swapped out from the underlying vehicle to support different HAPS.

The AGP needs to be able to drive in any orientation, from crabbing sideways to get into alignment with the plane as its coming into land then switching smoothly to straight ahead when the plane is landing on it; it then needs to return to the hangar passing wing tip first through gateways and doorways.

The AGP vehicle can move in any direction as all 4 of its battery powered wheels can swivel whilst in motion. The platform can be used for assisted take-off (see E.3) as well as a moving platform the Solaris plane lands on, and is capable of traveling at any speed from zero through to faster than the maximum flight speed of the plane. Its swivelling wheels allow it to carry the HAPS sideways (wing-tip first) through narrow hangar doors and runway access gateways, as well as along taxi ways.

As noted in E.3 above, for landing, the AGP positions itself at the runway threshold and is able, by being fed real time flight data from the HAPS and/or by using the AGP's own sensors/Lidar to determine the HAPS' exact location, trajectory and speed as it comes in to land. The AGP recovery frame matches the HAPS position in terms of location, speed and trajectory and the HAPS flies to land on, and be safely caught by, the AGP recovery truss, which can then transport the HAPS to a hangar.

Figures 25A, 25B:
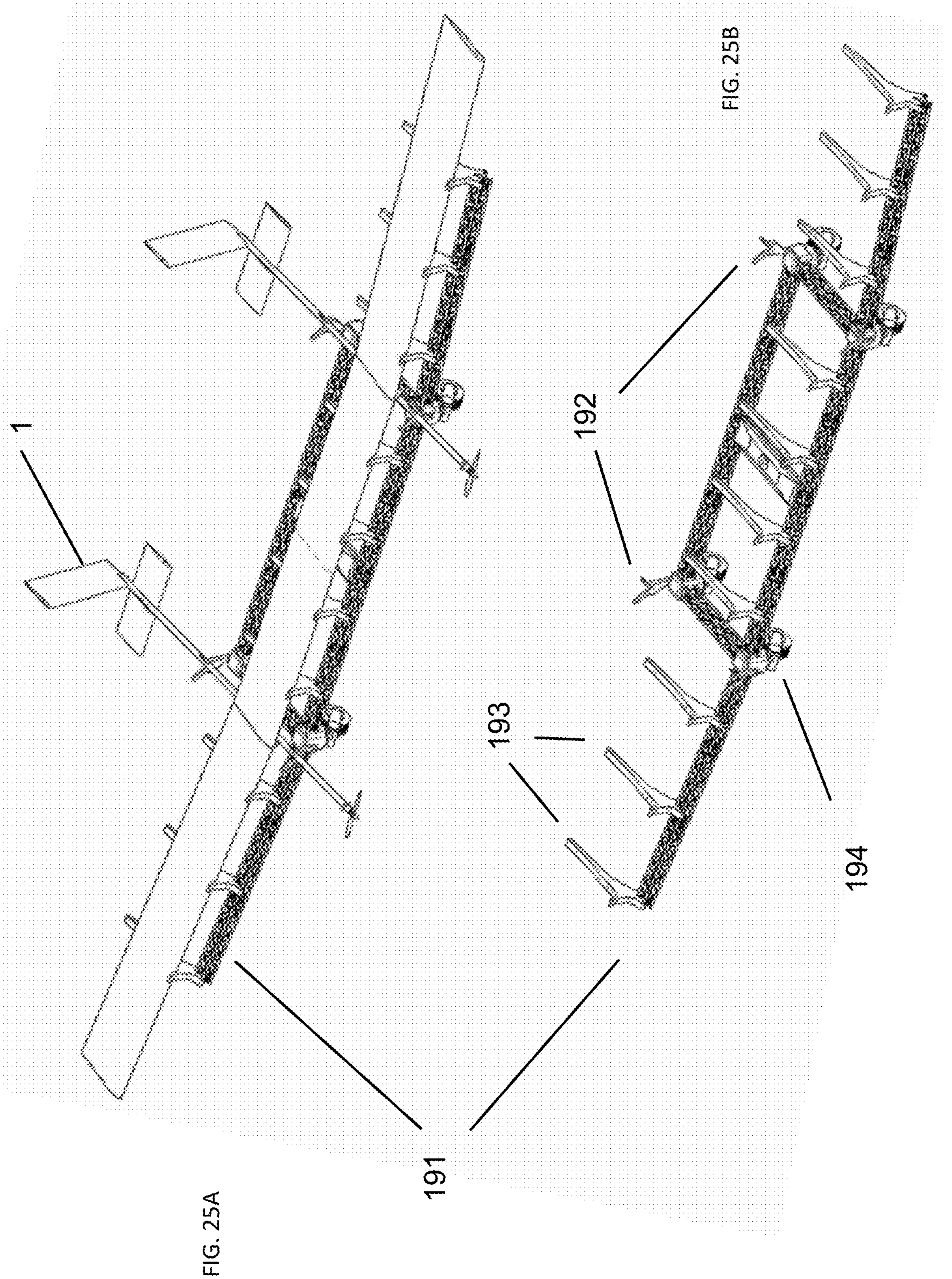
FIG. 25A illustrates a ground handling vehicle (AGP) with a plane securely resting on it according to one embodiment of the present invention.
FIG. 25B illustrates an AGP on its own, with wheels oriented for forward movement according to one embodiment of the present invention.
Figure 25C:
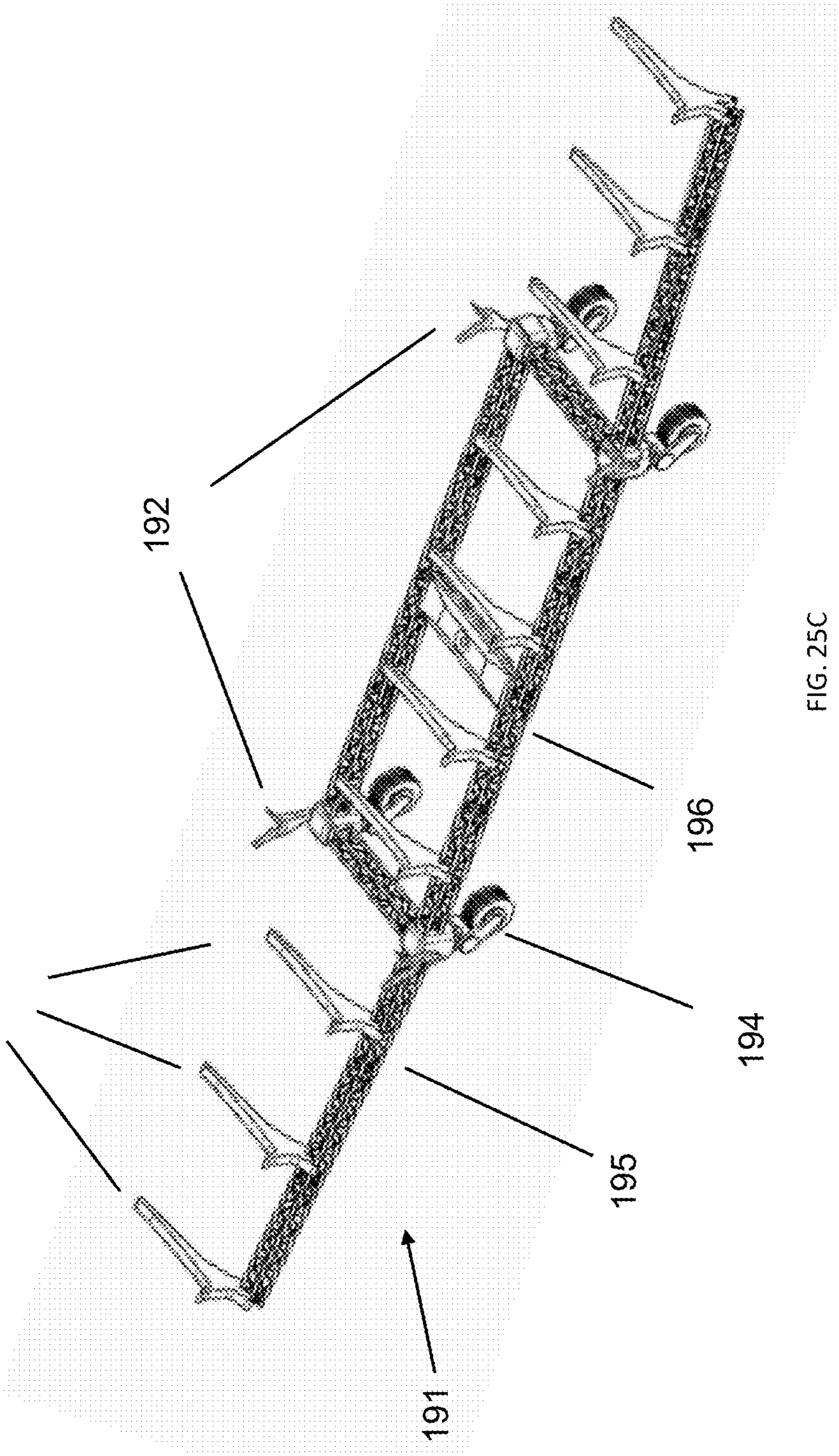
FIG. 25C illustrates the AGP on its own, with wheels oriented for sideways movement according to one embodiment of the present invention.

FIGS. 25A-C show the ground handling vehicle (AGP) 191 for transporting a Solaris plane 1. The AGP vehicle 191 is designed for various ground operations, such as transportation, maintenance, or any other logical tasks. The AGP 191 includes battery powered swivelling wheels 194 designed to drive in any orientation. The AGP 191 is made up a rectangular chassis section 196, with wheels 194 at each corner and fuselage holders 192 at each corner, sitting over each wheel; AGP 191 includes a lateral spar 195, extending from opposite sides of the rectangular frame, and sized to support the wings of the plane; each spar includes multiple support arms 193 (three are shown) designed to support and hold securely the wings of the plane. The chassis 196 includes 4 such support arms 193.

FIG. 25A shows the AGP 191 with the plane 1 securely resting on it. FIG. 25B shows the AGP 191 on its own, with wheels oriented for forward movement (e.g. parallel to the flight path of a plane coming into land on the AGP). FIG. 25C shows the AGP 191 on its own, with wheels oriented for sideways movement (e.g. when returning to a hanger).

Figure 26A:
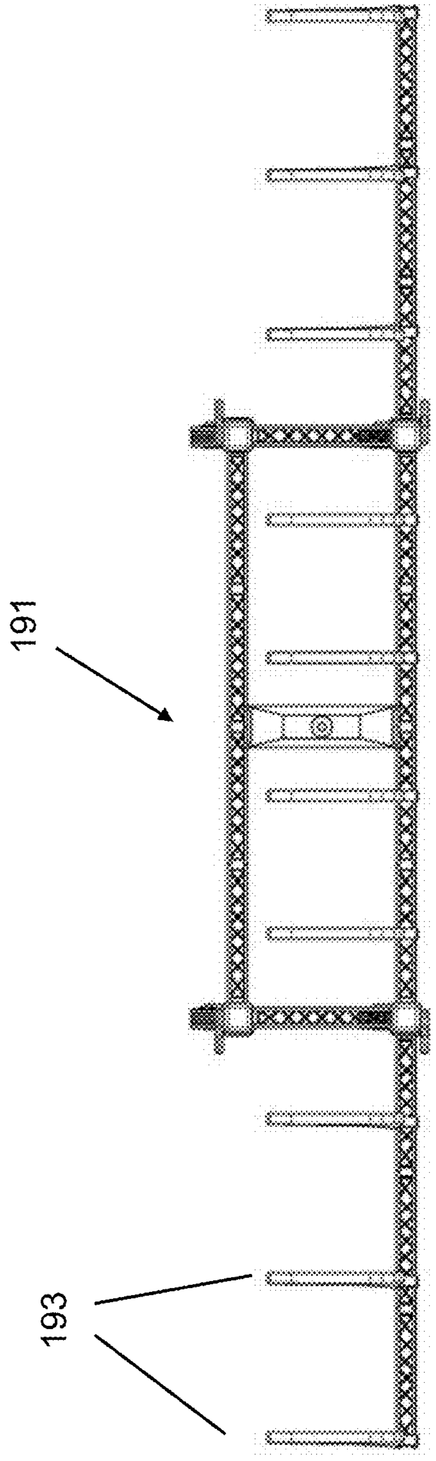
FIG. 26A illustrates a top-down view of the AGP according to one embodiment of the present invention.
Figure 26B:
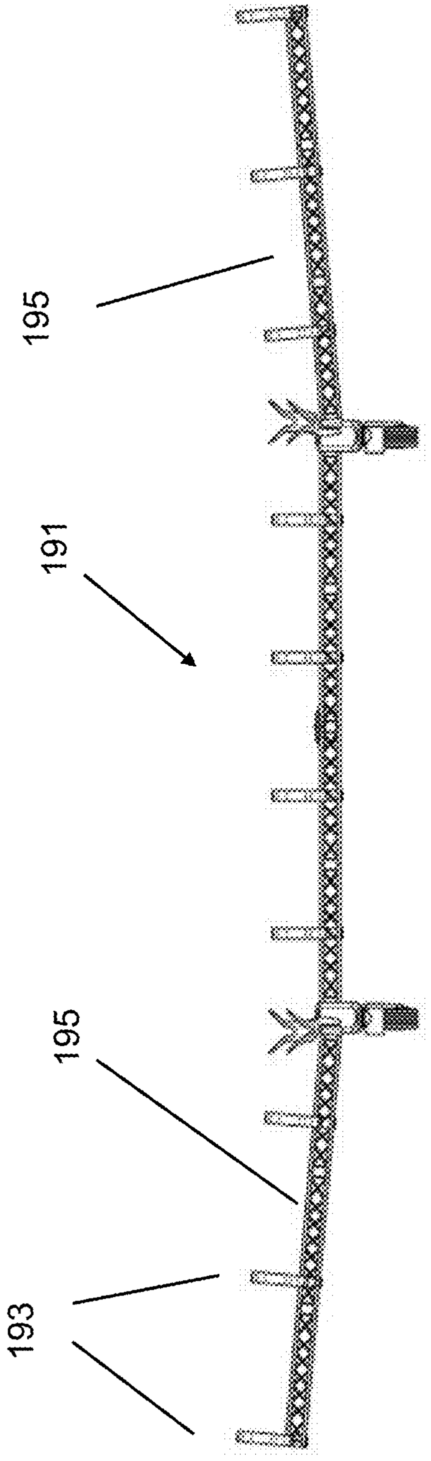
FIG. 26B illustrates a frontal view.
Figure 26D:
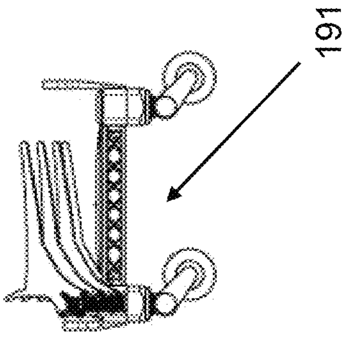
FIG. 26D illustrates a side view of the AGP, when not carrying a plane according to one embodiment of the present invention.
Figure 26C:
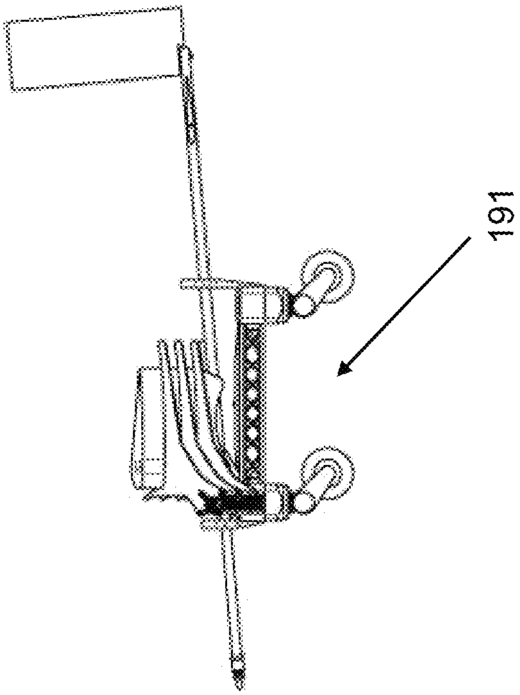

FIG. 26A is a top-down view of the AGP 191; FIG. 26B is a frontal view, showing how the lateral spars 195 are slightly tilted upwards when not supporting a plane; FIG. 26C is a side view of the AGP, carrying a plane, and FIG. 26D is a side view of the AGP, when not carrying a plane.

In one embodiment, this is operable to be generalized as a ground handling vehicle for a solar powered plane, the vehicle including (i) a wheeled or tracked chassis, (ii) fuselage holders extending from the chassis and (iii) a pair of lateral spars extending from the chassis, and (iv) a series of support arms mounted on the chassis and lateral spars and configured to support the wings of the plane.

In another embodiment, this is operable to be generalized as a method of landing and storing a solar powered plane, such as a plane configured to operate in the stratosphere, including the steps of a ground handling vehicle (i) driving in one direction to enable the plane to land on the vehicle and, after the plane has landed on the ground handling vehicle (ii) changing its movement in any direction, including perpendicularly.

Optional features are operable to include any one or more of the following:

- the ground handling vehicle is, before the plane has landed, configured to change its movement in any direction, including perpendicularly, so that it can align itself with the path of the plane as it comes into land.

the ground handling vehicle is configured, after the plane has landed on and is supported by the ground handling vehicle, to change its movement in any direction, including perpendicularly, so that it can move the plane wingtip first into the hangar.

the ground handling vehicle is configured to move off from stationary in any direction.

the plane is a dual fuselage plane with an approximately 25-40 m wingspan.

The ground handling vehicle or AGP may be configured with the attachment system described in E.4 above that securely retains the plane during the start of a take-off run, and releases the plane at the appropriate moment:

the attachment system between the plane and AGP is a mechanical latch.

the attachment system between the plane and AGP is a magnet or electromagnet.

the attachment system between the plane and AGP is a suction force.

the plane detaches from the AGP when the wings generate a lift force sufficient to overcome the attachment force.

the plane detaches from the AGP when the AGP and plane are travelling at a velocity associated with a sufficient lift force.

the plane detaches from the AGP by means of a remote-controlled manual trigger.

the plane and AGP are travelling between 20 and 40 miles per hour at the point of detachment.

the plane is attached to the AGP at an angle such that it promotes the generation of lift through the wings of the plane.

the AGP may include guide rails or tracks along which the plane is guided during take-off.

In another embodiment, this is operable to be generalized as a ground handling vehicle for a solar powered plane, the vehicle being a configured to move in any direction.

Optional features are operable to include any one or more of the following:

the ground handling vehicle is electrically powered.

the ground handling vehicle is capable of autonomous operation, including matching the speed, trajectory and position of a plane coming into land on the vehicle.

the ground handling vehicle is configured (i) to drive in a direction that is continuously or rapidly adjusted to enable the vehicle to adjust its position to enable the plane to land on the vehicle and, after the plane has landed on the ground handling vehicle, (ii) to change its movement in any direction, including perpendicularly, to transport the plane to a hangar.

the ground handling vehicle is configured to change its trajectory in any direction, including perpendicularly, so that it can align itself with the path of the plane as the plane comes in to land.

the ground handling vehicle is configured, after the plane has landed on and is supported by the ground handling vehicle, to change its direction in any direction, including perpendicularly, so that it can move the plane wingtip first into the hangar.

the ground handling vehicle is configured to move off from stationary in any direction.

the ground handling vehicle includes battery powered wheels that can each swivel through any angle.

the ground handling vehicle is configured to support a plane that is a dual fuselage plane with an approximately 25-40 m wingspan.

Feature Group F: Use Cases

F.1 Improved Training of AI Based Models

For many applications, such as weather monitoring, earth observation, earth imaging, border security, maritime patrols, anti-piracy operations, disaster response and agricultural observation, low earth orbit (LEO) satellites are currently used. But a typical LEO satellite with an orbital period of 120 minutes and a velocity of 27,000 Km/h might only be over the same area of the planet for a fraction of a second each day. Another approach is to use light aircraft, but these are both costly and cannot loiter over a target area for more than a few hours.

In one embodiment, a Solaris plane can loiter directly over a target area for many weeks, providing continuous, real-time data throughout this time. In a 24 hr period, a Solaris sensor at say 9 Hz refresh is gathering circa 777,000 images/samples of the target scene. A satellite constellation at full capacity may gather 50-100: a single Solaris plane can deliver up to 15,000× more information, giving a significant boost in temporal resolution, at a far lower cost.

For AI and signal processing, this larger data set (sample set) enables larger integration times which enable an exponential gain in resolution (signal to noise) such that objects, movements and changes can be seen at far higher resolutions and with much higher certainty than from a few samples. Further, the fact that Solaris planes hold-station by circling over the spot adds a 360° dimension to the data sets, further boosting resolution and reliable object, movement or event detection. The combined effect is a significant gain in spatial-temporal resolutions for any sensor/instrument flown, which closes critical observation gaps across a wide range of Earth Observation missions.

Solaris planes can hence persistently monitor earth areas and generate continuous real-time data over many weeks; a key advantage over satellite-based systems. Satellite systems are also limited to the imaging and earth monitoring systems available when the satellite is designed; these can be obsolete after a few years but cannot be replaced; the imaging and earth monitoring systems payload in a Solaris plane can be updated prior to a mission and so the most up to date and lightweight systems can be used.

Solaris planes use high-capacity satcom networks to live stream their data to a satellite and for that satellite to then transmit that data to a ground station for immediate analysis and use. Solaris planes may also use a free-space optical link for transmitting directly to a ground station, another Solaris plane, or a satellite. One or more sensors or imaging subsystems that are configured to operate in the stratosphere may be used in the Solaris plane and the outputs of each sensor or imaging subsystem combined (locally in a plane, or in data-connected planes, or on-the ground or remotely) to detect, predict or monitor a wide range of natural disasters or events.

In one embodiment, this is operable to be generalized as a method of generating training data for training an AI based system comprising the steps of operating a solar powered plane, such as a plane configured to operate in the stratosphere, to (a) capture data for a region over a continuous period that is at least 10 times longer than the continuous period for which a light aircraft could capture data for that region and to (b) capture a quantity of data for that region that is at least 10 times greater than the quantity of data that a constellation of low earth orbit satellites could capture over the same continuous period.

F.2 Improved Inference for AI Based Models

Because Solaris suborbital platforms provide continuous, real-time data feeds that last for hours, days or even weeks for a specific target area, raw and processed (as in the above examples), this data can then be used to significantly improve AI based predictive models, such as those used in disaster or emergency response environments. For example, being able to predict winds, movement of fires, water flows, rain etc. is key to incident room decision making. The problem is that most of these models are using relatively old data, perhaps satellite imagery from several hours ago, or field reports from a very small sample of events in the field. So, their decision making is not based on continuous, real-time data (inputs and outputs then generated from their predictive systems), nor data for a specific target area that has been captured over days or even weeks of persistent, continuous data capture.

However, Solaris changes this dramatically by live feeding in new, dynamic, volumetric data of events and how they are varying in time, over continuous and extended time periods (e.g. hours, or days or even weeks) to greatly improve the accuracy and value of predictive models/systems. This new data that is fed to an AI system to enable the AI system to make inferences or predictions is called inference data.

With live feeding of Solaris data to these predictive systems, we can accelerate these models up to near real-time (the time between data capture, streaming to the ground and ingesting and processing by the predictive system—a minute or two), which will naturally boost incident room accuracy and quality of decision making, closing a critical observation gap for predictive modelling.

Further, the output from the predictive systems can be fed-back into Solaris' own mission and data gathering systems, along with incident room instructions, in a feedback loop that can be used by a machine learning system to improve the accuracy and value of Solaris' operations and services for customers. Solaris can vary its mission including where to fly, rate of coverage, which sensors to use, what sensor settings to apply etc., to optimize the total system performance.

Solaris planes can become the co-ordination point by providing both live 'eyes-on' data for controllers and first-responders, but also providing navigation, mission and other data to people and vehicles (manned or autonomous) during the response stages. Solaris planes can carry a range of equipment, communications and even its own navigation services (INSS/GNSS) to ensure highly precise operations below. This improves accuracy, reliability, safety and reduces costs.

One example is in fire-fighting where Solaris planes can detect fires over wide areas and then guide in drones/UA Vs or even ground vehicles to remote locations to deliver fire-suppressants. Solaris can monitor the effect of suppressants or other tactics to ensure that they have worked, to either guide another craft to continue, or the original one to return. It can enable co-ordination of actions in real-time, and measure the effectiveness in real-time of these actions; it can guide craft and people to/from where needed, safely, and efficiently; it can optimise the overall effectiveness and cost of fighting fires. Another use case is in search and rescue where Solaris planes can detect a vessel or person(s) in distress and direct lifeboats, drones or autonomous craft to where they are needed.

Figure 27:
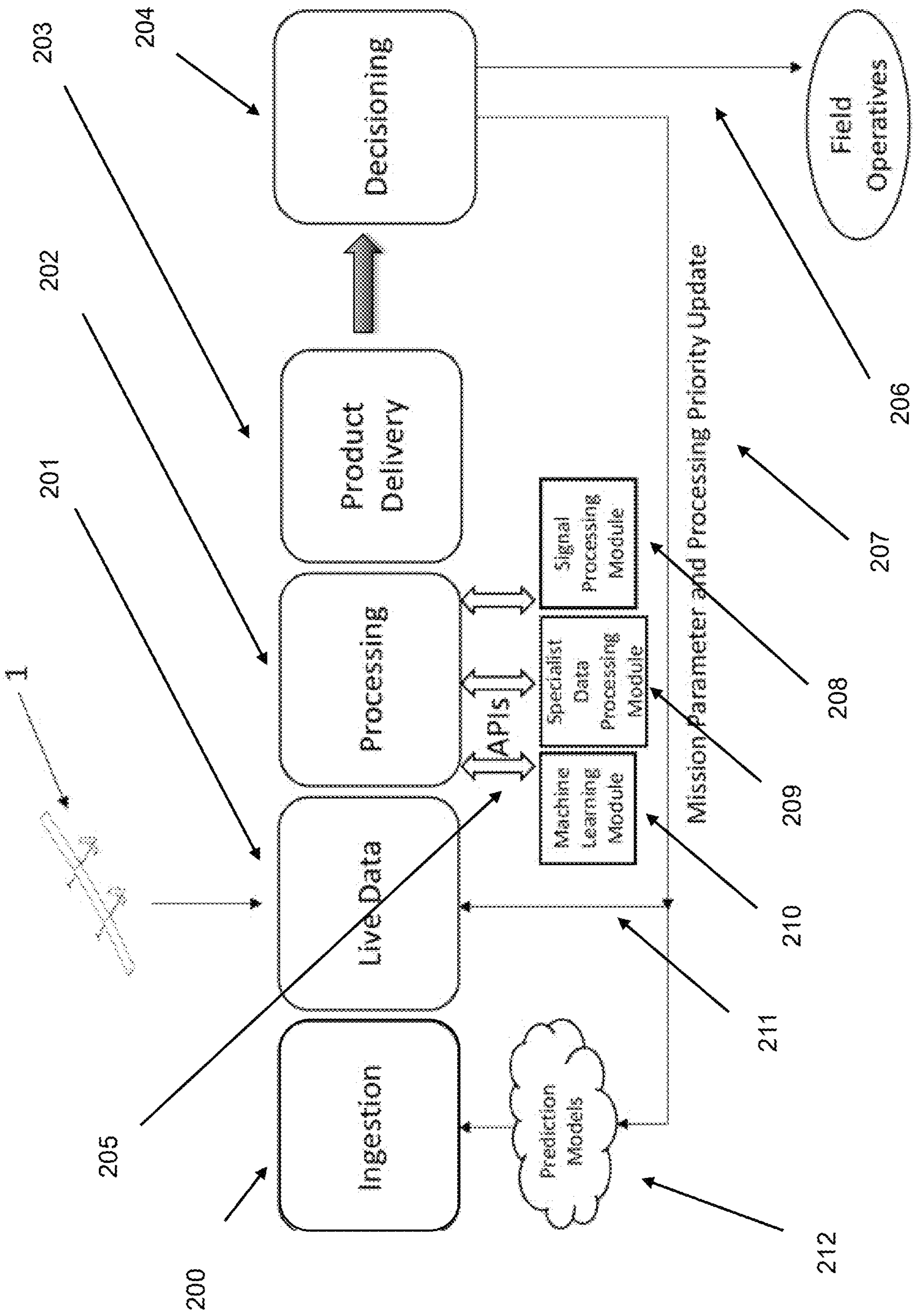
FIG. 27 illustrates a schematic of the entire Solaris data processing system according to one embodiment of the present invention.

FIG. 27 illustrates a schematic diagram showing data flow within one embodiment of the present invention. In one embodiment, live data from the glider 1 is taken in and processed by the system of the present invention and processed either on the glider 1 itself, or on a separate, remote processor. The workflow starts at the data ingestion stage 200, involving mission planning, including generating pre-tagged meta-data (e.g. such as known areas of high interest, seeing long range weather data that will impact the direction of a disaster and our mission, ground layer/drone layer data providing high resolution samples of the larger target area and GIS referencing, so that we can reliably resolve the location of data coming from different sources using the GIS geolocation standard, and likewise produce our processed data to the same standards for onward compatibility.

Live data is received at stage 201 from the Solaris planes; this data may in stage 201 be subject to anonymisation and also augmentation with other data sources—e.g. adding a layer of known risks, objects, features that improve the detection and classification of scene features and adaptation—e.g. ortho-rectification, filtering, enhancing, transposing data as required for improving the context of what's being observed (that may affect onward processing) and enhancing the capability of onward stages.

The data then is sent to processing stage 202, which includes AI/ML based processing (object identification, event detection, signal processing), generating derived data sets. Processing stage 202 is connected, via APIs 205 to various specialist processing modules, such as machine learning module 201, specialist data processing module 209, signal processing module 208. The derived data sets are in product delivery stage 203 processed for object/event selection, formatting and GIS referencing. Data is output to decisioning stage 204; this data can be in various formats, such as raw, point cloud data, or web-based data for immediate viewing, or event data for injection into a process or workflow. Decisioning stage 204 is typically human assisted; in the disaster response scenario, instructions will be sent to various field operatives (e.g. search teams, helicopters, drones etc.). Decisioning stage 204 can send mission parameter and processing priority updates 207 as a feedback loop to any and indeed all of the earlier stages.

One especially important aspect of the feedback loop is the ability to update the prediction models 212 that model and predict how real-world events will unfold and how different interventions (driven by the decisioning stage 204) affect that unfolding. For example, the system may be monitoring a wildfire; the prediction model 212 may model how fires spread based on various factors, such as meteorology, topology, vegetation, soil moisture, hydrology, man-made structures, and how that spread can be controlled by fire-breaks, backfiring, water and foam; because Solaris planes can provide real-time, continuous and persistent (lasting days or weeks) data tracking fires (e.g. using infrared video feeds and SAR data) and automatically identifying firebreaks and the location of fire crew and their equipment, enabling the prediction model to be provided with the richest and most up to date data; that in turn enables not only the prediction model itself to generate the most accurate intervention recommendations, but for the prediction model itself to be altered, adjusted and improved in the light of the feedback data. Data sets of actual events in high spatial-temporal resolution can be used to adapt and train predictive models to higher levels of accuracy and reliability; this again closes critical observation gaps for reliable modelling for predictive sciences.

In one embodiment, the processing involves one or more application programming interfaces (APIs), including, but not limited to, at least one machine learning module, at least one specialist data processing module (i.e., specific data processing tools adapted for specific tasks), and/or signal processing modules. In one embodiment, the system is able to receive a selection of at least one external API to use by at least one user device, such that customers are able to select their own software models for specific data processing tasks.

The system is operable to utilize a plurality of learning techniques including, but not limited to, machine learning (ML), artificial intelligence (AI), deep learning (DL), neural networks (NNs), artificial neural networks (ANNs), Convolutional Neural Networks (CNNs), support vector machines (SVMs), Markov decision process (MDP), and/or natural language processing (NLP). The system is operable to use any of the learning techniques alone or in combination.

Further, the system is operable to utilize predictive analytics techniques including, but not limited to, machine learning (ML), artificial intelligence (AI), neural networks (NNs) (e.g., long short-term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 28:
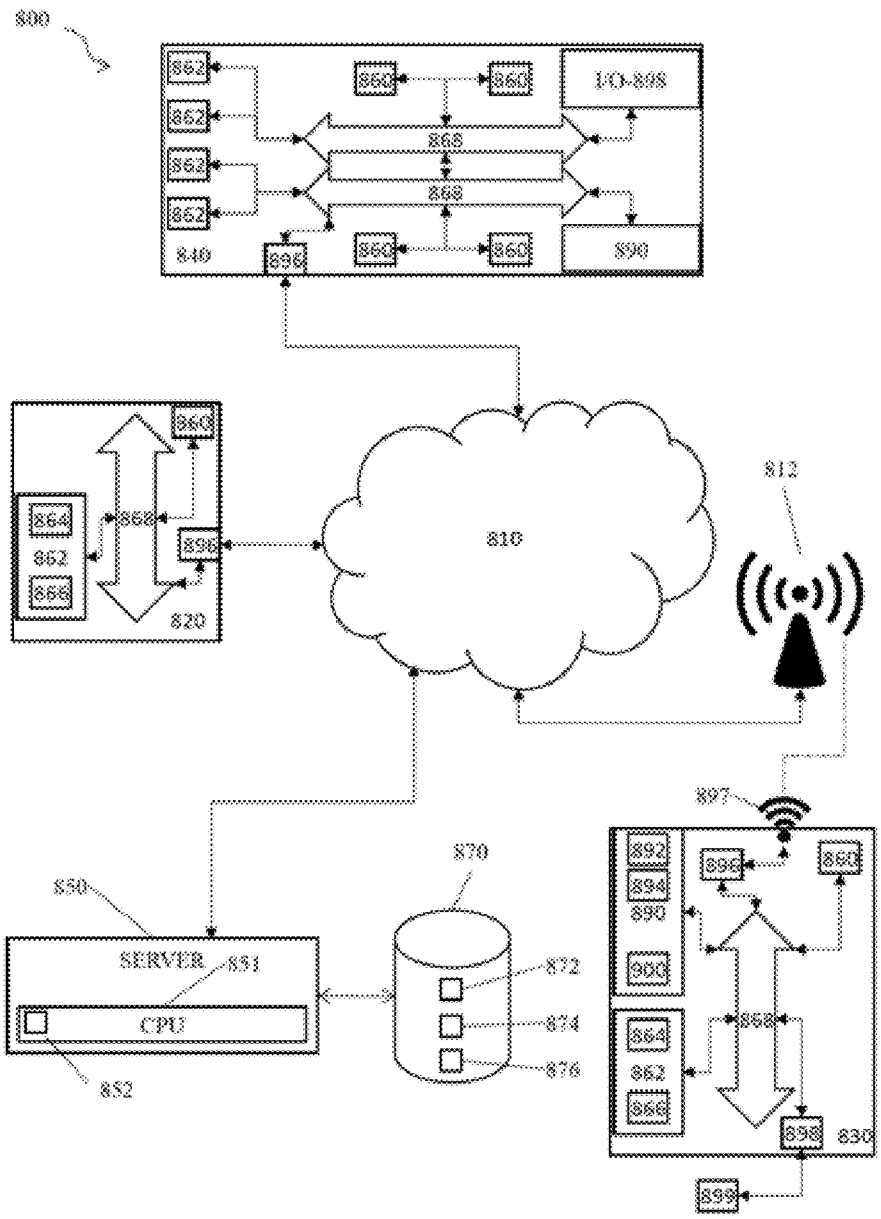
FIG. 28 illustrates a diagram of the Solaris computer system according to one embodiment of the present invention.

FIG. 28 is a schematic diagram of an embodiment of the invention illustrating a computer system 800, generally described as, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, Worldwide Interoperability for Microwave Access (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random-access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a plurality of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 28, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 25 is operable to include other components that are not explicitly shown in FIG. 25 or is operable to utilize an architecture completely different than that shown in FIG. 25.

F.3 Combining Multiple Sensors or Imaging Subsystems

Imaging subsystems providing real-time 3D data, such as SAR or LiDAR or any other 3D imaging subsystems, may be combined with thermal/hyperspectral/wideband and other imagers in order to provide a live 3D render of what is actually happening in an area of interest; the various subsystems and imagers may all be in a single Solaris plane, or distributed across several Solaris planes, and other types of platforms. Hence the 3D data measured by the 3D imaging subsystems may be enhanced using a multitude of sensor types, such as 2D thermal imaging or hyperspectral scanning sensors. The classification of objects and events being detected by SAR/LiDAR or other subsystems can therefore be improved.

For example, 2D thermal imaging sensors may be used to provide several measurements, such as temperature measurements or differences, heat signature or pattern. Hyperspectral imaging sensors may be used to detect the chemistry/material type being observed (e.g. vegetation type, soil, water, etc).

A Synthetic Aperture Radar (SAR/InSAR) subsystem can be used to capture high-resolution 3D images for high-resolution mapping, underground structure detection, disaster monitoring or environmental surveys. This is done by transmitting radar signals and analysing the backscattered signals in real-time or near real-time. The SAR subsystem parameters, such as operating frequency, antenna size, etc., can be tuned for suborbital measurements depending on the intended application. The SAR subsystem used may be configured to provide suborbital measurement data in real-time with high resolution capabilities. The resolution can also be adjusted during a mission, such as to provide 1-2 m resolution for a wide area and then to focus on smaller area at 1-2 cm resolution.

For example, the SAR subsystem can be used to detect vegetation canopies and to detect or identify the vegetation types and to assess the vegetation moisture content or hydrological properties. A thermal imaging subsystem may also be used for temperature mapping of an area.

One limitation is that thermal imagers only render in 2D, since they use a 2D sensor array, with each sensor in the array outputting the magnitude of the detected thermal signal. This is similar for other energy based passive sensors such as hyperspectral and wideband imaging sensors. In one embodiment, A 2D thermal imaging (or any other type of wide-band imaging (e.g. hyper spectral)) subsystem may be combined with SAR or LiDAR subsystems or any other 3D imaging subsystems to provide 3D data in real time for a wide number of, e.g. natural disaster or event monitoring, such as fire detection. As an example, in a fire, thermal dots must be overlaid onto a terrain map, and both measurements need to align (GIS, ortho-rectification and other methods used to estimate where you are looking are all prone to errors than can compound up). However, the terrain map that is available may not always be current. The density of vegetation may be different, objects/people/assets may be in different places, etc.

By combining 2D thermal imaging with SAR/LiDAR-based imaging, the advantage is that SAR provides 3D objects data to a very high accuracy, unlike optical or other imaging systems. Further, SAR is good at seeing through cloud, smoke, and other atmospheric clutter. By combining both 2D thermal imaging and 3D SAR—we can create a 3D thermal image of what is burning—the shape/volume of the object, the rate of change, etc, providing an improvement in managing fires (wildfires in particular) and prioritizing (triaging) what the next best action may be. All these lead to highly accurate and highly automated triaging of events to make decision making as effective and accurate as possible.

The SAR and thermal imaging subsystem is operable to be on board a Solaris suborbital platform, or may be flying in a constellation where larger apertures and accuracy over wider areas can be obtained, or a combination of both. The SAR subsystems can determine their separation down to sub-millimeter levels (or even micron levels) and their geo-location to similar accuracy. And all of this new data, when fed into AI or ML predictive models, improves their accuracy and value-both because there is new data (dynamic 3D/volumetric and object/type) and because it's now real-time and persistent. Additionally other sensors such as imaging sensor data, or non-imaging sensor data may also be used to enhance the measured data.

Further, with SAR/LiDAR, we can also provide the incident controller a real-time picture of what's in their space of operation—ground and aerial—to increase situational awareness, simplify data gathering (reduce planes/helicopter/drones) in theatre and focus on monitoring progress of action on the ground.

As an example, being able to see the firefighting craft (planes, helicopters, drones, ground vehicles, people) in real-time in one image/screen (video) and not have to rely on patching in small bits of data from different systems (e.g. from a plane, satellite, drone, radio reports, civilians, social media, which are all patchy, not in time sequence and can trigger many false positives, etc . . . ) is a tremendous practical advantage. Now the incident room can use the above live capability to triage events and use the live data to plan things like approach vectors for dropping fire retardant given ground conditions, flames, wind, rate of progress, location of important objects/people/assets/nature.

And being able to see the effectiveness of fire retardant being dropped on a particular location and watching that space for hours/days after improves the efficacy of operations. Often retardant does not hit the mark, hits it but not fully, hits it fully, but the fire re-emerges, smoulders quietly for hours before wind or other re-ignites it, burns underground, and emerges some distance away and starts a new fire. This data can now be added into the operators' systems for complete triaging and optimal response to events in the field. With Solaris' persistent coverage using combinations of sensors, we can provide that persistent situational awareness that is essential for natural disaster mitigation and control. To re-cap, Solaris can take sensor data (often 2D, such as thermal, wind, hydrology, vegetation, mineralogy/chemistry) and overlay it on 3D data sets which enhances its usefulness, particularly when both are sourced live so that the full context is available from one set into the other (e.g. during disasters when you need to see both the context and a specific measurement of say fire, wind, water, etc).

In one embodiment, this is operable to be generalized as a solar powered plane, such as a plane configured to operate in the stratosphere and configured to enable the detection or monitoring of a natural disaster event by measuring real-time data associated with a region of interest, in which the plane includes a 3D imaging subsystem and a 2D imaging unit.

A computer implemented method of detecting or monitoring of a natural disaster event, in which a solar powered plane is operating in the stratosphere and includes a 3D imaging subsystem and a 2D imaging unit that enables measuring real-time 3D data associated with a region of interest.

Optional features are operable to include any one or more of the following:

3D imaging subsystem includes a 3D imaging unit, such as SAR, inSar or LidAR.

3D data includes 3D objects data of the region of interest, in which the object is one of the following: tree, bush, grass, building, vehicle people, animal etc.

2D imaging unit includes thermal, hyperspectral or wide-band sensors.

a data fusion subsystem is configured to fuse or combine the data provided by the 3D imaging unit and the 2D imaging unit.

measured data takes into account environmental conditions.

the 3D Imaging subsystem together with the 2D imaging unit determines the movement of objects in an area of interest.

the 3D Imaging subsystem together with the 2D imaging unit identifies risk or danger, such as fire, collapse risk, flooding event or any other potential danger.

the 3D Imaging subsystem together with the 2D imaging unit is mounted on the solar powered plane.

the 3D Imaging subsystems together with the 2D imaging units are mounted on a constellation of solar powered planes and operate as a distributed system.

the 3D Imaging subsystem together with the 2D imaging unit is configured to have parameters that are tuneable during flight, such as to vary the resolution capabilities.

the output of the 3D imaging subsystem together with the 2D imaging unit is fed into a machine learning or AI based subsystem as training data.

the output of the 3D imaging subsystem together with the 2D imaging unit is fed into a machine learning or AI based subsystem as inference data.

the output of the 3D imaging subsystem together with the 2D imaging unit is fed into a machine learning or AI based subsystem that is configured to classify objects based on a specific natural disaster event.

the output of the 3D imaging subsystem together with the 2D imaging unit is fed into a machine learning or AI based subsystem that is configured to predict natural disaster event.

the output of the 3D imaging subsystem together with the 2D imaging unit is fed into a workflow automation subsystem such as a triaging subsystem that is configured to automatically triage a sequence of rescue actions based on the natural disaster detected.

the rescue actions include guidance of drones, UAVs or other rescue vehicles to remote locations for specific task.

the 3D imaging Subsystem is configured to monitor the effect of rescue actions or other tactics in real time.

the 3D imaging subsystem together with the 2D imaging unit detects moisture levels or hydrological properties and estimates change in moisture levels or hydrological properties.

the plane is configured to transmit an alarm when a risk is identified, such as if the moisture levels or hydrological properties exceed pre-defined thresholds.

the natural disaster event is a fire, and the 3D imaging subsystem and/or 2D imaging unit is configured to monitor ground conditions, flames, wind, rate of progress, location of important objects/people/assets/nature.

the 3D imaging subsystem together with the 2D imaging unit measures or estimates volume of fuel stock based on one or more of the following: type of fuel being burned or about to be burned, rate of change, such as rate at which fuel is being burned, or fuel consumption.

the 3D imaging subsystem together with the 2D imaging unit are configured to monitor effectiveness of fire retardant or suppressant in real time.

the 3D imaging subsystem together with the imaging unit estimates indicator of underground fire.

the 3D imaging subsystem together with the 2D imaging unit estimates indicator of subsidence, or collapse, such as sudden ground depression.

the plane is a dual fuselage plane with an approximately 25-40 m wingspan.

F.4 Dark Vessel Monitoring

The Solaris plane (or a constellation of Solaris planes) spots and tracks sea-going vessels using an imaging system (e.g. synthetic aperture radar) for detecting sea-going vessels; it includes a receiver for automatic identification system (AIS or S-AIS or the newer VDES) signals. Vessels that are tracked by the plane but are not sending AIS or S-AIS (or VDES) signal can be identified (either on the plane or on the ground) as potential dark vessels. The plane can also act as a relay for AIS, S-AIS or VDES signals, sharing them with other Solaris planes and also transmit to other planes and to the ground data that enables the identification of dark vessels. A constellation of these planes could provide persistent imaging of areas where dark vessels are likely to be present or have been identified.

Solaris planes are operable to carry an RF detection sensor to detect any RF signals to identify craft—e.g. their mobile phones, or other radio equipment they're using. Also, detecting odd patterns of movement would be an indicator that a vessel is say dumping, collecting, or performing an illicit act. AI would enhance identification and profiling of such vessel/craft or plane (e.g. turned off its ADS-B or similar identification transponder).

In one embodiment, this is operable to be generalized as a solar powered plane configured to operate in the stratosphere and configured to enable the detection of dark sea-going vessels by including (i) an imaging system (e.g. synthetic aperture radar) for detecting and tracking sea vessels; and (ii) a receiver for automatic identification system (AIS, S-AIS or VDES) signals; and in which the plane is configured to process or send data from the imaging system and the receiver to enable vessels that are tracked by the plane but are not sending AIS, S-AIS or VDES signal to be identified as potential dark vessels.

Optional features include any one or more of the following:

vessels that are tracked by the plane but are not sending AIS, S-AIS or VDES signal are identified locally on the plane as dark vessels.

vessels that are tracked by the plane but are not sending AIS, S-AIS or VDES signal are identified on the ground as dark vessels.

the plane is further configured to act as a relay for the AIS, S-AIS or VDES signals and/or data that enables the identification of dark vessels.

the plane is further configured to transmit to ground data that enables the identification of dark vessels.

the plane is further configured with an RF detection sensor to detect RF signals from the sea-going vessels.

the plane is further configured to collect vessel movement data to enable patterns of movement to be detected that are associated with dumping, collecting, or performing an illicit act.

a constellation of planes provides persistent imaging of areas where dark vessels are likely to be present or have been identified.

the plane is a dual fuselage plane with an approximately 25-40 m wingspan.

F.5 Ship Anchor Dragging Detection

In a similar manner to the monitoring disclosed in F.4, the Solaris plane (or a constellation of Solaris planes) can utilise an imaging system to spot and track sea-going vessels, continuously monitoring for instances of anchor dragging, which could indicate an attempt to sever seabed data or power cables.

The imaging system is of suitable resolution such that identification of a deployed anchor is possible. Using imaging systems such as Synthetic Aperture Radar (SAR) allows the monitoring to continue during periods with cloud cover (see Section F.17 for this and other techniques). AI-based object detection systems can be trained to detect a deployed anchor chain associated with a moving vessel; equally, human-operators can review video footage from the plane to detect this. Further, AI-based object detection systems (as well as human operators) can be used to detect other actions, such as launching a set of sea drones or light ribs from a vessel, or a pirate attack on a vessel. The live, continuous, persistent characteristics of the video data from the plane is a major advantage over current surveillance techniques: as noted earlier, the plane (or constellation of planes) can loiter for weeks at a time while monitoring one or multiple vessels, allowing continuous (including at night) and comprehensive data to be collected on the vessel or vessels being monitored.

In one embodiment, this is operable to be generalized as a solar powered plane, such as a plane configured to operate in the stratosphere, configured to detect instances of anchor dragging by sea-going vessels by means of an imaging system (e.g. synthetic aperture radar).

Optional features include any one or more of the following:

the plane is part of a constellation of planes configured to detect instances of anchor dragging by sea-going vessels by means of an imaging system.

a constellation of planes provides persistent imaging of areas where sea-going vessels conducting anchor dragging are likely to be present or have been identified.

the plane is further configured to collect vessel movement data to enable patterns of movement to be detected.

the imaging system is configured to operate continuously, including during times with cloud cover, allowing continuous monitoring of sea-going vessels.

the imaging system provides data to an AI-based object detection system, trained to detect a deployed anchor chain associated with a moving vessel the plane is a dual fuselage plane with an approximately 25-40 m wingspan.

F.6 Spy Balloon Capture

High altitude balloons (such as alleged spy balloons) have proven notoriously difficult to "Shoot Down"; this is because the balloon is travelling at the speed of the wind, likely less that 70 kts but at high altitude conventional aircraft have to fly at several hundred Kts to avoid stalling.

However, the Solaris plane at high altitude can fly at less than 50 kts if required, and this allows the plane to be manoeuvred to smoothly intercept or fly directly above the target balloon.

The Solaris plane can be set on a path to intercept an errant balloon, such as a potential spy balloon; the plane releases a net or tether that attaches to the balloon or its payload cables and puts the balloon out of equilibrium thus causing the balloon to gently descend. Alternatively the plane could drop a small hot wire mesh and batteries onto the balloon; once activated, the hot wire would melt through the balloon fabric causing it to deflate. The battery pack could be fitted with a small parachute to at least control the descent of the batteries.

Alternatively, the Solaris plane can include a 'Y' shaped capture prong on the front (or similar) that enables the plane to fly into say the flight train or payload cables, attach to it and so add to the mass of the plane to the balloon payload to bring the entire payload and balloon down intact, or to drag it down to several hundred feet off the ground, where it can be released and recovered. This may include the use of the Solaris plane's propulsion and flight control surfaces to actively drive and steer the balloon to a target area or landing site, rather than drift with the winds and land in undesirable areas.

In one embodiment, this is operable to be generalized as a solar powered plane configured to operate in the stratosphere and including a system designed to be released from the plane to disable a balloon.

Optional features include any one or more of the following:

- the system released from the plane is a net or tether configured to attach to the balloon or its payload cables to put the balloon out of equilibrium, thus causing the balloon and its payload to descend to ground.
- the system released from the plane is hot wire mesh and batteries configured to melt through the balloon fabric, causing it to deflate.
- the system released from the plane is a 'Y' shaped capture prong that enables the plane to fly into say the flight train or payload cables, attach to it and so add to the mass of the plane to the balloon payload to bring the entire payload and balloon down.
- the plane is a dual fuselage plane with an approximately 25-40 m wingspan.

F.7 Non-GPS Location System

The Solaris plane can include a stellar navigation system as described in WO 2017/158326 (the contents of which are herein incorporated by reference in its entirety) to determine its position with cm or sub-cm accuracy; in addition, each plane includes an atomic clock or a system that can receive and use time signals derived from an atomic clock. The plane transmits its position data and time signal data; when there is a constellation of these planes, then a user (e.g. on the ground, at sea or in the air) can infer their location using these position and time signals, much like the current GPS or other GNSS systems, but without the recourse to these GPS or other GNSS systems.

In one embodiment, this is operable to be generalized as a constellation of solar powered planes, each configured to operate in the stratosphere and configured to detect their position with reference to a star map, and to transmit that position data with time signal data to enable a user to infer their location using these position and time signals, without the recourse to the GPS or other GNSS systems.

Optional features include any one or more of the following:

- each plane includes a system that can receive and use time signals derived from an atomic clock.
- each plane includes an atomic clock.
- each plane is a dual fuselage plane with an approximately 25-40 m wingspan.

F.8 Weather/Wind Data Capture Process

For many years balloonists and others have released small helium or hydrogen balloons to give either a visual indication (or if fitted with a data capture device generally referred to as a sonde or radiosonde, then actual digital data) of the wind direction and speed at different heights as the balloon ascends. Eventually these balloons burst: it is also known to track the radiosonde descent after balloon burst. With balloon bursts, the remnants descend, causing "plastic" pollution with the potential to harm animals and fish if ingested. Consequently, the Australian government has banned the release of these sorts of balloons.

In the Solaris system, we can use (i) a tracker sonde, or (ii) sand (perhaps 100 g to 300 g); each is mounted in a paper cup (we will refer to either as 'ballast)'; the cup has a very small paper parachute with cotton rather than man made threads to attach the cup to the parachute, so there is much reduced environmental damage compared to synthetic balloons.

Either of these entire assemblies can be wrapped up and secured to a small drone, or a small UAV, e.g. a powered model aircraft, in such a way that they can be released at altitude. The drone can then be flown to altitude, were the parachute and ballast (either a tracker sonde or just sand) is then released. If the ballast is of sand, then wind direction is only determined by visual sightings of the relative movement of the parachute during descent. If the parachute has a sonde attached, then digital data can be captured on the ground using a receiver attached to a computer. Some sondes have a ground finding system that allows them to be collected after use and reused many times. The paper parachute may also be reused.

The approach is to capture the weather/wind data (e.g. wind velocity, temperature, humidity-any other variables that can affect the flight of the Solaris plane) solely during a descent rather than an ascent, and without using a balloon but instead a drone or UAV. This has several other advantages, one of which is that the drone can be flown upwind from the observer/receiver on the ground, unlike a balloon. This reduces the chance of the sonde being blown out of range down-wind of the observer, who in the conventional balloon scenario would be at the point of release from the ground. Another advantage is that when using a balloon, it often travels many tens of miles down wind after it has gone out of sight and is no longer useful.

In one embodiment, this is operable to be generalized as a weather data capture method including the steps of (i) using a drone or UAV to fly a device to altitude; (ii) releasing the device at altitude and (iii) monitoring the descent of the device to generate weather data.

Optional features include any one or more of the following:

- weather data includes wind data.
- the device descends under a parachute.
- the parachute is a paper parachute attached by cotton threads to the device.
- the device includes a tracker sonde.
- the device includes a weight, such as sand, and the wind direction is determined by visual sightings of the relative movement of the device and its parachute during descent.

Miscellaneous Use Cases

F.9 Urban Eyes

Solaris planes are uniquely placed to source live, video-grade data over significant areas of our planet. One class of high-value area is urban. Solaris planes can provide 24/7 live visibility of all urban spaces using cameras, IR and even SAR/InSAR (synthetic aperture radar) enabling it to identify the location and movement of vehicles, assets, people, plants, vegetation, animals and also monitor events, infrastructure and even the progress of natural events such as weather, water, dust, pollutants, fires, floods, earthquakes, infestations/migration, etc. A true, multi-dimensional living map and extremely rich data detailing the complex patterns of life and at scale can be generated.

Solaris planes can enable a wide range of municipal services to a broad set of stakeholders with the benefit that each reduces friction, improves efficiency and enables better use of busy, contested urban spaces along with improving safety, security and optimization of critical assets and infrastructure.

Solaris can provide a real-world picture of actual events and has no reliance of individual assets or spaces being 'wired-up' and registered to a central system (e.g. current traffic mapping systems rely on devices being connected and sharing their location data) meaning all non-GPS, non-connected devices, vehicles, people, animals are by default included. In the race to build a digital (virtual) system, Solaris provides the real-world data for a true 'digital twin' capability. This Solaris urban data layer is a rich enabler of many civic, commercial and agency services that go beyond some of the examples listed here.

F.10 Parking

An example use case of this is finding real-time parking spots. For instance, a user could simply sign up to the Solaris 'Find-A-Park' service which would in real-time know where parking spots were. You would simply put in your destination and select 'Find-A-Park' and it would provide your route to available spots and in real-time update your routing as options change. It might even pre-reserve a spot for you if those slots were allocated/managed on this system or via a third party system. Further, private parking spots, driveways and other private parking assets could also be listed and booked and paid for through this service. Finding an available EV charging station is another variant of this.

There are many benefits to users (less stress, more effective routing), traffic (fewer cars blocking up roads roaming around, waiting as they hunt for spots), owners (more effective way to manage and monetize parking spots). For covered indoor/underground parks, by knowing the capacity and monitoring the numbers in/out, Solaris planes would be able to calculate the availability of parking in each. Naturally the car park could also share both capacity and actual parking slots available to control their own flows and business. And of course municipalities would benefit from being able to better plan urban usage, traffic flows, safety, enforcement and a range of civic services. Parking control and enforcement can be highly automated by having real time facts starting with directing agents to where vehicles are currently illegally parked through to ultimately automating enforcement and issuance of penalties.

F.11 Traffic/Movements

Solaris planes can persistently image traffic in real-time across a broad urban area—not just traffic on main arteries or where there are traffic cameras/sensors; so Solaris enables a complete capability in live traffic management, incident management, safety, security and control essential for urban-wide (system-wide) optimization, including the following:

Traffic flows—precise volumes, speeds, down to each individual vehicle.

Real time incidents—jams, crashes, holes, pipe bursts, fires, lights out.

Geo-fencing borders for land, sea and air, including geo-fencing specific areas either persistently or on a timed basis.

Security—live incidents, track vehicles, movements, etc. . . . .

No need for helicopters/planes for tracking/chasing rogue vehicles or people or animals, etc.

The video streams would allow for seeing the full path of a vehicle into and out of a scene to establish full facts rather than rely on incomplete facts/local cameras/sensors.

i.e.—you could see who/what caused an event, know their origin and even follow them to their final location.

This also applies for a wide range of urban needs—e.g. rubbish/trash/refuse locations, collection, status, abuses etc., including seeing illegal dumping/tipping or other forms of abandonment and being able to track provenance and where the responsible party then went.

It could also be used to calculate the volumes and flows of people, such as at events, in/out of public areas, retail properties, offices/towers, buildings and transport systems, during a crisis or disaster. Again, this is valuable data for planning, management, safety/security and assisting agents and first responders with actual live data to more accurately and efficiently manage a range of events.

Solaris planes can be used for AIS/VDES detection/relaying of ships, as noted earlier. Solaris planes can also apply these detection/relaying techniques to autonomous vehicles (cars, trucks, farm vehicles, drones, robots, etc.) that will be required to use a form of self-identification, as well as sense and avoidance, in their traffic management systems, as well as future traffic management systems that co-ordinate the movement of vehicles. Vehicles may go dark, they may lose network connectivity or be out of range and Solaris planes can provide a navigation and safety overlay required for the safe and reliable operation of autonomous vehicles/craft/robots of all types: this navigation and safety overlay can be provided to the digital twins used to control and automate vehicle movements. The system can actively detect (e.g. using a camera, SAR, etc.) and validate the position, movement, and status of any vehicle that may have lost its identifier/signal, or lost network connectivity.

F.12 Buildings

Solaris planes can persistently and in real-time monitor, and benchmark various building parameters (usage, energy efficiency, fire risk, insurance damage, maintenance tasks), including generating data for both buildings, and the background/ambient environment. Solaris planes can include imaging payloads that enable:

Monitoring thermal signatures of buildings to help owners/users know where energy is lost and generate actual energy ratings for each, including reports and optimised plans to improve and achieve required efficiency levels or standards.

Detect ageing and insulation properties of building structures improves preventative maintenance and lifetime and value of the asset.

Leads to environmental charging/credits by building/asset as we move to a zero-carbon world.

Change monitoring: millimetric changes in structures, ground levels etc. can be detected, including normal diurnal, seasonal changes and abnormalities, as a predictor of failure. This can be applied to the monitoring of infrastructure such as power lines, roads, railways, runways, ports, etc., and waterways/canals, where millimetric levy deformation is an indicator of structure failure or leaking of water below ground.

Security: being able to subscribe to a Solaris service that monitors your property when you are not there—e.g. for visitors, movements, deliveries, access, usage (including heat, lights, watering, etc.) to not only provide live incident management, but evidence of any event—who, where, where it/they came from and went, etc.

Flows: being able to monitor daily patterns of life around building or estate usage can enable far more efficient designs, maintenance, prevention and choice of improvements.

Fires: being able to detect fires in real-time and alert and accurately direct emergency services to the scene at the earliest stages of a fire and provide accurate information (live video stream) of the actual fire, progress, type, etc., both for the central incident room for faster, more precise response and instructions to first responders and experts.

Floods: being able to detect floods in real-time and alert and accurately direct emergency services to the scene at the earliest stages of a flood and provide accurate information (live video stream) of the actual flood, progress, type, etc., both for the central incident room for faster, more precise response and instructions to first responders and experts.

Earth quakes/tsunamis/storms/pests/infestations.

Monitoring of vegetation, growth rates, quality and being able to optimise treatment, care and scheduling of services to optimise resource usage which opens up commercial providers to service these needs.

E.g. users could subscribe to a service that optimizes how and when they should water, fertilize, plant and even mow/prune/weed their gardens and may even trigger the sending of products or professionals to treat/manage their gardens at key moments as required.

The same applies to monitoring all forms of infrastructure such as street surfaces, drains, pipes, lights, cabling, signage, markings, etc., where preventative maintenance, optimized routing/planning and resource usage are key drivers for more efficient public services, spending and ROI.

F.13 Insurers, Finance, Service Providers

Based on the rich data that the Solaris urban data layer (and even wider suburban and rural) offers, a range of additional possibilities such as Insurance—remotely assessing a risk, evaluating an event and detailed actual data for improving claims assessment and disbursements.

Finance—assessing the use, quality and progress of assets-buildings, vehicles, locations (e.g. traffic, footfall, goods movements . . . ).

Services—a range of services will benefit from having precise data about say the state of a building and its land (offer roof repair, wall/painting/fencing, gardening), its performance (thermal/energy) and its safety and security (fire, water, infestation and access/use/events).

In one embodiment, Features F.9 to F.13 operable to be generalized as follows:

A solar powered plane configured to operate in the stratosphere including (i) an imaging system (e.g. digital cameras, IR cameras, SAR/InSAR) configured to capture imaging data relating to objects and features on the Earth's surface, where that data is live, continuous, and persistent, namely lasting days or weeks, and (ii) a data transmission system configured to transmit live, continuous, and persistent data to ground, satellite, or another solar powered plane.

Optional features include any one or more of the following:

Urban Eyes the imaging system collects live, continuous, and persistent data for urban areas.

the plane is positioned to collect live, continuous, and persistent data for a defined area of Earth's surface such as a town or city.

the plane is part of a constellation of planes collecting live, continuous, and persistent data.

the imaging system is contained within the wings of the plane.

the plane is positioned to collect live, continuous, and persistent data for a natural event such as weather, water, dust, pollutants, fires, floods, earthquakes, avalanches, infestations/migration, etc.

the plane is positioned to collect live, continuous, and persistent data for a man-made event such as road traffic, construction projects, controlled water discharge, festivals and parades, sporting events, and search and rescue operations.

Parking the imaging system collects live, continuous, and persistent data for transportation infrastructure, such as parking spots and electric charging points.

The live, continuous, and persistent data collected for transportation infrastructure is used to determine available parking spots or electric charging points in real time.

The live, continuous, and persistent data is used in conjunction with data from the IoT to provide suggestions for available parking spots or electric charging points in real time.

Traffic/Movements

The imaging system collects live, continuous, and persistent data for traffic management, incident management, safety, security and control.

The live, continuous, and persistent data collected for traffic management, incident management, safety, security and control is used to determine traffic flows or real time incidents.

The live, continuous, and persistent data collected for traffic management, incident management, safety, security and control is used for geo-fencing purposes.

The live, continuous, and persistent data collected for traffic management, incident management, safety, security and control is used for security purposes, such as tracking the movement of people or vehicles.

Buildings

The imaging system collects live, continuous, and persistent data to be used in undertaking real-time monitoring and benchmarking of building parameters such as usage, energy efficiency, fire risk, insurance damage, maintenance tasks.

The imaging system collects live, continuous, and persistent data to be used in undertaking real-time monitoring and benchmarking of building parameters, the live, continuous, and persistent data including building data as well as data for the background and ambient environment.

The imaging system collects live, continuous, and persistent data of thermal signatures of buildings.

The live, continuous, and persistent data of thermal signatures of buildings enables energy ratings, reports and optimised plans to be created.

The live, continuous, and persistent data of thermal signatures of buildings enables detection of ageing and insulation properties of building structures.

The live, continuous, and persistent data of thermal signatures of buildings enables leads to environmental charging/credits by building/asset.

The imaging system collects live, continuous, and persistent data for the monitoring of change in the natural and built environments.

The live, continuous, and persistent data for monitoring of change in the natural and built environments enables detection of millimetric changes or deformations.

The live, continuous, and persistent data for monitoring of change in the natural and built environments enables a property surveillance and management service that can include evidence of any event e.g. movements, deliveries, access, usage (including heat, lights, watering etc.).

The live, continuous, and persistent data for monitoring of change in the natural and built environments enables monitoring of daily patterns of life that can contribute to more efficient designs.

The live, continuous, and persistent data for monitoring change in the natural and built environments enables detection of events such as fires, floods, earthquakes, tsunamis, storms, avalanches, and pest infestations in real-time, which is used to accurately direct emergency services as well as provide accurate information (a live video stream).

The live, continuous, and persistent data for monitoring change in the natural and built environments enables monitoring of vegetation and crops, the live visibility data being used to optimise treatment and care of the vegetation and crops based on parameters such as growth rate and quality.

Insurers, Finance, Service Providers

The live, continuous, and persistent data is applied to the insurance industry in applications including, but not limited to, remotely assessing a risk and evaluating an event.

The live, continuous, and persistent data is applied to the finance industry in applications including, but not limited to, assessing the use, quality and progress of assets.

The live, continuous, and persistent data is applied to services for a property and its land in applications including, but not limited to, roof repairs, fencing, painting, gardening, the property's performance (thermal/energy), and the property's safety and security.

Miscellaneous the plane is a dual fuselage plane with an approximately 25-40 m wingspan.

F.14 Plane Includes Sensors for Geophysical Surveys

Additionally, the Solaris plane can also include sensors such as fly magnetometers and gravimeters to measure the earth's magnetic and gravitational field, respectively, and to map both land and oceans. The sensors may be directly mounted on the Solaris plane and are configured to provide high-resolution geophysical data over large areas. Magnetometers and gravimeters, hyperspectral and thermal imagers can be used when Solaris is monitoring seismically active areas; being able to persistently monitor seismically active areas and to generate continuous data over the many weeks leading up to an actual seismic event may enable us to build better earthquake prediction models, e.g. using machine learning. Conversely, with satellites, the data is not continuous-a typical LEO satellite with an orbital period of 120 minutes and a velocity of 27,000 Km/h might only be over the same area of the planet for a fraction of a second each day, whereas a Solaris plane can loiter directly over a target area for many weeks, providing continuous data throughout that time.

Solaris can also combine multiple 3D data sets to reveal more accurate, deeper insights—e.g. terrain or structure deformation from LiDAR/Radar/SAR combined with photogrammetry, e.g. for near-real-time uses, such as: monitoring: Tectonic movements; Coastlines and erosion/risks; Waterways, rivers, levies, land features; deformations and risks of breach, slides; Buildings and infrastructure—health, leaning/movement, preventative maintenance/mitigation, optimization.

Solaris planes can generate the data needed for accurate magnetic and gravimetric maps. These maps have useful properties, such as:

The maps vary constantly with changes in the earth's mantle.

The maps are indicative of tectonic activity and risks.

The ocean maps are useful for sub-sea navigation—as no GPS signals are available under the ocean and inertial platforms often drift over time.

The maps are useful for navigation in GPS/GNSS denied environments.

Magnetometers and gravimeters can be small and compact and make use of quantum sensing technologies, allowing for easier integration into the Solaris plane.

In one embodiment, this is operable to be generalized as a solar powered plane configured to operate in the stratosphere including geophysical sensing instruments (such as magnetometers, gravimeters, hyperspectral imagers and thermal imagers) configured to capture continuous data for geophysical surveys.

Optional features include any one or more of the following:

The solar powered plane is part of a constellation of planes collecting continuous data for geophysical surveys.

The geophysical sensing instruments are located within the wings of the plane.

The geophysical sensing instruments include magnetometers and gravimeters that make use of quantum sensing technologies.

The continuous data for geophysical surveys is used to generate accurate magnetic and gravimetric maps.

the plane is a dual fuselage plane with an approximately 25-40 m wingspan.

F.15 Characterizing 3D Spaces

There are many new impact/climate applications which the Solaris system is ideally suited for, because the relative proximity of Solaris planes to the earth surface (compared to satellites) yields high SNR and the persistence of Solaris planes (compared to satellites) delivers deep data sets and integration times that allow for granular detection in 3D spaces. Typical applications include:

GHG (greenhouse gas) monitoring and pollution monitoring and characterizing columns of the atmosphere of scientific interest, e.g. for benchmarking natural/background levels of key gases, particulates, aerosols against pollutants and monitoring man-made peaks.

Using LiDAR (and other technologies) to map wind speeds at varying layers—meteorological, climate change, renewable optimization (turbines), aviation efficiency.

Using LiDAR and/or GNSS-R techniques to measure atmospheric moisture levels—e.g. atmospheric rivers that determine large parts of the hydrological cycle in US, Asia, etc., flood vs. drought planning.

Measuring the dynamics of ocean/sea characteristics is key to modelling the impact of climate change actions—e.g. when to spread alkaline chemicals or materials that accelerate the sea/ocean's ability to absorb $CO_2$ (marine Carbon Dioxide Removal) to match optimal absorption windows and avoid excess mixing between lower layers. Or fisheries, marine plant stocks and other natural resources you're aiming to enhance and/or protect.

And for commercial purposes—optimizing safety, energy efficiency etc., of all types of vessels (above and below marine).

Measuring ocean/sea surface characteristics—e.g. waves/roughness, currents, cycles, etc . . . for safe navigation, optimization.

Heat wave/heat island monitoring—climate change, agriculture, droughts, pest migration/swarm direction (often local heat bubble driven).

In one embodiment, this is operable to be generalized as a solar powered plane configured to operate in the stratosphere including remote sensing instruments (such as LiDAR and GNSS-R) to enable live, continuous, and persistent data collection across 3D spaces.

Optional features include any one or more of the following:

The solar powered plane is part of a constellation of planes collecting continuous data for characterising 3D spaces.

The remote sensing instruments are located within the wings of the plane.

The remote sensing instruments include LiDAR and GNSS-R instruments.

The live, continuous, and persistent data collected can include, but is not limited to, atmospheric data such as GHG (greenhouse gas), pollution, characterizing columns of atmosphere of interest, wind speed at varying layers, atmospheric moisture levels, temperature.

The live, continuous, and persistent data collected can include, but is not limited to, ocean/sea data such as waves/roughness, currents, cycles, temperature.

The plane is a dual fuselage plane with an approximately 25-40 m wingspan.

F.16 Synthetic Radar Return Pulse Generation

When operating as a network of planes, the Solaris aircraft are able to generate a synthetic radar return pulse that is associated with a different object travelling at a different velocity; this can be a useful way of testing and developing air traffic control systems.

When one Solaris aircraft deems that it has been 'painted' by radar, it provides a synthetically generated return radar pulse. The size of this return signal gives an indication as to the size of the object the Solaris aircraft is imitating. Generating a synthetic radar return is used by vehicles such as hot air balloons and small boats. Solaris enhances this by generating a sequence of synthetic returns across a network of Solaris planes. Given the information provided by the first 'painted' aircraft, a second aircraft can send a synthetic pulse at a determined interval imitating the same object as the first. The time difference between receiving these return signals in addition to their location gives the radar a false indication as to the position and speed of a non-existent aircraft. This could be further enhanced by additional aircraft that can further send return signals from their location to suggest continued motion of the non-existent aircraft. The extent to which this can continue is limited only by the size of the network of planes. So a network of Solaris aircraft can synthetically re-create the radar return of one or more aircraft, with predefined radar cross-sections, appearing to move across the network or constellation of Solaris aircraft at any arbitrary velocity.

This can be useful when testing the ability of new radar systems to accurately detect and track aircraft in the airspace they are monitoring.

Solaris planes can create synthetic aircraft radar signals through:

A first aircraft being 'painted' and sending an initial radar return signal.

The first aircraft communicating with the network of aircraft and prompting a second aircraft to send a radar return signal to give the impression of a non-existent aircraft in motion at a desired velocity.

Any number of further aircraft, limited only by the number in the network, providing further synthetic return signals to continue the impression of an aircraft in motion.

In one embodiment, this is operable to be generalized as a method of generating a synthetic radar return pulse using a constellation of solar powered planes, each configured to operate in the stratosphere, including the steps of (i) a first aircraft sending an initial radar return signal, (ii) the first aircraft communicating with a network of aircraft prompting a second aircraft to send a radar return signal giving the impression of a non-existent aircraft or object in motion at a desired velocity, (iii) any number of further aircraft in the network providing further synthetic radar return signals to continue the impression of an aircraft or object in motion.

Optional features include the strength of the synthetic radar return pulse determines the radar cross-sectional area of the non-existent aircraft or object.

We can generalise beyond radar to other detection systems: the principle of amplifying or altering the return signal in response to incoming waves can extend beyond radar to other domains. The general concept involves detecting an incoming signal (electromagnetic, acoustic, or otherwise) and returning an amplified or modified signal to deceive, disrupt, or enhance the perception of an observer or sensor. For example, in detection systems using lidar, spoofing could involve the aircraft or other object/vessel/vehicle (or constellation or networks of these) returning signals that suggest false distances, shapes, or object sizes; in telecommunications, returning amplified or modified signals could be used to spoof or disrupt communication systems, such as simulating a large number of devices in a network to create a denial-of-service effect; in the infrared spectrum, devices can emit heat or manipulate reflective properties to mimic a larger or hotter target.

As noted, these techniques could be implemented using not just Solaris planes, but also other object/vessel/vehicles: anything that can include a spoofing device, including people. For example, disabled people, elderly, children or other users who have low mobility, could wear a spoofing device of this sort; this device could help advance warn cars/trucks/vans and other traffic systems using e.g. LIDAR etc that they need extra time/space so the spoofing device returns a signal that indicates a much closer object than the actual person, to ensure that the approaching vehicle slows down/stops longer/sooner to give them a wider margin of safety. Also pets (horses) and other animals could have this device on their collar; cyclists with this device could give them a wider safety margin and help them feel more comfortable riding their bikes In all these cases, the spoofing device simulates size, faster (to warn others to slow down/stop sooner) or slower depending on what is best for the user.

F.17 Below Horizon Aircraft Monitoring

The Solaris plane, or a constellation of Solaris planes, can act as one or more aerial relay stations to bridge coverage gaps in air traffic control (ATC) radar systems. By equipping the one or more Solaris planes with a specialised payload to detect and relay ADS-B (Automatic Dependent Surveillance-Broadcast) signals from aircraft transponders, the one or more Solaris planes can utilise the high altitude at which they operate to maintain line-of-sight communication with aircraft that are otherwise below the radar horizon.

This system enhances situational awareness for ATC, improves safety by reducing blind spots, and supports more efficient airspace management, with the added advantage of leveraging a cost-effective and sustainable high-altitude platform. The system could be particularly useful in remote, mountainous or oceanic regions.

The specialised payload includes an ADS-B receiver as well as a data relay system such as satellite communication (SATCOM) or high-speed line-of-sight data links such as radio frequency (RF) or laser-based systems.

In one embodiment, this is operable to be generalized as a solar powered plane configured to operate in the stratosphere including a payload configured to receive and relay transponder signals from aircraft, such as ADS-B (Automatic Dependent Surveillance-Broadcast) or other identification systems

F.18 Imaging Systems for Cloud Penetration

For all use cases discussed in Key Feature Group F, the Solaris plane must maintain imaging operation during periods of cloud cover. The Solaris plane would be flawed if it could only provide reliable data during periods of clear skies.

The Solaris plane can maintain continuous imaging through use of a combination of specialised technologies designed to penetrate cloud cover, atmospheric interference and other obstructions. The technologies often make use of parts of the electromagnetic (EM) spectrum that can partially or fully penetrate clouds. This does not include visible light.

The following systems could be used either independently or in conjunction with one or more other systems to provide continuous imaging data, even during times of cloud cover:

- Synthetic Aperture Radar (SAR)—SAR uses radar waves, which are part of the electromagnetic spectrum and can penetrate through clouds, rain and darkness. The system sends radar pulses towards the ground and measures the reflected signals to construct detailed images. It is a suitable imagining system in this case as works in all weather conditions, can provide high-resolution images even at long range and can detect shapes, textures and surface movements. This enables SAR to monitor landscapes, track vessels and identify structures.
- Infrared Imaging—Infrared sensors detect thermal radiation emitted by objects. While clouds can scatter visible light, they are less obstructive to certain infrared wavelengths. This is useful for detecting heat signatures from vehicles, machinery, or warm-bodied organisms and it can distinguish objects based on temperature differences. However dense or thick clouds may reduce resolution, especially if water vapor content is high.
- Hyperspectral Imaging—Hyperspectral imaging sensors capture data across many wavelengths, including those that penetrate thin clouds. By analysing the spectral signatures, it can identify materials and objects on the ground. The system can differentiate materials based on their unique spectral fingerprints and is effective in thin or broken cloud cover. It is less effective in dense cloud conditions.
- Millimetre-Wave and Sub-Millimetre-Wave Radar—These systems operate in higher-frequency radar bands capable of penetrating cloud cover while maintaining reasonable resolution. They are ideal for detecting small or concealed objects and are less affected by weather compared to visible and infrared sensors.
- LiDAR (Laser Imaging Detection and Ranging)—LiDAR uses laser pulses to map the terrain. While it is primarily line-of-sight and struggles with dense clouds, multi-wavelength LiDAR systems can sometimes penetrate thin clouds. They have high precision in mapping topography and can be paired with other systems like SAR for enhanced imaging.
- Multimodal Sensor Fusion—Combining data from multiple sensors (e.g., SAR, infrared, and optical systems) allows for enhanced imaging through cloud cover. This mitigates limitations of individual sensors and provides richer and more accurate data by cross-referencing different imaging methods.
- Advanced Signal Processing and AI Algorithms—Using machine learning and advanced algorithms, noise from clouds can be filtered out, and missing data can be reconstructed from partial observations. This enhances resolution and detail in challenging conditions and can provide predictive insights based on patterns.

When selecting appropriate imaging systems for a task, the following key factors should be considered:

Atmospheric Conditions: The effectiveness of these methods depends on cloud density, thickness, and composition (e.g., water vapor vs. ice crystals).

Sensor Range and Altitude: Higher altitude systems often benefit from less interference but may lose resolution.

Real-Time Capabilities: Some technologies, like SAR, are better suited for real-time imaging, making them ideal for surveillance.

By using these technologies, surveillance aircraft can effectively monitor and image ground-based objects even in challenging weather conditions.

In one embodiment, this is operable to be generalized as a solar powered plane, such as a plane configured to operate in the stratosphere, including one or more imaging systems, the one or more imaging systems utilising technologies configured to penetrate cloud cover or other obstructions.

Optional features include any one or more of the following:

One or more of the imaging systems configured to penetrate cloud cover or other obstructions is a Synthetic Aperture Radar (SAR) system.

One or more of the imaging systems configured to penetrate cloud cover or other obstructions is an infrared imaging system.

One or more of the imaging systems configured to penetrate cloud cover or other obstructions is a hyperspectral imaging system.

One or more of the imaging systems configured to penetrate cloud cover or other obstructions is Millimetre-Wave or Sub-Millimetre-Wave Radar system.

One or more of the imaging systems configured to penetrate cloud cover or other obstructions is a LiDAR system.

The data from multiple imaging systems is combined e.g. in a sensor fusion system to allow for enhanced imaging.

One or more of the imaging systems provides real-time, continuous and persistent imaging data to an AI-based system configured to filter out noise and reconstruct missing data from partial observations.

The plane is a dual fuselage plane with an approximately 25-40 m wingspan.

F.19 Cloud Characteristic Monitoring

The Solaris plane, or a constellation of Solaris planes, can include a payload that can measure a variety of cloud characteristics. These characteristics can be used to provide an indication of the likelihood of adverse weather, such as very heavy rain, very high winds. Measurements of the cloud characteristics can be used in conjunction with one another to accurately predict adverse weather events. This data can be used to predict the worst affected areas, for which necessary preparations, e.g. flood preparation, evacuation, stay-indoors alerts, can be made. As noted earlier, Solaris planes can provide live, continuous (e.g. 24/7), and persistent (days or weeks) monitoring, and can hence provide far more detailed monitoring of evolving cloud characteristics—e.g. Solaris planes can loiter near a major storm system, providing far more detailed and accurate data than is possible using satellites.

Below is a list of cloud characteristics that could be measured by instruments deployed as Solaris payloads:

Cloud Top Temperature—The temperature of the top of clouds is a good indication as to the strength and severity of an ongoing or imminent storm. Cold temperatures at the top of clouds indicate convective activity, which leads to precipitation. There is a negative correlation between temperature of the cloud top and the intensity of the expected precipitation. If the temperature of the top of the cloud measured −50° C., for example, there is an indication of significant convection. Solaris planes can use infrared radiometers, thermal imaging cameras, lidar (with temperature profiling) or other instruments to measure the temperature of the top of the clouds.

Cloud Height and Vertical Development—Tall clouds like cumulonimbus indicate severe weather due to strong vertical motion. They are crucial for predicting thunderstorms, hail, and tornadoes. Solaris planes can measure cloud height and thickness using lidar, radar, or optical systems.

Cloud Water and Ice Content—High water or ice content suggests the potential for heavy precipitation or hail. This characteristic is vital for identifying the intensity of storms. Solaris planes use cloud radar and microwave radiometers to measure water and ice concentrations.

Cloud Optical Thickness—Thick clouds often correspond to high moisture levels, which can lead to intense storms. This helps in understanding cloud dynamics and precipitation potential. Solaris planes can estimate optical thickness using sun photometers and spectrometers.

Cloud Temperature Gradients—Steep temperature gradients reveal strong updrafts associated with severe storms, including tornadoes. This helps in tracking storm intensification. Solaris planes use infrared radiometers and hyperspectral imaging to measure temperature variations within clouds.

Cloud Base Temperature and Altitude—Low cloud bases can signal flooding potential or severe thunderstorms, making this characteristic essential for early warnings. Solaris planes measure cloud base height and temperature using lidar or temperature-humidity profilers.

Cloud Electrification—Electrified clouds are precursors to lightning, which is a marker of storm intensity and severe weather. Solaris planes gather this data using electric field sensors and lightning detectors.

Cloud Motion and Wind Shear—Rapidly moving clouds and wind shear are associated with hurricanes and tornadoes, providing insights into storm dynamics. Solaris planes track cloud motion and wind patterns using Doppler radar and high-resolution imaging.

Precipitation Formation—Clouds producing heavy rain, hail, or snow signal strong storm activity. Understanding this helps predict flooding and other severe weather outcomes. Solaris planes measure precipitation intensity with rain radar and microwave sensors.

Cloud Morphology—Specific shapes like anvil or wall clouds are indicators of severe thunderstorms or tornadoes. This helps in identifying storm types and predicting their evolution. Solaris planes capture cloud structures using optical and infrared imaging systems.

Cloud Microphysical Properties—The size and distribution of droplets and ice particles influence precipitation and storm dynamics. Monitoring these properties aids in understanding storm formation. Solaris planes use spectrometers and polarimetric radar to measure particle distributions.

It is advantageous to use planes configured to operate in the stratosphere to measure cloud characteristics for numerous reasons. Firstly, the high-altitude operation of the Solaris plane is beneficial as operating above the troposphere reduces interferences from lower-level weather phenomena. Secondly, by implementing a Solaris plane, or a constellation of Solaris planes, continuous monitoring is possible as the planes can loiter over a location of interest. Thirdly, the Solaris planes provide both flexibility and precision in comparison to satellites as they can be directed to specific regions of interest while providing higher-resolution data. By leveraging these capabilities, the Solaris plane improves preparedness for future storms.

In one embodiment, this is operable to be generalized as a solar powered plane, such as a plane configured to operate in the stratosphere, including a payload of one or more instruments configured to image or otherwise measure cloud characteristics.

Optional features include any one or more of the following:

- one or more of the instruments measure one or more cloud characteristics independently of other instruments.
- Data from one instrument is used in conjunction with data from one or more other instruments at a data fusion system to provide a measurement of one or more cloud characteristics.
- one or more of the instruments configured to measure cloud characteristics is an infrared radiometer.
- one or more of the instruments configured to measure cloud characteristics is a thermal imaging camera.
- one or more of the instruments configured to measure cloud characteristics is lidar.
- one or more of the instruments configured to measure cloud characteristics is synthetic aperture radar.
- one or more of the instruments configured to measure cloud characteristics is an infrared camera.
- one or more of the instruments configured to measure cloud characteristics is a hyperspectral imaging system.
- one or more of the instruments configured to measure cloud characteristics is a Doppler radar system.
- one or more of the instruments configured to measure cloud characteristics is a high-resolution imaging system.
- one or more of the instruments configured to measure cloud characteristics is an electric field sensor.
- one or more of the instruments configured to measure cloud characteristics is a lightning detector.
- one or more of the instruments configured to measure cloud characteristics is a temperature-humidity profiler.
- one or more of the instruments configured to measure cloud characteristics is a spectrometer.
- one or more of the instruments configured to measure cloud characteristics is a polarimetric radar system.
- one or more of the instruments configured to measure cloud characteristics is a sun photometer.
- one or more of the instruments configured to measure cloud characteristics is a microwave radiometer.
- one or more of the instruments configured to measure cloud characteristics is a cloud radar system.
- One or more of the instruments provides real-time, continuous and persistent imaging data to an AI-based system configured to analyse cloud characteristics.
- The plane is a dual fuselage plane with an approximately 25-40 m wingspan.

In various missions described herein, payloads may be positioned in fuselage compartments, within wing-mounted compartments, or within removable leading-edge D-section modules, depending on the specific field-of-view, environmental sampling, or communications requirements of the mission.

Feature Group G: Additional Features

This section outlines additional features. Any one or more of the features or optional features described below may be combined, in whole or in part in any permutation, with the one or more of the other features or optional features described herein, as well as with any one or more of the key features or optional features described above.

G.1 Reducing Kinetic Energy Risk to Meet a Safety Threshold

We reduce the kinetic energy of any item of the plane hitting the ground to below the safety thresholds required by regulators (for example, the EASA requirement that transferred energy to a person is less than 80 Joules, and the additional requirement that impact energy is less than 175 Joules). Below these thresholds, the risk of serious injury to a person is sufficiently low. This kinetic energy reduction is used when for example; there has been a loss of control (e.g. loss of communications) or have had to enact a flight termination or any other scenario when we want to safely bring the platform down.

In some embodiments, the platform is designed such that its inherent modularity, low mass distribution, structural flexibility and vibration spectrum behaviour all contribute to reducing the initial impact energy and the imparted kinetic energy, thereby ensuring that impact energies remain below regulatory thresholds even before, or in combination with, additional descent-control measures.

As used herein, 'transferred energy' refers to energy transferred from an item of the aircraft to an impacted object (for example the ground, a person, or another object) during an impact event, and may be expressed as a kinetic energy of the impacted object after impact and/or as an energy dissipated by deformation and damping in the aircraft item and/or the impacted object. 'Kinetic energy imparted on impact' refers to transferred energy as defined above and is used interchangeably with 'transferred energy' in this description.

In some embodiments, the kinetic energy imparted on impact (and/or transferred energy to a person or other object) is time dependent, particularly for a flexible long span airframe, such that transferred energy may evolve after initial contact due to structural compliance, vibration, and wave propagation through wing and fuselage structures. Accordingly, in some embodiments, compliance with a kinetic energy safety threshold is assessed with respect to a relevant interaction interval following first contact (for example, an initial interval prior to subsequent ground contact, rebound, separation, or other secondary event), and the solar powered plane is configured such that one or more of structural flexibility, damping behaviour, modular separation, and mass distribution reduce the transferred energy during the relevant interaction interval even where additional oscillatory energy exchange could occur over longer time periods.

In some embodiments, the transferred energy to a person or other impacted object can be modelled, estimated, and/or bounded as a function of one or more parameters including: (i) impact position along a wingspan or other structural span, (ii) mass ratio between an impacted object and the aircraft or a structural section of the aircraft, and (iii) time-dependent structural response of the aircraft. For example, in some embodiments, an impact position parameter is defined between a spanwise centre and a spanwise end, and transferred energy is evaluated for impacts occurring at different positions. In some embodiments, time-dependent transfer is assessed using a normalised time based on a structural frequency (for example a first flexural frequency) so that transferred-energy behaviour may be generalised across different wingspans, masses, and stiffness profiles.

We achieve this by:

1. Tethering all the structural sections of the plane together and attaching the tethered sections to a parachute (or other braking system) that automatically or manually deploys when the kinetic energy reduction process is needed (e.g. on an airframe failure etc); the tether keeps all of these sections together (especially important if there has been an airframe failure) and the parachute etc. slows the descent of the tethered plane (or its fragments) of the airframe to below a threshold speed needed to ensure that a regulatory or legal limit is not breached; this could be 2 m per second at the ground. The descent speed is a function of the size and design of the parachute and other factors, such as the weight of the plane. The parachute is designed with these factors in mind, and the target kinetic energy and impact speed that cannot be exceeded if the overall system is to sit within a desired regulatory or legal standard—typically one that requires less stringent safety standards to be met by the plane.

In further embodiments, the modular architecture of the plane and its flexible wing structures inherently limit the initial impact energy by dissipating vibrational energy and by preventing large masses from acting as single heavy impactors.

2. Even at a 2 m/s descent, no single item should weigh more than about 4 kg. when the parachute (or other braking mechanism) is deployed, it's tether is connected to a series of tethers to each of the batteries (and any other high mass item—e.g. payload, sensor . . . ) and as the parachute etc is deployed, that automatically triggers a release action, such as pulling a pin, that releases these tethers. This release mechanism is operable to be:

- mechanical (via braking system release/tether),
- electronic (e.g. onboard sensor that actuates to release under certain conditions-altitude, temperature, force, sequence of events, structural failure, or loss of power),
- remotely via an actuator (e.g. RockBLOCK, Iridium, cellular, or similar remote control unit).

The release mechanism may be actuated by an onboard autonomous trigger, not dependent on RockBlock, or other communications, and not solely linked to deployment of the braking system but instead activated by a detected onboard condition such as altitude, temperature, acceleration, structural failure, or loss of power.

This mechanism ensures that no individual item retains excessive mass at impact, thereby reducing the imparted kinetic energy and maintaining compliance with regulated thresholds.

3. If the batteries were retained in a wing, then that wing+multiple batteries structure would weigh well over 4 Kg, so on an airframe failure, batteries and other heavy payloads are automatically released from their payloads, and each are then suspended from the wing by a tether of several m in length. So the batteries etc. are separated from the wings and suspended several m below the wing section and hit the ground first; this ensures that no single item that weighs more than about 4 kg impacts the ground (or any person on the ground)—each battery impacts at approx. 25 J but since they are all physically separated, no single impact breaches the 80 J threshold or the 175 J impact energy limit.

4. A release mechanism, such as a RockBlock or an onboard autonomous trigger, is used, if the airframe fails e.g. trigged by the parachute release, to drop the batteries from the frames that they are supported on, inside the wing leading edge payload sections. The foam of the leading edge can be formed e.g. with fault lines, so that a falling battery can easily break through the foam and can then drop on its tether to be suspended several m below the wing. The wing leading edge (and even the wing skins as we may mount items aft of the wing spar within the wing section) are relatively brittle/weak materials: the foam used for the leading edge is RAVATHERM™ XPS R×H LB Extruded Polystyrene Foam, but other foams may be used. Heavy items will likely just break through them without needing to 'score' the material, though that would be an option to ensure clean release/breakthrough. The use of intentionally weak or frangible structures, such as foam, further reduces impact forces by preventing heavy components from remaining within rigid structures that would otherwise increase initial impact energy 5. The release could be triggered when the tethers within the airframe go taut, which is a different mode—i.e. airframe failure, no chute/braking or before this happens. It could be by each section that has failed, so that only its load is dropped, giving options on the sequence of crash/termination. This enables selective reduction of mass per impacting item, ensuring that imparted kinetic energy remains below safety limits even under complex failure modes.

6. Using more than 1 braking mechanism (the main chute) is possible to ensure more control during descent as required—e.g. to control descent angle, on each wing section in case of catastrophic failure. This enables the platform to be automatically oriented as it descends to a particular impact angle to further minimize the KE risk, such as tail first, or at an oblique angle so that say one wing tip impacts first and acts as a crumple zone slowing down the rest of the mass behind it.

Structural flexibility and vibration-spectrum behaviour assist in dissipating energy during controlled or uncontrolled descent, contributing to overall low kinetic energy risk.

In some embodiments, orienting the plane such that a spanwise end region (e.g., wingtip or other low-mass/compliant region) is more likely to contact first reduces the transferred energy to an object or person compared with an impact nearer a spanwise centre, subject to impact conditions.

7. Some form of warning may be added e.g. flashing/strobe light, siren or audible warning so that people below the falling platform can take evasive action and further reduce the probability of someone being hit (which is part of the risk calculation). This would also be triggered by one of the release mechanisms above.

8. Example of impact modelling. In an example calculation for a high-altitude platform system (HAPS) or other long-wingspan solar powered plane descending under the control of a braking system such as a parachute, kinetic energy may be evaluated both before and after an inelastic collision with an impacted object. In one set of example cases, the plane is characterised by representative values of airframe mass, wingspan, and downward speed, and the impacted object is characterised by a representative target mass, for example representing a higher-mass target case and a lower-mass target case, as shown in Table 1 in FIG. 29.

In this example methodology, results may be tabulated for (i) an initial kinetic energy of the plane prior to collision ($KE_{initial}$), (ii) a kinetic energy associated with the plane after collision ($KE_{airframe}$), and (iii) a kinetic energy transmitted to the impacted object ($KE_{target}$), where KEtarget represents energy (in joules) transmitted to the impacted object.

In addition, the collision may be parameterised by a collision position along the span, for example where collision position=0 corresponds to a spanwise centre location and collision position=1 corresponds to a spanwise end location (e.g., wingtip).

In the illustrated example results shown in the table in FIG. 30, $KE_{target}$ varies with collision position (centre versus wingtip) and with target mass (higher-mass target versus lower-mass target), demonstrating that transferred energy to an impacted object can depend on impact location along the span and on a mass ratio between the impacted object and the plane, subject to collision conditions.

Figure 31:
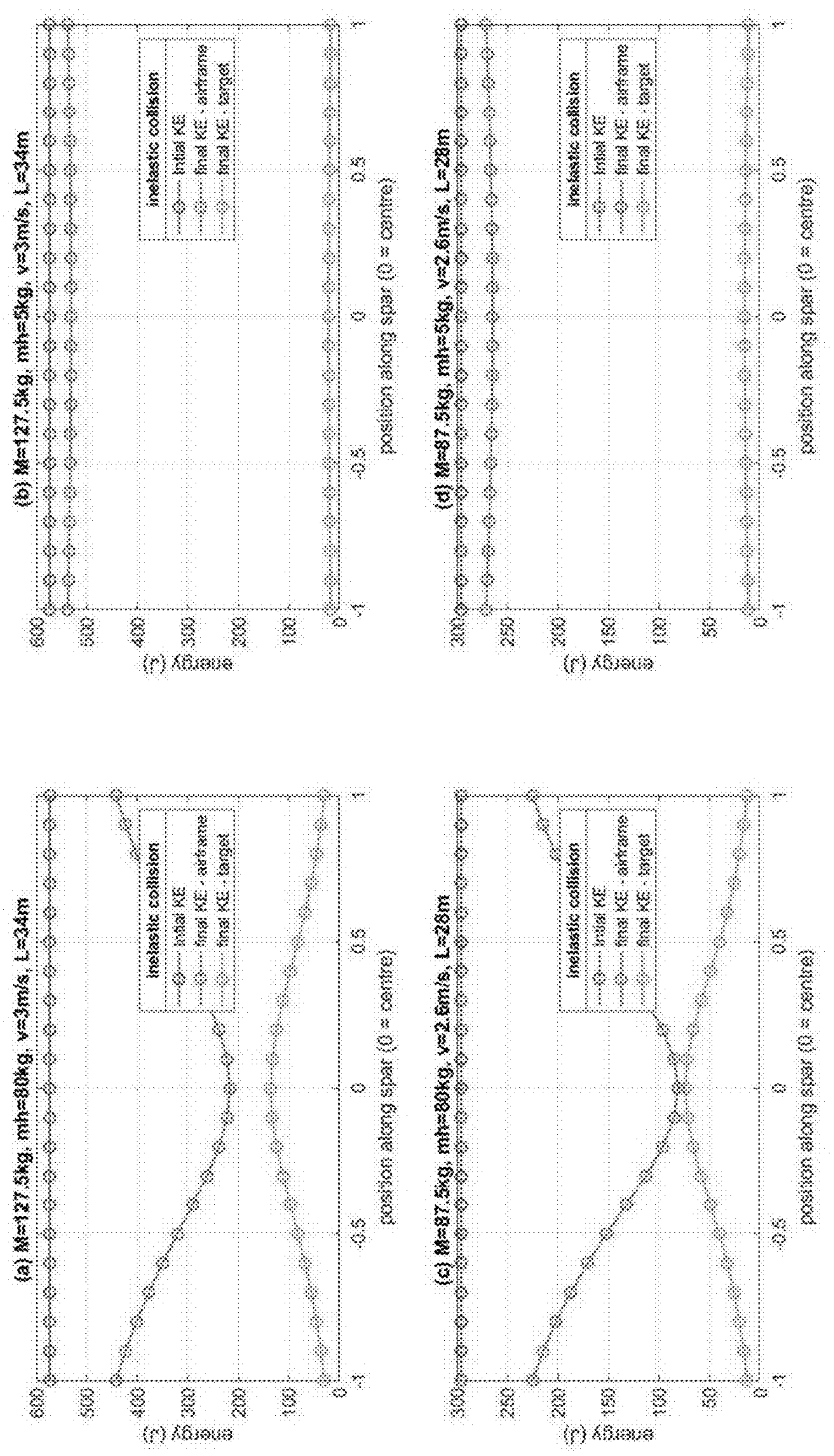
FIG. 31 illustrates an example of inelastic collision calculation between a falling airframe and a target according to one embodiment of the present invention.

FIG. 31 shows an example of inelastic collision calculation between a falling airframe and a target. The kinetic energy may be assessed as a function of impact position along a spanwise member (for example along a spar), where the position is expressed relative to a spanwise centre location. The initial kinetic energy of the falling airframe is substantially constant with respect to impact position, while a final kinetic energy associated with the airframe after collision and a kinetic energy transmitted to a target ($KE_{target}$) vary with impact position.

In representative higher-mass target cases, the example calculation illustrates that the energy transmitted to the target can be higher for impacts nearer a spanwise centre and lower for impacts nearer a spanwise end (e.g., wingtip), demonstrating that transferred energy can depend strongly on collision position along a long-span structure. In representative lower-mass target cases, the example calculation illustrates that transmitted energy to the target may be lower overall and may exhibit reduced sensitivity to collision position, subject to collision conditions and modelling assumptions.

Figure 32:
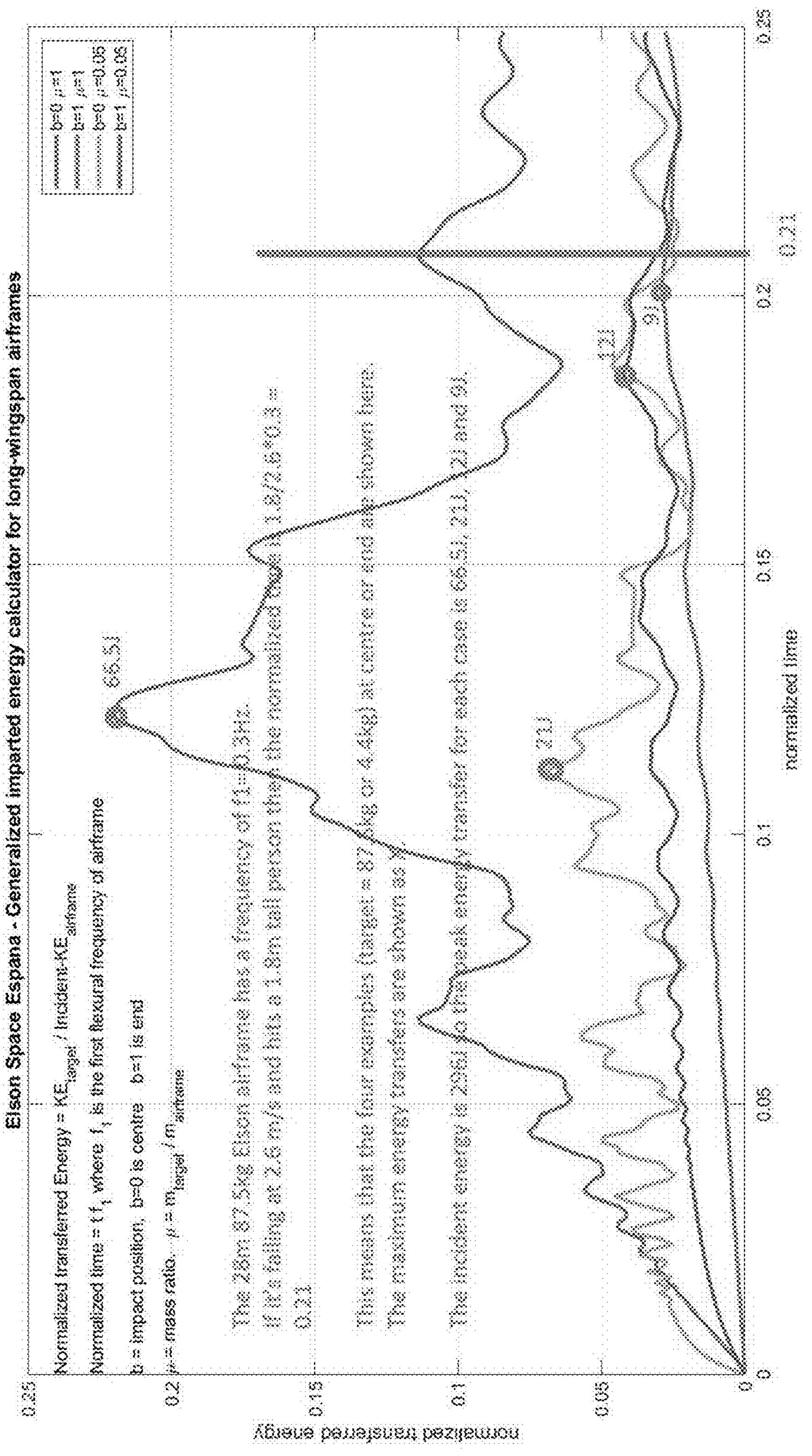
FIG. 32 illustrates results of normalized transferred energy for long wingspan airframes vs. normalized time according to one embodiment of the present invention.

FIG. 32 is an illustrative plot showing that transferred energy may evolve over time due to flexible structural response of a long-wingspan solar powered plane. In the illustrated example, transferred energy is presented in normalised form and plotted against a normalised time defined using a structural frequency of the airframe (for example, a first flexural frequency), enabling generalisation across different wingspans and stiffness profiles. The plot illustrates that transferred energy can build and oscillate after initial contact, and that assessment may be performed with respect to a relevant interaction interval following first contact.

In one embodiment, this is operable to be generalized as a solar powered plane, such as a plane configured to operate in the stratosphere, that includes a descent control system arranged such that, in the event of loss of control or airframe failure or flight termination, a transferred energy to an impacted object and/or kinetic energy imparted on impact, of any item of the plane that reaches the ground is reduced to less than a predetermined energy or a regulatory or legal safety threshold.

A solar powered plane, such as a plane configured to operate in the stratosphere, including one or more tethers interconnecting structural sections of the plane, and a braking system such as a parachute, in which the tether or tethers are arranged to keep the structural sections attached together in the event of loss of control or an airframe failure or flight termination, and the braking system is configured to deploy automatically or manually to reduce the descent speed of the plane or its sections to a value such that the kinetic energy, or the kinetic energy imparted on impact, of any item of the plane that reaches the ground is reduced to less than a predetermined energy or a regulatory or legal safety threshold.

A solar powered plane, such as a plane configured to operate in the stratosphere, configured such that transferred energy to a person or other impacted object during an impact event is reduced during a relevant interaction interval following first contact, wherein the reduction is achieved by one or more of: structural compliance, damping behaviour, modular separation, controlled impact attitude, and mass distribution.

A method of configuring and/or validating a solar powered plane configured to operate in the stratosphere to meet a kinetic energy safety threshold, comprising assessing transferred energy to an impacted object as a function of at least one of impact position along a span, a mass ratio between the impacted object and the plane or a structural section of the plane, and time-dependent structural response, and configuring the plane and/or its descent control system such that transferred energy during a relevant interaction interval is below a predetermined threshold.

Optional features are operable to include:

- the kinetic energy imparted on impact and/or transferred energy to an impacted object is less than the predetermined energy threshold during a relevant interaction interval following first contact.
- the relevant interaction interval is an initial interval prior to a secondary event comprising ground contact, rebound, separation, or a secondary impact.
- the solar powered plane and/or its descent control system is configured to reduce kinetic energy imparted on impact by controlling one or more of: (i) descent speed, (ii) impact attitude and likely first-contact location along the span, (iii) mass distribution and modular separation, and (iv) structural compliance and damping behaviour, to reduce transferred energy to an impacted object.
- the braking system is a parachute.
- the braking system is selected from one or more of: a parachute, a deployable wing surface, a drag panel, an airbag, a deployable aerodynamic foil, or other deployable drag-inducing structure.
- the braking system is configured to reduce descent speed to approximately 2 m/s at ground impact.
- the regulatory or legal safety threshold corresponds to an impact energy of less than approximately 175 Joules, or a transferred energy to a person of less than 80 Joules.
- the braking system is designed according to the weight of the plane and distribution of its structural sections.
- deployment of the braking system is triggered by an onboard sensor, a remote command, or detection of a specific event such as loss of control, airframe failure or flight termination.

Time dependent transfer

- the kinetic energy imparted on impact, and/or transferred energy to an impacted object, is assessed over a relevant interaction interval following first contact.
- the relevant interaction interval begins at first contact and ends upon loss of contact between the item and the impacted object.
- the relevant interaction interval begins at first contact and ends upon ground contact of the item.
- the relevant interaction interval begins at first contact and ends upon a secondary event comprising rebound, separation, or a secondary impact.

transferred energy to an impacted object is assessed as a function of an impact position along a span of the plane.

transferred energy to an impacted object is assessed as a function of a mass ratio between (i) an impacted object mass and (ii) a mass of the plane or a structural section of the plane.

transferred energy is evaluated over a relevant interaction interval following first contact, rather than only as a long-time peak.

time-dependent transfer behaviour is assessed using a normalised time based on a structural frequency of the plane, such as a first flexural frequency, to generalise assessment across different wingspans and stiffness profiles.

the descent control system is configured to bias first contact toward a spanwise end region and/or another low-mass and/or compliant region of the plane to reduce transferred energy to an impacted object.

the plane is configured such that at least one of structural compliance, damping behaviour, mass distribution, modular separation, and controlled impact attitude reduces transferred energy to an impacted object during a relevant interaction interval.

transferred energy is estimated using a collision model that accounts for conservation of linear momentum and angular momentum and a coefficient of restitution, and/or using a flexible-body model that accounts for time-dependent structural response.

the plane is configured and/or validated by assessing transferred energy across a plurality of impact scenarios having different impact positions and/or different impacted object masses.

High Mass Items the braking system is connected by one or more tethers to high-mass items of the plane, such as batteries or other high-mass payloads.

deployment of the braking system automatically triggers a release system.

the release system is configured to separate the high-mass items from their supporting structures and suspends them on individual tethers, so that no single item having a mass greater than about 4 kg impacts the ground without braking.

the release system comprises pulling a pin or other mechanical release coupled to the braking system or tether.

the release system is electronic, actuated by an onboard sensor that responds to at least one of: altitude, temperature, force, or sequence of events.

the release system is remotely actuated by an actuator such as a RockBlock or equivalent remote-control unit.

each tether suspends the high-mass item several metres below a structural section of the plane.

High Mass Items in the Wing Section the high-mass items include multiple batteries retained in a wing section.

high mass items are automatically released from their mounts in the wing.

each released item is suspended several metres below the wing by its tether.

the high mass items are suspended by individual tethers of several metres in length, such that the batteries and payloads are separated from the wing and descend ahead of the wing section, each item impacting the ground with a kinetic energy below a regulatory or legal safety threshold.

each battery impacts the ground with a kinetic energy of approximately 25 Joules.

the tethering arrangement ensures that no single item impact exceeds 80 Joules.

the arrangement ensures that no item with a mass greater than about 4 kg impacts the ground without braking.

Release Mechanism release system includes a release mechanism configured to drop one or more batteries from frames in which they are supported within a wing leading edge payload section.

the wing leading edge includes a foam material.

foam material is formed with fault lines, so that a falling battery can readily pass through the foam and be suspended on its tether.

the wing leading edge or wing skin is formed of a relatively brittle or weak material, so that a falling high-mass item can break through without additional scoring.

the release mechanism is configured to suspend each heavy item several metres below its corresponding wing section.

the wing leading edge or wing skins may support additional items aft of the wing spar, which can also be released and tether-suspended in the same manner.

Release System Triggered Independently from Braking System the release system is arranged to be triggered without deployment of a braking system such as a parachute.

the release system is arranged to be triggered before, after, or independently of deployment of a braking system.

the release system is arranged to be triggered by tension in one or more tethers of the airframe.

the release system is configured to drop one or more corresponding loads from the airframe.

the release system is associated with individual sections of the airframe, such that only the load of a section that has failed is released.

the release system is arranged to permit sequential release of loads depending on which section fails, thereby providing options for controlled crash or termination profiles.

the release mechanism is actuated by an onboard autonomous trigger that is not solely linked to deployment of the braking system and that is activated by a detected onboard condition such as altitude, temperature, acceleration, structural failure, or loss of power.

Multiple Braking Systems the plane includes more than one braking system, arranged to provide additional control during descent and to orient the plane into a selected impact attitude so as to reduce kinetic energy on impact.

the braking systems include a main parachute and one or more auxiliary parachutes.

the auxiliary braking systems are associated with individual wing sections.

the braking systems are arranged to orient the plane into a tail-first impact attitude.

the braking systems are arranged to orient the plane at an oblique angle such that a wing tip contacts the ground first.

the wing tip acts as a crumple zone, absorbing energy and slowing descent of the remaining mass of the plane.

the orientation during descent is controlled automatically by selective deployment of the braking systems.

Modular Architecture the modular architecture of the plane is arranged to limit initial impact energy by preventing large masses from acting as single heavy impactors.

Flexible Wings and Vibration Dissipation flexible wing structures dissipate vibrational energy during descent so as to inherently reduce initial impact energy.

Rigid Payload Bay the plane includes a rigid payload bay configured to maintain a fixed geometry independently of deformation of surrounding structures.

the rigid payload bay being arranged either to house only low mass payloads that individually satisfy a maximum energy impact threshold, or to house high mass payloads in combination with a release or tether suspension mechanism to ensure compliance with the kinetic-energy limit.

Warning System the plane includes a warning system configured to provide a human-perceptible warning during at least a portion of a descent event.

the plane includes a warning system configured to activate automatically in response to at least one of: (i) deployment of the braking system, (ii) actuation of the release system, (iii) detection of loss of control, (iv) detection of structural failure, or (v) receipt of a flight termination command.

the warning system is configured to alert people below the plane during descent so as to reduce the probability of impact with the plane or its components.

the warning system comprises at least one of: a flashing light, a strobe light, a beacon, a siren, a loudspeaker, or an audible alarm.

the warning system is configured to operate (i) for a predetermined time period, (ii) until ground contact of the plane or a released item, and/or (iii) until loss of contact between the plane or item and an impacted object.

the warning system is automatically triggered by deployment of a braking system such as a parachute.

the warning system is automatically triggered by actuation of a release system for a high-mass item.

the warning system provides a continuous or pulsed output during descent.

the warning system is configured to operate (i) for a predetermined time period, (ii) until ground contact of the plane or a released item, and/or (iii) until loss of contact between the plane or item and an impacted object.

G.2 Constant Chord Wings

All three wings have a constant chord, enabling just a single design of wing rib to be used for all wings, greatly simplifying production and reducing costs of production, servicing/maintenance, repair and also increasing the reliability of operation since there is just a single wing rib to model and to design-in reliability.

All three wings includes spars of the same length, again greatly simplifying production and reducing costs.

The rudders and the elevators are also all identical and have the same, constant chord-again enabling just a single design of wing rib to be used for all rudders and elevators, again greatly simplifying production and reducing costs of production, servicing/maintenance, repair and also increasing the reliability of operation since there is just a single wing rib to model and to design-in reliability.

Constant-chord or substantially constant-chord wings may incorporate removable leading-edge D-section modules, provided attachment points maintain aerodynamic continuity.

In one embodiment, this is operable to be generalized as:

A solar powered plane, such as a plane configured to operate in the stratosphere, that includes a plurality of main lift wings, the main lift wings being configured with a substantially constant chord so that a single rib design is employable across all of the main lift wings.

A solar powered plane, such as a plane configured to operate in the stratosphere, that includes a plurality of elevators, the elevators being configured with a substantially constant chord so that a single rib design is employable across all of the elevators.

A solar powered plane, such as a plane configured to operate in the stratosphere, that includes a plurality of rudders, the rudders being configured with a substantially constant chord so that a single rib design is employable across all of the rudders.

Optional features are operable to include one or more of the following:

the main lift wings include spars of substantially the same length.

the main lift wings each have a substantially constant chord such that a single rib design is employable across all of the main lift wings.

the elevators each have a substantially constant chord such that a single rib design is employable across all of the elevators.

the rudders each have a substantially constant chord such that a single rib design is employable across all of the rudders.

the rudders and elevators have substantially the same chord length.

the constant chord of the elevators and rudders differ from the constant chord of the main lift wings.

the use of constant chord wings and control surfaces reduces production cost, simplifies servicing and maintenance, and increases operational reliability.

G.3 Rectangular or Trapezoidal Cross-Section Wing Spars

The wing spars now have a constant rectangular or trapezoidal in cross-section (using the same carbon fibre/honeycomb structure as previously described for the circular x-section wing spars). A rectangular or trapezoidal x-section tube is easier to fabricate compared to a circular x-section tube and at the low speeds and accelerations at which the plane flies, and given its very low weight, the forces are essentially largely horizontal or essentially vertical, so that a rectangular x-or or trapezoidal section spar, oriented with sides very approximately (e.g. within 20 degrees of the horizontal and vertical), is surprisingly sufficient. As before, there are carbon fiber inner and outer surfaces, between which is a structural foam core (e.g. a polymethacrylimide (PMI) based structural foam such as Rohacell™, PVC foams, polyurethane foam cores, epoxy foams, or other structural core materials).

In some embodiments, one or more structural features described in Section A.2 may also be applied to wing structures and other airframe elements. In particular, one or more wing spars, spar caps, or other primary structural members may be formed using a layered composite construction comprising inner and outer composite layers with a lightweight core material disposed between the layers.

Although described herein in the context of a solar powered stratospheric aircraft, the described structural construction techniques are not limited to Solaris platforms and may be applied to other aircraft, including suborbital platforms, high-altitude aircraft, or other lightweight airframes.

In one embodiment, this is operable to be generalized as a solar powered plane, such as a plane configured to operate in the stratosphere, that includes one or more wing spars having a non-circular or non-elliptical cross-section and comprising fibre-reinforced composite outer surfaces with a structural core material.

Optional features are operable to include one or more of the following:

- the cross-section is rectangular or trapezoidal.
- the fibre-reinforced composite comprises carbon fibre.
- the structural core comprises a foam, honeycomb or lightweight filler.
- the outer and inner composite layers enclose the structural core.
- the cross-section is oriented with its sides substantially aligned with horizontal and/or vertical directions of the plane.
- the structure is suitable for low-speed, low-acceleration flight of a lightweight stratospheric plane.

G.4 Solar Cells Flush to the Wing Skin

We use a system that allows us to connect the solar cells flush to the wing skin and keep all of the wiring and tab joints inside of the wing by passing it through the skin. In one embodiment, this is operable to be generalized as a solar powered plane, such as a plane configured to operate in the stratosphere, that includes one or more wings having a wing skin, in which photovoltaic cells are mounted substantially flush with the wing skin.

Optional features are operable to include one or more of the following:

- electrical connections from the photovoltaic cells are routed through or beneath the wing skin so that associated wiring and tab joints are contained within the wing.
- the photovoltaic cells are provided as thin-film photovoltaic devices or photovoltaic foils.
- the electrical connections are protected from aerodynamic exposure by being embedded within or behind the wing skin.
- the photovoltaic cells cover a substantial portion of the wing skin to maximise energy capture.
- In some variants, solar cells may also be affixed to removable leading-edge D-section modules, enabling mission-specific photovoltaic configurations.

G.5 Latitude Extension

The Solaris platform can fly stratospherically at extended latitudes, including winter conditions with reduced solar irradiance. This is achieved through a combination of factors, including energy density of onboard batteries, power generated from advanced PV films, optimised PV useable area, aerodynamic airframe design, low drag profiles, dynamic flight path, and high efficiency propulsion and motor systems.

To overcome the operational high latitude or winter operation, currently constrained to for example approximately 45° north/south, the aircraft may incorporate or interoperate with a wireless power transfer system configured to provide direct power delivery and/or in-flight energy supply. (please see for example G.6 wireless power transfer) The integration of a wireless power transfer subsystem also mitigates the inherent limitations of onboard energy storage capacity and battery energy density, enabling continuous operation without dependence solely on solar energy availability. Future embodiments may incorporate power beaming from space based solar collector satellites, forming part of an orbital energy distribution infrastructure for high-altitude platforms. In another embodiment, the battery comprises an atomic battery, nuclear battery, radioisotope battery or radioisotope generator which uses energy from the decay of a radioactive isotope to generate electricity. Like a nuclear reactor, it generates electricity from nuclear energy but not using a chain reaction. Although commonly called batteries, atomic batteries are not electrochemical and cannot be charged or recharged. These batteries have extremely long lives and high energy density, so they a perfect alternative battery source for the plane or glider of the present invention, In contrast, during summer operation at such latitudes, solar irradiance may be significantly higher, with extended daylight periods Sustained operation under such seasonal and latitudinal variations is achieved in some embodiments through a combination of factors including onboard energy storage capacity, power generated from photovoltaic films, optimisation of usable photovoltaic area, aerodynamic airframe design, low-drag profiles, dynamic flight path control, and high-efficiency propulsion and motor systems.

In one embodiment, this is operable to be generalized as a solar powered plane, such as a plane configured to operate in the stratosphere, that is arranged to sustain flight during conditions of reduced solar irradiance, the plane including a power system and airframe design providing sufficient energy storage and energy generation capability to maintain flight under such conditions.

As described further in Section G.6, wireless power receivers may be distributed across multiple airframe surfaces to support thermal management and receiver field-of-view requirements.

G.6 Wireless Power Transfer (Microwave/RF and Optical) and Combined Communications for Sustained Stratospheric Operations Solaris has been investigating energy solutions for continuous operations in the stratosphere where certain physical constraints may limit how much energy can be carried or harvested from natural sources. For instance, in winter there may be fewer daylight hours, and the angle of solar energy incidence may be reduced when operating above or below approximately 45° latitude. In some scenarios, improvements in solar capture (currently on an asymptote in the 30% efficiency range) and/or lensing to correct for incidence angles may not, alone, provide sufficient harvested solar energy to close an energy budget for continuous operations.

The category of high altitude pseudo-satellites (HAPS), high altitude platform stations (HAPS), and/or suborbital platforms has to date commonly pursued solar power and rechargeable batteries for persistent operations. In some embodiments, an aircraft may additionally or alternatively use other onboard energy sources (for example fuel cells and/or carried reactants) to supplement power generation.

In some embodiments there is another approach: to transfer power to a Solaris suborbital platform through the air and thereby reduce limitations associated with onboard energy capture and storage. In one embodiment, wireless power transfer may be implemented using RF techniques such as microwave power transfer (which has been used in terrestrial applications and proposed for beaming energy from space solar stations), and/or using optical techniques such as lasers or other coherent photon-based energy transfer (e.g., free space optics (FSO)).

In some embodiments, RF wireless power transfer may be constrained by factors including beam spreading, receiver aperture size (e.g., antenna or rectenna arrays placed on an aircraft), path loss, and/or transmitter amplifier efficiency. In some embodiments, spectrum regulation and/or licensing may add operational complexity and may affect where such techniques can be deployed. In some embodiments, coherent optical power transfer may provide reduced beam divergence and/or improved coupling efficiency under suitable propagation conditions and may permit different regulatory treatment in some jurisdictions relative to RF spectrum licensing (subject to applicable law).

In some embodiments, industrial laser sources and optical amplifiers can support power transmission at kilowatt and/or multi kilowatt scale, and in some embodiments higher powers may be used depending on implementation constraints. In some embodiments, multi-wavelength (multi-colour) beams are used, increasing opportunities for combined power transfer and communications and/or enabling wavelength selective separation between a power channel and a data channel.

In some embodiments, a solar powered plane operating in the stratosphere has an average electrical load on the order of kilowatts, and wireless power transfer is configured to provide at least a portion of that load and/or to recharge onboard energy storage during periods of reduced solar availability. In some embodiments, received wireless power is used to directly supply onboard electrical loads during flight, either alone or concurrently with charging onboard energy storage.

In some embodiments, wireless power transfer is performed between a ground station and a solar powered plane operating at an altitude on the order of tens of kilometres, and the transmitted power is selected based on link losses, receiver aperture constraints, atmospheric conditions, and a target delivered electrical power at the plane. In one illustrative example, a solar powered plane operating at about 20 km altitude has an average electrical load of about 2 kW, and a ground station transmits an optical power beam of about 9 kW to deliver sufficient power for onboard loads and/or charging, subject to link losses and pointing constraints In some embodiments, a limitation of optical propagation for communications and/or power transfer is atmospheric dispersion and/or turbulence, cloud, or precipitation. In some embodiments, mitigation techniques include frequency/wavelength selection, wavefront techniques, adaptive optics, beam shaping, spatial diversity, and/or temporal diversity. In some embodiments, a high-power beam is used to create and/or maintain a propagation path through atmospheric clutter (for example thick clouds and/or dust), and a second beam is used within the created/maintained path to transmit data and/or additional power.

In some embodiments, optical links (including lasers and/or FSO) can provide a narrow-beam physical layer that may be resistant to interception and/or interference in some scenarios compared to broad-beam links and can be combined with cryptographic services including quantum key distribution (QKD) or other optical key distribution techniques when supported by terminal hardware.

Figure 33:
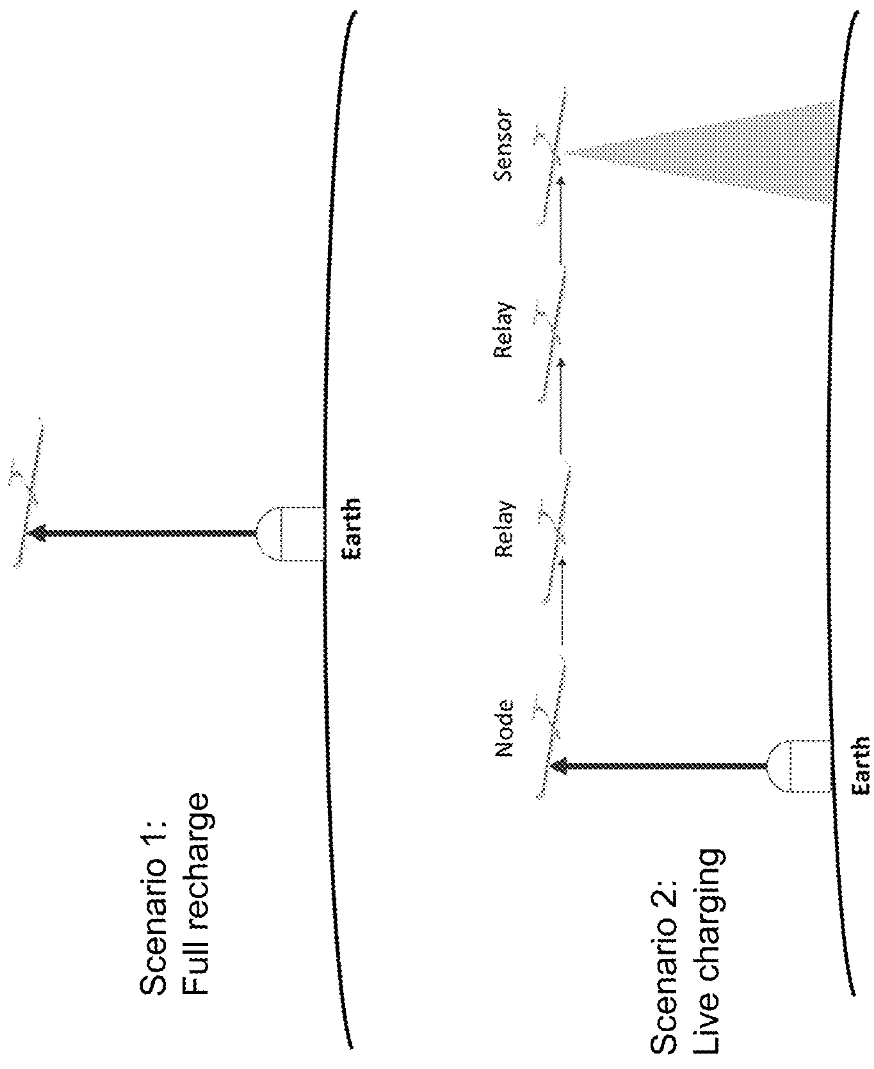
FIG. 33 illustrates two operating modes for wireless power transfer to a solar powered plane configured to operate in the stratosphere according to one embodiment of the present invention.

As an example, FIG. 33 illustrates two operating modes for wireless power transfer to a solar powered plane configured to operate in the stratosphere. In a first mode, a ground station transmits a directed wireless power beam to a plane for charging of onboard energy storage. In a second mode, the ground station transmits wireless power to a node plane which forwards at least a portion of the received power to one or more downstream planes, optionally via one or more relay planes, to supply in-flight electrical loads and/or charge onboard energy storage while a sensor plane performs a mission payload operation.

Figure 34:
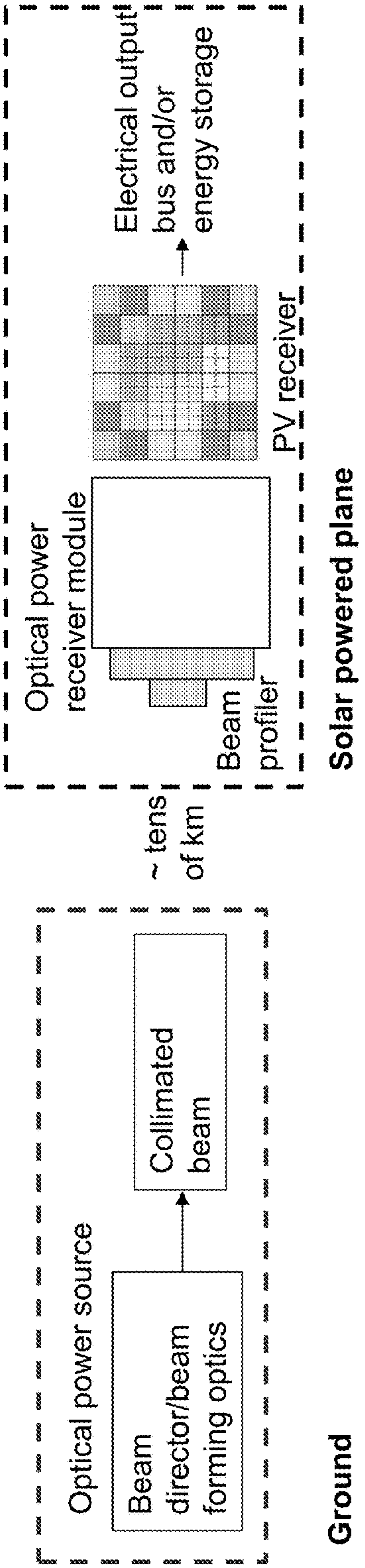
FIG. 34 illustrates an example of optical wireless power transfer arrangement according to one embodiment of the present invention.

FIG. 34 illustrates an example optical wireless power transfer arrangement in which a ground station comprises an optical power source and beam-directing/beam-forming optics configured to generate a directed collimated optical beam for transmission through the atmosphere over a link distance on the order of tens of kilometres. A solar powered plane comprises an optical power receiver module including a photovoltaic (PV) receiver arranged to capture at least a portion of the beam and provide electrical output for supply to an onboard electrical bus and/or onboard energy storage. In some embodiments, the solar powered plane further includes a beam monitoring element, such as a beam profiler, to support pointing and tracking of the optical power beam.

G.6A Wireless Charging (Microwave/RF/Optical)

Once the platform has recharged, it can return to its mission and may later return to recharge again. During summer months, recharging may be reduced or omitted; during months of reduced sunlight hours, or when operating conditions require higher energy consumption, the platform can return for recharging to provide continuous operations.

In some embodiments, the received wireless power is used to charge one or more onboard energy storage devices. In other embodiments, the received wireless power is used to directly supply operating power to one or more onboard systems while in flight. In further embodiments, charging and direct powering occur concurrently, such that wireless power supplements onboard generation and storage during operation.

In some embodiments, one or more wireless beams are aggregated and/or directed at the suborbital platform to deliver sufficient path and power. Often high-power wireless systems may be limited in output; multiple transmitters may be used in parallel to increase total transmitted power and/or improve resilience. Ground stations may also be deployed in diverse locations to improve pathways and likelihood of delivery, such that if one suffers interference or loss, one or more others continue delivery.

In some embodiments, when aligning a power beam to a suborbital platform, power is modulated in real time as the beam moves on and off a receiver target window, to reduce delivery outside of the receiver where it might cause interference or damage. Targeting feedback may include ground-based telescopes/sensors, a secondary steering beam (pilot beam) that is lower power, sensors on the platform, and/or real-time positional and/or attitude data streamed via onboard communications systems (e.g., satellite communications, or via another platform point-to-point through its connected ground point).

In some embodiments, the power used to create and/or maintain a pathway (including a conditioned-path technique) is modulated in real time to match path characteristics and ensure a target level of power delivery as atmospheric conditions vary (e.g., moving clouds, precipitation, variable clarity).

In some embodiments, for a fleet of platforms servicing mission areas (e.g., borders, wildfire-sensitive areas), a schedule for recharging ensures that there are always platforms over a mission area meeting a service level objective.

Microwave receivers or associated payloads may be housed in fuselage compartments or in removable leading-edge modules (e.g., D-section modules), depending on field-of-view or antenna-geometry constraints.

In some embodiments, wireless power receivers or associated payloads (including RF, microwave, millimetre-wave, optical, laser, or FSO receivers) are distributed across one or more external surfaces of the aircraft rather than being confined to a single location. For example, receivers may be positioned on wing upper surfaces, wing lower surfaces, tail planes, wing tips, fuselage surfaces, or combinations thereof, depending on the selected transmission technology, field-of-view requirements, and thermal management considerations.

Distributing receiver elements across multiple airframe surfaces can reduce local power density, improve heat dissipation, and provide flexibility in receiver orientation and pointing geometry. The Solaris platform may support through-the-air microwave charging of the on-board batteries.

In addition to direct ground to air transmission, one or more airborne platforms may act as relay nodes, receiving microwave power and forwarding it on to other gliders located several 100 km away. Calculations show that power can be transmitted over distances exceeding 700 km, with the airborne relay providing a vantage point above most of the atmosphere and thus enabling low loss, line of sight energy transfer to a distant aircraft.

Additionally, the wireless power system can be configured as a mesh-type distribution network, in which one or more airborne nodes receive power and redistribute it to multiple other airborne platforms. This enables a single powered node to act as a hub supplying energy to several planes in a fleet.

Remote power transfer can also be used during transitional phases of flight, such as take-off and climb, in order to supplement onboard power and ensure the plane is fully charged upon reaching operational altitude.

In one embodiment, this is operable to be generalized as a solar powered plane, such as a plane configured to operate in the stratosphere, that includes an energy storage system comprising one or more onboard batteries, in which the energy storage system is arranged to receive electrical power by wireless energy transmission through the air, such as by microwave, millimetre-wave, optical, or laser-based transmission.

Optional features are operable to include one or more of the following:

Wireless transmission is provided from a ground node or forwarded via an airborne relay node to one or more other solar powered planes.

The airborne relay node transmits power over distances of several 100 km, such as over 700 km.

The airborne relay node provides line of sight power transfer above most of the atmosphere, reducing losses compared to ground to air transmission.

multiple airborne relay nodes are used in series to extend the transmission distance.

the receiving solar powered plane recharges its onboard energy storage system while in flight.

the airborne node receives and re-transmits power while also using a portion for its own onboard energy storage system.

the wireless power transfer is arranged as a peer-to-peer or mesh-type distribution network.

the wireless power system is configured as a mesh network, in which one or more airborne nodes redistribute received power to multiple other airborne platforms or planes.

remote power transfer is used during take-off, climb, or other transition phases to ensure full charge at operational altitude.

Coherent optical wireless power transfer (laser/FSO):

In some embodiments, wireless energy transmission is implemented using coherent optical power transfer (e.g., lasers, FSO, or other coherent photon-based directed energy transmission) from one or more ground stations to a solar powered plane to provide energy for in-flight electrical load supply and/or charging of onboard energy storage. Coherent optical transmission may provide reduced beam divergence relative to lower-frequency RF approaches and may therefore allow smaller receiver apertures and/or improved coupling under suitable propagation conditions.

In some embodiments, the optical power beam is generated by a narrow linewidth and/or spatially coherent source, such as a single mode laser source, to reduce divergence and improve coupling to a receiver aperture at the solar powered plane. In some embodiments, the optical power beam is expanded and collimated at the ground station using a beam expander and/or telescope such that a far-field spot size at altitude is reduced relative to an unexpanded beam, subject to pointing and safety constraints.

A coherent optical power transfer system may include a ground station having an optical emitter (e.g., laser source) and a beam director (e.g., telescope, gimballed optics, phased optical array, adaptive optic element) configured to direct an optical power beam to a receiver on the solar powered plane. The plane may include an optical power receiver configured to convert received optical power to electrical power (e.g., photovoltaic conversion tuned to one or more wavelengths, thermal conversion, or other optical-to-electrical conversion).

In some embodiments, the optical power receiver comprises one or more photovoltaic receiver materials and/or stacks selected for a transmit wavelength, for example silicon, III-V materials, InGaAs, multi-junction structures, and/or wavelength-selective photovoltaic structures, thereby improving conversion efficiency at the selected wavelength (s) compared to broadband solar photovoltaic operation. In some embodiments, the receiver includes one or more optical filters, dichroic elements, and/or concentrator optics configured to couple one or more wavelengths to one or more receiver arrays. The converted electrical power may be delivered to an onboard electrical bus to power propulsion, avionics, communications, payloads and/or to charge energy storage (e.g., batteries, capacitors, fuel cells or other storage).

In some embodiments, industrial laser systems can deliver kilowatt and/or multi-kilowatt optical power and/or can operate with multi-wavelength beams, enabling wavelength separation between power transfer and communications or enabling additional capacity for combined power and communications.

In one embodiment, this is operable to be generalized as a solar powered plane, such as a plane configured to operate in the stratosphere, comprising: an optical power receiver configured to receive an optical beam transmitted through the air from a ground station or node and to convert the received optical power into electrical power; and an electrical interface configured to supply the electrical power to at least one of propulsion, avionics, communications, payloads, and onboard energy storage.

In one embodiment, this is operable to be generalized as a method of powering a solar powered plane comprising: directing an optical power beam from a ground station or node towards an optical power receiver on the solar powered plane; receiving the beam at the receiver; converting the received optical power into electrical power; and supplying the electrical power to at least one of propulsion, payload, avionics, communications, and onboard energy storage of the solar powered plane.

Optional features are operable to include one or more of the following:

- The optical power receiver comprises one or more photovoltaic receiver arrays tuned to one or more wavelengths of the optical power beam.
- The optical power beam is generated by a narrow-linewidth and/or single-mode laser source.
- The optical power receiver is distributed over multiple locations on the solar powered plane (e.g., wing upper surface, fuselage dorsal region, removable leading-edge module surfaces) to manage thermal load and/or reduce local power density.
- The ground station includes adaptive optics and/or wavefront correction to improve coupling efficiency at the receiver.
- The optical power beam is multi-wavelength and the receiver includes wavelength-selective elements and/or multiple receiver arrays optimised for different wavelengths.
- The optical power beam is multi-wavelength and the solar powered plane comprises wavelength-selective optics to direct at least one wavelength to power conversion and at least one wavelength to communications.
- The optical power receiver is distributed across the plane (e.g., wing and/or fuselage) to manage thermal load and/or reduce local power density.
- The optical power receiver is mounted on a gimbal or includes a steerable receiver optic to enlarge a tracking envelope.
- The optical power receiver is located on or within a removable module, such as a removable leading-edge module, and is electrically coupled to the plane via one or more connectors accessible upon removal of said module.
- The optical power receiver comprises one or more photovoltaic materials selected for the transmit wavelength, including silicon and/or III-V and/or InGaAs receiver structures.
- The optical power receiver includes wavelength-selective optics to split incident optical power into a power-conversion channel and a communications channel.
- The ground station includes refractive optics and/or reflective optics, including one or more lenses and/or a Fresnel lens, to collimate and/or focus the optical power beam.

G.6B Combined Wireless Power and Communications

During recharging, the link to the platform can be used to move data up/down to/from the platform. This can be achieved by a second direct point-to-point communications link or by using the power link as a communications carrier, combining power and communications in one. Both techniques may be used to provide communications diversity and robustness.

In some embodiments, data carried by modulation of the wireless power beam is detected at the solar powered plane by the optical power receiver itself, wherein small variations in received optical power are demodulated and tapped off from the power-conversion path to recover a data signal. In some embodiments, data carried by modulation of a wireless power beam is demodulated at the receiver by detecting variations in received power and extracting a corresponding data signal.

In some embodiments, the system provides combined power and data by spectral separation, in which a primary wavelength (or wavelength band) is used primarily for power transfer and a second wavelength (or wavelength band) is used primarily for communications. In some embodiments, a portion of a transmitted optical beam is optically coupled (for example using a beam splitter, fiber coupler, dichroic optic, or other coupler) to a communications terminal and/or to a wavelength conversion stage to generate a communications wavelength while the remaining portion is used primarily for power transfer.

In some embodiments, using a power link as a carrier (or sharing the same narrow-beam pointing infrastructure) can provide improved signal-to-noise ratio (SNR) under some conditions compared to low-power communication links and can support larger range and/or more challenging conditions. By combining services, fewer payload items and reduced complexity and cost may be achieved, making operations more viable and scalable. In some embodiments, the solar powered plane connects to a satellite network supporting optical communications (FSO/lasercom) such that a lasercom terminal on the plane points to one or more satellites and provides direct connections and/or connections to ground networks.

In one embodiment, this is operable to be generalized as a solar powered plane, such as a plane configured to operate in the stratosphere, configured to receive wireless power from a ground station or node via directed wireless power transmission, and further configured to exchange data with the ground station or node using at least one of: (i) a separate point-to-point communications link that is independent of the directed power beam, and (ii) by modulation of the directed power beam to carry a data signal.

Optional features are operable to include one or more of the following:

- The solar powered plane is configured to use both (i) and (ii) to provide communications diversity and robustness.

The plane exchanges data using a separate communications beam that is co-aligned with a directed power beam.

The separate point-to-point communications link comprises E-band RF and/or FSO and operates in parallel with the directed power beam for diversity.

A data signal is carried on a pilot beam while a main power beam is unmodulated or slowly modulated.

Optical links are combined with cryptographic services, including key distribution techniques, and/or QKD.

A portion of an optical power beam is coupled using an optical coupler and/or wavelength selective element to provide an optical communications channel while a remaining portion is used primarily for power transfer.

The solar powered plane includes wavelength-selective optics to direct a first wavelength band to power conversion and a second wavelength band to a laser-com terminal.

G.6C (Atmospheric) Dispersion Mitigation and "Tunnel"

In some embodiments, optical propagation is affected by atmospheric dispersion and/or turbulence. In some embodiments, dispersion and/or turbulence mitigation is performed using wavelength selection, wavefront techniques, adaptive optics, beam shaping, and/or diversity techniques. In some embodiments, a first beam is used to create and/or maintain a pathway through atmospheric clutter (such as dense cloud and/or dust) and a second beam is used within the pathway for communications and/or for power transfer. In some embodiments, the power used to create and/or maintain a pathway is modulated in real time responsive to path characteristics to maintain a target delivered power and/or communications link quality as conditions vary.

In some embodiments, the first beam used to condition the propagation path comprises a pulsed beam and/or an ultrafast beam (for example a high peak-power pulsed beam) configured to modify a propagation condition through an obscurant and/or to support formation of a transient low-attenuation channel, subject to applicable safety limits and implementation constraints. In some embodiments, the conditioned path is maintained using a duty cycle and/or pulse repetition rate selected responsive to measured backscatter and/or attenuation.

In one embodiment, this is operable to be generalized as a method of operating a wireless power and/or communications link for a solar powered plane configured to operate in the stratosphere, comprising selecting at least one link parameter responsive to atmospheric conditions; and controlling at least one of beam pointing, beam power, and wavefront correction to increase received power and/or link quality at the solar powered plane.

A method of operating a wireless power and/or communications link for a solar powered plane configured to operate in the stratosphere, comprising: selecting at least one link parameter responsive to atmospheric conditions; controlling at least one of beam pointing, beam power, and wavefront correction to increase received power and/or link quality at the solar powered plane; and optionally operating a first beam to condition a propagation path and operating a second beam through the conditioned path to transmit power and/or data.

A system comprising: a first optical beam configured to condition a propagation path between a ground station or node and a solar powered plane; and a second optical beam configured to transmit data and/or power between the ground station or node and the solar powered plane through the conditioned path.

Optional features are operable to include one or more of the following:

The conditioned path is maintained by controlling the first beam in response to backscatter measurements.

The conditioned path is maintained by controlling the first beam in response to received power telemetry from the solar powered plane.

The conditioned path is maintained by controlling the first beam in response to ground-based optical sensing.

The first beam comprises a pulsed beam and/or ultrafast beam.

The pulsed beam and/or ultrafast beam are selected to condition a transient propagation path through an obscurant, subject to safety constraints.

The first beam is controlled using a duty cycle and/or repetition rate responsive to measured backscatter and/or received power telemetry.

Wavelength selection is performed dynamically based on measured attenuation and/or scattering at specific wavelengths.

The solar powered plane carries atmospheric sensors and provides this data to select link parameters and/or ground station selection.

The system includes safety limits on conditioning beam operation (e.g., geofencing, aircraft avoidance logic, controlled duty cycle).

The system switches between (i) single-beam operation and (ii) two-beam conditioned-path operation responsive to detected cloud/attenuation conditions.

G.6D Ground Station Diversity

When conditions do not permit a given technique to transfer power and/or data, the system may include multiple diverse ground station locations providing services to platforms above. For instance, if a storm presents impenetrable conditions in one region, a second ground station some distance away (e.g., several hundred kilometres) can provide services to platforms above. Mission planning may take into account forecasts, conditional limits, and optimise configuration and operations.

In some embodiments, multiple ground power stations point at one platform to aggregate their power to fit generation limits and to provide diversity and resilience. In some embodiments, power transmitted in a beam is modulated to adapt to path characteristics and to achieve a consistent level of power delivery. In some embodiments, power is additionally modulated for safety when a beam is off-target to avoid damaging or interfering with platforms.

In one embodiment, this is operable to be generalized as a wireless power transfer system for one or more solar powered planes configured to operate in the stratosphere, comprising: a plurality of geographically separated ground stations configured to transmit wireless power through the air to a solar powered plane.

Optional features are operable to include one or more of the following:

multiple ground stations may be operated concurrently to aggregate delivered power.

the transmitted power is modulated responsive to at least one of path characteristics, received power telemetry, and pointing error.

Transmission is reduced or interrupted when a beam is off-target.

G.6E Wireless Power Live Supply

This extends the idea of wireless power charging to transfer power from the ground up to a "master node station" which is a Solaris platform acting as a power distribution station in the sky. This platform not only receives ground power beamed up to it but relays it onward to another Solaris platform some distance away. The receiving platform can be a sensing platform gathering data or a relay node that relays power onward to another sensing platform or another relay node. As in communications systems, this forms a mesh network that allows dynamic formation, range extension, reconfiguration, optimisation, healing, and other network features.

In some embodiments, a master node station acts as a master relay avoiding conversion of the transferred signal into DC and then back into electromagnetic radiation (RF and/or FSO), thereby improving relay efficiency and/or reducing mass and reducing the amount of power required for keeping each platform in steady flight, subject to implementation constraints.

In some embodiments, the master node station forwards incident wireless power by for example optical to optical or RF to RF redirection without full electrical conversion, thereby reducing conversion loss and thermal load. In further embodiments, the master node station forwards wireless power by power redirection, in which incident wireless power is redirected toward a downstream receiver by wavefront manipulation rather than by photovoltaic conversion to DC followed by retransmission. For example and not limitation, the master node station may comprise a reconfigurable power redirection structure configured to controllably alter phase and/or amplitude across an aperture to steer and/or focus received RF wireless power (e.g., microwave or millimetre-wave) toward a target platform, conceptually similar to a reconfigurable intelligent surface (RIS). In some embodiments, an analogous wavefront-manipulating element is used for optical/FSO power (e.g., controllable mirror, adaptive optics, or diffractive optical element) to redirect incident optical power toward a receiver. In some embodiments, the master node station extracts a portion of the received power to supply onboard loads and/or charge onboard energy storage while redirecting another portion toward one or more downstream platforms.

In some embodiments, the wavefront-manipulating element comprises a steerable reflector and/or mirror and/or mirror array, including a galvanometer-driven mirror, phased optical array, adaptive optics element, and/or a diffractive optical element, configured to redirect incident optical power while maintaining a desired pointing direction. In some embodiments, the master node station includes one or more sensors for tracking and alignment, for example sensors responsive to near infrared (NIR) and/or short-wave infrared (SWIR) wavelengths and uses these sensors to control pointing of the redirection structure. Again, data transfer can be combined with this power network to distribute data (communications), or both. The solution may use one or more wireless transfer technologies to create a pathway and deliver power to a platform or network of platforms. A key benefit of live supply and mesh distribution is a reduction in energy storage and capture required on airborne platforms. This can support higher power missions (e.g., higher power sensors including radar and/or LiDAR), operations in more challenging conditions (e.g., stronger winds), and reduction in mass carried which can lead to smaller airframes and more scalable platforms.

In one embodiment, this is operable to be generalized as a system comprising a plurality of solar powered planes configured to operate in the stratosphere, wherein a first solar powered plane is configured to receive wireless power transmitted through the air and to forward at least a portion of the received wireless power to one or more other solar powered planes, thereby forming a peer-to-peer or mesh-type wireless power distribution network.

Optional features are operable to include one or more of the following:

- The first solar powered plane forwards power while also charging its own onboard energy storage.
- Multiple relay nodes are used in series to extend delivery distance and/or to route around weather.
- Power routing is coordinated with data routing in a combined power-and-data mesh.
- The first solar powered plane forwards wireless power by power redirection using a reconfigurable power redirection structure configured to steer and/or focus an incident wireless power wavefront toward a downstream receiver.
- Reconfigurable power redirection structure includes a controllable mirror, galvanometer-driven mirror, MEMS mirror array, adaptive optics element, phased optical array, and/or diffractive optical element configured to redirect incident optical power.
- The master node or relay node include tracking sensors responsive to at least one of near infrared and shortwave infrared and uses sensor feedback to control pointing and/or wavefront shaping.

General features are operable to include one or more of the following:

- Using lasercoms or FSO techniques to connect suborbital platforms with ground stations for high capacity, hardened communications.
- Using a combination of lasercoms and RF (e.g., E-band) communications to directly connect suborbital platforms with ground stations for network diversity.
- Using lasers or FSO, or RF (microwaves or similar) to provide wireless power from the ground up to one or more suborbital platforms for direct recharging and/or for relaying power onward to another suborbital platform as a mesh network.
- Combining wireless power and communications in one link and similarly across a mesh network of combined power and data distribution between suborbital platforms, wherein a power beam becomes a carrier beam for data.
- Using high power links between a ground station and one or more suborbital platforms to create a tunnel through atmospheric clutter (typically dense clouds) as a pathway for communications and/or as a carrier for communications and power.
- Using diverse locations of base stations to provide multiple opportunities for connecting to suborbital platforms for power and/or data.
- Using multiple ground power stations pointing at one platform to aggregate power to fit generation limits and provide diversity and resilience.
- Modulating power transmitted in a beam to adapt to path characteristics to achieve a consistent level of power delivery and for safety when a beam is off-target to avoid damaging or interfering with platforms.
- Using a reconfigurable power redirection structure (e.g., RIS/metasurface/controllable reflector) on an airborne platform to redirect incident wireless power toward one or more other platforms without full conversion to DC and retransmission.

In some embodiments, the topology used for wireless power distribution (G.6) is coordinated with, or shared with, a communications network (G.7), such that one or more solar powered planes act as gateway nodes for both (i) wireless power forwarding and (ii) data aggregation and backhaul. In some embodiments, the same pointing, tracking, and safety interlock subsystems are used across power links and communications links, and network scheduling coordinates charging windows with high-rate data transfer windows.

G.7 Peer-to-Peer FSO (Laser Com) or RF Communications Mesh

In one embodiment, the Solaris platform is operable to implement a peer-to-peer Free Space Optical (FSO) communications mesh network where the data gathering platforms are connected via FSO and then one acts as the main node to collect and aggregate other platforms' data and deliver the data to a ground gateway and/or to a satellite network via a high capacity backhaul link. In some embodiments, the mesh supports multiple backhaul architectures including (i) Direct-to-Earth (DTE), in which a sensing platform links directly to a ground gateway, and (ii) Relay-to-Earth (RTE), in which one or more relay platforms provide multi-hop backhaul between sensing platforms and one or more ground gateways.

Figure 35:
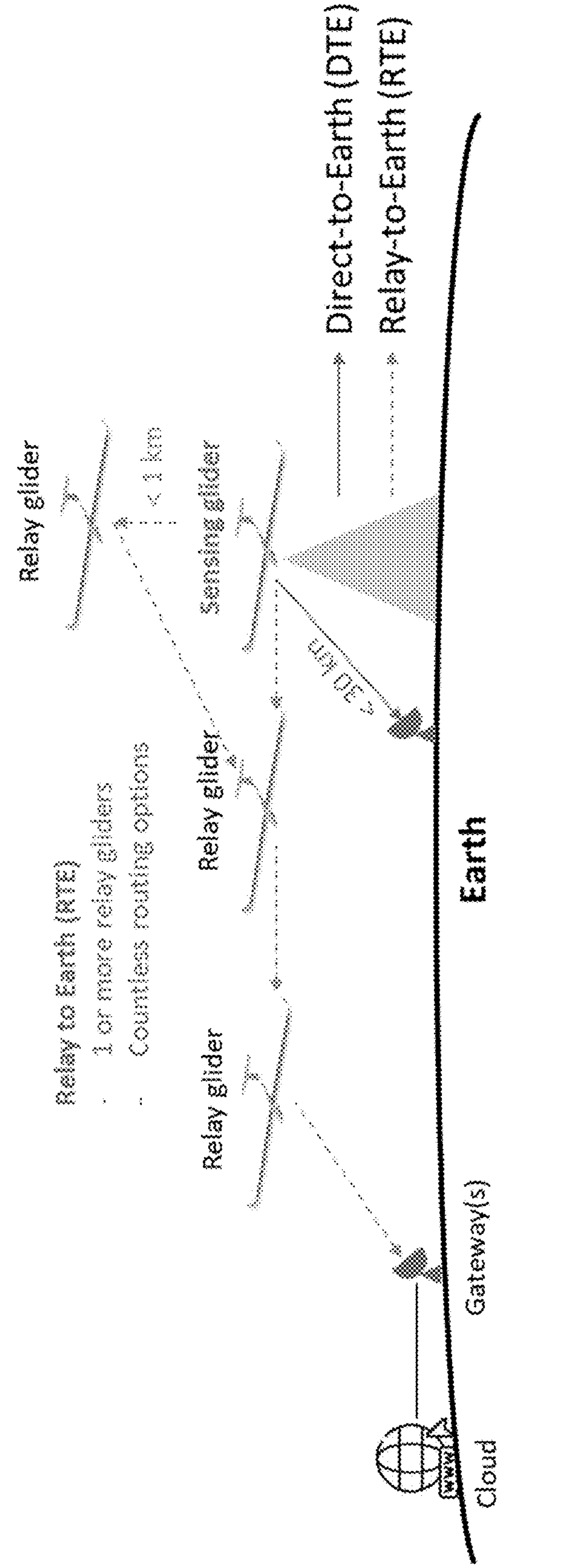
FIG. 35 illustrates backhaul modes for a peer-to-peer airborne communications network according to one embodiment of the present invention.

As an example, FIG. 35 illustrates backhaul modes for a peer-to-peer airborne communications network. A sensing platform may deliver data to a ground gateway by Direct-to-Earth (DTE) operation when gateway proximity and pointing constraints permit. Alternatively, Relay-to-Earth (RTE) operation provides multi-hop backhaul via one or more relay platforms, enabling extended range and flexible routing paths between the sensing platform and the ground gateway. The diagram is illustrative only and shows example inter node and node to ground link paths.

In some embodiments, node roles include sensing nodes, relay nodes and ground gateway nodes, and the network supports hub-and-spoke operation in which one relay aggregates data from multiple sensing platforms and one ground node aggregates multiple relays.

In addition to FSO, the communication system may also be extended or substituted with a point-to-point RF Link, such as an E-band mesh system, or other high-frequency spectrum mesh system. In some embodiments the RF mesh comprises E-band terminals providing high-capacity point-to-point links between sensing and relay platforms and/or between relay platforms and a ground gateway. This ensures we have comms options including links operable independently of third party satcom infrastructure and configurable to provide resilience, security and routing flexibility (e.g., mode switching, re-route, store and forward).

In some embodiments, DTE operation may be constrained by ground-gateway proximity and/or pointing constraints, whereas RTE operation provides extended range via relays at the cost of increased routing and network management complexity. Optical apertures or windows used for FSO communication may be formed in, or supported by, removable leading-edge D-section modules.

Backhaul/Concepts of Operations (CONOPS) Constraints and Performance Targets

In some embodiments, at least one sensor ground data path provides a data rate greater than about 100 Mbps, and in some embodiments a modem data rate is at least about 300 Mbps and up to about 2.5 Gbps, dependent on link distance and network loading.

In some embodiments, inter-sensor separation is on the order of tens of kilometres, for example about 60 km, and relay nodes provide mid-hop and/or last-hop backhaul.

In some embodiments, a maximum sensor-to-relay link distance is on the order of hundreds of kilometres, and a maximum relay-to-ground link distance is lower and may be atmosphere-limited.

No-Gimbal Terminals/Wide-Scan Arrays

In some embodiments, at least one platform uses a communications terminal with no mechanical steering, and beam pointing is achieved by electronic beam steering and/or switched-beam antenna arrays providing wide angular coverage (e.g., 360° azimuth coverage).

In some embodiments, the antenna implementation is selected from: (i) a circular switched beam array, (ii) two semi-circular switched-beam arrays, (iii) a hemispherical array, or (iv) multiple planar arrays co-located or distributed across the platform.

In some embodiments, the antenna provides high gain (e.g., greater than about 42 dBi) while maintaining wide scan coverage to support relay-to-earth operation without a gimbal.

In some embodiments, an E-band payload mass budget is constrained, for example with side payload mass less than about 0.5 kg and/or centre payload mass less than about 1 kg, with interconnections to the autopilot via wired data links such as Ethernet.

Figure 36:
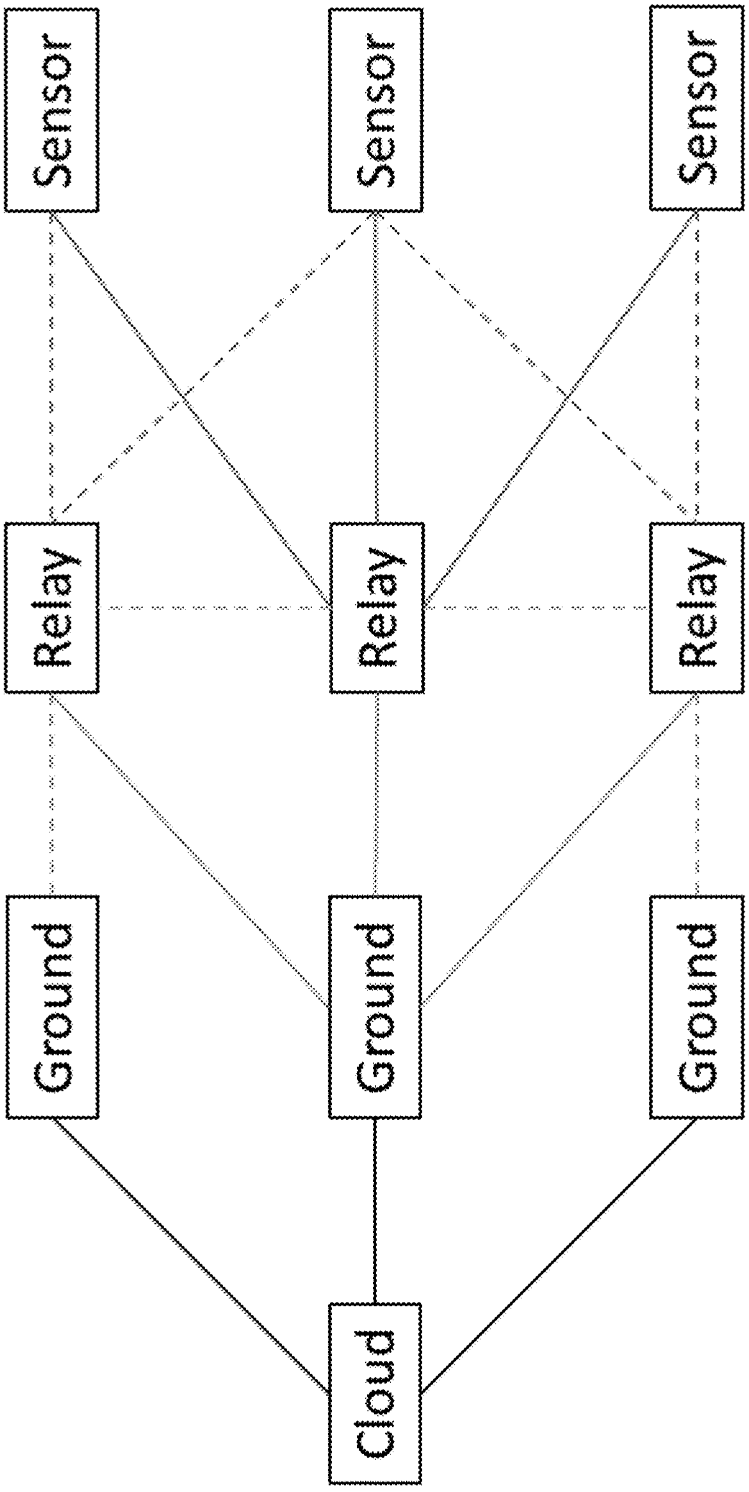
FIG. 36 illustrates a schematic illustrating angular coverage patterns achievable using electronic beam steering and/or switched-beam arrays to support mesh links without mechanical gimbals according to one embodiment of the present invention.

FIG. 36 shows a schematic illustrating angular coverage patterns achievable using electronic beam steering and/or switched-beam arrays to support mesh links without mechanical gimbals. Multiple beam sectors may be selected to provide wide azimuth and elevation coverage, enabling a platform to establish and maintain links to neighbouring nodes and/or to a ground gateway while accommodating relative motion and network topology changes.

Figure 37:
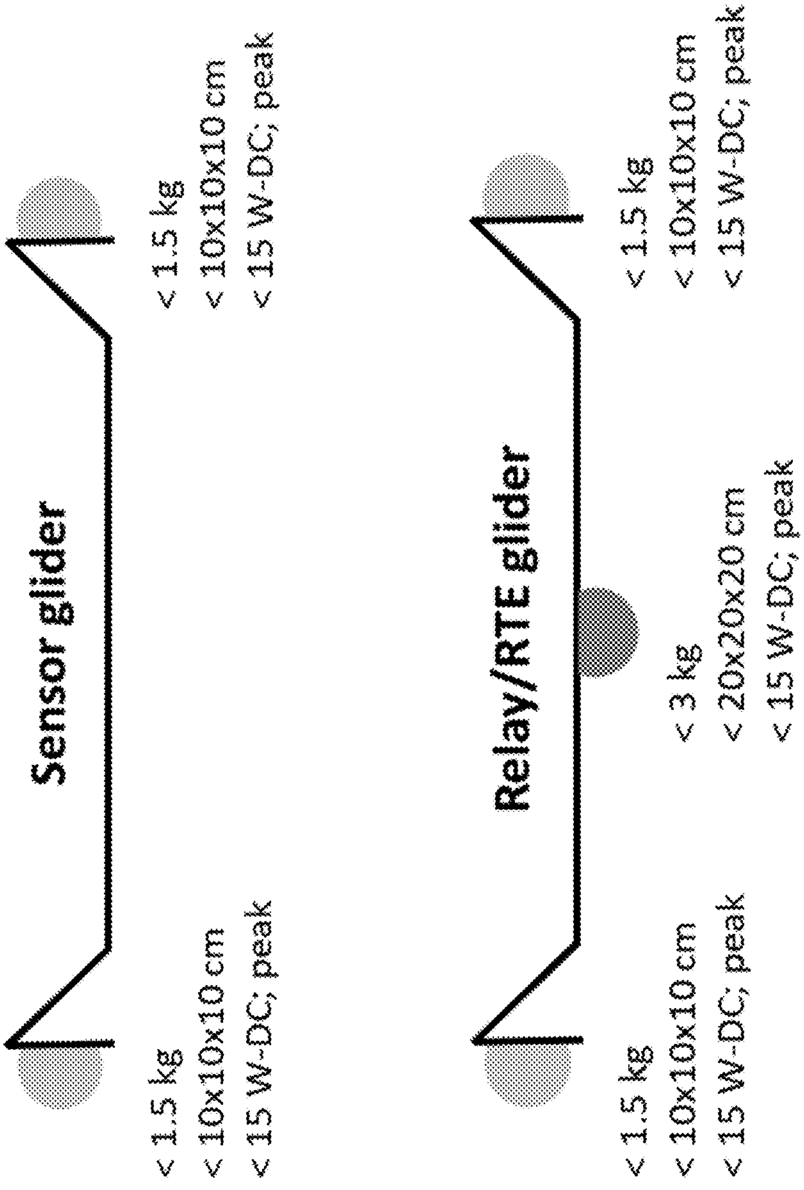
FIG. 37 illustrates an example allocation of RF communications payload modules on different platform roles within the mesh according to one embodiment of the present invention.

FIG. 37 illustrates an example allocation of RF communications payload modules on different platform roles within the mesh, including a sensing platform and a relay platform. In some embodiments, multiple side payload modules are mounted at spanwise locations and an additional centre payload module is provided on relay platforms to support additional links and/or backhaul. The diagram is illustrative of packaging and distribution concepts for meeting mass and volume constraints while supporting multi-link mesh connectivity.

E-Band and Point-to-Point Mesh Systems

The comms network may also comprise a point-to-point RF mesh system, such as an E-band or other high frequency spectrum system, configured to operate independently of external or third-party satellite communication infrastructure. This enables a secure, high-capacity data transfer under the control of the network operator or mission authority.

The mesh network can include a plurality of airborne communication nodes distributed among different classes of aircraft, such as sensing gliders, relay gliders, or a ground node glider. In some embodiments, sensing platforms connect to neighbouring relay platforms to establish multi-hop links back to a ground gateway node, and the ground gateway node includes a higher-capacity terminal to connect to a fixed ground station or network. As an example, the sensing gliders can be equipped with communication terminals that exchange data with other neighbouring relay gliders, thereby establishing daisy chained links back to the ground node glider. The ground node glider includes a high-capacity communication terminal configured to provide a link to a ground station or other fixed node within the network.

Additionally, the communication mesh may further include or interoperate with a FSO communication subsystem, such as a laser communication link. The FSO subsystem may be used as an alternative or supplementary layer to the RF mesh, depending on one or more of the following: environmental conditions, operational constraints, or available satellite network access. The system architecture is able to accommodate future integration with satellite based FSO, or high bandwidth RF networks.

Adaptive and Intelligent Routing

An 'optimal routing' framework is also incorporated that automatically selects the most suitable link type based on mission requirements and operating conditions. For example, laser com can be used under clear line of sight conditions, while the system can fail over to RF or satellite links under cloud cover, or stores and forwards data until condition improve. Mission requirements are either predefined prior to flight or re-assigned in real time by an onboard or remote controller. This allows the communications network to be dynamically optimised for one or more operational parameters, such as bandwidth, power consumption, and security depending on mission priority or environmental factors. Routing logic can prioritise latency, bandwidth, or energy efficiency based on mission type or requirements. Routing parameters and node priorities may be reassigned dynamically from a ground station or mission controller. A distributed artificial intelligence or machine learning model may also be used onboard to optimise routing, bandwidth allocation, or link prioritisation.

In one embodiment, this is operable to be generalized as a solar powered plane, such as a plane configured to operate in the stratosphere, that includes one or more communication devices arranged to communicate directly with corresponding devices on other aircraft, thereby forming a peer-to-peer mesh network.

Optional features are operable to include one or more of the following:

- The one or more communication devices are selected from FSO transceivers and RF transceivers, and/or satellite communication transceivers.
- The plurality of planes forms a distributed, self-organising mesh network.
- Each aircraft can function as both a data source and a communication relay, enabling multi-hop data exchange without reliance on ground infrastructure or external satellite networks.
- at least one plane acts as a main node to collect and aggregate data from other planes.
- at least one plane can transmit the aggregated data via a high-bandwidth communication link to a ground station or to a satellite.
- Relay planes are used to daisy chain data between nodes and a ground node plane providing a backhaul connection.
- the high bandwidth communication link comprises a free-space optical (FSO) link or a radio-frequency (RF) link and/or a satellite link.
- RF link includes a point-to-point RF link such as an E-band mesh link, or other high-frequency spectrum mesh system.
- A routing algorithm is employed that selects between FSO, RF, or satellite links based on predefined or real-time mission requirements and/or link conditions.
- the mesh network is configured to dynamically switch between FSO, RF, and satellite links depending on environmental or mission conditions.
- the mesh network is configured to re-route data between planes in the event of a communication link failure.
- the mesh network supports store-and-forward transmission of data.
- the communication links are configured to provide resistance to jamming or interference.
- at least one platform operates without mechanical steering, and beam pointing is provided by electronic beam steering and/or switched-beam operation to provide wide angular coverage.
- the peer-to-peer mesh network is configurable such that at least one aircraft operates as a relay and forwards data received from one or more other aircraft.
- at least one aircraft in the peer-to-peer mesh network operates as a gateway node that transmits aggregated data to a ground station and/or to a satellite.
- the network supports (i) a direct-to-ground mode in which a sensing aircraft transmits data to a ground station without airborne relaying, and (ii) a relay-assisted mode in which the data is forwarded via one or more relay aircraft.
- the peer-to-peer mesh is configured to adapt a link type, modulation, coding, and/or routing to satisfy a target throughput and/or range based on mission requirements and network loading.

G.8 Configurable Removable Leading-Edge Module or D-Section

As illustrated for example in FIGS. 6B-6D, the wing leading edge comprises a modular foam component forward of the spar. In certain embodiments shown by way of example, this component has a generally D-shaped cross-sectional appearance and may therefore be referred to as a 'D-section'. However, the term 'D-section' as used herein is non limiting and does not require any particular geometric shape or cross-section profile. The term is therefore intended to cover any leading-edge module positioned forward of a spar and configured to define, enclose, or support payloads, regardless of its exact geometry. "Profile" or "forward profile" refers to the external aerodynamic shape or contour of the D-section as viewed in a plane orthogonal or oblique to the wingspan. Profiles may include bulged, tapered, recessed, truncated, chamfered, or streamlined shapes, including shapes formed or altered to accommodate apertures, protrusions, or sensors.

The D-section can be configured as a modular element and can vary in shape to accommodate payloads or other components mounted or adjacent to the wing spar. This includes for example the ability to enlarge the D-section forward of adjacent sections, taper the D-section laterally to maintain aerodynamic smoothness, or shape the D-section with holes, cavities, recesses, or apertures to house sensors, communication devices, or other mission payloads. When the D-section bulges forward relative to adjacent sections, the additional internal volume may enable larger payload to be housed.

The D-section is operable to accommodate lenses or other sensor elements that protrude forward of, below, or above the leading edge. The elements may include lenses, cameras, photodetector, or other collector devices. The D-section may also be shaped with airflow lips, or guiding surfaces arranged to channel the boundary layer smoothly around the protruding element. In this way, the D-section can provide both structural housing and aerodynamic optimisation to reduce drag and turbulence that would otherwise be caused by a protrusion.

The D-section is further operable to include thermal or insulation materials to regulate the temperature of payloads or structural components housed in or adjacent to that section of the wing. The insulation may also be tailored to specific mission requirements, such as minimising heat loss in cold stratospheric conditions or shielding sensitive electronics and sensors from solar heating.

Unlike conventional leading edges, which are typically cast or moulded in carbon fiber or similar composite and therefore difficult and costly to modify, the D-sections are fabricated from lightweight foam or similar cuttable material. These can therefore be rapidly produced by hot-wire cutting directly from CAD models, allowing a new design to be manufactured in a matter of minutes at a very low cost. This approach also enables collaborative integration with payload partners. Payload partners may be provided with the D-section design template and the relevant spar or payload dimensions, allowing them to design their own customised D-section profile. These designs can then be manufactured directly by hot-wire cutting, ensuring rapid turnaround and cost-effective mission-specific adaptation.

The D-sections are designed to be removably attachable to the spar and to adjacent wing sections. The D-sections can simply be pop into place and are then secured with aerodynamic sealing such as tape applied over the joins, providing both structural retention and a smooth aerodynamic surface. The D-sections can therefore be easily removed or replaced in the field. Unlike hinged designs, the pop-in sections provide true modularity: mission specific sections can be installed, swapped, or serviced quickly and at a very low cost. By shaping, bulging, or recession the D-sections, different classes of mission payload can be housed, including communication equipment, scientific collectors, or biological and chemical sensors. The D-section can support specialised scientific missions, such as collectors for atmospheric gases or chemistry, biological experiments, or trailing collectors (e.g. a line extending 100 m or more behind the plane to measure atmospheric profiles.

In one embodiment, this is operable to be generalized as:

Configurable modular D-section: A solar powered plane comprising a wing having a leading-edge D-section housing one or more payloads formed of a removable modular component positioned forward of a wing spar, the D-section defining an internal volume that houses one or more payloads and being replaceable with mission specific variants having different forward profiles.

Configurable modular D-section with mission specific shaping: A solar powered plane comprising a wing having a leading-edge D-section formed of a removable modular component positioned forward of a wing spar, the D-section defining an internal volume that houses one or more payloads, the D-section being replaceable with mission specific variants having different forward profiles including curved, bulged, tapered or recessed shapes to accommodate payload elements mounted adjacent to or forward of the wing spar.

D-section with sensor apertures/protrusions and boundary layer conditioning: A solar powered plane comprising a wing having a leading-edge D-section formed of a removable modular component positioned forward of a wing spar, the D-section housing one or more sensor payloads and including apertures, recesses or protrusions for sensors, and aerodynamic shaping arranged to guide airflow around such protrusions.

In some embodiments, the removable leading-edge D-section module is configured to house one or more energy storage elements, such as batteries or battery modules, in addition to or instead of mission payloads, and to provide plug-and-play electrical coupling of such energy storage elements to the aircraft electrical system.

Rapidly manufactured D-section: A solar powered plane comprising a wing having a leading-edge D-section formed of a removable modular component positioned forward of a wing spar, the D-section defining an internal volume that houses one or more payloads and being manufactured from cuttable material using a hot-wire process based on CAD-defined templates.

An aircraft configured for operation in the stratosphere, comprising: (a) multiple wings; (b) a photo-voltaic power source; and (c) at least one payload item positioned inside one of the wings; wherein the payloads items are positioned behind one or more removable parts or covers that define a curved, frontal part of a leading edge of a wing surface and those removable parts or covers form a continuous surface with adjacent parts of the leading edge of the wing surface; and wherein at least one removable part or cover varies in cross-sectional shape relative to adjacent parts to accommodate payloads of different size or type.

Optional features are operable to include one or more of the following:

- the removable part or cover varies in cross-sectional shape along the wingspan.
- the aircraft is configured to accept multiple differently shaped removable covers at different wing stations.
- the leading-edge part comprises two or more removable cover pieces joined together.
- the removable part or cover is enlarged or bulged forward relative to adjacent parts to provide additional internal volume for payloads.
- the removable part or cover is tapered laterally to maintain aerodynamic smoothness with adjacent parts.
- the removable part or cover includes apertures, or recesses for housing or aligning with optical sensors, cameras, or other collector devices.
- the removable part or cover is shaped with aerodynamic lips, or ridges arranged to guide airflow smoothly around a protruding payload.
- the removable part or cover contains thermal or insulation material to regulate the temperature of the payload item.
- the removable part or cover is fabricated of any lightweight material, including foam, carbon fibre, composite laminate, or hybrid constructions.
- the removable part or cover is fabricated from foam or other lightweight machinable material and is cut directly from a CAD model.
- the removable part or cover design is defined by a digital template provided to third parties for customisation.
- the removable part or cover design is transmitted electronically and fabricated remotely.
- third parties or payload partners are enabled to design customised removable parts or covers from shared spar and payload dimensional data, and those parts or covers are manufactured directly from CAD.

the removable part or cover is fabricated by 3D printing directly from a CAD model.

the removable part or cover comprises a core of foam and a skin of fabric, plastic, or thin composite.

the removable part or cover is configured to pop into place against the spar or adjacent wing structure.

the removable part or cover is removably secured by aerodynamic sealing means comprising tape, adhesive, or film applied over the joins.

the payload item is mounted to a support bracket, retention strap, or non-rigid retention feature within the cavity exposed by removal of the leading-edge cover.

the payload item is retained without structural disassembly of the wing.

payload cavities are positioned at or near the leading edge, or at other parts of the wing skin, accessible through the removable covers.

the removable leading-edge D-section module is configured to house at least one battery or energy storage module and to electrically couple the battery or energy storage module to the aircraft upon installation of the module.

the payload item is swappable for a different payload type by removing the leading edge cover.

the aircraft comprises at least a battery positioned inside one of the wings, as an alternative or in addition to the payload.

the payload item comprises any avionics subsystem, imaging sensor, synthetic aperture radar, antenna, or phased array antenna, communications equipment, a scientific collector, a gas or chemistry sampler, or a biological experiment module.

the payload item comprises a trailing sensor extending at a substantial distance behind the aircraft, such as 100 m or more.

the payload item comprises a sampler configured to collect air, particulates, or atmospheric chemistry at or beyond the leading edge.

In one embodiment, the present invention is operable to include: A solar powered plane, such as a plane configured to operate in the stratosphere, that includes a descent control system arranged such that, in the event of loss of control or airframe failure or flight termination, a transferred energy to an impacted object and/or a kinetic energy imparted on impact by any item of the plane that reaches the ground is reduced to less than a predetermined energy or a regulatory or legal safety threshold.

In one embodiment, optional features are operable to include one or more of the following:

The kinetic energy imparted on impact and/or transferred energy to an impacted object is less than the predetermined energy threshold during a relevant interaction interval following first contact.

The relevant interaction interval is an initial interval prior to a secondary event comprising ground contact, rebound, separation, or a secondary impact.

The solar powered plane and/or its descent control system is configured to reduce a transferred energy to an impacted object by controlling one or more of: (i) descent speed, (ii) impact attitude and likely first-contact location along the span, (iii) mass distribution and modular separation, and (iv) structural compliance and damping.

One or more tethers interconnecting structural sections of the plane, wherein the tether or tethers are arranged to keep the structural sections attached together in the event of loss of control or an airframe failure or flight termination.

A braking system configured to reduce descent speed.

Where the braking system is configured to deploy automatically or manually to reduce the descent speed of the plane or its sections.

Where the braking system is a parachute.

Where the braking system is selected from one or more of: a parachute, a deployable wing surface, a drag panel, an airbag, a deployable aerodynamic foil, or other deployable drag-inducing structure.

Where the braking system is configured to reduce descent speed to less than 3 m/s at ground impact, or approximately 2 m/s at ground impact.

Where the braking system is designed according to the weight of the plane and distribution of its structural sections.

Where the deployment of the braking system is triggered by an onboard sensor, a remote command, or detection of a specific event such as loss of control, airframe failure or flight termination.

Where the braking system is connected by one or more tethers to high-mass items of the plane comprising batteries and/or payload items.

Where deployment of the braking system automatically triggers a release system.

Where the release system is configured to separate the high-mass items from their supporting structures and suspends them on individual tethers.

Where the release system comprises pulling a pin or other mechanical release coupled to the braking system or tether.

Where the release system is electronic, actuated by an onboard sensor that responds to at least one of: altitude, temperature, force, or sequence of events.

Where the release system is remotely actuated by an actuator.

Where the individual tethers provide a separation distance between the high mass items and a corresponding structural section during descent.

Further including high-mass items, wherein the high-mass items include multiple batteries retained in a wing section.

Where the high mass items are automatically released from their mounts in the wing.

Where the high mass items are suspended by individual tethers of several metres in length, such that the batteries and payloads are separated from the wing and descend ahead of the wing section, each item impacting the ground with a transferred energy below the regulatory or legal safety threshold.

Where each battery impacts the ground with a transferred energy of approximately 25 Joules.

Where the release system includes a release mechanism configured to drop one or more batteries from frames in which they are supported within a wing leading edge payload section.

Where the wing leading edge includes a foam material.

Where the foam material is formed with fault lines, so that a falling battery can readily pass through the foam and be suspended on its tether.

Where the wing leading edge or wing skin is formed of a relatively brittle or weak material, so that a falling high-mass item can break through without additional scoring.

Where a release system is arranged to be triggered independently of deployment of the braking system.

Where triggering comprises detecting tension in one or more tethers, structural failure of a structural section, or a predetermined sequence of events.

Where the release system is configured to permit sequential release of loads associated with different structural sections.

Further including a plurality of braking systems configured to control attitude during descent, arranged to provide additional control during descent and to orient the plane into a selected impact attitude.

Where the braking systems are selectively deployable to bias an impact attitude such that a spanwise end-region contacts first.

Where the airframe includes flexible wing structures and/or damping elements configured to dissipate energy during descent and/or during an impact event.

Where a modular architecture limits initial impact energy by preventing large masses from acting as a single heavy impactor.

Further including a rigid payload bay configured to maintain a fixed geometry independently of deformation of surrounding structures, wherein the rigid payload bay is configured to house (i) payloads each individually satisfying a maximum impact-energy criterion and/or (ii) high-mass payloads in combination with the release system.

Further including a warning system configured to provide a human-perceptible warning during at least a portion of a descent event.

Where the warning system is configured to activate automatically in response to at least one of: (i) deployment of the braking system, (ii) actuation of the release system, (iii) detection of loss of control, (iv) detection of structural failure, or (v) receipt of a flight termination command.

Where the warning system is configured to provide the warning at ground level during descent.

Where the warning system comprises at least one of: a flashing light, a strobe light, a beacon, a siren, a loudspeaker, or an audible alarm.

Where the warning system is configured to operate (i) for a predetermined time period, (ii) until ground contact of the plane or a released item, and/or (iii) until loss of contact between the plane or item and an impacted object.

Where the warning system configured to activate during descent in response to deployment of the braking system and/or actuation of the release system.

Where the regulatory or legal safety threshold corresponds to an impact energy of less than approximately 175 Joules, and/or a transferred energy to a person of less than 80 Joules.

Where no suspended item having a mass greater than about 4 kg impacts the ground without a braking system being deployed.

Where each battery impacts the ground with a transferred energy of about 25 J.

Where no single item impact exceeds 80 Joules.

Where the plane is a dual fuselage plane with an approximately 25 to 40 m wingspan.

Further including a wiring loom that runs along a surface of a wing spar.

Further including a wiring architecture in which control signal wiring is routed externally of a wing spar and power distribution wiring is routed within the wing spar.

Further including a removable airframe component, wherein the removal of the removable airframe component exposes one or more connectors arranged to permit plug and play connection of a payload.

Further including a wing spar having a plurality of apertures, cutouts or channels located in respective bays between adjacent wing ribs, the apertures, cutouts or channels being configured to allow wiring to exit an interior of the wing spar to interface with payloads positioned in the wing.

Further including a leading-edge D-section housing one or more payloads formed of a removable modular component positioned forward of a wing spar, the D-section defining an internal volume that houses one or more payloads and being replaceable with mission specific variants having different forward profiles.

Where the different forward profiles include curved, bulged, tapered or recessed shapes to accommodate payload elements mounted adjacent to or forward of the wing spar.

Where the D-section includes apertures, recesses or protrusions for sensors, and aerodynamic shaping arranged to guide airflow around such protrusions.

Where the D-section defines an internal volume that houses one or more payloads and being manufactured from cuttable material using a hot-wire process based on CAD-defined templates.

Where the removable leading-edge D-section module is configured to house at least one battery or energy storage module and to electrically couple the battery or energy storage module to the aircraft upon installation of the module.

Further including communication devices configured to communicate directly with other aircraft or another node to form a peer-to-peer mesh network, and a routing subsystem configured to dynamically select between free-space optical, radiofrequency, and satellite links using mission-dependent parameters.

Further including at least one user-movable item that is configured to be positioned pre-flight against a support surface, in which the user-movable item includes at least one hook/fastener pad or strip and the support surface includes at least one reciprocal hook/fastener pad or strip.

Further including multiple main lift wings having substantially constant chord such that a common rib design is employable across the wings.

Further including a plurality of elevators, the elevators being configured with a substantially constant chord so that a single rib design is employable across all of the elevators.

Further including a plurality of rudders, the rudders being configured with a substantially constant chord so that a single rib design is employable across all of the rudders.

Where the plane/glider is configured to communicate with other aircraft or another node in a mesh network, the aircraft including logic that automatically reroutes data through alternative aircraft or another node when a communication link fails and that stores data for later forwarding when a link is unavailable.

Further including one or more communication devices arranged to communicate directly with corresponding devices on other aircraft, thereby forming a peer-to-peer mesh network.

Further including an energy storage system comprising one or more onboard batteries, in which the energy storage system is arranged to receive electrical power by wireless energy transmission through the air, such as by microwave, millimetre-wave, optical, or laser-based transmission.

Further including an optical power receiver configured to receive an optical beam transmitted through the air from a ground station or node and to convert the received optical power into electrical power; and an electrical interface configured to supply the electrical power to at least one of propulsion, avionics, communications, payloads, and onboard energy storage.

Where the plane/glider is configured to receive wireless power from a ground station or node via directed wireless power transmission, and further configured to exchange data with the ground station or node using at least one of: (i) a separate point-to-point communications link that is independent of the directed power beam, and (ii) by modulation of the directed power beam to carry a data signal.

In one embodiment, the present invention is operable to include a method of operating a solar powered plane configured to operate in the stratosphere, comprising detecting a loss of control, airframe failure, or flight termination condition; deploying at least one descent-control measure; and configuring a descent profile such that a transferred energy to an impacted object is below a predetermined energy or a regulatory or legal safety threshold.

In another embodiment, the present invention is operable to include a method of configuring a solar powered plane to satisfy a transferred energy threshold, comprising determining transferred energy as a function of impact position along a span and time dependent structural response, and configuring at least one of descent speed, impact attitude, mass partitioning, and structural compliance accordingly.

In another embodiment, the present invention is operable to include a method of configuring and/or validating a solar powered plane configured to operate in the stratosphere to meet a transferred energy safety threshold, comprising assessing transferred energy to an impacted object as a function of at least one of impact position along a span, a mass ratio between the impacted object and the plane or a structural section of the plane, and time-dependent structural response, and configuring the plane and/or its descent control system such that transferred energy during a relevant interaction interval is below a predetermined threshold.

In another embodiment, the present invention is operable to include a solar powered plane, such as a plane configured to operate in the stratosphere, and that includes a wiring loom that runs along a surface of a wing spar.

In another embodiment, the present invention is operable to include a solar powered plane, such as a plane configured to operate in the stratosphere, and that includes a wiring architecture in which control signal wiring is routed externally of a wing spar and power distribution wiring is routed within the wing spar.

In another embodiment, the present invention is operable to include a solar powered plane, such as a plane configured to operate in the stratosphere, the plane comprising a removable airframe component, wherein the removal of the removable airframe component exposes one or more connectors arranged to permit plug and play connection of a payload.

In another embodiment, the present invention is operable to include a solar powered plane, such as a plane configured to operate in the stratosphere, and that includes a wing spar having a plurality of apertures, cutouts or channels located in respective bays between adjacent wing ribs, the apertures, cutouts or channels being configured to allow wiring to exit an interior of the wing spar to interface with payloads positioned in the wing.

In another embodiment, the present invention is operable to include a wing assembly comprising a wing spar, a wiring loom routed along an external surface of the spar, and at least one connector exposed upon removal of a removable airframe component to permit plug-and-play payload installation.

In another embodiment, the present invention is operable to include a solar powered plane comprising a wing having a leading-edge D-section housing one or more payloads formed of a removable modular component positioned forward of a wing spar, the D-section defining an internal volume that houses one or more payloads and being replaceable with mission specific variants having different forward profiles.

In another embodiment, the present invention is operable to include a solar powered plane comprising a wing having a leading-edge D-section formed of a removable modular component positioned forward of a wing spar, the D-section defining an internal volume that houses one or more payloads, the D-section being replaceable with mission specific variants having different forward profiles including curved, bulged, tapered or recessed shapes to accommodate payload elements mounted adjacent to or forward of the wing spar.

In another embodiment, the present invention is operable to include a solar powered plane comprising a wing having a leading-edge D-section formed of a removable modular component positioned forward of a wing spar, the D-section housing one or more sensor payloads and including apertures, recesses or protrusions for sensors, and aerodynamic shaping arranged to guide airflow around such protrusions.

In another embodiment, the present invention is operable to include a solar powered plane comprising a wing having a leading-edge D-section formed of a removable modular component positioned forward of a wing spar, the D-section defining an internal volume that houses one or more payloads and being manufactured from cuttable material using a hot-wire process based on CAD-defined templates.

In another embodiment, the present invention is operable to include a removable leading-edge module for a wing of a solar powered plane, defining an internal payload volume and comprising at least one external aerodynamic surface and at least one electrical connector interface configured for plug-and-play coupling to a wing spar wiring architecture.

In another embodiment, the present invention is operable to include a solar powered plane including communication devices configured to communicate directly with other aircraft or another node to form a peer-to-peer mesh network, and a routing subsystem configured to dynamically select between free-space optical, radio-frequency, and satellite links using mission-dependent parameters.

In another embodiment, the present invention is operable to include a solar-powered aircraft configured to communicate with other aircraft or another node in a mesh network, the aircraft including logic that automatically reroutes data through alternative aircraft or another node when a communication link fails and that stores data for later forwarding when a link is unavailable.

In another embodiment, the present invention is operable to include a solar powered plane, such as a plane configured to operate in the stratosphere, and that include at least one user-movable item that is configured to be positioned preflight against a support surface, in which the user-movable item includes at least one hook/fastener pad or strip and the support surface includes at least one reciprocal hook/fastener pad or strip.

In another embodiment, the present invention is operable to include a solar powered plane, such as a plane configured to operate in the stratosphere, including wing ribs made of compressed structural foam struts.

In another embodiment, the present invention is operable to include a solar-powered aircraft including multiple main lift wings having substantially constant chord such that a common rib design is employable across the wings.

In another embodiment, the present invention is operable to include a solar powered plane, such as a plane configured to operate in the stratosphere, that includes a plurality of elevators, the elevators being configured with a substantially constant chord so that a single rib design is employable across all of the elevators.

In another embodiment, the present invention is operable to include a solar powered plane, such as a plane configured to operate in the stratosphere, that includes a plurality of rudders, the rudders being configured with a substantially constant chord so that a single rib design is employable across all of the rudders.

In another embodiment, the present invention is operable to include a solar-powered aircraft comprising a gas-filled enclosure configured to provide control pressurisation and/or thermal buffering and/or lightweight volume within a structural region.

In another embodiment, the present invention is operable to include a solar powered plane, such as a plane configured to operate in the stratosphere, that includes one or more communication devices arranged to communicate directly with corresponding devices on other aircraft, thereby forming a peer-to-peer mesh network.

In another embodiment, the present invention is operable to include a solar powered plane, such as a plane configured to operate in the stratosphere, that includes an energy storage system comprising one or more onboard batteries, in which the energy storage system is arranged to receive electrical power by wireless energy transmission through the air, such as by microwave, millimetre-wave, optical, or laser-based transmission.

In another embodiment, the present invention is operable to include a solar powered plane, such as a plane configured to operate in the stratosphere, comprising: an optical power receiver configured to receive an optical beam transmitted through the air from a ground station or node and to convert the received optical power into electrical power; and an electrical interface configured to supply the electrical power to at least one of propulsion, avionics, communications, payloads, and onboard energy storage.

In another embodiment, the present invention is operable to include a method of powering a solar powered plane comprising: directing an optical power beam from a ground station or node towards an optical power receiver on the solar powered plane; receiving the beam at the receiver; converting the received optical power into electrical power; and supplying the electrical power to at least one of propulsion, payload, avionics, communications, and onboard energy storage of the solar powered plane.

In another embodiment, the present invention is operable to include a solar powered plane, such as a plane configured to operate in the stratosphere, configured to receive wireless power from a ground station or node via directed wireless power transmission, and further configured to exchange data with the ground station or node using at least one of: (i) a separate point-to-point communications link that is independent of the directed power beam, and (ii) by modulation of the directed power beam to carry a data signal.

In another embodiment, the present invention is operable to include a method of operating a wireless power and/or communications link for a solar powered plane configured to operate in the stratosphere, comprising selecting at least one link parameter responsive to atmospheric conditions; and controlling at least one of beam pointing, beam power, and wavefront correction to increase received power and/or link quality at the solar powered plane.

In another embodiment, the present invention is operable to include a method of operating a wireless power and/or communications link for a solar powered plane configured to operate in the stratosphere, comprising: selecting at least one link parameter responsive to atmospheric conditions; controlling at least one of beam pointing, beam power, and wavefront correction to increase received power and/or link quality at the solar powered plane; and optionally operating a first beam to condition a propagation path and operating a second beam through the conditioned path to transmit power and/or data.

In another embodiment, the present invention is operable to include a system comprising: a first optical beam configured to condition a propagation path between a ground station or node and a solar powered plane; and a second optical beam configured to transmit data and/or power between the ground station or node and the solar powered plane through the conditioned path.

In another embodiment, the present invention is operable to include a wireless power transfer system for one or more solar powered planes configured to operate in the stratosphere, comprising: a plurality of geographically separated ground stations configured to transmit wireless power through the air to a solar powered plane.

In another embodiment, the present invention is operable to include a system comprising a plurality of solar powered planes configured to operate in the stratosphere, wherein a first solar powered plane is configured to receive wireless power transmitted through the air and to forward at least a portion of the received wireless power to one or more other solar powered planes, thereby forming a peer-to-peer or mesh-type wireless power distribution network.

In another embodiment, the present invention is operable to include a method of transferring power to a solar powered plane, the method comprising directing a wireless power beam from a ground station; receiving telemetry indicating at least one of pointing error and received power; and controlling beam pointing and/or transmitted power responsive to the telemetry to maintain a target delivered power while enforcing a safety limit when off-target.

In another embodiment, the present invention is operable to include a ground station comprising: a wireless power transmitter configured to transmit a directed wireless power beam to a solar powered plane; a pointing and tracking subsystem; and a controller configured to control at least one of beam pointing and beam power based on (i) position/attitude telemetry from the plane and/or (ii) a received-power indication from the plane.

In another embodiment, the present invention is operable to include a solar powered plane comprising a reconfigurable power redirection structure configured to receive incident wireless power and to redirect the wireless power toward a downstream receiver by controllably altering phase and/or amplitude across an aperture.

In another embodiment, the present invention is operable to include a system comprising a ground station and a solar powered plane, wherein the ground station transmits a directed beam to the plane, the plane converts received energy to electrical power, and data is exchanged between the ground station and plane by modulation of the directed beam and/or by a co-aligned communications beam.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A glider configured for operation in the stratosphere, comprising:

multiple wings;

at least one fuselage;

a photovoltaic power source;

at least one battery positioned inside one of the multiple wings;

at least one payload item positioned inside one of the multiple wings or within the at least one fuselage;

a descent control system configured to reduce transferred energy to an impacted object by controlling mass distribution and modular separation;

a braking system; and a release system, wherein deployment of the braking system automatically triggers the release system to separate high-mass items including the at least one battery or the at least one payload item from respective supporting structures and to suspend the high-mass items on individual tethers;

wherein the at least one battery is positioned behind one or more removable parts or covers that define a curved, frontal part of a leading edge of a wing surface and wherein the one or more removable parts or covers form a continuous surface with adjacent parts of the leading edge of the wing surface.

2. The glider of claim 1, wherein the descent control system is arranged such that, in the event of loss of control or airframe failure or flight termination, the transferred energy to the impacted object and/or kinetic energy imparted on impact by any item of the glider that reaches the ground is reduced to less than a predetermined energy or a regulatory or legal safety threshold.

3. The glider of claim 2, wherein the descent control system is further configured to reduce the transferred energy to the impacted object by controlling impact attitude and likely first-contact location along a span of the glider, and structural compliance and damping.

4. The glider of claim 2, wherein the predetermined energy or the regulatory or legal safety threshold corresponds to an impact energy of less than approximately 175 Joules, and/or a transferred energy to a person of less than 80 Joules.

5. The glider of claim 1, further comprising one or more tethers interconnecting sections of the glider including the multiple wings, the at least one fuselage, the at least one payload item, and/or the at least one battery, wherein the one or more tethers are arranged to keep the sections of the glider attached together in an event of loss of control or an airframe failure or flight termination.

6. The glider of claim 1, wherein the braking system includes at least one parachute, a deployable wing surface, a drag panel, an airbag, a deployable aerodynamic foil, and/or another deployable drag-inducing structure, wherein the braking system is connected to one or more tethers and/or the at least one battery.

7. The glider of claim 6, wherein deployment of the braking system is triggered by an onboard sensor, a remote command, detection of a specific event such as loss of control, airframe failure, and/or flight termination, wherein the braking system is configured to reduce descent speed to less than 3 m/s at ground impact.

8. The glider of claim 6, wherein the release system comprises a release pin or another mechanical release coupled to the braking system and/or the one or more tethers.

9. The glider of claim 1, wherein the one or more removable parts or covers is made of foam.

10. The glider of claim 9, wherein the foam provides thermal protection for the at least one battery positioned behind the one or more removable parts or covers.

11. A glider, comprising:

an airframe comprising multiple wing sections, wherein the multiple wing sections include at least one removable component defining a leading edge of the multiple wing sections;

a plurality of power storage devices positioned distributed across the multiple wing sections to optimize weight distribution and energy storage capacity;

an optical power receiver configured to receive a directed optical power beam transmitted through air from a ground station or a node glider and to convert the received directed optical power beam into electrical power;

a braking system; and a release system, wherein deployment of the braking system automatically triggers the release system to separate high-mass items including one or more of the plurality of power storage devices or a payload from respective supporting structures and to suspend the high-mass items on individual tethers;

wherein the plurality of power storage devices are positioned behind the at least one removable component defining the leading edge of the multiple wing sections.

12. The glider of claim 11, further comprising an electrical interface configured to supply the electrical power to a propulsion system, avionics system, communications system, the payload, and/or the plurality of power storage devices.

13. The glider of claim 11, wherein the glider is further configured to exchange data with the ground station or the node glider via a separate point-to-point communications link that is independent of the directed optical power beam and by modulation of the directed optical power beam to carry a data signal.

14. The glider of claim 11, further comprising at least one communication device configured to communicate directly with other aircraft, a satellite, and/or the node glider to form a peer-to-peer mesh network, and a routing subsystem configured to dynamically select between free-space optical, radiofrequency (RF), and/or satellite links.

15. The glider of claim 11, wherein the optical power receiver comprises one or more photovoltaic receiver materials selected for a wavelength of the directed optical power beam.

16. The glider of claim 11, wherein the optical power receiver is mounted on a gimbal or includes a steerable receiver optic configured to enlarge a tracking envelope of the optical power receiver for receiving the directed optical power beam.

17. A solar powered glider, comprising:

an airframe comprising multiple wing sections, wherein the multiple wing sections include at least one removable component defining a leading edge of the multiple wing sections;

at least one photovoltaic power source;

at least one power storage device positioned within at least one of the multiple wing sections;

at least one payload item positioned within one or more of the multiple wing sections or within at least one fuselage;

a braking system; and a release system, wherein deployment of the braking system automatically triggers the release system to separate high-mass items including the at least one power storage device or the at least one payload item from respective supporting structures and to suspend the high-mass items on individual tethers;

wherein the at least one payload item comprises at least one communication module configured to receive and/or transmit signals; and wherein the at least one power storage device and/or the at least one payload item is positioned behind the at least one removable component defining the leading edge of the multiple wing sections.

18. The solar powered glider of claim 17, wherein the solar powered glider is further configured to exchange data with a ground station, a node glider, and/or at least one satellite via the at least one communication module.

19. The solar powered glider of claim 17, wherein the at least one communication module includes an automatic dependent surveillance-broadcast (ADS-B) receiver, a data relay subsystem comprising satellite communication (SATCOM), a radiofrequency (RF) line-of-sight data link, and/or a laser-based communication link.

20. The solar powered glider of claim 17, further comprising one or more tethers interconnecting sections of the solar powered glider including the multiple wing sections, the at least one payload item, and/or the at least one power storage device, wherein the one or more tethers are arranged to keep the sections of the solar powered glider attached together in an event of loss of control or an airframe failure or flight termination.

* * * * *